US012505460B2

(12) United States Patent
Warner et al.

(10) Patent No.: US 12,505,460 B2
(45) Date of Patent: Dec. 23, 2025

(54) LOCATION ALERT SYSTEM USING VEHICLE IDENTIFIERS AND TRANSACTION PARAMETERS

(71) Applicant: AutoAlert, LLC, Kansas City, MO (US)

(72) Inventors: Boyd Hodgson Warner, San Clemente, CA (US); Jeffrey Stuart Cotton, Laguna Hills, CA (US)

(73) Assignee: AutoAlert, LLC, Kansas City, MO (US)

( * ) Notice: Subject to any disclaimer, the term of this patent is extended or adjusted under 35 U.S.C. 154(b) by 0 days.

(21) Appl. No.: 18/648,998

(22) Filed: Apr. 29, 2024

(65) Prior Publication Data

US 2024/0394736 A1 Nov. 28, 2024

Related U.S. Application Data

(63) Continuation of application No. 17/543,364, filed on Dec. 6, 2021, now Pat. No. 11,972,447, which is a (Continued)

(51) Int. Cl.

| | |
|---|---|
| ***G06Q 30/00*** | (2023.01) |
| ***G06F 3/00*** | (2006.01) |
| ***G06F 3/0484*** | (2022.01) |
| ***G06F 16/00*** | (2019.01) |
| ***G06F 16/22*** | (2019.01) |
| ***G06F 16/25*** | (2019.01) |
| ***G06Q 10/00*** | (2023.01) |
| ***G06Q 10/087*** | (2023.01) |

(Continued)

(52) U.S. Cl.
CPC ....... *G06Q 30/0202* (2013.01); *G06F 3/0484* (2013.01); *G06F 16/22* (2019.01); *G06F 16/252* (2019.01); *G06Q 10/087* (2013.01); *G06Q 30/012* (2013.01); *G06Q 30/0185* (2013.01); *G06Q 30/0207* (2013.01); *G06Q 30/08* (2013.01); *G06Q 40/03* (2023.01); *G06Q 40/02* (2013.01); *G06Q 50/18* (2013.01)

(58) Field of Classification Search
CPC ......... G06Q 30/00; G06Q 10/00; G06Q 50/00
USPC ........................................................ 705/7.31
See application file for complete search history.

(56) References Cited

U.S. PATENT DOCUMENTS

| | | | |
|---|---|---|---|
| 4,554,418 | A | 11/1985 | Toy |
| 4,736,294 | A | 4/1988 | Gill et al. |

(Continued)

FOREIGN PATENT DOCUMENTS

| | | |
|---|---|---|
| EP | 1146459 | 10/2001 |
| EP | 1220131 | 7/2002 |
| WO | WO 2008/110939 | 9/2008 |

OTHER PUBLICATIONS

U.S. Appl. No. 61/155,388, filed Feb. 25, 2009, Colson.

*Primary Examiner* — Mustafa Iqbal
(74) *Attorney, Agent, or Firm* — Knobbe, Martens, Olson & Bear, LLP

(57) ABSTRACT

A computing system can generate data for rendering an interactive graphical user interface, allow a user to input transaction parameters, receive a vehicle identifier associated with an individual, determine that an existing vehicle is at a service location, and provide an indication that the first individual is a qualifying individual and that the existing vehicle is at the service location.

20 Claims, 81 Drawing Sheets

Related U.S. Application Data continuation of application No. 16/997,897, filed on Aug. 19, 2020, now Pat. No. 11,195,192, which is a continuation of application No. 14/263,894, filed on Apr. 28, 2014, now abandoned, which is a continuation of application No. 13/281,355, filed on Oct. 25, 2011, now abandoned.

(60) Provisional application No. 61/406,474, filed on Oct. 25, 2010.

(51) Int. Cl.

| | |
|---|---|
| ***G06Q 30/012*** | (2023.01) |
| ***G06Q 30/018*** | (2023.01) |
| ***G06Q 30/0202*** | (2023.01) |
| ***G06Q 30/0207*** | (2023.01) |
| ***G06Q 30/08*** | (2012.01) |
| ***G06Q 40/00*** | (2023.01) |
| ***G06Q 40/03*** | (2023.01) |
| ***G06Q 50/00*** | (2024.01) |
| *G06Q 40/02* | (2023.01) |
| *G06Q 50/18* | (2012.01) |

(56) References Cited

U.S. PATENT DOCUMENTS

| | | | |
|---|---|---|---|
| 4,774,664 | A | 9/1988 | Campbell et al. |
| 5,414,621 | A | 5/1995 | Hough |
| 5,493,490 | A | 2/1996 | Johnson |
| 5,500,793 | A | 3/1996 | Deming et al. |
| 5,664,115 | A | 9/1997 | Fraser |
| 5,724,573 | A | 3/1998 | Agrawal et al. |
| 5,742,769 | A | 4/1998 | Lee et al. |
| 5,774,883 | A | 6/1998 | Andersen et al. |
| 5,794,207 | A | 8/1998 | Walker |
| 5,884,305 | A | 3/1999 | Kleinberg et al. |
| 5,893,075 | A | 4/1999 | Plainfield et al. |
| 5,930,764 | A | 7/1999 | Melchione et al. |
| 5,933,818 | A | 8/1999 | Kasravi et al. |
| 5,940,812 | A | 8/1999 | Tengel et al. |
| 5,966,695 | A | 10/1999 | Melchione et al. |
| 5,987,434 | A | 11/1999 | Libman et al. |
| 6,023,687 | A | 2/2000 | Weatherly et al. |
| 6,026,370 | A | 2/2000 | Jermyn |
| 6,041,310 | A | 3/2000 | Green et al. |
| 6,061,682 | A | 5/2000 | Agrawal et al. |
| 6,073,112 | A | 6/2000 | Geerlings |
| 6,161,103 | A | 12/2000 | Rauer et al. |
| 6,236,978 | B1 | 5/2001 | Tuzhilin |
| 6,266,668 | B1 | 7/2001 | Vanderveldt et al. |
| 6,285,983 | B1 | 9/2001 | Jenkins |
| 6,332,126 | B1 | 12/2001 | Peirce et al. |
| 6,334,110 | B1 | 12/2001 | Walter et al. |
| 6,418,419 | B1 | 7/2002 | Nieboer et al. |
| 6,480,105 | B2 | 11/2002 | Edwards |
| 6,493,722 | B1 | 12/2002 | Daleen et al. |
| 6,502,080 | B1 | 12/2002 | Eichorst et al. |
| 6,526,335 | B1 | 2/2003 | Treyz et al. |
| 6,603,487 | B1 | 8/2003 | Bennett et al. |
| 6,629,095 | B1 | 9/2003 | Wagstaff et al. |
| 6,658,390 | B1 | 12/2003 | Walker |
| 6,925,411 | B1 | 8/2005 | Drost et al. |
| 6,941,305 | B2 | 9/2005 | Magouirk et al. |
| 6,950,807 | B2 | 9/2005 | Brock |
| 6,965,874 | B2 | 11/2005 | Joseph |
| 7,050,982 | B2 | 5/2006 | Sheinson |
| 7,065,555 | B2 | 6/2006 | Foulger et al. |
| 7,072,848 | B2 | 7/2006 | Boyd et al. |
| 7,089,588 | B2 | 8/2006 | Schaefer |
| 7,130,821 | B1 | 10/2006 | Connnors et al. |
| 7,177,822 | B2 | 2/2007 | Mahmood et al. |
| 7,213,023 | B2 | 5/2007 | Hadzikadic |
| 7,216,102 | B2 | 5/2007 | Nabe |
| 7,239,234 | B2 | 7/2007 | Cina |
| 7,249,322 | B2 | 7/2007 | Jones et al. |
| 7,305,364 | B2 | 12/2007 | Nabe et al. |
| 7,343,406 | B1 | 3/2008 | Buonanno |
| 7,346,537 | B2 | 3/2008 | Kraft et al. |
| 7,386,485 | B1 | 6/2008 | Mussman et al. |
| 7,386,594 | B2 | 6/2008 | Foulger et al. |
| 7,392,221 | B2 | 6/2008 | Nabe |
| 7,406,436 | B1 | 7/2008 | Reisman |
| 7,444,304 | B2 | 10/2008 | Mellinger et al. |
| 7,472,072 | B2 | 12/2008 | Kowalchuk |
| 7,483,846 | B1 | 1/2009 | Kumar et al. |
| 7,487,110 | B2 | 2/2009 | Bennett |
| 7,529,694 | B2 | 5/2009 | Crites |
| 7,546,273 | B2 | 6/2009 | Blanchard et al. |
| 7,555,443 | B2 | 6/2009 | Chandran et al. |
| 7,571,128 | B1 | 8/2009 | Brown et al. |
| 7,827,099 | B1 | 11/2010 | Cotton |
| 8,005,752 | B1 | 8/2011 | Cotton |
| 8,086,529 | B2 | 12/2011 | Cotton |
| 8,095,461 | B2 | 1/2012 | Cotton |
| 8,315,911 | B2 | 11/2012 | Callow et al. |
| 8,374,894 | B2 | 2/2013 | Weinstock et al. |
| 8,396,791 | B2 | 3/2013 | Cotton |
| 8,560,161 | B1 | 10/2013 | Kator et al. |
| 8,756,112 | B1 * | 6/2014 | Edelman ............ G06Q 30/0621 705/26.4 |
| 9,047,616 | B2 | 6/2015 | Schnabel et al. |
| 2001/0034700 | A1 | 10/2001 | Foss et al. |
| 2001/0044769 | A1 | 11/2001 | Chaves |
| 2001/0049653 | A1 | 12/2001 | Sheets |
| 2002/0010643 | A1 | 1/2002 | Chaves |
| 2002/0013711 | A1 | 1/2002 | Ahuja et al. |
| 2002/0023051 | A1 | 2/2002 | Kunzle et al. |
| 2002/0024537 | A1 | 2/2002 | Jones et al. |
| 2002/0035520 | A1 | 3/2002 | Weiss |
| 2002/0042752 | A1 | 4/2002 | Chaves |
| 2002/0065707 | A1 | 5/2002 | Lancaster |
| 2002/0082860 | A1 | 6/2002 | Johnson |
| 2002/0099618 | A1 | 7/2002 | Stiberman |
| 2002/0103715 | A1 | 8/2002 | Bennett |
| 2002/0123961 | A1 * | 9/2002 | Stoyanov ............... G06Q 40/02 705/38 |
| 2002/0188506 | A1 | 12/2002 | Smith |
| 2002/0194050 | A1 | 12/2002 | Nabe et al. |
| 2002/0198820 | A1 | 12/2002 | Mills |
| 2003/0105728 | A1 | 6/2003 | Hirobe et al. |
| 2003/0154094 | A1 | 8/2003 | Bredemeier et al. |
| 2003/0154129 | A1 | 8/2003 | Goff |
| 2003/0172016 | A1 | 9/2003 | Chandran et al. |
| 2003/0212619 | A1 | 11/2003 | Jain et al. |
| 2003/0212628 | A1 | 11/2003 | Kuttan et al. |
| 2003/0216995 | A1 | 11/2003 | DePauw |
| 2003/0229528 | A1 | 12/2003 | Nitao et al. |
| 2004/0002921 | A1 | 1/2004 | Himes |
| 2004/0039690 | A1 | 2/2004 | Brown et al. |
| 2004/0103041 | A1 | 5/2004 | Alston |
| 2004/0138997 | A1 | 7/2004 | DeFrancesco |
| 2004/0148181 | A1 | 7/2004 | Mcknight et al. |
| 2004/0167897 | A1 | 8/2004 | Kuhlmann et al. |
| 2004/0181480 | A1 | 9/2004 | Greenberg et al. |
| 2004/0254819 | A1 | 12/2004 | Halim et al. |
| 2005/0021378 | A1 | 1/2005 | Weinstock et al. |
| 2005/0049911 | A1 | 3/2005 | Engelking et al. |
| 2005/0091087 | A1 | 4/2005 | Smith et al. |
| 2005/0165639 | A1 | 7/2005 | Ross et al. |
| 2005/0171896 | A1 | 8/2005 | Seretti et al. |
| 2005/0177337 | A1 | 8/2005 | Beyer et al. |
| 2006/0004626 | A1 | 1/2006 | Holmen et al. |
| 2006/0020477 | A1 | 1/2006 | Retzbach et al. |
| 2006/0041443 | A1 | 2/2006 | Horvath |
| 2006/0064340 | A1 | 3/2006 | Cook |
| 2006/0085283 | A1 | 4/2006 | Griffiths |
| 2006/0129423 | A1 | 6/2006 | Sheinson et al. |
| 2006/0143112 | A1 | 6/2006 | Donarski et al. |
| 2006/0155439 | A1 | 7/2006 | Slawinski et al. |
| 2006/0184379 | A1 | 8/2006 | Tan et al. |
| 2006/0229981 | A1 | 10/2006 | Crites |
| 2007/0129954 | A1 | 6/2007 | Dessureault |

(56) References Cited

U.S. PATENT DOCUMENTS

| | | | |
|---|---|---|---|
| 2007/0136163 | A1 | 6/2007 | Bell |
| 2007/0179798 | A1 | 8/2007 | Inbarajan |
| 2007/0282712 | A1 | 12/2007 | Ullman et al. |
| 2007/0282713 | A1 | 12/2007 | Ullman et al. |
| 2008/0103785 | A1 | 5/2008 | Logan |
| 2008/0120155 | A1 | 5/2008 | Pliha |
| 2008/0183616 | A1 | 7/2008 | Hankey et al. |
| 2008/0201163 | A1 | 8/2008 | Barker et al. |
| 2008/0201184 | A1 | 8/2008 | Rose et al. |
| 2008/0288332 | A1 | 11/2008 | Altounian et al. |
| 2008/0294996 | A1 | 11/2008 | Hunt et al. |
| 2008/0300962 | A1 | 12/2008 | Cawston et al. |
| 2009/0106036 | A1 | 4/2009 | Tamura |
| 2009/0171737 | A1 | 7/2009 | Polanco |
| 2009/0287595 | A1 | 11/2009 | Hanifi |
| 2010/0082780 | A1 | 4/2010 | Muilenburg et al. |
| 2010/0217616 | A1 | 8/2010 | Colson et al. |
| 2010/0274571 | A1 | 10/2010 | McFall et al. |
| 2010/0274631 | A1 | 10/2010 | McFall et al. |
| 2010/0278318 | A1 | 11/2010 | Flockhart et al. |
| 2010/0287058 | A1 | 11/2010 | Rosskamm et al. |
| 2011/0173111 | A1 | 7/2011 | Cotton |
| 2011/0173112 | A1 | 7/2011 | Cotton |
| 2011/0270659 | A1 | 11/2011 | Crites |
| 2012/0036033 | A1 | 2/2012 | Serrgy et al. |
| 2012/0059725 | A1 | 3/2012 | Colson et al. |
| 2012/0116890 | A1 | 5/2012 | Colson et al. |
| 2012/0136775 | A1 | 5/2012 | Cotton |
| 2013/0185190 | A1 | 7/2013 | Cotton |
| 2013/0211865 | A1 | 8/2013 | Cotton |
| 2013/0218336 | A1 | 8/2013 | Colson et al. |
| 2013/0268315 | A1 | 10/2013 | Cotton et al. |
| 2014/0006108 | A1 | 1/2014 | Cotton |
| 2014/0081751 | A1 | 3/2014 | Hogan et al. |
| 2014/0324531 | A1 | 10/2014 | Cotton |
| 2014/0324536 | A1 | 10/2014 | Cotton et al. |
| 2015/0019407 | A1 | 1/2015 | Cotton |
| 2015/0235241 | A1 | 8/2015 | Schnabl et al. |
| 2015/0332390 | A1 | 11/2015 | Cotton |
| 2016/0110804 | A1 | 4/2016 | Cotton |
| 2022/0020086 | A1 | 1/2022 | Kuchenbecker |
| 2022/0156772 | A1 | 5/2022 | Lalka |

* cited by examiner

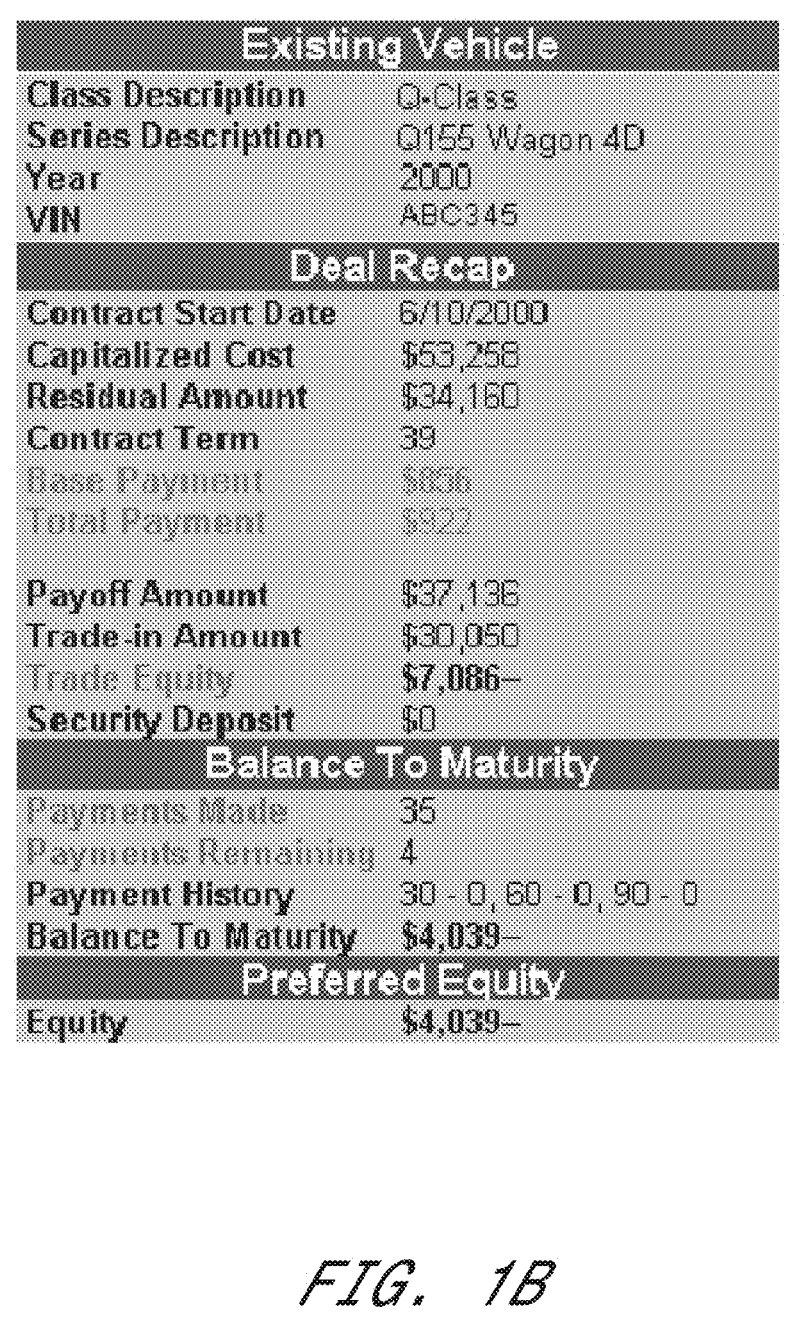

| | |
|---|---|
| **Existing Vehicle** | |
| Class Description | Q-Class |
| Series Description | Q155 Wagon 4D |
| Year | 2000 |
| VIN | ABC345 |
| **Deal Recap** | |
| Contract Start Date | 6/10/2000 |
| Capitalized Cost | $53,258 |
| Residual Amount | $34,160 |
| Contract Term | 39 |
| Base Payment | $856 |
| Total Payment | $922 |
| Payoff Amount | $37,136 |
| Trade-in Amount | $30,050 |
| Trade Equity | $7,086– |
| Security Deposit | $0 |
| **Balance To Maturity** | |
| Payments Made | 35 |
| Payments Remaining | 4 |
| Payment History | 30 - 0, 60 - 0, 90 - 0 |
| Balance To Maturity | $4,039– |
| **Preferred Equity** | |
| Equity | $4,039– |

FIG. 1B

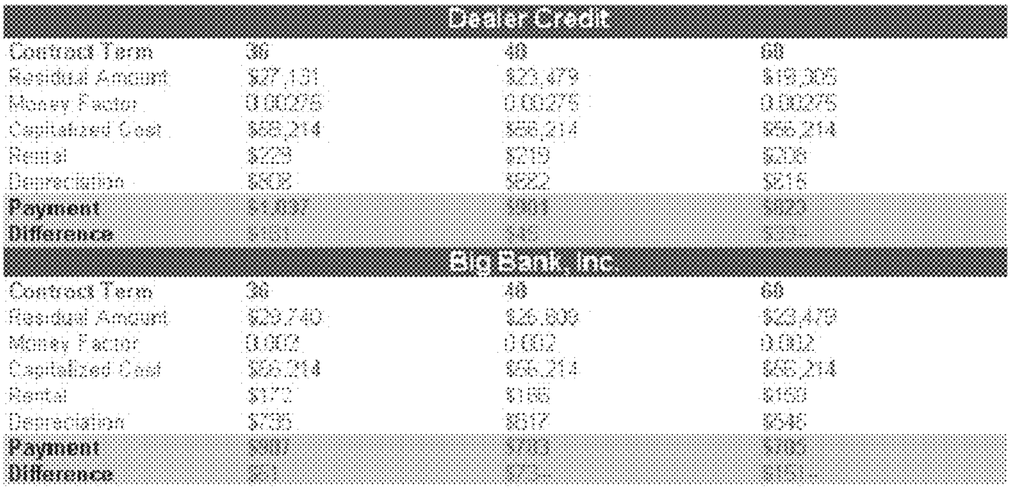

| Dealer Credit | | | |
|---|---|---|---|
| Contract Term | 36 | 48 | 60 |
| Residual Amount | $27,131 | $23,479 | $19,305 |
| Money Factor | 0.00275 | 0.00275 | 0.00275 |
| Capitalized Cost | $58,214 | $56,214 | $56,214 |
| Rental | $229 | $219 | $208 |
| Depreciation | $808 | $922 | $216 |
| **Payment** | [illegible] | [illegible] | [illegible] |
| **Difference** | [illegible] | [illegible] | [illegible] |

| Big Bank, Inc | | | |
|---|---|---|---|
| Contract Term | 36 | 48 | 60 |
| Residual Amount | $29,740 | $26,809 | $23,479 |
| Money Factor | 0.002 | 0.002 | 0.002 |
| Capitalized Cost | $56,214 | $56,214 | $56,214 |
| Rental | $172 | $166 | $160 |
| Depreciation | $735 | $817 | $546 |
| **Payment** | [illegible] | [illegible] | [illegible] |
| **Difference** | [illegible] | [illegible] | [illegible] |

FIG. 1D

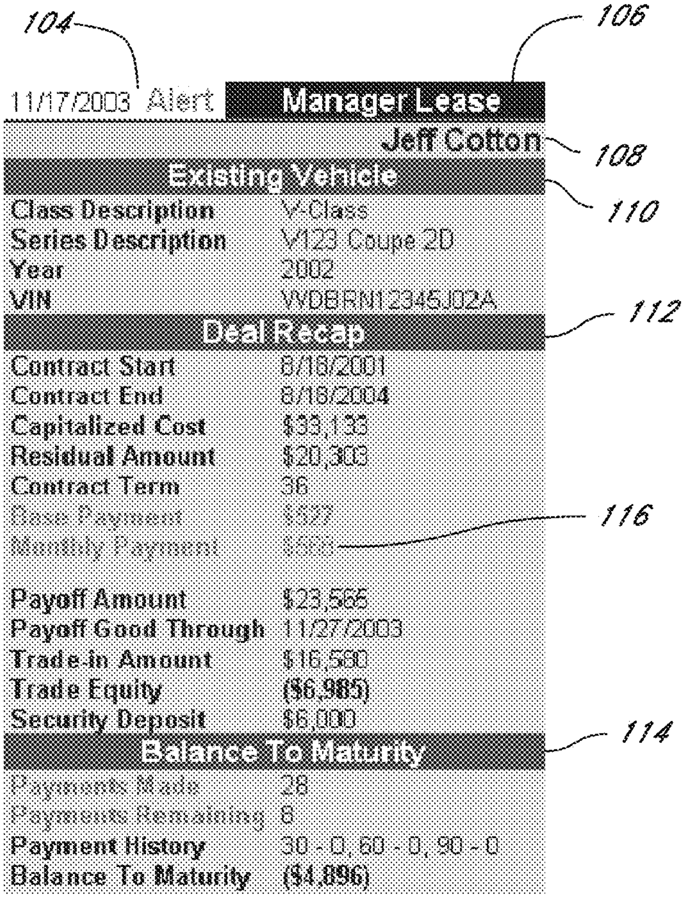

FIG. 1E

Lease Payment

CAPITALIZED COST CALCULATION

| | | | |
|---|---|---|---|
| 1 | Agreed upon value of the vehicle | | $ |
| 2 | Sales/Use Tax (if capitalized) | + | $ |
| 3 | Luxury Tax (calculation A) | + | $ |
| 4 | Other (explain) | + | $ |
| 5 | Prior credit or lease balance (negative equity) | + | $ |
| 6 | Subtotal | = | $ |
| 7 | Acquisition fee (if capitalized) | + | $ |
| 8 | Scheduled Maintenance Cost | + | $ |
| 9 | Additional Wear & Usage | + | $ |
| 10 | Other (explain) | + | $ |
| 11 | Gross Capitalized Cost | = | $ |
| 12 | Gross Capitalized Cost Reduction Trade $ Cash $ | − | $ |
| 13 | Adjusted Capitalized Cost | − | $ |
| | | | |

LEASE PAYMENT CALCULATION

| | | |
|---|---|---|
| 14 | Residual Value (calculation C) | $ |
| 15 | Depreciation (lines 13−14) | $ |
| 16 | Money Factor | .0 |
| 17 | Add Lines 13+14 | $ |
| 18 | Rent Charge (lines 16x17) x Term ____ | $ |
| 19 | Total Base Single Payment (lines 15+18) | $ |
| 20 | Base Monthly Payment/Base Single Pymnt (19/# of payments) | $ |
| 21 | Sales/Use Tax ____ % x line 20 | $ |
| 22 | Total Monthly Payment (or total single payment) | $ |

FIG. 1H

B. Residual Value Calculation

TSRP ____
Residualized Options + ____
Subtotal = ____
Gas Guzzler Tax − ____
Basis for Residual Value = ____ %
Residual Value % X ____
Residual Value = ____
Prepaid Mileage (15¢ per mile) − ____
Adjusted Residual Value (line 14) = ____

Deferred Payment $$A=((P*(1+i)^{n} - B)*i)/((1+i)^{n-1})$$

A=Payment
P=Principle
i=Interest rate
B=Differed Amount or Balloon

FIG. 1I

Purchase Payment $$A=p+i/n$$

A=Payment
P=Principle
i=Interest amount
n=number

FIG. 1J

| Mercedes-Benz Credit | | | |
|---|---|---|---|
| Contract Term | 36 | 48 | 60 |
| Residual Amount | $27,131 | $23,479 | $19,305 |
| Money Factor | 0.00275 | 0.00275 | 0.00275 |
| Capitalized Cost | $56,214 | $56,214 | $56,214 |
| Rental | $229 | $219 | $208 |
| Depreciation | $808 | $682 | $615 |
| **Payment** | $1,037 | $901 | $823 |
| **Difference** | $181 | $45 | $33– |
| **Chase** | | | |
| Contract Term | 36 | 48 | 60 |
| Residual Amount | $29,740 | $26,609 | $23,479 |
| Money Factor | 0.002 | 0.002 | 0.002 |
| Capitalized Cost | $56,214 | $56,214 | $56,214 |
| Rental | $172 | $166 | $159 |
| Depreciation | $735 | $617 | $546 |
| **Payment** | $907 | $783 | $705 |
| **Difference** | $51 | $73– | $151– |

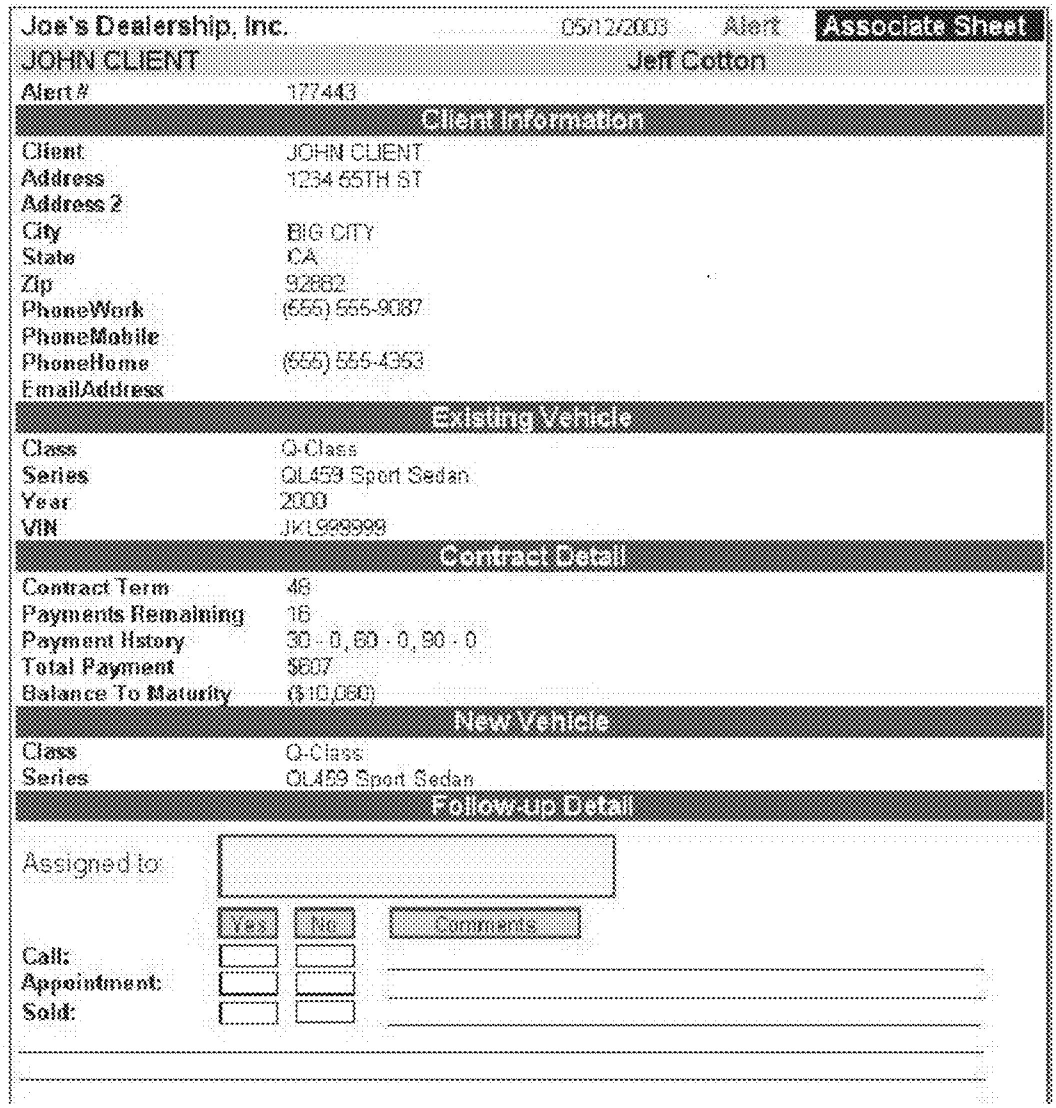
Joe's Dealership, Inc. 05/12/2003 Alert Associate Sheet

JOHN CLIENT Jeff Cotton

| | |
|---|---|
| **Alert #** | 177443 |

Client Information

| | |
|---|---|
| **Client** | JOHN CLIENT |
| **Address** | 1234 55TH ST |
| **Address 2** | |
| **City** | BIG CITY |
| **State** | CA |
| **Zip** | 92882 |
| **PhoneWork** | (555) 555-9087 |
| **PhoneMobile** | |
| **PhoneHome** | (555) 555-4353 |
| **EmailAddress** | |

Existing Vehicle

| | |
|---|---|
| **Class** | Q-Class |
| **Series** | QL459 Sport Sedan |
| **Year** | 2000 |
| **VIN** | JKL999999 |

Contract Detail

| | |
|---|---|
| **Contract Term** | 48 |
| **Payments Remaining** | 16 |
| **Payment History** | 30 - 0, 60 - 0, 90 - 0 |
| **Total Payment** | $607 |
| **Balance To Maturity** | ($10,080) |

New Vehicle

| | |
|---|---|
| **Class** | Q-Class |
| **Series** | QL459 Sport Sedan |

Follow-up Detail

Assigned to:

| | Yes | No | Comments |
|---|---|---|---|
| **Call:** | | | |
| **Appointment:** | | | |
| **Sold:** | | | |

FIG. 10

FIG. 18

1802

Joe's Dealership, Inc.
AutoAlert
Average Selling Price by Series
Wednesday, July 30, 2003 7:42:54 PM

| Series ID | Series Description | Average Selling Price | Base Price | Delivery Charge | Sunroof Package | Automatic Transmission | Metallic Paint |
|---|---|---|---|---|---|---|---|
| 47 | Q111 Sedan | $28,865 | $24,950 | $720 | $1,215 | $1,325 | $655 |
| 1 | Q111 Coupe | $32,290 | $27,990 | $720 | $1,600 | $1,325 | $655 |
| 26 | Q551 Coupe | $33,700 | $29,400 | $720 | $1,600 | $1,325 | $655 |
| 976 | Q551 Sedan | $35,575 | $31,400 | $720 | $1,475 | $1,325 | $655 |
| 52 | QL459 Sport Sedan | $51,775 | $50,400 | $720 | - | - | $655 |

FIG. 20

2002

Joe's Dealership, Inc.
AutoAlert
Bank Rate by Series
Wednesday, July 30, 2003 7:45:13 PM

Bank: Big Bank

| Bank Rate ID | Series ID | Series | Term ID | Term | Money Factor | Residual % | MRM |
|---|---|---|---|---|---|---|---|
| 404 | 47 | Q111 Sedan | 2 | 36 | 0.00240 | 47 | $36,500 |
| 405 | | | 5 | 48 | 0.00240 | 40 | $36,500 |
| 406 | | | 8 | 60 | 0.00240 | 34 | $36,500 |
| 407 | 1 | Q111 Coupe | 2 | 36 | 0.00240 | 56 | $40,800 |
| 408 | | | 5 | 48 | 0.00240 | 47 | $40,800 |
| 409 | | | 8 | 60 | 0.00240 | 40 | $40,800 |
| 410 | 26 | Q551 Coupe | 2 | 36 | 0.00240 | 53 | $42,500 |
| 411 | | | 5 | 48 | 0.00240 | 45 | $42,500 |
| 412 | | | 8 | 60 | 0.00240 | 38 | $42,500 |
| 413 | 976 | Q551 Sedan | 2 | 36 | 0.00240 | 51 | $41,300 |
| 414 | | | 5 | 48 | 0.00240 | 43 | $41,300 |
| 415 | | | 8 | 60 | 0.00240 | 37 | $41,300 |
| 416 | 52 | QL459 Sport Sedan | 2 | 36 | 0.00240 | 59 | $57,900 |
| 417 | | | 5 | 48 | 0.00240 | 50 | $57,900 |
| 418 | | | 8 | 60 | 0.00240 | 44 | $57,900 |

FIG. 24

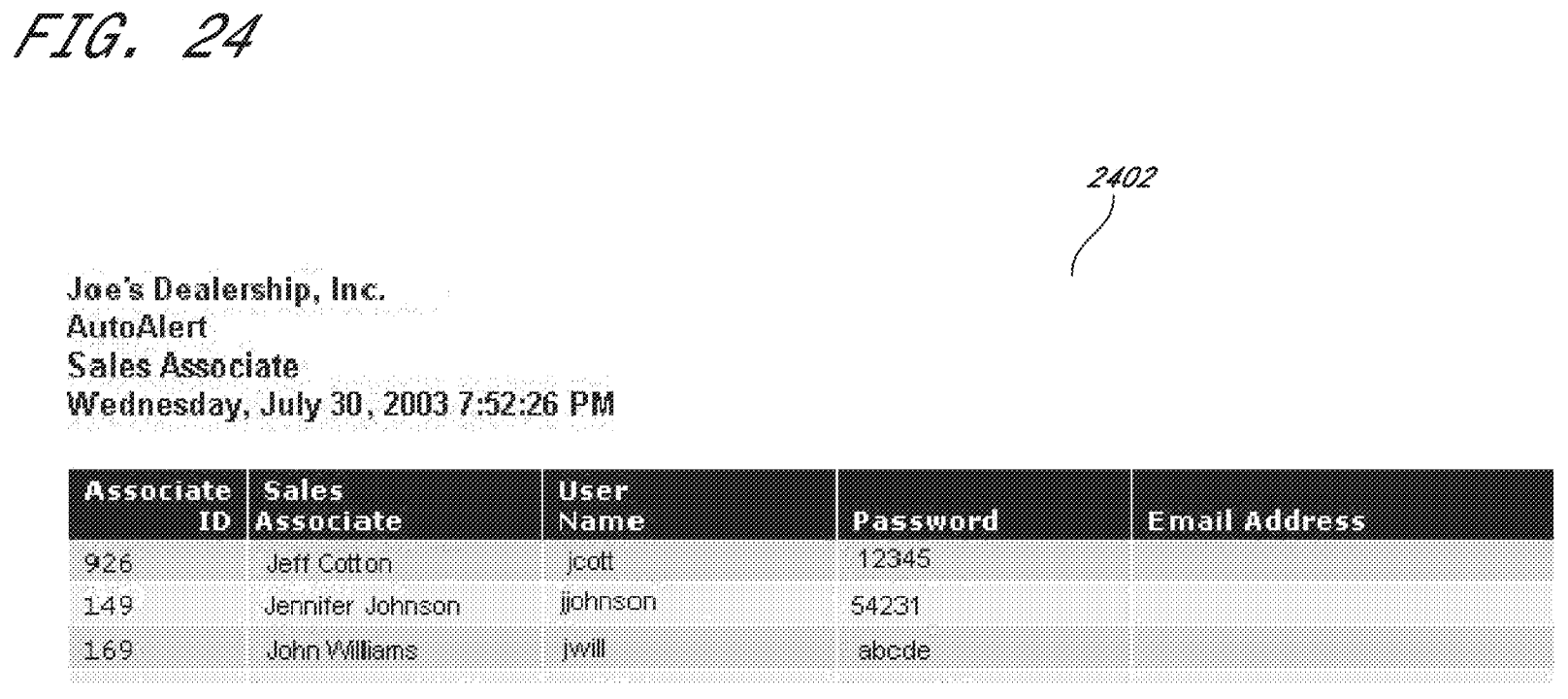

2402

Joe's Dealership, Inc.
AutoAlert
Sales Associate
Wednesday, July 30, 2003 7:52:26 PM

| Associate ID | Sales Associate | User Name | Password | Email Address |
|---|---|---|---|---|
| 926 | Jeff Cotton | jcott | 12345 | |
| 149 | Jennifer Johnson | jjohnson | 54231 | |
| 169 | John Williams | jwill | abcde | |

3002

Joe's Dealership, Inc.
AutoAlert
Trade-in History by Model
Wednesday, July 30, 2003 7:55:02 PM

| | | | 7/25/2003 | | | 7/18/2003 | | | 7/11/2003 | | |
|---|---|---|---|---|---|---|---|---|---|---|---|
| VIN | Series | Year | Trade-in | Adjust | % | Trade-in | Adjust | % | Trade-in | Adjust | % |
| LMNO654 | Q111 Sedan | 1993 | $4,296 | - | 6.4% | $4,038 | - | 0.0% | $4,038 | - | 100.0% |
| ABCDE987 | Q111 Coupe | 1995 | $10,828 | ($1,000) | -21.7% | $13,825 | ($1,000) | 0.0% | $13,825 | ($1,000) | 100.0% |
| ZYX12345 | Q551 Coupe | 1994 | $11,365 | - | 28.1% | $8,875 | - | 0.0% | $8,875 | - | 100.0% |
| 23FGH34 | Q551 Sedan | 1993 | $7,294 | - | -2.7% | $7,494 | - | 0.0% | $7,494 | - | 100.0% |
| WDBJF20F V | Q111 Sedan | 1997 | $17,330 | - | -1.1% | $17,521 | - | 0.0% | $17,521 | - | 100.0% |
| STR45XYZ | Q111 Coupe | 1993 | $5,447 | - | 9.6% | $4,970 | - | 0.0% | $4,970 | - | 100.0% |
| ZYX12380 | Q551 Coupe | 1995 | $9,903 | - | -2.0% | $10,100 | - | 0.0% | $10,100 | - | 100.0% |
| UKLM987 | Q551 Sedan | 1994 | $8,231 | - | -8.0% | $8,948 | - | 0.0% | $8,948 | - | 100.0% |
| GHIJ897 | QL459 Sport Sedan | 1993 | $6,887 | - | -29.5% | $9,770 | - | 0.0% | $9,770 | - | 100.0% |

FIG. 30

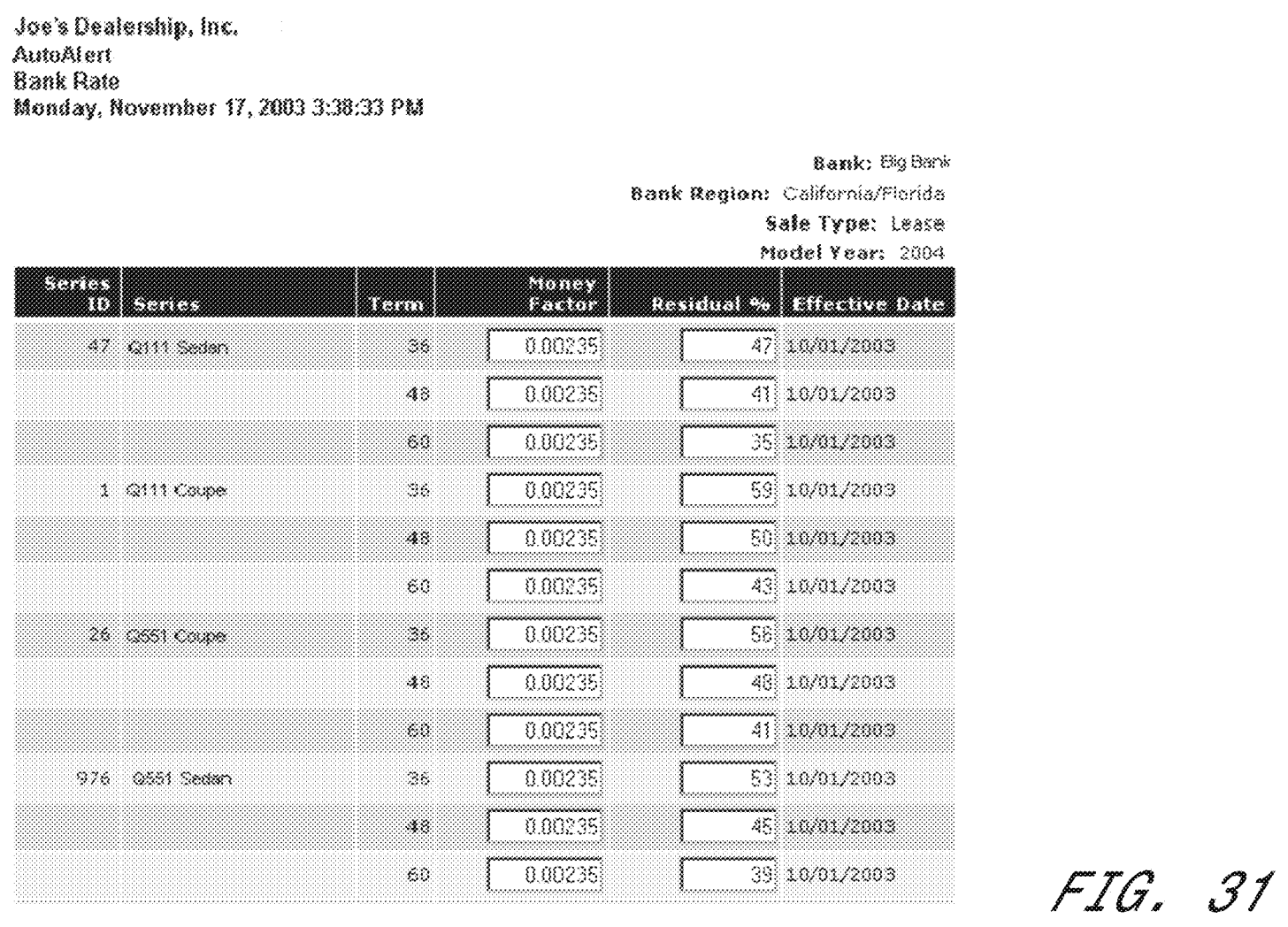

Joe's Dealership, Inc.
AutoAlert
Bank Rate
Monday, November 17, 2003 3:38:33 PM

Bank: Big Bank
Bank Region: California/Florida
Sale Type: Lease
Model Year: 2004

| Series ID | Series | Term | Money Factor | Residual % | Effective Date |
|---|---|---|---|---|---|
| 47 | Q111 Sedan | 36 | 0.00235 | 47 | 10/01/2003 |
| | | 48 | 0.00235 | 41 | 10/01/2003 |
| | | 60 | 0.00235 | 35 | 10/01/2003 |
| 1 | Q111 Coupe | 36 | 0.00235 | 59 | 10/01/2003 |
| | | 48 | 0.00235 | 50 | 10/01/2003 |
| | | 60 | 0.00235 | 43 | 10/01/2003 |
| 26 | Q551 Coupe | 36 | 0.00235 | 56 | 10/01/2003 |
| | | 48 | 0.00235 | 48 | 10/01/2003 |
| | | 60 | 0.00235 | 41 | 10/01/2003 |
| 976 | Q551 Sedan | 36 | 0.00235 | 53 | 10/01/2003 |
| | | 48 | 0.00235 | 45 | 10/01/2003 |
| | | 60 | 0.00235 | 39 | 10/01/2003 |

FIG. 31

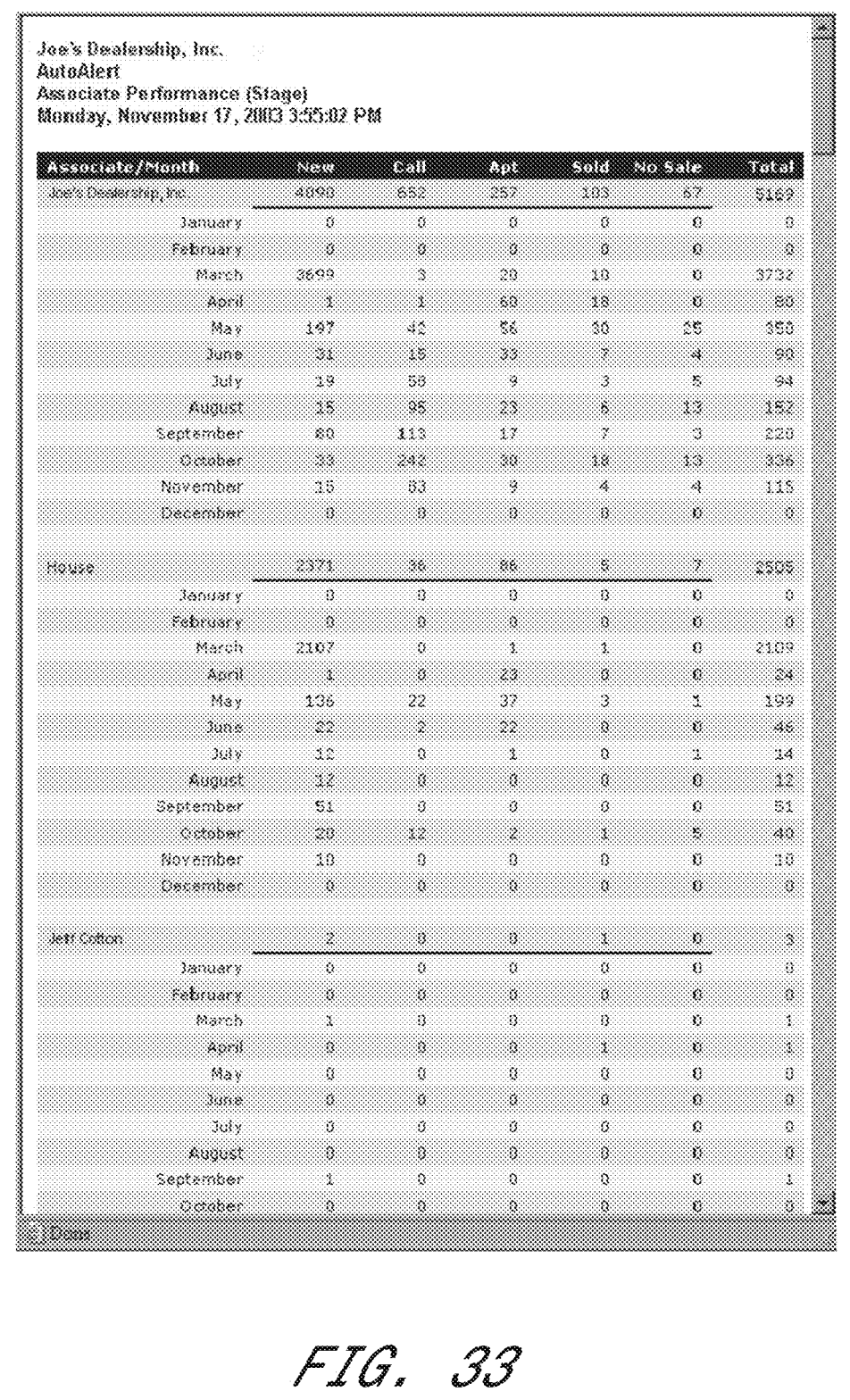

Joe's Dealership, Inc.
AutoAlert
Associate Performance (Stage)
Monday, November 17, 2003 3:55:02 PM

| Associate/Month | New | Call | Apt | Sold | No Sale | Total |
|---|---|---|---|---|---|---|
| Joe's Dealership, Inc. | 4090 | 652 | 257 | 103 | 67 | 5169 |
| January | 0 | 0 | 0 | 0 | 0 | 0 |
| February | 0 | 0 | 0 | 0 | 0 | 0 |
| March | 3699 | 3 | 20 | 10 | 0 | 3732 |
| April | 1 | 1 | 60 | 18 | 0 | 80 |
| May | 197 | 42 | 56 | 30 | 25 | 350 |
| June | 31 | 15 | 33 | 7 | 4 | 90 |
| July | 19 | 58 | 9 | 3 | 5 | 94 |
| August | 15 | 95 | 23 | 6 | 13 | 152 |
| September | 80 | 113 | 17 | 7 | 3 | 220 |
| October | 33 | 242 | 30 | 18 | 13 | 336 |
| November | 15 | 83 | 9 | 4 | 4 | 115 |
| December | 0 | 0 | 0 | 0 | 0 | 0 |
| House | 2371 | 38 | 88 | 9 | 7 | 2505 |
| January | 0 | 0 | 0 | 0 | 0 | 0 |
| February | 0 | 0 | 0 | 0 | 0 | 0 |
| March | 2107 | 0 | 1 | 1 | 0 | 2109 |
| April | 1 | 0 | 23 | 0 | 0 | 24 |
| May | 136 | 22 | 37 | 3 | 1 | 199 |
| June | 22 | 2 | 22 | 0 | 0 | 46 |
| July | 12 | 0 | 1 | 0 | 1 | 14 |
| August | 12 | 0 | 0 | 0 | 0 | 12 |
| September | 51 | 0 | 0 | 0 | 0 | 51 |
| October | 20 | 12 | 2 | 1 | 5 | 40 |
| November | 10 | 0 | 0 | 0 | 0 | 10 |
| December | 0 | 0 | 0 | 0 | 0 | 0 |
| Jeff Cotton | 2 | 0 | 0 | 1 | 0 | 3 |
| January | 0 | 0 | 0 | 0 | 0 | 0 |
| February | 0 | 0 | 0 | 0 | 0 | 0 |
| March | 1 | 0 | 0 | 0 | 0 | 1 |
| April | 0 | 0 | 0 | 1 | 0 | 1 |
| May | 0 | 0 | 0 | 0 | 0 | 0 |
| June | 0 | 0 | 0 | 0 | 0 | 0 |
| July | 0 | 0 | 0 | 0 | 0 | 0 |
| August | 0 | 0 | 0 | 0 | 0 | 0 |
| September | 1 | 0 | 0 | 0 | 0 | 1 |
| October | 0 | 0 | 0 | 0 | 0 | 0 |

Done

FIG. 33

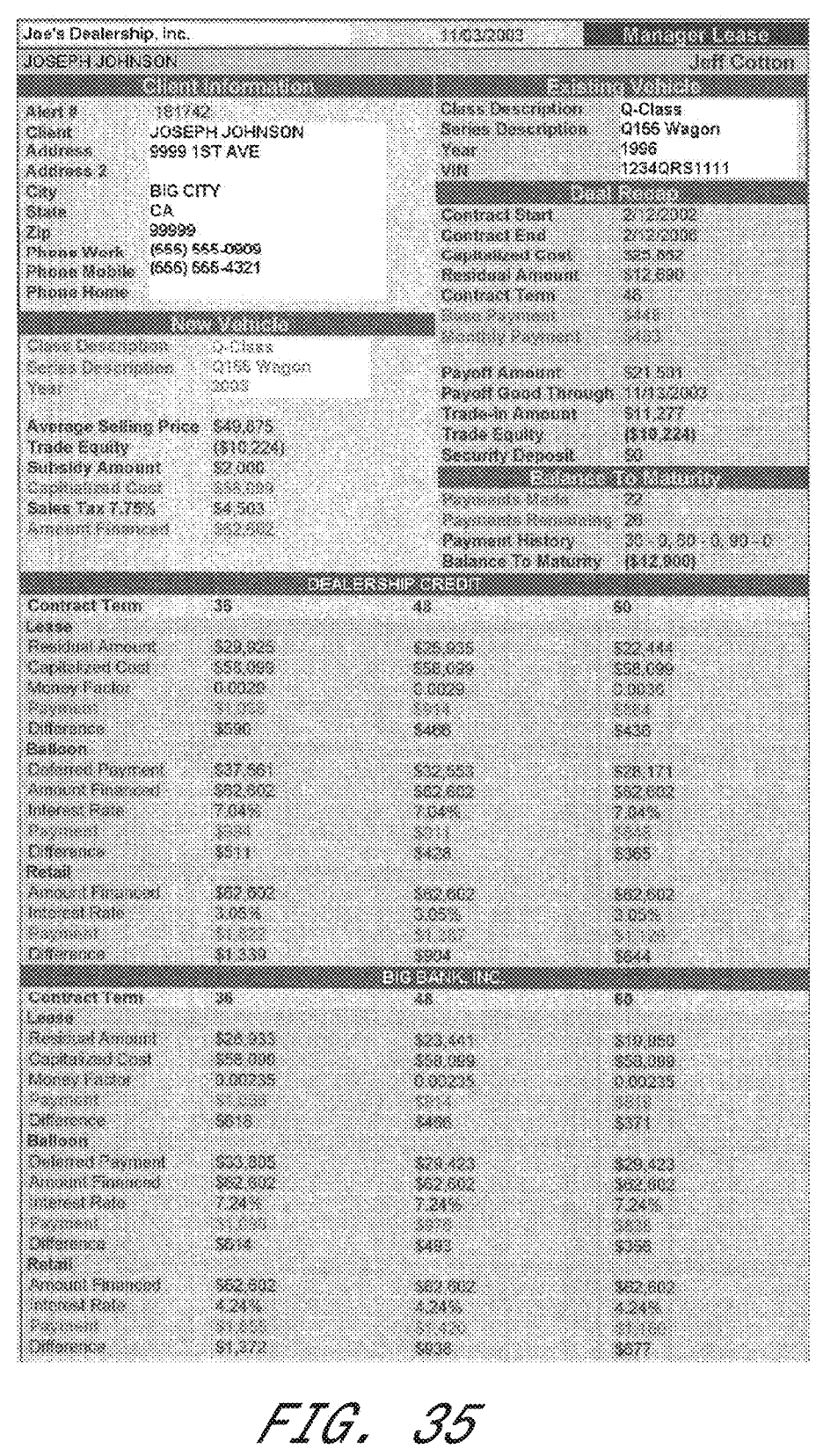

Joe's Dealership, Inc. 11/03/2003 Manager Lease

JOSEPH JOHNSON Jeff Cotton

Client Information

| | |
|---|---|
| Alert # | 181742 |
| Client | JOSEPH JOHNSON |
| Address | 9999 1ST AVE |
| Address 2 | |
| City | BIG CITY |
| State | CA |
| Zip | 99999 |
| Phone Work | (555) 555-0909 |
| Phone Mobile | (666) 666-4321 |
| Phone Home | |

New Vehicle

| | |
|---|---|
| Class Description | Q-Class |
| Series Description | Q155 Wagon |
| Year | 2003 |
| Average Selling Price | $49,875 |
| Trade Equity | ($10,224) |
| Subsidy Amount | $2,000 |
| Capitalized Cost | $58,099 |
| Sales Tax 7.75% | $4,503 |
| Amount Financed | $62,602 |

Existing Vehicle

| | |
|---|---|
| Class Description | Q-Class |
| Series Description | Q155 Wagon |
| Year | 1996 |
| VIN | 1234QRS1111 |

Deal Recap

| | |
|---|---|
| Contract Start | 2/12/2002 |
| Contract End | 2/12/2006 |
| Capitalized Cost | $35,852 |
| Residual Amount | $12,890 |
| Contract Term | 48 |
| Base Payment | $448 |
| Monthly Payment | $483 |
| Payoff Amount | $21,501 |
| Payoff Good Through | 11/13/2003 |
| Trade-in Amount | $11,277 |
| Trade Equity | ($10,224) |
| Security Deposit | $0 |

Balance To Maturity

| | |
|---|---|
| Payments Made | 22 |
| Payments Remaining | 26 |
| Payment History | 30 - 0, 60 - 0, 90 - 0 |
| Balance To Maturity | ($12,900) |

DEALERSHIP CREDIT

| Contract Term | 36 | 48 | 60 |
|---|---|---|---|
| **Lease** | | | |
| Residual Amount | $29,925 | $26,935 | $22,444 |
| Capitalized Cost | $58,099 | $58,099 | $58,099 |
| Money Factor | 0.0029 | 0.0029 | 0.0036 |
| Payment | [illegible] | [illegible] | [illegible] |
| Difference | $590 | $466 | $436 |
| **Balloon** | | | |
| Deferred Payment | $37,561 | $32,553 | $26,171 |
| Amount Financed | $62,602 | $62,602 | $62,602 |
| Interest Rate | 7.04% | 7.04% | 7.04% |
| Payment | [illegible] | [illegible] | [illegible] |
| Difference | $511 | $428 | $365 |
| **Retail** | | | |
| Amount Financed | $62,602 | $62,602 | $62,602 |
| Interest Rate | 3.05% | 3.05% | 3.05% |
| Payment | [illegible] | [illegible] | [illegible] |
| Difference | $1,339 | $904 | $644 |

BIG BANK, INC.

| Contract Term | 36 | 48 | 60 |
|---|---|---|---|
| **Lease** | | | |
| Residual Amount | $26,933 | $23,441 | $19,850 |
| Capitalized Cost | $58,099 | $58,099 | $58,099 |
| Money Factor | 0.00235 | 0.00235 | 0.00235 |
| Payment | [illegible] | [illegible] | [illegible] |
| Difference | $616 | $486 | $371 |
| **Balloon** | | | |
| Deferred Payment | $33,805 | $29,423 | $29,423 |
| Amount Financed | $62,602 | $62,602 | $62,602 |
| Interest Rate | 7.24% | 7.24% | 7.24% |
| Payment | [illegible] | [illegible] | [illegible] |
| Difference | $614 | $483 | $358 |
| **Retail** | | | |
| Amount Financed | $62,602 | $62,602 | $62,602 |
| Interest Rate | 4.24% | 4.24% | 4.24% |
| Payment | [illegible] | [illegible] | [illegible] |
| Difference | $1,272 | $838 | $677 |

*FIG. 35*

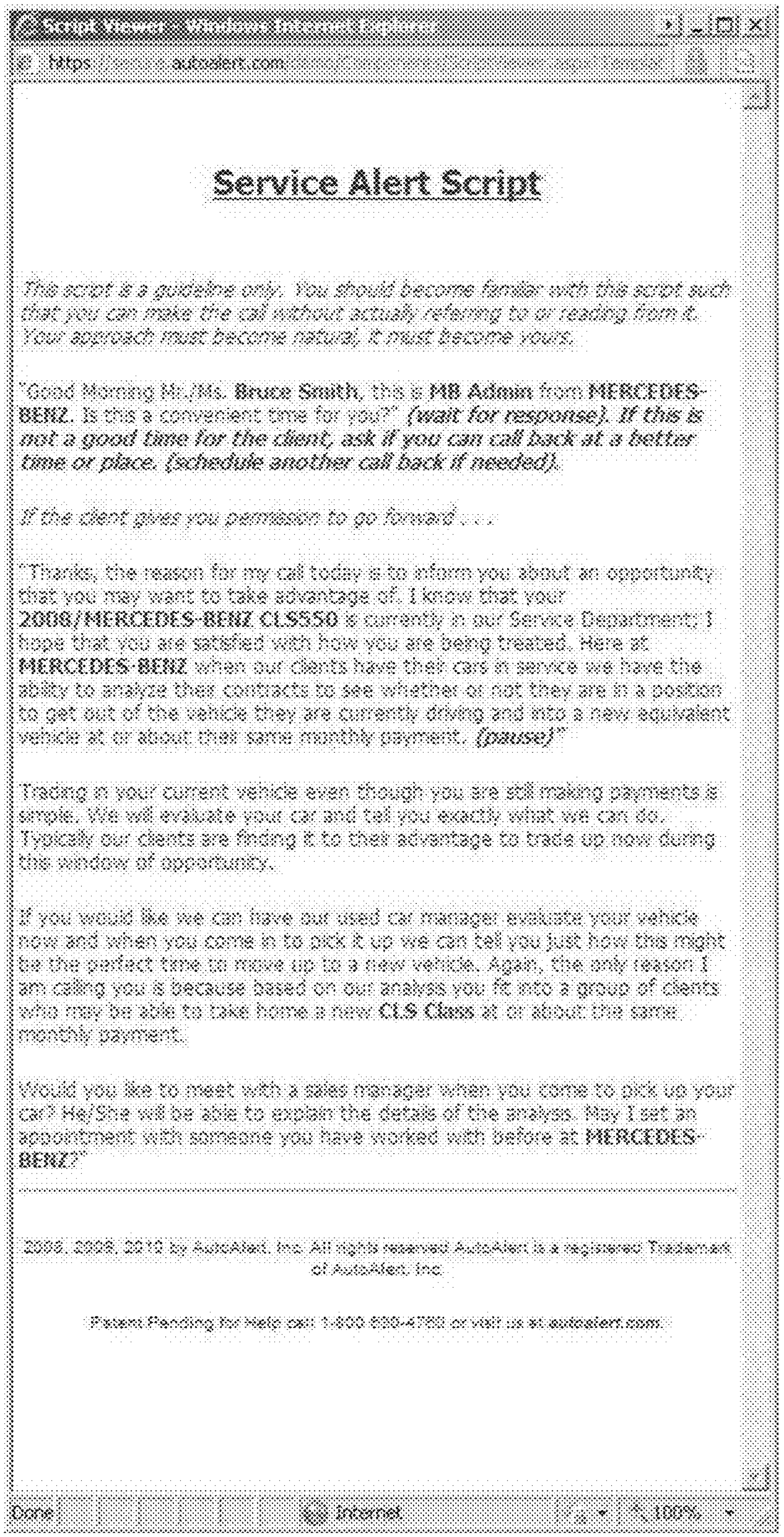

https autoalert.com

Service Alert Script

*This script is a guideline only. You should become familiar with this script such that you can make the call without actually referring to or reading from it. Your approach must become natural, it must become yours.*

"Good Morning Mr./Ms. Bruce Smith, this is MB Admin from MERCEDES-BENZ. Is this a convenient time for you?" *(wait for response). If this is not a good time for the client, ask if you can call back at a better time or place. (schedule another call back if needed).*

*If the client gives you permission to go forward . . .*

"Thanks, the reason for my call today is to inform you about an opportunity that you may want to take advantage of. I know that your 2008/MERCEDES-BENZ CLS550 is currently in our Service Department; I hope that you are satisfied with how you are being treated. Here at MERCEDES-BENZ when our clients have their cars in service we have the ability to analyze their contracts to see whether or not they are in a position to get out of the vehicle they are currently driving and into a new equivalent vehicle at or about their same monthly payment. *(pause)*"

Trading in your current vehicle even though you are still making payments is simple. We will evaluate your car and tell you exactly what we can do. Typically our clients are finding it to their advantage to trade up now during this window of opportunity.

If you would like we can have our used car manager evaluate your vehicle now and when you come in to pick it up we can tell you just how this might be the perfect time to move up to a new vehicle. Again, the only reason I am calling you is because based on our analysis you fit into a group of clients who may be able to take home a new CLS Class at or about the same monthly payment.

Would you like to meet with a sales manager when you come to pick up your car? He/She will be able to explain the details of the analysis. May I set an appointment with someone you have worked with before at MERCEDES-BENZ?"

2006, 2008, 2010 by AutoAlert, Inc. All rights reserved AutoAlert is a registered Trademark of AutoAlert, Inc.

Patent Pending for Help call 1-800 630-4780 or visit us at autoalert.com.

Done Internet 100%

Figure 56

LOCATION ALERT SYSTEM USING VEHICLE IDENTIFIERS AND TRANSACTION PARAMETERS

REFERENCE TO RELATED APPLICATIONS

The entirety of any application incorporated by reference herein is hereby made part of this specification as if set forth fully herein and incorporated by reference into this application for all purposes, for all that it contains.

BACKGROUND

Field

Embodiments of the systems and methods described herein relate to identifying opportunities for customers or prospective customers to obtain favorable contract or warranty terms.

Description of Related Art

Rather than paying cash for a product, a person may enter a financial agreement (e.g., a purchase agreement, a lease agreement, deferred or balloon payment agreement, or the like) in which the person makes a series of payments for a specified term. Often, these payments are periodic, such as weekly, monthly, quarterly, yearly, or the like. For example, if a person purchases an automobile, the person may expect to pay a series of substantially similar monthly payments for one or more years. Financial agreements are not, of course, limited to automobiles: they are available for a wide variety of products and services including land, housing, furniture, electronics, medical devices, recreational products, service contracts, compensation packages, and any other product or service available for purchase.

During the term of the financial agreement (the "current agreement") covering the first product ("the current product"), a person may desire to replace or supplement the current product with a second product (a "replacement product"). In such an instance, to obtain the replacement product, a person may be willing to return the current product and enter a second financial agreement (a "replacement agreement") that satisfies the first financial agreement. For example, a person having two years of payments remaining on his automobile lease may be willing to return the automobile to a dealership and enter a new lease for a latest model. The replacement agreement may be any suitable type of financial agreement (e.g., a purchase contract, a lease, deferred payment, or the like), including the same type as the current agreement or a different type. In some instances, a person will agree to enter a replacement agreement if the replacement product and payments are acceptable. For example, a person may find the replacement product and the payments under the terms of the replacement agreement acceptable if they are sufficiently similar to the current product and payments under the current agreement.

If a seller of products, such as an automobile dealer or dealership, knows when a customer is able to enter into a new financial arrangement under terms favorable to the customer, the seller can take advantage of this knowledge by offering a deal to the customer that includes the favorable terms. Accordingly, such knowledge, if possessed by the dealer, can drive increased sales, revenues, or profits.

"Warranties" are available for many products. Warranties typically have one or more "terms" that define when they expire, such that they expire when one, some, or all of the terms are exceeded. For example, a warranty for a car might have terms for of ten years and 100,000 miles, with the warranty expiring when at least one of those terms is exceeded. "Warranty" is a broad term and is to be given its ordinary and customary meaning to a person of ordinary skill in the art (i.e., it is not to be limited to a special or customized meaning) and includes, without limitation, guaranty, protect plan, service agreement, factory warranty, manufacturer warranty, dealer warranty, store warranty, and assurance plan.

"Secondary warranties" are often available to customers who wish to continue coverage after a "primary warranty" expires. Secondary warranties are often available for other secondary warranties, so the primary warranty need not be the first warranty that a customer has for a product.

Different warranties for the same product may have different scopes of coverage. Also, multiple warranties may be in effect at the same time. Thus, a customer may possess an 'accidental damage' warranty with a term of five years and a 'manufacturing defect' warranty with a term of ninety days. On day 45, both are in effect. If the customer obtains a secondary warranty for the manufacturing defect warranty, then it might have the same scope of coverage as the original, or it may exclude certain types of manufacturing defects that the primary warranty had covered.

If a warranty expires, then not only is the customer left without the protection of that warranty, but the customer may no longer be eligible for certain types of secondary warranties, such as factory extended warranties. Some of these secondary warranties (such as factory extended warranties) are more desirable (because of terms, costs, coverage, or other factors) than other after-market extended warranties (such as 'after-market factory warranties). It is therefore advantageous to customers and warranty providers (particularly providers of factory extended warranties) for customers to be reminded of when a primary warranty is about to expire—i.e., when one or more relevant terms is about to be exceeded.

Many secondary warranties are sold through the outlet (e.g., store or dealer) that originally sold the customer the product protected by the warranty in question. It is also in the interests of this dealer to remind its customers when primary warranties are going to expire. Doing so allows customers to take advantage of factory extended warranties, which they are more likely to buy than after-market extended warranties. But it also provides an opportunity to sell them any available continuing warranty coverage, and the dealer will typically receive compensation for each such sale. To the extent that a third party (i.e., someone other than the dealer) is able to sell the customer a secondary warranty, it is also in that third party's interest to know when a potential customer's warranty coverage is about to expire.

It is typical for a dealer selling a customer a product to also have information about some or all of the warranties provided with that product. For car purchases, for example, the terms of the warranty are generally recorded with the other details of the sale and kept in a system such as the dealer's Dealer Management System (DMS). Similarly, if a warranty is purchased with a home appliance or electronic equipment, many dealers will store that information, including the warranty terms, in a manner similar to the way they store other details of the sale.

In some cases the dealer may not have immediate access to the warranty information. For example, some products are bundled with a warranty whose details are not known to the dealer and some "original", "factory", "manufacturer", or like warranties may be purchased or activated via communications which are out of the dealer's control (such as by accessing a manufacturer's website or call center). However, means of providing access to that information, such as via webservices or other online access, batch lookup, or any of a number of query and response mechanisms are available. Indeed, even if there is no independent record of a warranty's terms, a customer with a copy of the warranty may convey the terms to a dealer or other interested entity.

If the terms of a warranty are only date related (e.g., "30 days" or "10 years" or "until Jan. 15, 2010", then a dealer or anyone else with access to the warranty terms, the purchase date (if necessary), and the customer's contact information may contact the customer to attempt to sell a secondary warranty. This process is still time consuming, error prone, and labor intensive: for example, it requires collating and reviewing the necessary information.

If one of the terms is usage related, giving the customer a timely phone call to replace their soon-to-expire primary warranty is more challenging. It is all too typical for a call to be made when a customer has two months left on a primary warranty only to find, for example, that the warranty's mileage term was exceeded six months previously and the primary warranty has already expired. A promising sales call to invite a customer to obtain continuing warranty protection has become a triage situation where the dealer explains why the customer lacks protection for their product and that the possibility of factory extended warranty is gone. A similar scenario might arise with a printer or copier whose warranty terms include a maximum number of copies or prints—an attempt to remind customer about the upcoming date-based expiration of the warranty may be frustrated because the usage based term has already taken effect.

Many sellers would also benefit from being able to apply opportunistic sales techniques (such as bringing a contract term to the attention of a customer when it is particularly favorable or relevant to that customer and the proactive selling of secondary warranties) to individuals who are consumers of the type of product sold by the seller but who did not buy their current product from that seller. These "Conquests™" or "conversions" represent a gain for the seller and a loss for the competition. However, a dealer will typically not have the information used in applying those techniques, because the individuals are not their customers.

SUMMARY

Systems and methods related to certain embodiments disclosed herein are discussed in U.S. Pat. No. 7,827,099, issued on 2 Nov. 2010 and entitled "SYSTEM AND METHOD FOR ASSESSING AND MANAGING FINANCIAL TRANSACTIONS," the content of which is in its entirety hereby incorporated by reference. U.S. Provisional Patent Application No. 60/525,233, filed 25 Nov. 2003 and titled "SYSTEM AND METHOD FOR ASSESSING AND MANAGING FINANCIAL TRANSACTIONS" is also hereby incorporated by reference in its entirety into this application.

Some embodiments of the system and method described herein systematically generate and send alerts to dealers or customers when customers are eligible to enter new financial arrangements under terms favorable to the customer. Some embodiments systematically generate and send alerts to dealers or customers when customers have warranties nearing time based or use based expiration. Some embodiments perform either or both of these functions for non-customers who own products or warranties that the dealer transacts in. Advantageously, the knowledge that embodiments of the system and method make available to dealers can significantly increase the dealers' sales.

In one embodiment, a financial terms alert generation system comprises an information retrieval module, a financial terms comparison module, and an alert transmission module. The information retrieval module is configured to retrieve financing information, customer information, product information, and product use information from one or more sources accessible on a network. Such information can be retrieved, for example, from websites, web services, or other resources located on the Internet. The financial terms comparison module is configured to compare a customer's current financial arrangement to a potential new financial arrangement to determine whether the customer is able to enter into a new financial arrangement on terms favorable to the customer. In one embodiment, the financial terms comparison module performed at least one calculation based on the retrieved information in order to make this comparison. The alert transmission module is configured to transmit, store, or present an alert to a dealer or customer in cases in which the financial terms comparison module determines that a customer is able to enter into a new financial arrangement on terms favorable to the customer. Such alerts identify the customer that is able to enter into a new financial arrangement on terms favorable to the customer and identify the terms of the new financial arrangement.

Embodiments of the system disclosed herein perform a number of processes for alerting a dealer when a customer can enter into a new financial arrangement with terms favorable to the customer. For example, one such process includes (1) retrieving financing, customer, and product information, (2) comparing, for each of a plurality of customers, the customer's current financial terms for a financial arrangement related to a first product currently owned or leased by the customer with potential financial terms related to a second product comparable to the first product that would be available to the customer under a new financial arrangement in order to determine whether the new financial arrangement has terms favorable to the customer, (3) generating, for each customer for which the comparing shows that the new financial arrangement has terms favorable to the customer, an alert comprising information identifying the customer and indicating the terms favorable to the customer under the new arrangement, and (4) transmitting the alerts to at least one dealer or customer.

Another process that can be performed by an embodiment of the system includes (1) receiving a modified financial variable, (2) comparing, for each of a plurality of customers, the customer's current financial terms for a financial arrangement related to a first product currently owned or leased by the customer with potential financial terms related to a second product comparable to the first product that would be available to the customer under a new financial arrangement, taking into account the modified financial variable, in order to determine whether the new financial arrangement has terms favorable to the customer, (3) generating, for each customer for which the comparing shows that the new financial arrangement has terms favorable to the customer, an alert comprising information identifying the customer and indicating the terms favorable to the customer under the new arrangement, and (4) transmitting the alerts to at least one dealer or customer.

Advantageously, by performing the foregoing process, embodiments of the system are able to determine how changed financial variables affect whether customers can enter new financial arrangements with favorable terms. For example, this process can be used to generate alerts when a new financial incentive, such as a manufacturer rebate or a dealership incentive, allows customers to enter new financial arrangements with favorable terms.

Advantageously, embodiments of the system are able to generate alerts related to a particular customer in real-time. This advantageous capability can be used to generate an alert when a customer enters a dealership, such as when a customer has taken his car to a dealership for service. Advantageously, in this embodiment, the alerts are generated in real-time, such that if favorable financial terms are available to the customer, the dealer can attempt to sell a new product to the customer while the customer is still at the dealership. Accordingly, this embodiment can be used to drive increased sales. In accordance with the foregoing embodiment, the system performs a process including (1) receiving an identification of a customer, (2) retrieving, in real-time, financial information regarding a current financial arrangement of the customer identified by the identification, wherein the current financial arrangement relates to a first product currently owned or leased by the identified customer, (3) comparing current financial terms of the current financial arrangement with potential financial terms related to a second product comparable to the first product that would be available to the identified customer under a new financial arrangement in order to determine whether the new financial arrangement has terms favorable to the identified customer, (4) generating an alert comprising information identifying terms favorable to the identified customer under the new financial arrangement if the comparing shows that the new financial arrangement has terms favorable to the identified customer, and (5) transmitting the alert in real-time to at least one dealer or customer.

Accordingly, the foregoing embodiments timely alert dealers regarding opportunities to sell new products to customers by identifying circumstances under which a customer can enter a new financial arrangement with terms favorable to the customer. This and other advantages of the foregoing embodiments will be apparent to a skilled artisan in light of this disclosure.

BRIEF DESCRIPTION OF THE DRAWINGS

FIGS. 1A-1G illustrate an example deal sheet generated by one embodiment of a financial terms alert generation system.

FIGS. 1H-1J illustrate formulae for calculating certain terms of financial arrangements, as used by one embodiment of a financial terms alert generation system.

FIGS. 1K-8 are example screen shots illustrating functionality of various embodiments of a financial terms alert generation system.

FIGS. 9 and 10 illustrate an example deal sheet generated by one embodiment of a financial terms alert generation system.

FIGS. 11-33 are example screen shots illustrating functionality of various embodiments of a financial terms alert generation system.

FIG. 35 illustrates an example deal sheet generated by one embodiment of a financial terms alert generation system.

FIG. 56 is an example of a service alert script generated by one embodiment of a financial terms alert generation system.

DETAILED DESCRIPTION OF PREFERRED EMBODIMENTS

Figure 1A:
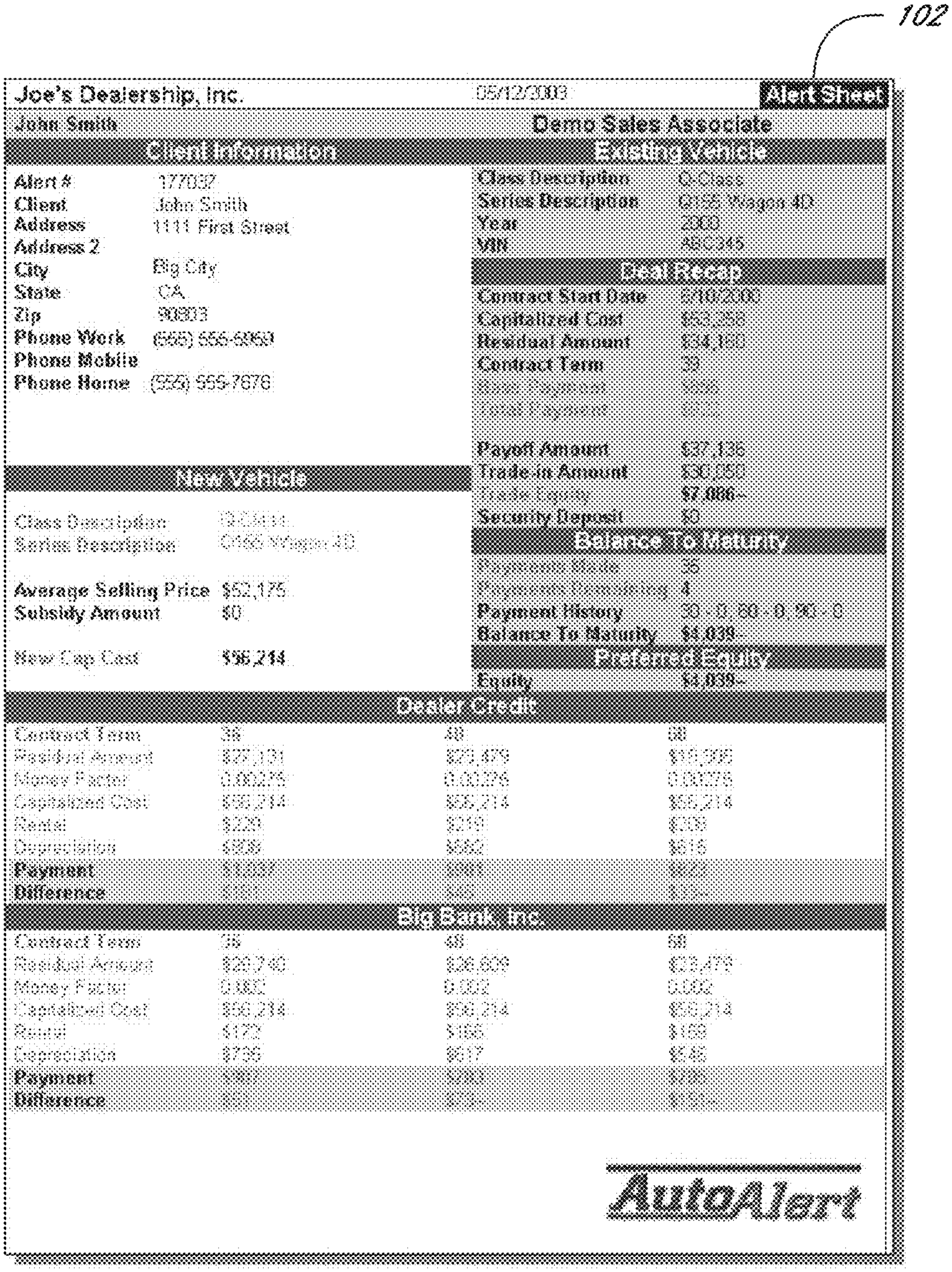

Embodiments of the system described herein may be used to assess the desirability of a new financial arrangement such as a replacement agreement. For example, in response to a customer's inquiry, a salesperson may use certain embodiments of the system to generate a deal sheet to determine whether replacement product and payments are acceptable to the client. In another example, certain embodiments of the system may generate notifications or alerts, which may advantageously indicate a potential replacement agreement satisfies certain parameters that indicate that the potential replacement agreement has terms favorable to the customer. Using these alerts, a person (such as a salesperson) may proactively contact a customer to offer the potential replacement agreement. To help manage client-contact-related tasks, certain embodiments may advantageously include contact management features.

Details regarding several illustrative preferred embodiments for implementing the system and method described herein are described below with reference to the figures. At times, features of certain embodiments are described below in accordance with that which will be understood or appreciated by a person of ordinary skill in the art to which the system and method described herein pertain. For conciseness and readability, such a "person of ordinary skill in the art" is often referred to as a "skilled artisan."

Extrapolating Product Use Information: A Virtual Odometer

One approach to tracking opportunities related to usage terms in warranties (as well as in lease agreement and in other like opportunities that depend on usage) is to track the relevant use of the product (or a reasonable proxy of that use).

Some products may report their relevant use in a way that facilitates such tracking. For example, newer copiers and printers may report the number of documents processed (copied or printed). Vehicles such as cars traditionally display their mileage, but an increasing number of them have the ability to send that information back to a central service via a network.

There are also a number of ways for a dealer to otherwise obtain access to usage based information. For example, when the product is serviced, diagnostics (or simple visual inspection of an odometer or copy-count display) can expose the relevant use to the servicing technician. Courtesy calls, surveys, and self-reporting can all also result in usage data being exposed.

A preferred embodiment of a mileage tracking system configured for use by car (or other motor vehicle) dealers takes advantage of all these methods. It includes components which allow direct entry of the mileage on a particular vehicle, as reported by a user or as observed by the dealer when the vehicle is brought in for service, for example. It also includes the ability to retrieve or accept data from external data sources, such as those maintained by third party service providers.

This mileage information is integrated with the data already maintained by the earlier embodiment, such as customer identity information, vehicle information, and contract terms.

Another piece of information relevant to most warranties is the date on which the vehicle was purchased. This information is typically available in a car dealer's Dealer Management System (DMS), the system used by the dealer to track its sales and other business. Most dealers of any type will have a similar inventory and sales tracking system.

Also in a typical DMS is information about the warranty itself. When a car is sold, details of any warranty or warranties (some vehicles may be sold with both a factor or manufacturer warranty and a dealer warranty) are recorded in the DMS. In addition to information about the scope and cost of the warranty, information about the terms will be recorded.

Evaluating Options: The Deal Sheet

FIG. 1A includes an example of a deal sheet 102. The term "deal sheet" is a broad term and is to be given its ordinary and customary meaning to a person of ordinary skill in the art (i.e., it is not to be limited to a special or customized meaning) and includes, without limitation, collections of information related to customers and existing, replacement, or new financing agreements, lease agreements, warranty agreements, service agreements, purchase agreements, or trade agreements. In various embodiments, a deal sheet can present customer information along with a comparison of an existing agreement for a current product of the customer with one or more new agreements for a supplemental or replacement product that can be offered to the customer. The term "replacement product" is a broad term and is to be given its ordinary and customary meaning to a person of ordinary skill in the art (i.e., it is not to be limited to a special or customized meaning) and includes, without limitation, products, services, or agreements relating to the provision of products or services, that can be offered to a customer in lieu of or in addition to any current products, services, or agreements relating to the provision of products or services. In various embodiments disclosed herein, a replacement product can be a vehicle, or a lease or financing agreement related to a vehicle, that can be offered to a customer.

It should be understood that a deal sheet can contain, without limitation, the following: information relating to a customer and a replacement product, which can for example allow a user to evaluate a particular replacement product for a customer; information relating to a customer and multiple replacement products, which can for example allow a user to evaluate a variety of replacement products for a customer; information relating to multiple customers and a single replacement product, which can for example allow a user to evaluate whether a particular replacement product can be offered to multiple customers; or information relating to multiple customers and multiple replacement products, which can for example allow a user to evaluate a variety of replacement products for a plurality of customers. Further still, a deal sheet in accordance with various embodiments can contain, without limitation, information relating to one or more current products of one or more customers. Deal sheets will be discussed below in more detail.

Figure 1C:
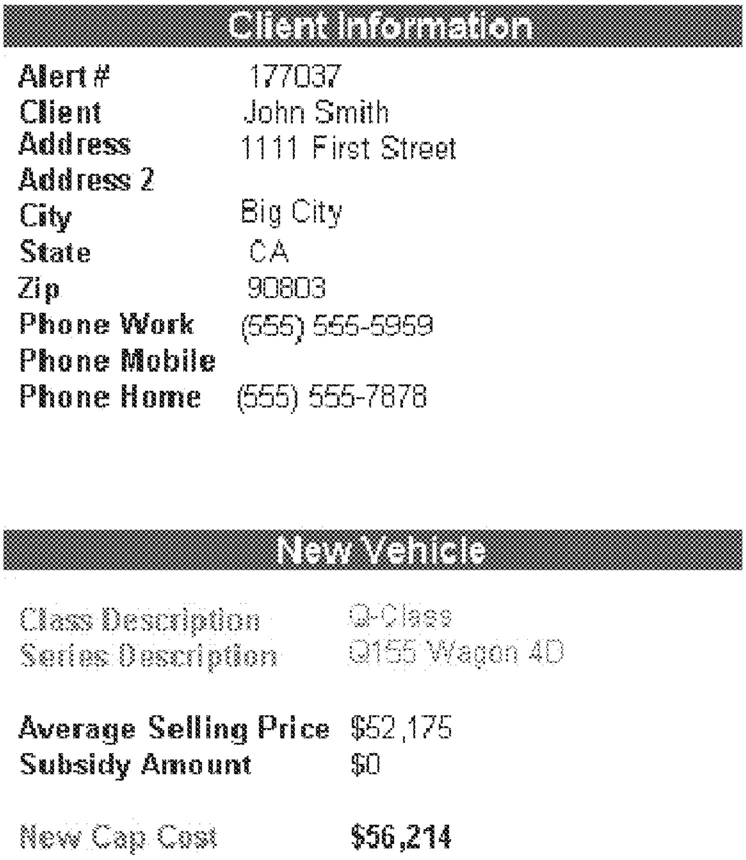

An embodiment of a deal sheet 102 illustrated in FIG. 1A may include a description of a client's current agreement (FIG. 1B), the client's contact information and a description of the replacement product (FIG. 1C), and a comparison between the client's current agreement and one or more replacement agreements (FIG. 1D). The deal sheet may advantageously include a recent measure of the current product's usage (such as when the deal sheet was prepared) or an estimate of the current product's usage now (based, e.g., on earlier measures) or in the future (based, e.g., on one or more recent or earlier measures). This usage information is advantageously included with information about usage based fees associated the current agreement, such that a customer can compare the cost of their use of the product under the current agreement to the cost of a replacement agreement. Any suitable number of replacement agreements may be displayed, including but not limited to one, two, three, four, five, six, or more replacement agreements. Any suitable number of lenders for replacement agreements may be displayed, including but not limited to one, two, or more lenders. The replacement agreements may be for any suitable term, including but not limited to 36 months, 48 months, 60 months, or any other period. The replacement agreements may incorporate any suitable use terms, including but not limited to the terms of the current agreement, terms with a higher allowed based use and a lower allowed base use, and terms with a higher excess use rate and a lower excess use rate. As illustrated, a replacement agreement's payment is advantageously shown along with the difference between the client's current financial agreement's payment and the replacement agreement's payment. Thus, using the deal sheet, a salesperson or customer may advantageously review a plurality of replacement agreements.

Lease or rental agreements typically include use based terms. For example, a retail vehicle lease may include 10, 12, or 15 thousand base miles, with 15,000 being the typical default. If use exceeds that at the time the lease is over and the product is returned, a penalty fee is usually required. For example, the customer may be obliged to pay 10 or 25 cents a mile, perhaps depending on the amount of excess use. In some circumstances approximately 10% of lease customers incur these penalties, with 5,000 dollars being a typical penalty fec. For agreements that do not include use based terms, such as typical purchase agreements, use information may advantageously not be produced on a deal sheet. However, if a customer is considering moving from a current purchase agreement to a replacement lease agreement (or vice versa) then such information is advantageously included.

Virtual use meters, such as a virtual odometer, can advantageously be used in deal sheet alerts and warranty alerts, as described below. They can also be applied in a number of other scenarios, including calculating depreciation or asset values and setting scheduled service alerts (e.g., pre-reserving service slots or reminding customers that service is likely necessary, if the service is recommended on a use based schedule).

Basic Deal Sheets

Figure 1F:
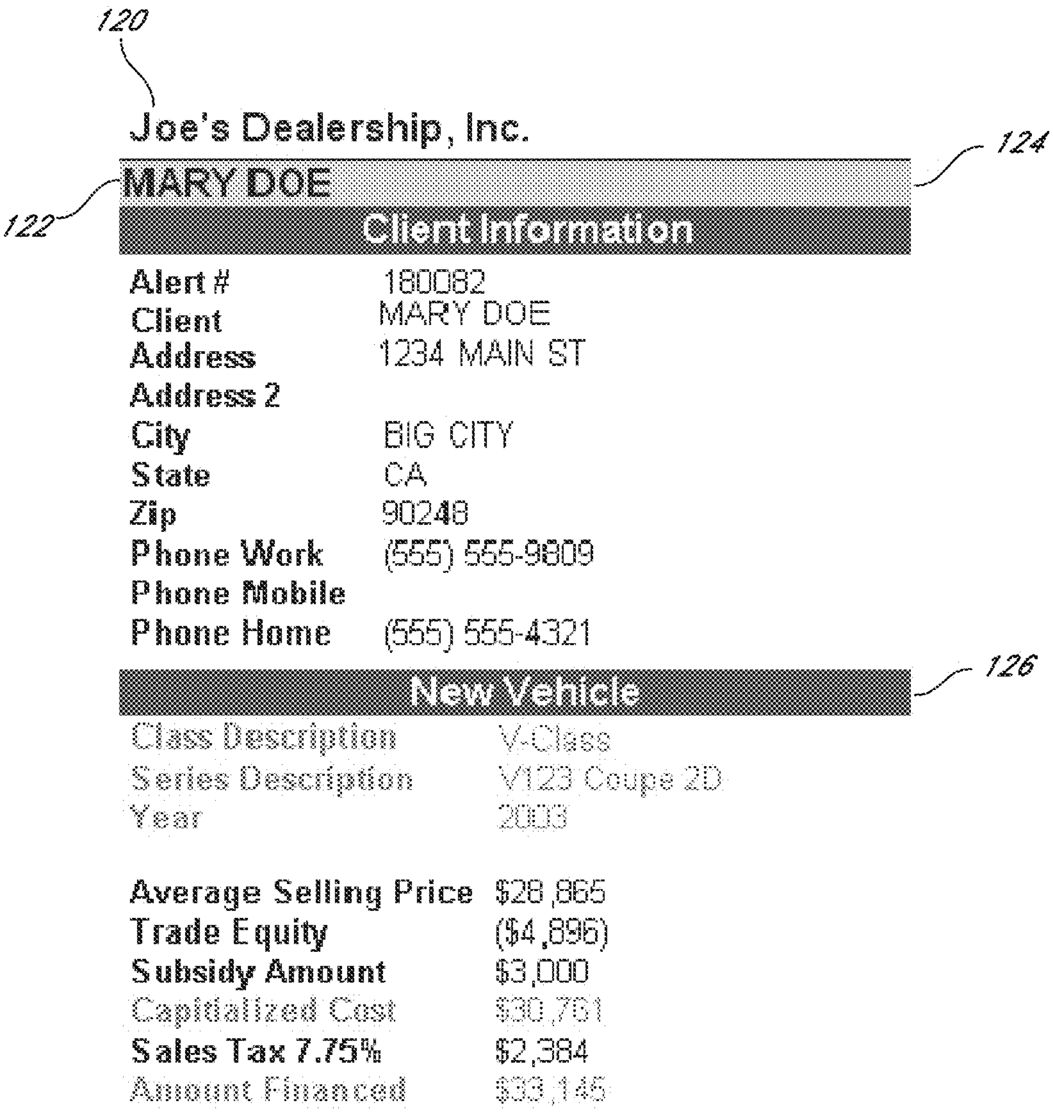
Figure 1G:
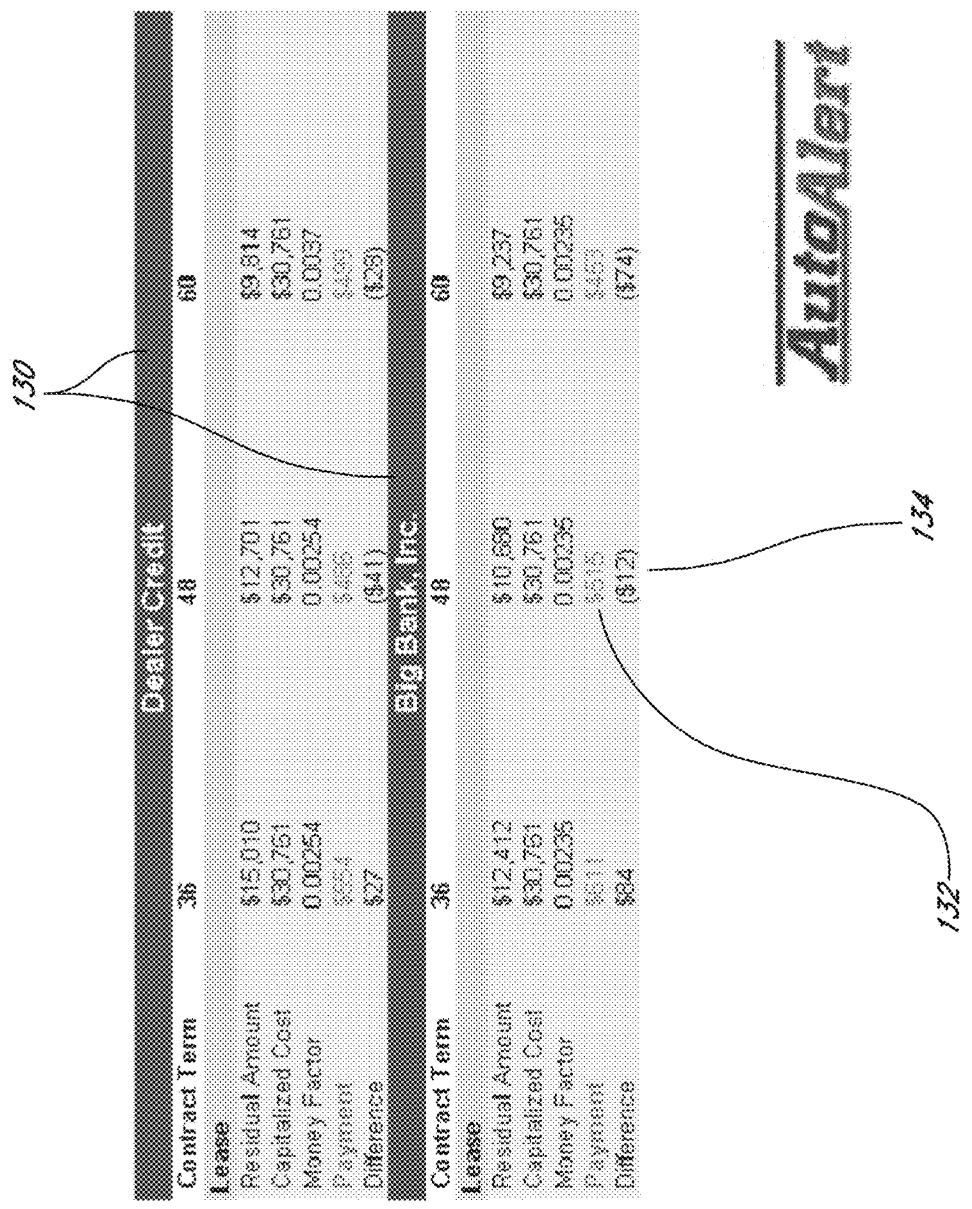

FIGS. 1E, 1F, and 1G illustrate portions of an embodiment of a deal sheet. As illustrated in FIG. 1E, the text 104 indicates that the deal sheet is associated with an alert. In various embodiments, a deal sheet can be associated with zero, one, or more alerts. Text 106 advantageously identifies information about the deal sheet. As illustrated, text 106 illustrates that it is a manager-level view of a lease. In one embodiment, varying levels of detail from the detail sheet are shown to different persons accessing the system. Accordingly, the system may be advantageously used to customize varying views for the persons accessing the system to an appropriate level of detail. For example, a salesperson may need less detail than a manager. In one embodiment, the system determines the identity, the employment position, or both to ascertain the level of detail to display to a user of the system. Although a lease is illustrated, the information displayed may be use for other agreements, such as a purchase agreement. Text 108 may indicate that the alert is associated with a particular person (e.g., a salesperson) or a group of persons (e.g., a "house account" for some or all salespersons).

Figure 43:
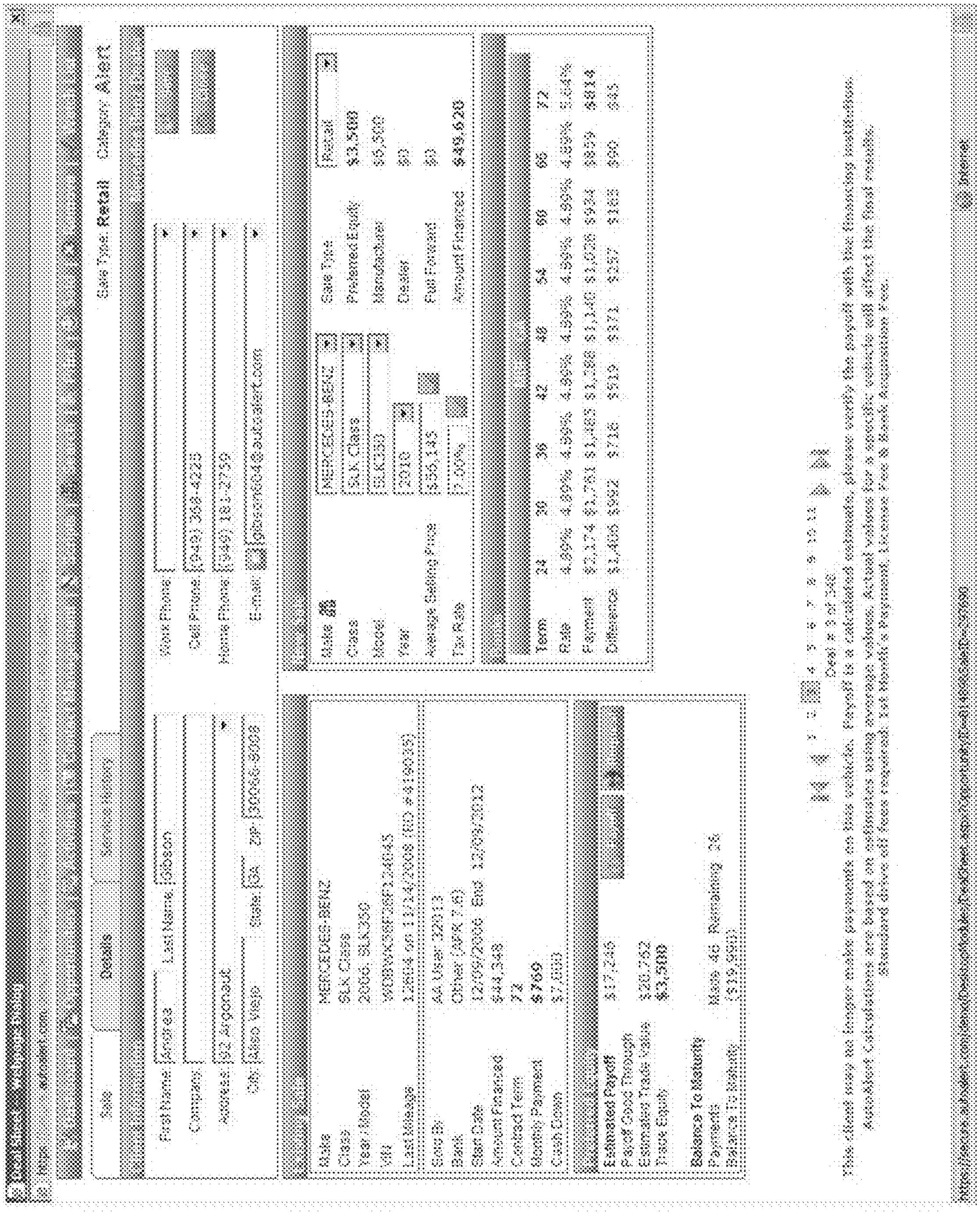
FIG. 43 is a screen shot that illustrates a ‘sales’ tab associated with a detailed view of an alert in one embodiment of a financial terms alert generation system.

As illustrated in FIG. 1E, section 110 of the deal sheet includes information about the current product. The information about the current product may include any suitable information, including but not limited to a product identifier that preferably uniquely identifies the product (e.g., a vehicle identification number or VIN or the like), a class identifier identifying a group of models, a series identifier identifying a particular model, a model year, a make, a model, or the like. As illustrated in FIG. 43, use information (e.g., a vehicle's most recent mileage reading) may also be presented. The information about the current product may be obtained from any suitable resource, including but not limited to a governmental agency (e.g., a department of motor vehicles), the current product's manufacturer, a local distributor of the current product (e.g., the local car dealership that sold the current product or the like), an online database of transactions, or the like. The information about the current product may be added to the system in any suitable manner (e.g., including but not limited to manual entry, automated entry, manual importation, automatic importation, static addition, dynamic addition, or the like) and using any suitable form of data (e.g., database, flat file, or the like). In some instances, the local car dealership that sold the current product may have some or all of the information about the current product in a software system from which the information may be obtained. In some instances, the current product's manufacturer may have some or all of the information about the current agreement in a website from which the information may be obtained. Other sources of usage information, such as mileage information, are discussed above.

Figure 66:
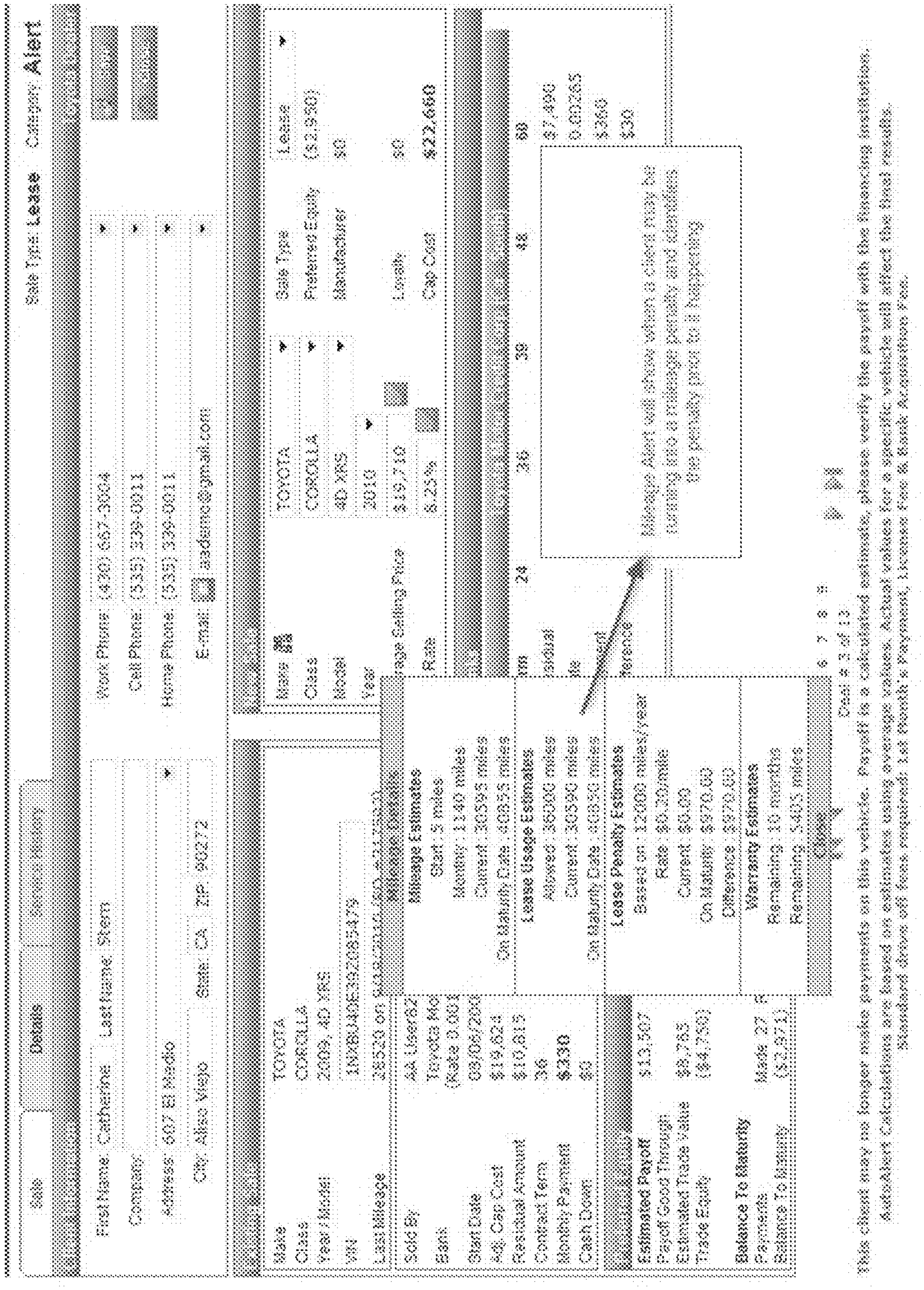
FIG. 66 is an example screen shot that illustrates an example embodiment's use and display of mileage details, warranty terms, and lease usage terms.

As illustrated in FIG. 1E, section 112 includes information about the current agreement, which may include any suitable information, including but not limited to the date the agreement started, the date the agreement ends, the original capitalized cost (or amount financed), the end of term residual (or deferred) payment, the term of the agreement, a base periodic payment (which may be pre tax in certain states), an actual periodic payment (which may be post-tax in certain states), the payoff amount (e.g., the amount owed to the lender to satisfy the agreement), a date until which the lender will accept the payoff amount in satisfaction of the agreement (e.g., a date representing the end of a ten-day period or other suitable period), a trade-in value associated with the product under the agreement, a trade equity (e.g., the trade-in value less the payoff amount), and a security deposit (if any) held by the lender. Again, if the agreement is a lease or other agreement with use terms, the amount of use included, and possibly the rate at which overage is charged, may also be included. In one embodiment, the trade-in value is an average of trade-in values over a suitable period, which values may be obtained from one or more suitable sources. In one embodiment, values over a ten-year period are obtained from an online auction website and grouped by a suitable geographic region. In one embodiment, the trade-in value is manually adjustable. Trade-in values may be selected from any suitable location, including but not limited to one or more car dealerships. In one embodiment, trade-in values may have associated assumptions (e.g., mileage, condition, or the like). Of course, any suitable method for calculating a trade-in value may be used. The term "trade-in value" is a broad term and is to be given its ordinary and customary meaning to a person of ordinary skill in the art (i.e., it is not to be limited to a special or customized meaning) and includes, without limitation, aspects of some embodiments disclosed herein and the value of any cash, services, or price or fee reductions provided. As illustrated in FIG. 1E, section 114 includes additional information concerning the current agreement, including the number of payments the client has made under the agreement, the number of payments remaining under the agreement, the number of times (if any) the client has made late payments (including payments 30 days late, 60 days late, 90 days late, or the like), and the total of remaining payments and any additional fees to conclude the agreement as scheduled under the agreement. In some embodiments, this screen or a similar one might also include information about the amount of use remaining (based on the current or estimated current use, as discussed above). Some embodiments may also include information about any usage fee due now (based, for example, on the same value) or the usage fee due if the agreement were to conclude on the schedule date (e.g., based on an extrapolated future value, also as discussed above). See, for example, FIG. 66, which illustrates one way an embodiment can present this information. Another embodiment may present this information integrated into a table such as that masked by the explanatory text in FIG. 66. Yet another embodiment may display this information in graphical format, such as by means of charts or graphs.

The information about the current agreement (e.g., FIG. 1E) may be obtained from any suitable resource, including but not limited to the lender that financed the current agreement, a governmental agency (e.g., a department of motor vehicles), the current product's manufacturer, a local distributor of the current product (e.g., the local dealership that provided the current product), an online database of transactions, or the like. Information about the current agreement may be added to the system in any suitable manner (e.g., including but not limited to manual entry, automated entry, manual importation, automatic importation, static addition, dynamic addition, or the like) and using any suitable form of data (e.g., database, flat file, or the like). In some instances, the local dealership that provided (e.g., sold or leased) the current product may have some or all of the information about the current agreement in a software system from which the information may be obtained. An affiliate of that local dealership may also such information—e.g., if the local outlet is part of a larger organization, that larger organization may have it. In some instances, the current product's manufacturer may have some or all of the information about the current product (originally sourced, for example, by customers who enter the information, by dealers and the like who first provide it, via automatic upload from the product itself, or due to the manufacturer or an affiliate having provided the product directly). Services holding such data may make it available in a website from which the information may be obtained, or by other means (such as batch query or even delivery upon request). Usage based information may be obtained from similar sources in similar ways, as well as is otherwise discussed herein.

As illustrated in FIG. 1F, the text 120 indicates that the deal sheet is provided by a particular car dealership. Text 122 indicates the client for whom the deal sheet was created. Section 124 includes information, including contact information, for the client, such as the client's name, address, and telephone numbers. The information about the client may be obtained from any suitable resource, including but not limited to a governmental agency (e.g., a department of motor vehicles), the current product's manufacturer, a local distributor of the current product (e.g., the local car dealership that sold the current product or the like), an online database of transactions, or the like. The information about the client may be added to the system in any suitable manner (e.g., including but not limited to manual entry, automated entry, manual importation, automatic importation, static addition, dynamic addition, or the like) and using any suitable form of data (e.g., database, flat file, or the like). In some instances, the local car dealership that sold the current product may have some or all of the information about the client in a software system from which the information may be obtained. In some instances, the current product's manufacturer may have some or all of the information about the client in a website from which the information may be obtained.

As illustrated in FIG. 1F, section 126 may include any suitable information about the replacement product, including but not limited to a class identifier identifying a group of models, a series identifier identifying a particular model, a model year, a make, a model, a selling price associated with the product (e.g., an average selling price), the trade equity value illustrated in section 112 (FIG. 1E), a subsidy amount (if any) the seller of the replacement product would be willing to accept below the selling price associated with the product, the total selling price (or capitalized cost) on the replacement product including any equity and including sales tax (if any), sales tax (if any), and the total amount financed including trade equity and sales tax. The information about the replacement product may be obtained from any suitable resource, including but not limited to the sources discussed above as well as a governmental agency (e.g., a department of motor vehicles), the replacement product's manufacturer, a local distributor of the replacement product (e.g., a local dealership) or an affiliate, an online database of transactions, or the like. The information about the replacement product may be added to the system in any suitable manner or format, including but not limited to those discussed above. In some instances, a local car dealership may have some or all of the information about the replacement product in a software system from which the information may be obtained. In some instances, the replacement product's manufacturer may have some or all of the information about the replacement product in a website from which the information may be obtained.

As illustrated in FIG. 1G, the section headings 130 indicate the names of the lenders associated with the replacement agreements shown under the section headings 130. Any suitable information about the replacement agreements may be displayed, including but not limited to a contract term (e.g., 36 months, 48 months, 60 months, or the like), the type of agreement (e.g., lease, purchase, deferred payment), a residual or deferred payment amount, a capitalized cost or amount financed, a money factor or interest rate charged on the replacement agreement, a periodic payment associated with the replacement agreement, and difference (e.g., text 134) between the client's periodic payment under the current agreement (e.g., text 116 in FIG. 1E) and the payment under the replacement agreement (e.g., text 132). Other information may include, for example, the base mileage included in the agreement and the excess mileage fec. If the customer indicates, or the customer's extrapolated mileage indicates, that the customer is likely to exceed the base mileage, the estimated overage fee due at the end of the new agreement may also be shown, in an analogous way to the showing of a final payment in a balloon type agreement. For one of the illustrated replacements agreements, text 134 indicates that the replacement agreement's payment is twelve dollars less than the current agreement's payment. In one embodiment, the actual replacement agreement that the client enters may differ from those displayed in the FIG. 1G; for example, upon review of the current product, particular values (e.g., a trade-in value or selling price) may be adjusted higher or lower for any suitable reason. Accordingly, a deal sheet may advantageously display an indication that the values on the deal sheet are estimates.

Similarly, a dealer or other agent hoping to provide a replacement product may "eat" or assume some or all of any usage based that is due if the current agreement is cancelled (this may or may not be related to a the dealer's assumption of any early-termination fees). For direct financial reasons (e.g., a dealer's incentive to provide a replacement product or agreement to a customer exceeds the current usage fee due on the current agreement) or customer service reasons (e.g., perhaps a customer did not expect the usage fee), a dealer may decide to pay some or all of the usage fee due on the current agreement if the customer enters a replacement agreement. Also, entering into a replacement agreement may, just because of the benefit of avoiding usage fees or also because of other financial reasons, be financially attractive to a customer. In such circumstances, a dealer may be able to present a customer with a scenario in which projected future use fees are eliminated-such a scenario may appear to the customer like one in which the dealer ate or forgave use-fees while the dealer is, in fact, not out of pocket for such fees (as a dealer typically would be for forgiving or assuming such fees). For example, if a customer is already over the usage limit of her current agreement, she may owe $1,000 in excess use fees. Depending on her future use over the remainder of the current agreement (which some embodiments may estimate based on past or current use, as described above) at various times in the future her excess use fees may be higher, reaching a maximum of, for example, an estimated $5,000 if the agreement runs its course and her future use is similar to her past use. This type of information can be advantageously deployed by a dealer or a customer seeking to understand the full cost of remaining in a current agreement and the relative cost of a new agreement. Some embodiments, for example, may adjust the displayed monthly cost of the present agreement to include a prorated amount of the estimated final usage penalty. If a user is expected, in advance, to exceed the usage limits of a replacement agreement, then the estimated monthly fees for that agreement may be similarly adjusted.

The information about the replacement agreements (FIG. 1G) may be obtained from any suitable resource, including but not limited to the lenders offering financing for the replacement agreement, the replacement product's manufacturer, a local distributor of the replacement product (e.g., a local dealership), an online database of transactions, or the like. The information about the replacement agreement may be added to the system in any suitable manner (e.g., including but not limited to manual entry, automated entry, manual importation, automatic importation, static addition, dynamic addition, or the like) and using any suitable form of data (e.g., database, flat file, or the like). In some instances, a local car dealership may have some or all of the information about the replacement agreement in a software system from which the information may be obtained. In some instances, the replacement product's manufacturer may have some or all of the information about the replacement agreement in a website from which the information may be obtained.

Figure 70:
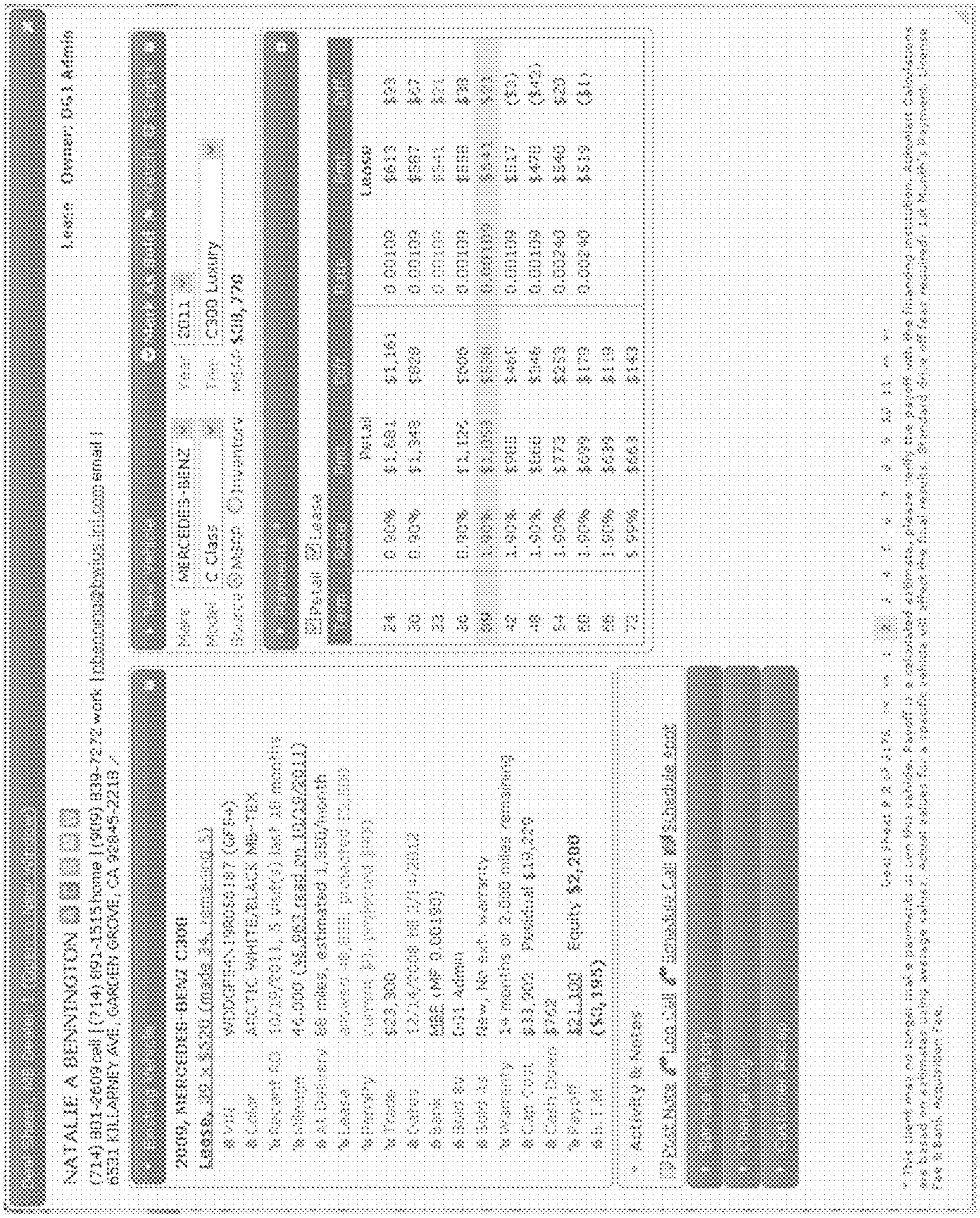
FIG. 70 shows an example of a deal sheet and deal sheet interface in one embodiment of a financial terms alert generation system.

In the example illustrated in FIG. 1G, the replacement agreements are leases; however, replacement agreements may be any suitable type of agreement, including but not limited to a lease agreement, a deferred or balloon agreement, a purchase agreement, or the like. In accordance with various embodiments, various kinds of replacement agreements can be displayed side-by-side to facilitate comparison. FIG. 70, for example, shows a side-by-side comparison of a replacement lease and a replacement sale agreement. The term "agreement" is a broad term and is to be given its ordinary and customary meaning to a person of ordinary skill in the art (i.e., it is not to be limited to a special or customized meaning) and includes, without limitation aspects of some embodiments disclosed herein, leases, purchases, options and other derivatives, rentals, and trades or swaps. FIG. 1H illustrates one embodiment of a lease payment formula; however, any suitable lease payment formula may be used. The term "lease" is a broad term and is to be given its ordinary and customary meaning to a person of ordinary skill in the art (i.e., it is not to be limited to a special or customized meaning) and includes, without limitation, aspects of some embodiments disclosed herein, fixed-term leases, fixed-use leases, lease-to-buy plans, and rentals. FIG. 1I illustrates one embodiment of a deferred or balloon payment formula; however, any suitable deferred or balloon payment formula may be used. The term "deferred" is a broad term and is to be given its ordinary and customary meaning to a person of ordinary skill in the art (i.e., it is not to be limited to a special or customized meaning) and includes, without limitation, aspects of some embodiments disclosed herein, balloon payments, payments-upon-cancellation or payments-upon-termination, or any type of payment obligation due at a time in the future. The term "balloon" is a broad term and is to be given its ordinary and customary meaning to a person of ordinary skill in the art (i.e., it is not to be limited to a special or customized meaning) and includes, without limitation aspects of some embodiments disclosed herein. FIG. 1J illustrates one embodiment of a purchase payment formula; however, any suitable purchase payment formula may be used. The term "purchase" is a broad term and is to be given its ordinary and customary meaning to a person of ordinary skill in the art (i.e., it is not to be limited to a special or customized meaning) and includes, without limitation aspects of some embodiments disclosed herein.

Figure 9:
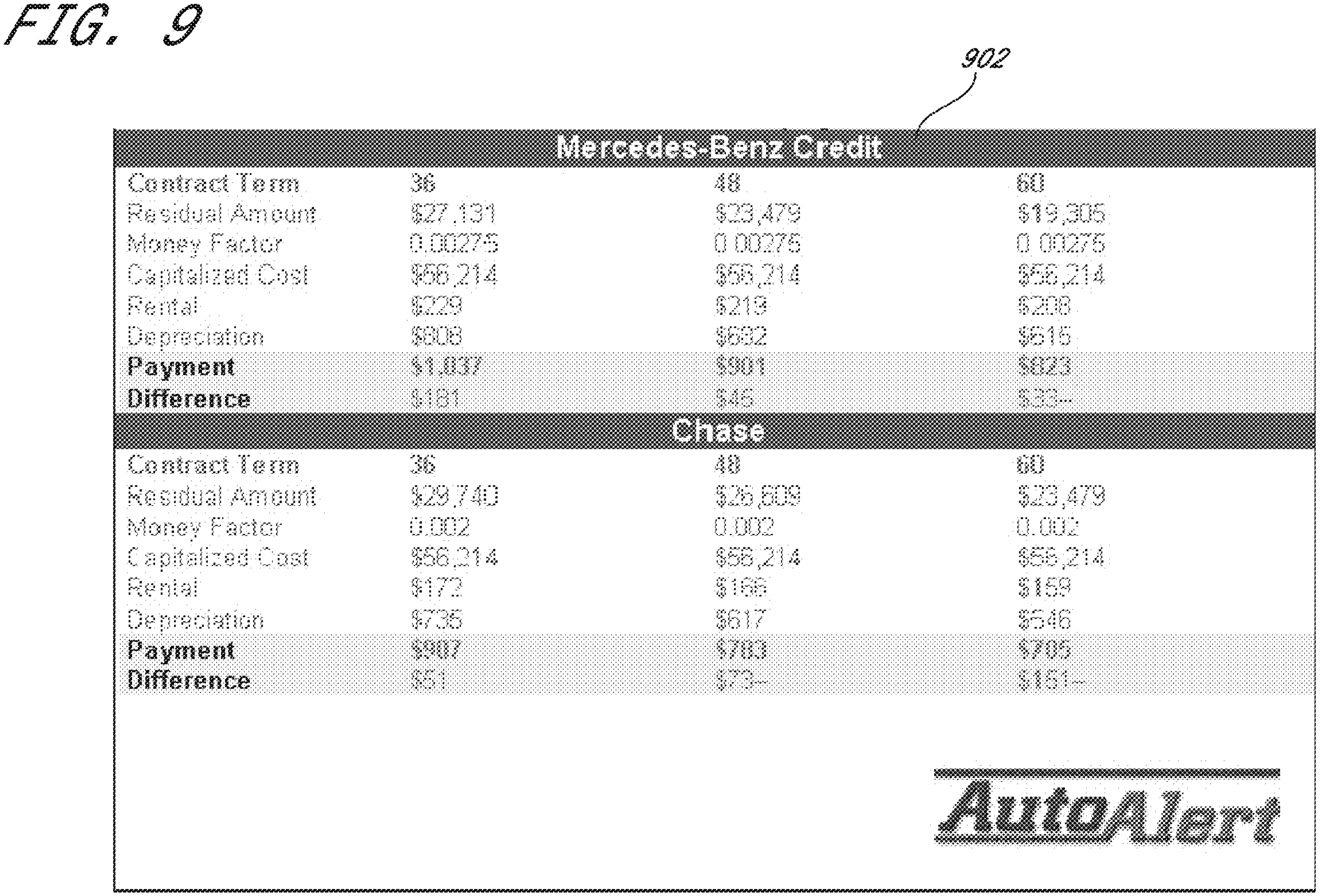
Figure 11:
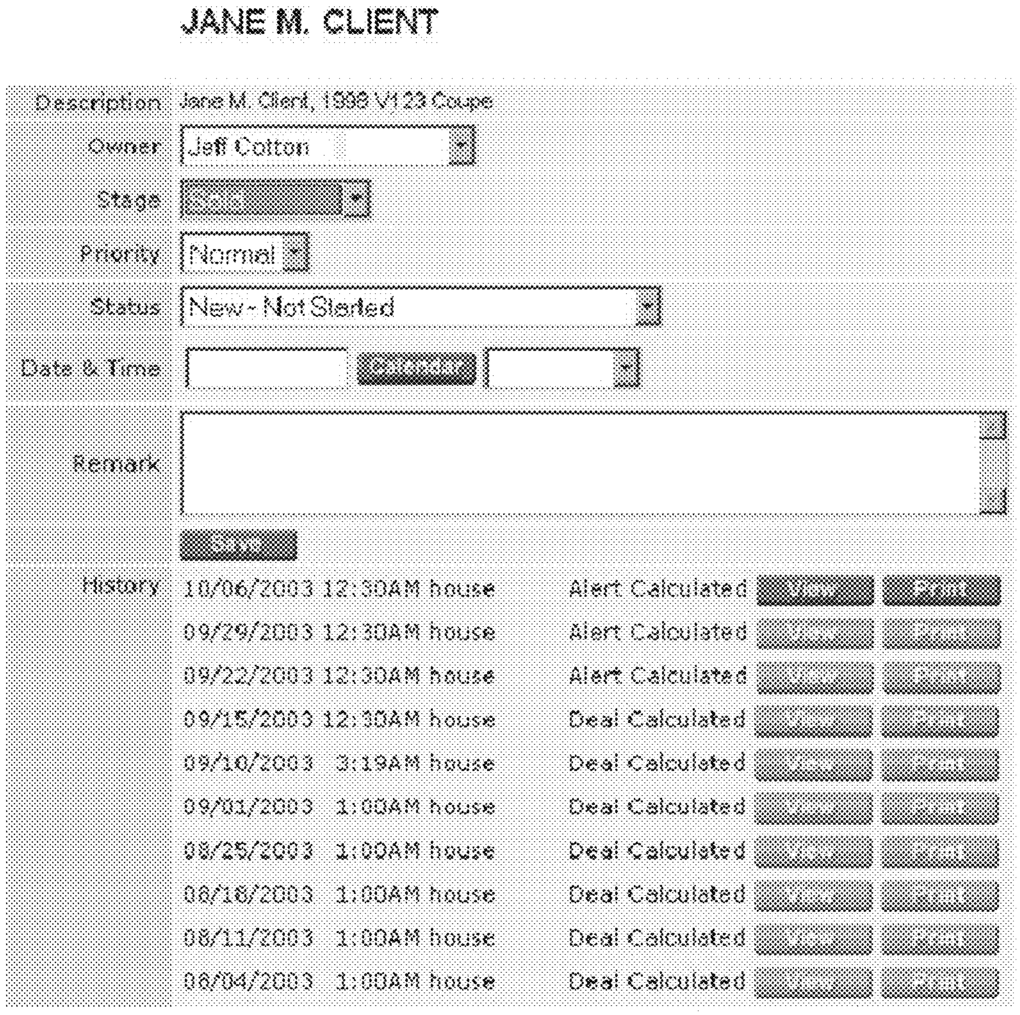

FIG. 9 also illustrates a deal sheet 902. A deal sheet may include some or all of the data displayed in deal sheet or any other suitable data. Thus, a deal sheet showing a different set of data is shown in FIG. 9. For example, FIG. 10 illustrates a view of a deal sheet highlighting the client's current transaction. Although a particular presentation is illustrated in FIG. 9, a deal sheet may use any suitable presentation and, thus, may be configured to show the data in a variety of ways, whether similar to or not similar to that shown in FIG. 9. A user may browse from a displayed deal sheet to the contact management view (FIG. 11). For example, after calling a client and discussing the displayed deal sheet, a salesperson may wish to access the contract management view to update the current status of the contact management process.

FIG. 35 illustrates an embodiment of a deal sheet. As illustrated in FIG. 35, deal sheet may have one, two, three, or more types of agreements (e.g., lease, balloon, retail purchase, or the like). Further, different types of agreements may have the same or different sets of parameters displayed in the deal sheet.

Detailed Interactive Deal Sheets

Figure 44:
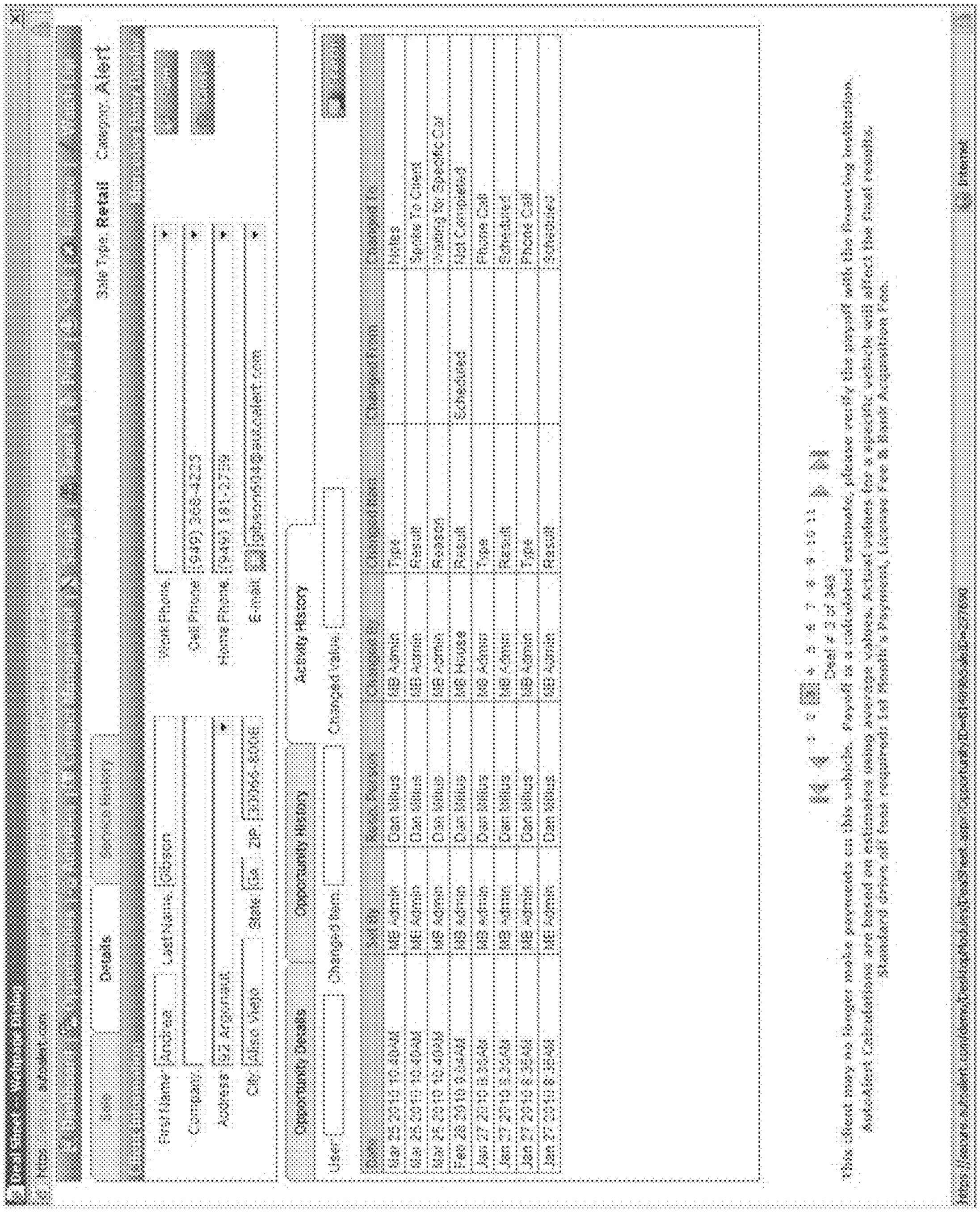
FIG. 44 is a screen shot that illustrates an “activity history” tab within a ‘details’ tab associated with a detailed view of an alert in one embodiment of a financial terms alert generation system.
Figure 45:
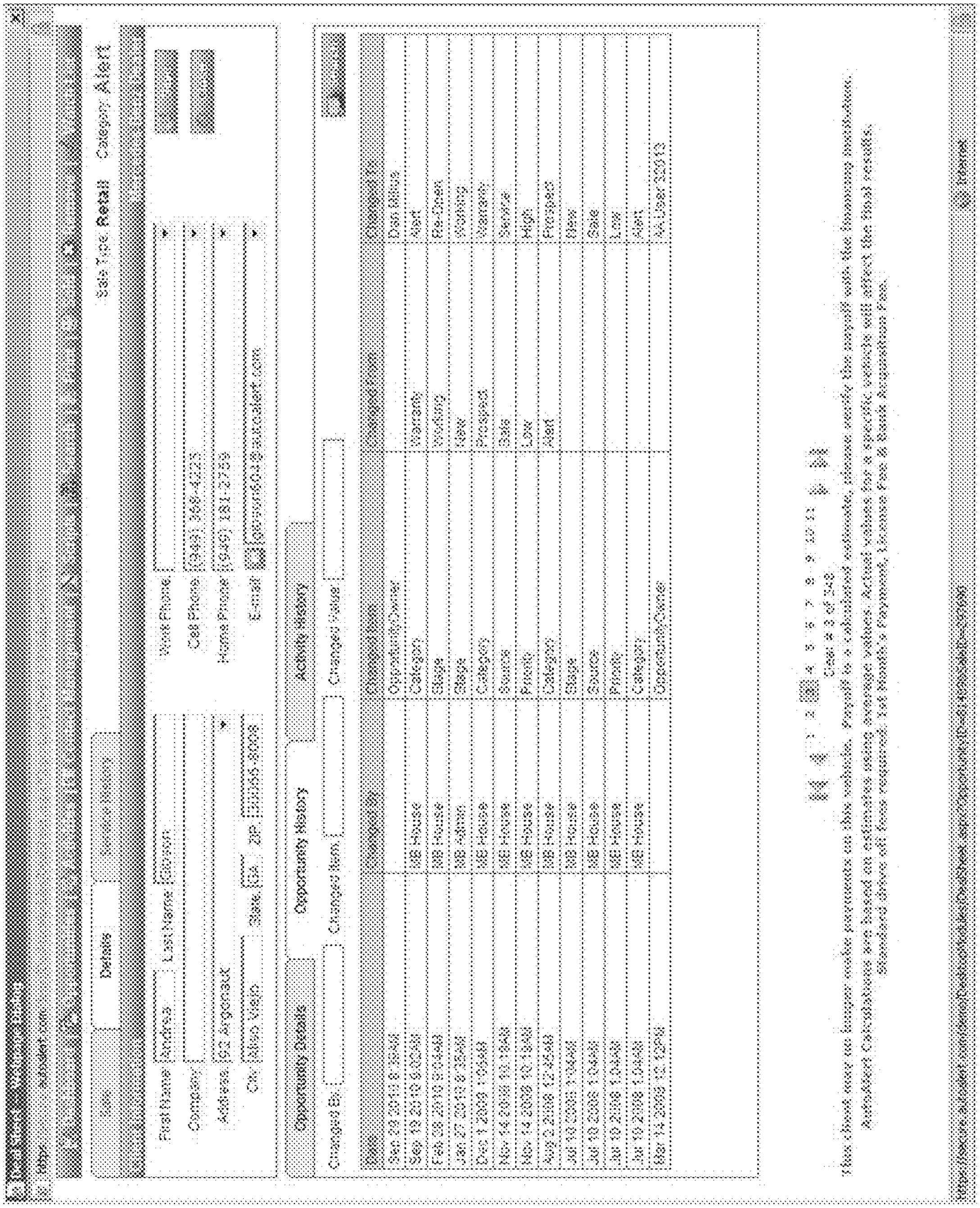
FIG. 45 is a screen shot that illustrates an “opportunity history” tab within a ‘details’ tab associated with a detailed view of an alert in one embodiment of a financial terms alert generation system.
Figure 46:
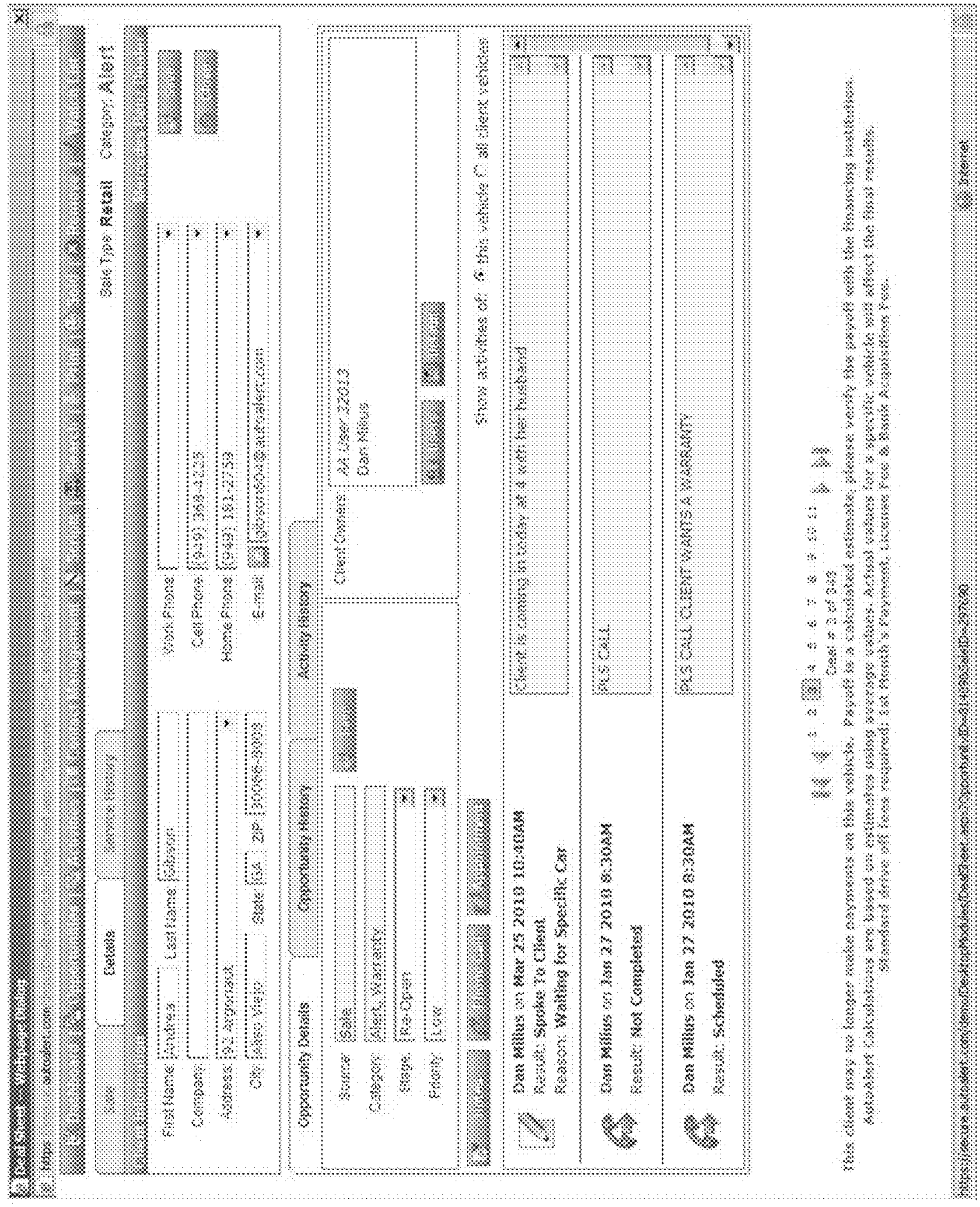
FIG. 46 is a screen shot that illustrates an “opportunity details” tab within a ‘details’ tab associated with a detailed view of an alert in one embodiment of a financial terms alert generation system.

In various embodiments, detailed interactive deal sheets are presented to the user. In some embodiments, for example, FIG. 43 is displayed when a particular user, Andrea Gibson, is selected from the display in FIG. 42. FIG. 43 shows, by default, a deal sheet akin to what is described above. If a user selects the "Details" tab, than a screen such as that shown in FIG. 44 is displayed. This details screen contain its own set of internal tabs, giving access to details about the history of activity with that customer (as show in FIG. 44), the history of opportunities with that customer (as shown in FIG. 45), and the details of the most recent opportunity with that customer (as shown in FIG. 46). These displays integrate, as other embodiments may do in different ways as appropriate for the selected user interface and design choices of that embodiment, the usage and warranty features discussed above. For example, 'last mileage' is shown in FIG. 43, and FIG. 45 shows that the customer was the subject of a mileage alert.

FIG. 70 shows an alternative embodiment of a deal sheet. At the top of the deal sheet, the customer's name can be displayed along with other contact information. Icons can be displayed to indicate what kind of alerts the deal sheet corresponds to. In FIG. 70, for example, the deal sheet has been generated for customer Natalie A Bennington based on a general alert ("A"), a contract end alert ("C"), a service alert ("S"), a mileage alert ("M"), and a warranty alert ("W"). Information about the customer's current vehicle can be displayed. Notably, this information can include the vehicles predicted current mileage with a note indicating the last verified mileage recordation and its date. This information can also include estimated monthly mileage, mileage allowed under the lease, current mileage-based financial penalty, trade-in value, lease start and end dates, warranty term in months or miles, payoff amount, and current equity. Based on the lease end date and estimated monthly mileage, the deal sheet can also provide predicted mileage at the lease end date, predicted financial penalty at the lease end date, and predicted warranty expiration date based on the earlier of the warranty's end date or the customer's predicted mileage exceeding the mileage term of the warranty. Such information can be calculated in real-time or can be displayed based on alerts generated previously and stored, transmitted, queued, or the like.

As further shown in FIG. 70, the deal sheet can include an area for selecting criteria for a replacement product. For example, replacement vehicle make, model, year, and trim can be selected. In various embodiments, these fields can be pre-populated with criteria corresponding to the same general product family, price level, or luxury degree as the customer's existing product. In FIG. 70, for example, the customer's current vehicle is a 2009 Mercedes-Benz C300. Accordingly, the replacement product criteria have been pre-populated with information corresponding to the 2011 model of the same C300 model. The replacement product area can also include a selection. A selection field can also be provided to specify the source for the replacement product data. For example, the data about replacement products can be retrieved from a retail listing (e.g., a MSRP listing), or from local inventory. Information about local inventory can be retrieved from a data source, for example, located at the dealership or stored in a remotely accessible data repository.

Although the selected replacement product criteria shown in FIG. 70 can be pre-populated with criteria corresponding to the same general product family, price level, or luxury degree as the customer's existing product, a customer may want to "buy up," or purchase a product with a higher level of quality of luxury. Accordingly, embodiments of the system and method described herein allow a dealer to determine financial arrangements that are available to a customer in such a "buy up" situation. In certain embodiments, for example, a dealer selects, using, for example, a pull-down menu, a class of products that a customer potentially desires to buy. For example, with respect to cars, a dealer may select a model of car, such as a Mercedes-Benz C class, or a Mercedes-Benz E class. FIG. 70 illustrates an area for selecting criteria for a replacement product which allows a dealer to make such a selection. Upon receiving such a selection, embodiments of the system determine new financial arrangements that are available to the customer for that class of product. Advantageously, the dealer can use such information to present the customer with an offer to "buy up" to a higher quality product. Similarly, embodiments of the system and method allow a dealer to select a lower class of product to find out about opportunities for the customer to "buy down," or purchase a lower class product in order to save money. In certain embodiments, such "buy up" or "buy down" inquiries are limited to products from the same manufacturer as a product that the customer currently owns or is leasing. In other embodiments, such "buy up" or "buy down" inquiries can include manufacturers that are different from the manufacturer of a product that the customer currently owns or is leasing.

The payments area on the right hand side of FIG. 70 can display information about the options for leasing or financing a replacement product. This information can include a comparison of the customer's current financing agreement and the terms of various available replacement agreements. For example, the right side of the payments table in FIG. 70 shows the financial criteria corresponding to different lease terms ranging from 24-72 months. For each lease term, the table indicates the interest rate, the monthly payment, and the difference between the monthly payment under that lease and the customer's current monthly payment. The left hand side of the table shows the financial criteria corresponding to different financing periods for a retail purchase of the replacement product. For each financing period, the table indicates the interest rate, the monthly payment, and the difference between the monthly payment under the financing agreement and the customer's current monthly payment. Notably, this side-by-side display of lease payments and retail purchasing financing payments can allow the customer to compare the attractiveness of leasing a replacement product as compared to financing the purchase of a replacement product. Check boxes above the table can allow the user to remove either the retail purchase or lease columns from the table, for example, in the event that the customer specifies that she is only interested in one of leasing and buying. Also, as shown in FIG. 70, the row of the payments table corresponding to the term-length of the customer's current agreement can be highlighted for comparison.

Figure 71:
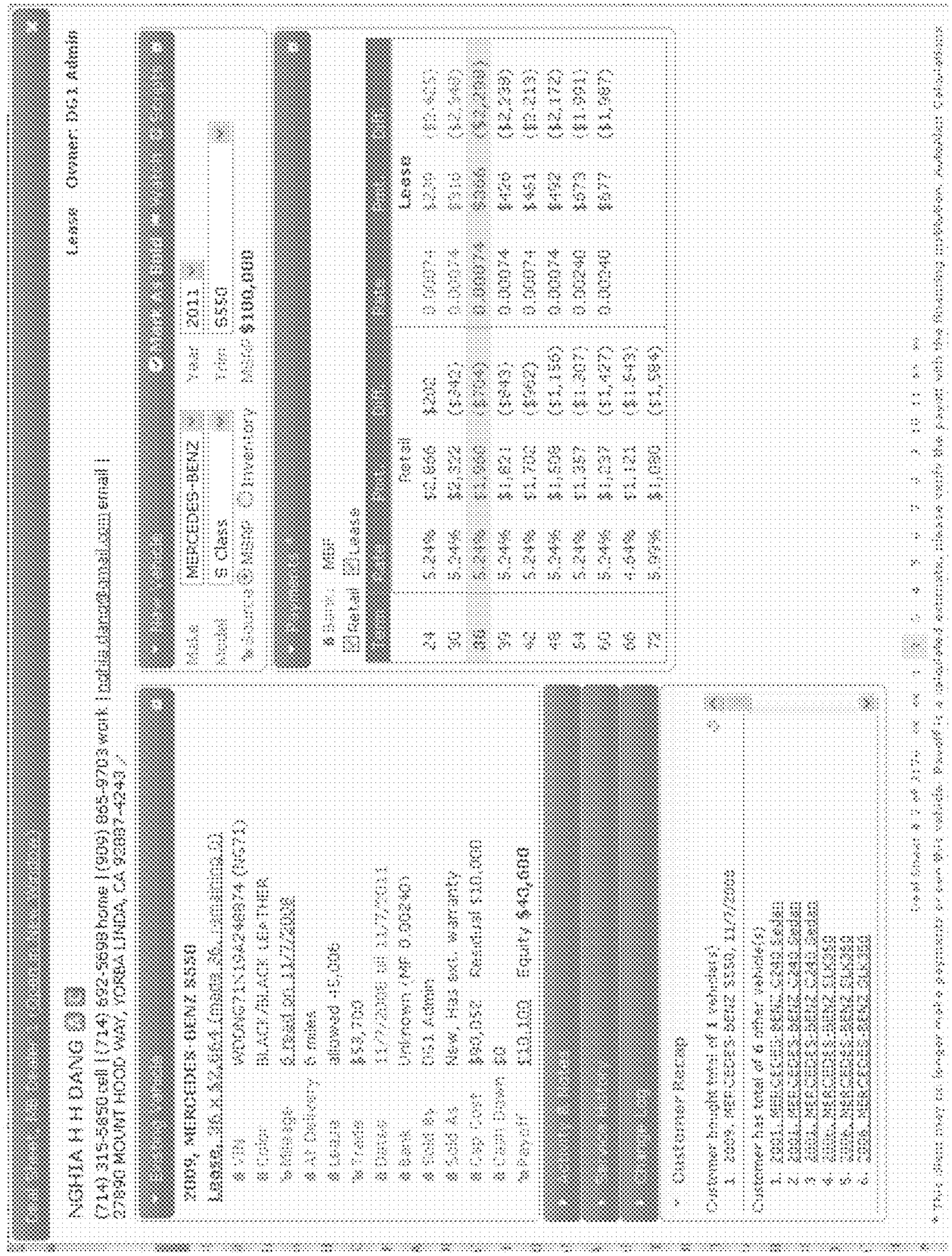
FIG. 71 shows an example of a deal sheet and deal sheet interface in one embodiment of a financial terms alert generation system.

As shown in FIG. 71, in the bottom left change log section, the deal sheet can provide a review of other products purchased, leased, or owned by the customer. Vehicles purchased or leased through the user's dealership can be listed separately from other vehicles owned by the customer. Information about the other vehicles owned by the customer can be retrieved, for example, from a remote server of a financial institution, dealership, insurance company, or the like. Information about the other vehicles can also be collected when the vehicles are brought into the dealership for service or inspection. Such vehicles, for example, can be the subject of Conquest™ alerts when the dealer can offer the customer a financially attractive deal on a newer vehicle.

Alerts and Opportunities

The term "alert" is a broad term and is to be given its ordinary and customary meaning to a person of ordinary skill in the art (i.e., it is not to be limited to a special or customized meaning) and includes, without limitation, a listing, notification, presentation, storage, or transmission of relevant information. In various embodiments, an alert can comprise a deal sheet. For example, an alert can be a deal sheet that may be of interest to one or more customers. An alert can, for example, comprise a query result, a result of an on-demand calculation, a result of a pre-calculation, a calculated deal sheet, or information relating to a scheduled or predicted occurrence.

The term "opportunity" is likewise a broad term and is to be given its ordinary and customary meaning to a person of ordinary skill in the art (i.e., it is not to be limited to a special or customized meaning) and includes, without limitation, circumstances, customers, products, or agreements that may be of interest (e.g., to a user, customer, dealer, service provider, financier, or the like). An opportunity may comprise, for example, a deal sheet or an alert. In various embodiments, opportunities can be detected or calculated sets of circumstances that indicate the desirability of further investigation.

Generally speaking, in various embodiments, an alert is an indication that a customer is in a position to be presented with a new offer. For example, some embodiments of the system and method described herein systematically generate and send alerts to dealers or customers when a customer is eligible to enter a new financial arrangement for one or more replacement products under terms favorable to the customer. Also for example, other embodiments systematically generate and send alerts when a customer or her circumstances meet certain criteria related to the financial attractiveness of replacement products or agreements, to lease dates and mileage allowances of the customer's products, to warranty dates and mileage allowances of the customer's products, to service dates and schedules, or to any other aspect of the customer, her products, her agreements, or her circumstances. Alerts can be generated and processed by various embodiments of the system and presented to a user. A user, for example, can be a customer, dealer, financier, service provider, or any other interested party. In some embodiments, the system can generate, process, and provide alerts for a plurality of client entities, each client entity having customer data associated with a plurality of customers.

Home and Top Alerts Interfaces

Figure 1K:
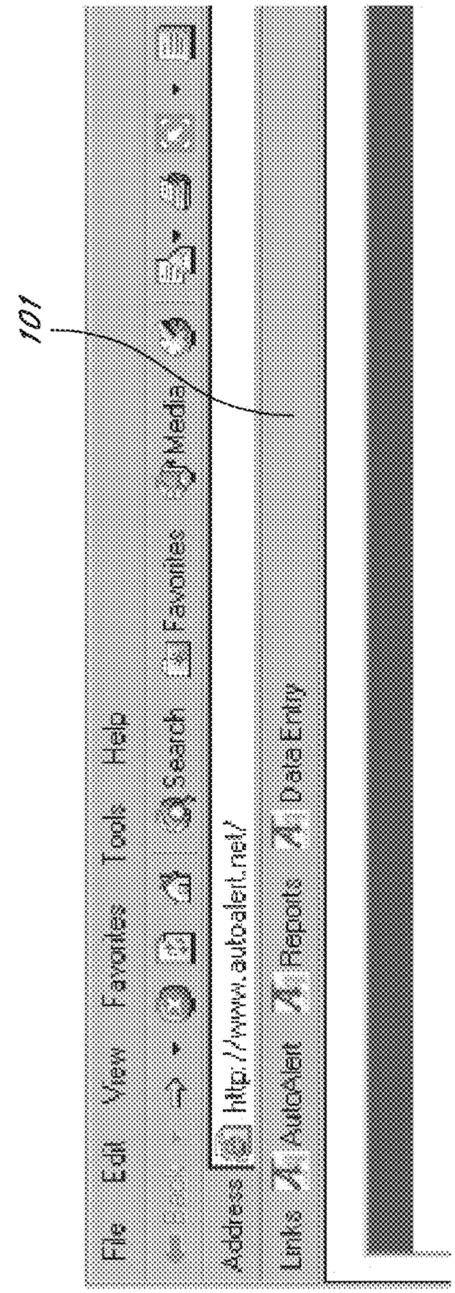
Figure 2:
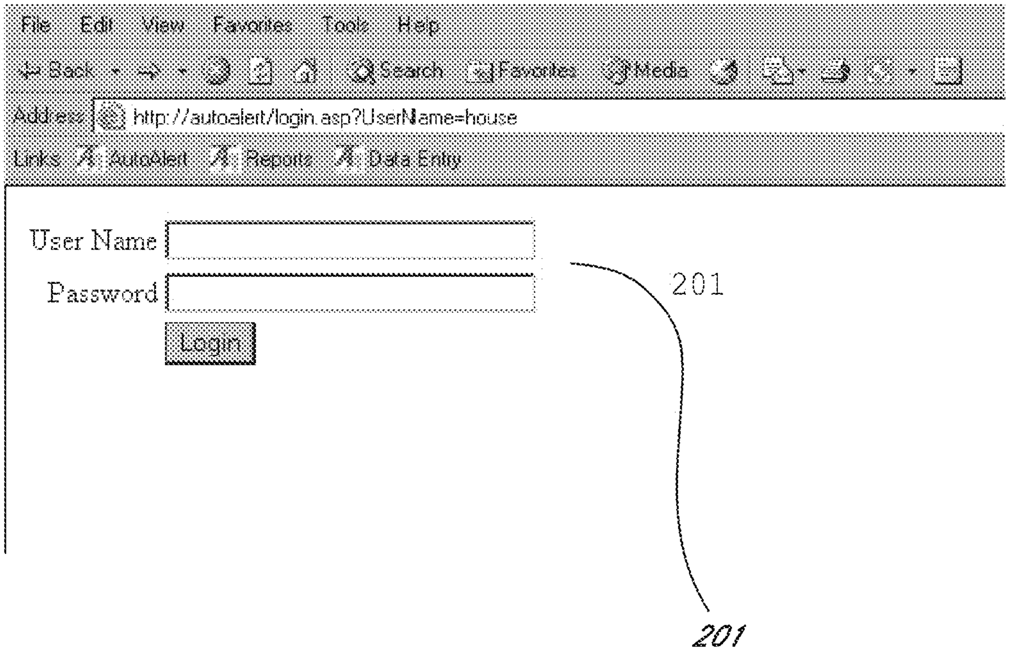

FIG. 1K illustrates an internet browser that has buttons 101 advantageously used to access functions of various embodiments. FIG. 2 illustrates an initial log in screen in which a user enters a username and password into fields 201 to gain authorized access to the system.

Figure 41:
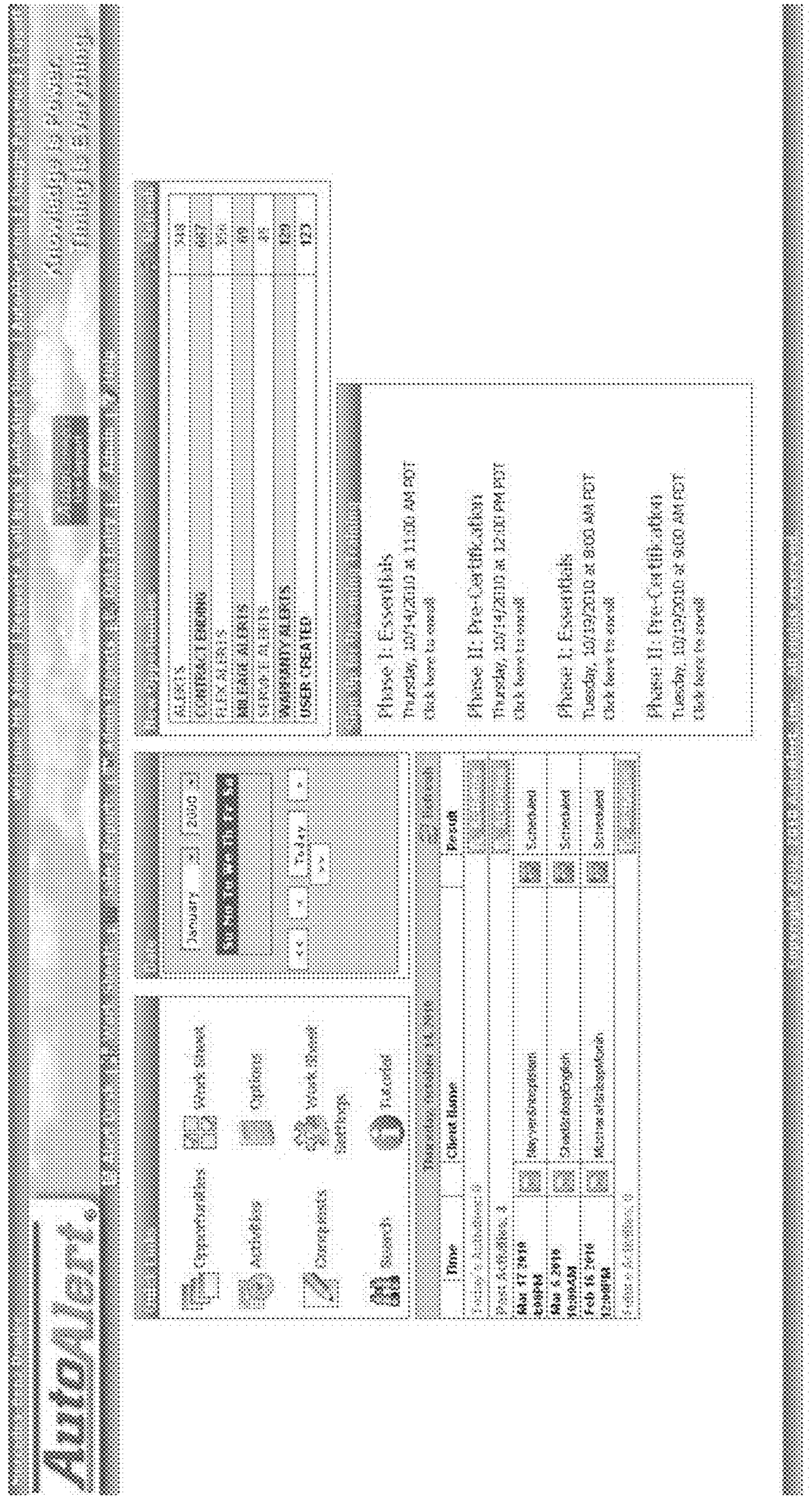
FIG. 41 is a screen shot that illustrates a home screen or launch screen of one embodiment of a financial terms alert generation system.
Figure 42:
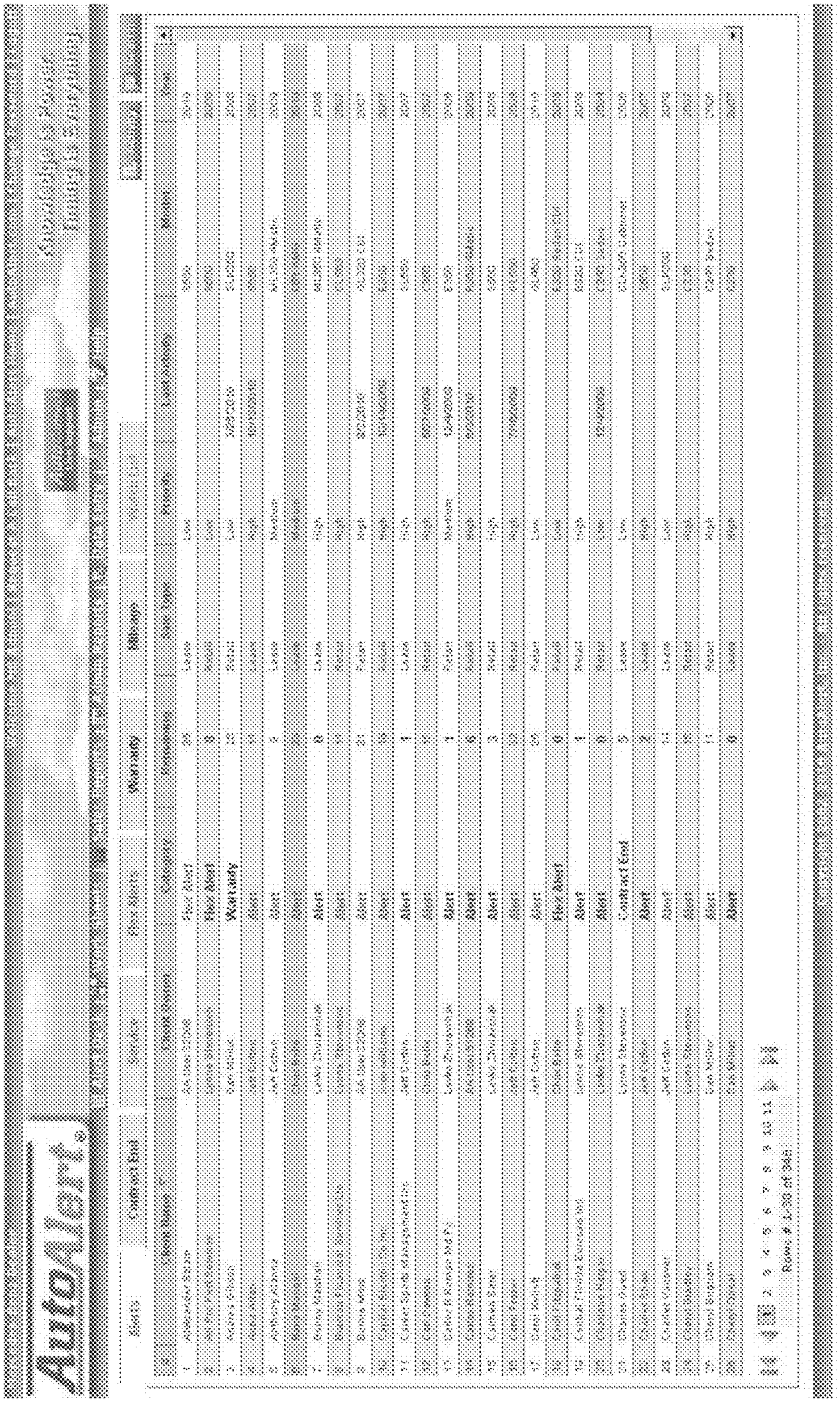
FIG. 42 is a screen shot that illustrates an ‘alerts’ tab showing different types of alerts or opportunities in one embodiment of a financial terms alert generation system.

FIG. 41 illustrates a home screen for a system embodying many aspects of what is disclosed herein. The home screen of FIG. 41 may be presented after a user logs in, such as via the screen illustrated in FIG. 2. On the right side of the home screen is a table of "New Opportunities". This presents a summary of the active "alerts." Of particular note are the "Mileage Alerts" and the "Warranty Alerts", which are discussed herein. The "Quick Links" provides access various parts of the illustrated embodiment. Of particular interest are the "Opportunities" and "Conquests™" functions. FIG. 42 illustrates an example of a screen similar to that of FIG. 67 (described above in more detail), which appears after selecting "Opportunities" on the screen in FIG. 41. This is a tabbed display: the initial screen shows "Alerts" and a user can select to see other types of opportunities by selecting other tabs. A user also could have gone directly to one of those tabs by clicking on the analogously named entry on the table in the homepage of FIG. 41. Alerts interfaces such as that illustrated in FIG. 42 are described above in more detail.

Figure 67:
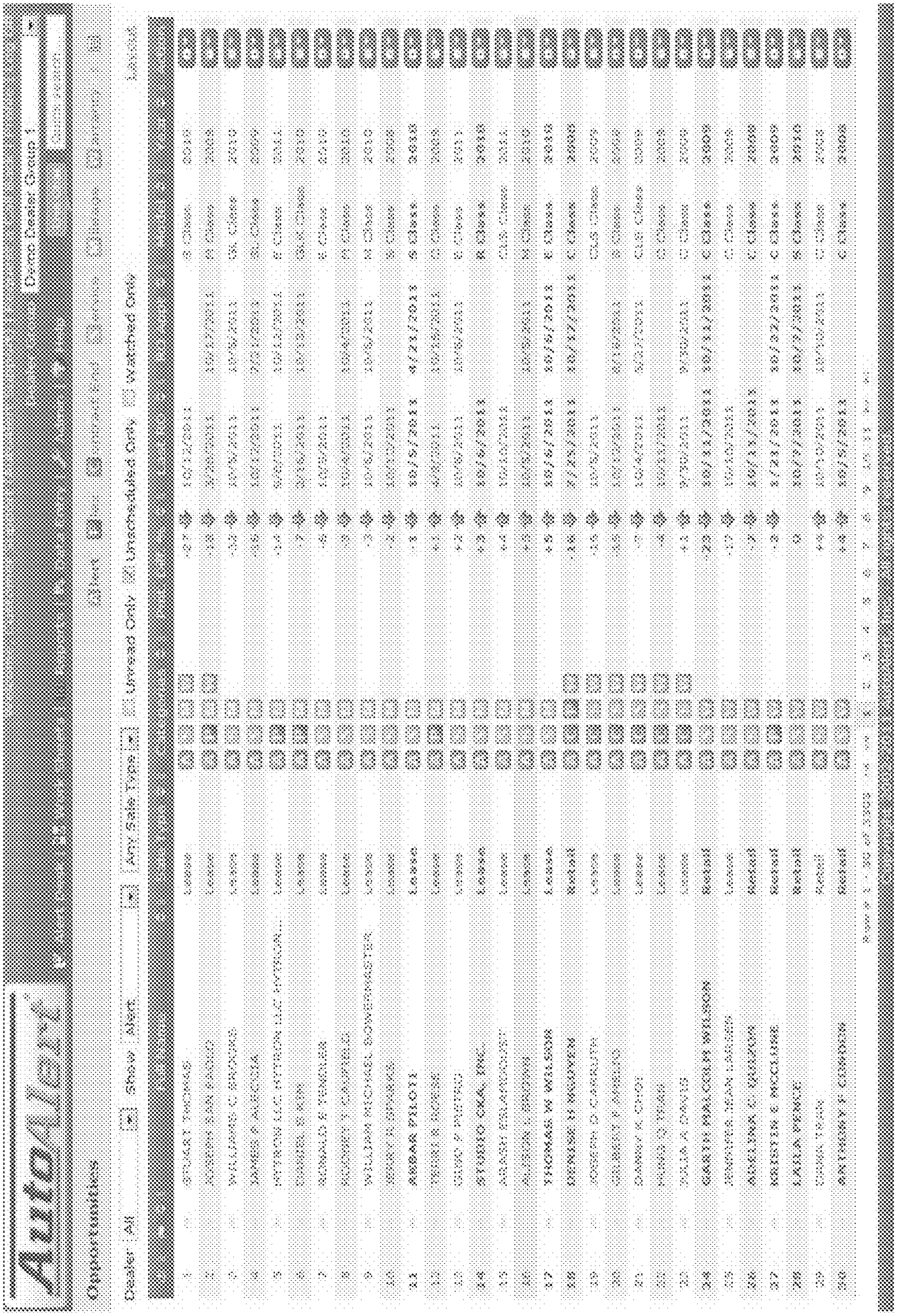
FIG. 67 illustrates an 'alerts' tab showing different types of alerts or opportunities in one embodiment of a financial terms alert generation system.
Figure 68:
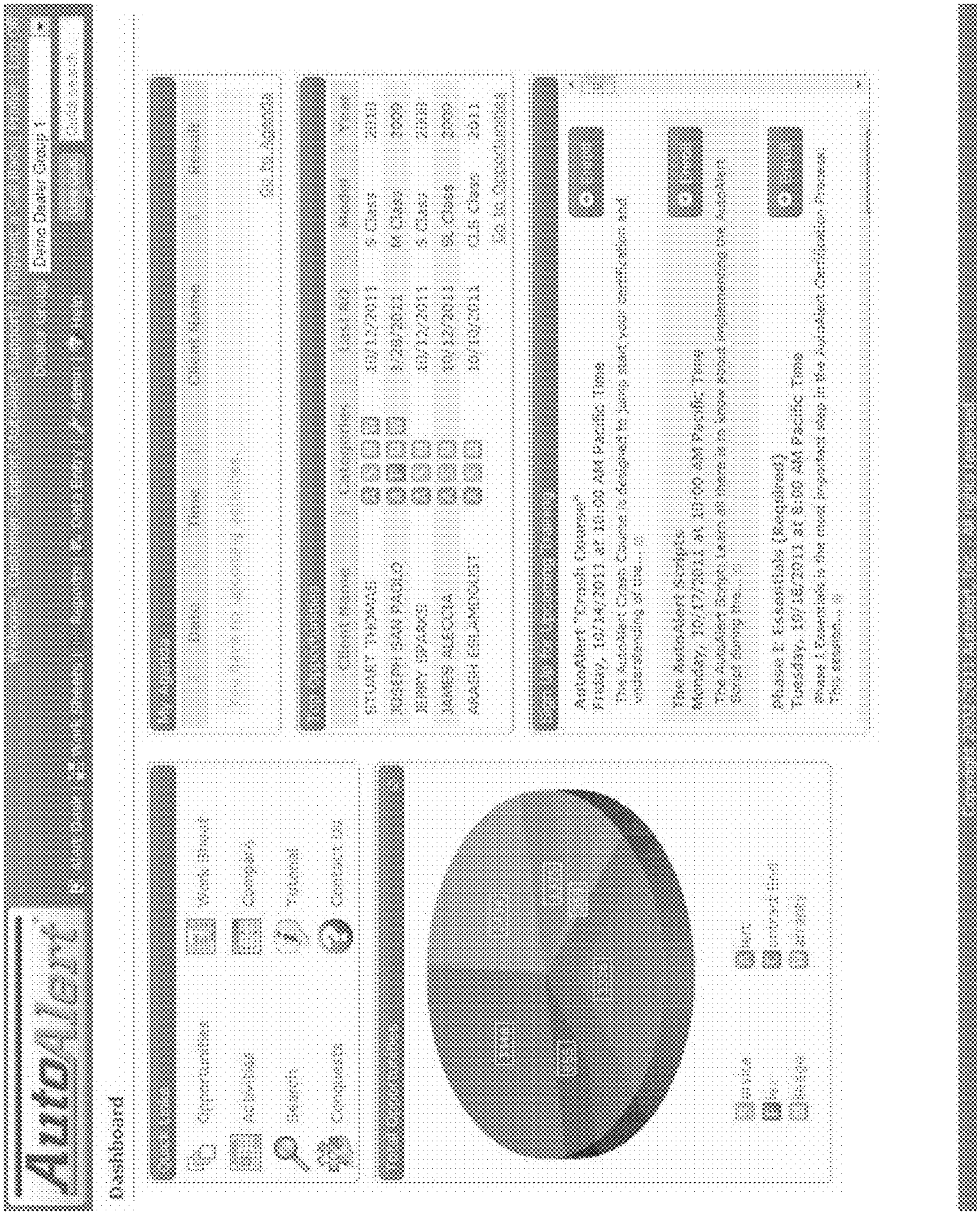
FIG. 68 illustrates a home interface showing different types of alerts or opportunities and a listing of top alerts or opportunities in one embodiment of a financial terms alert generation system.
Figure 69:
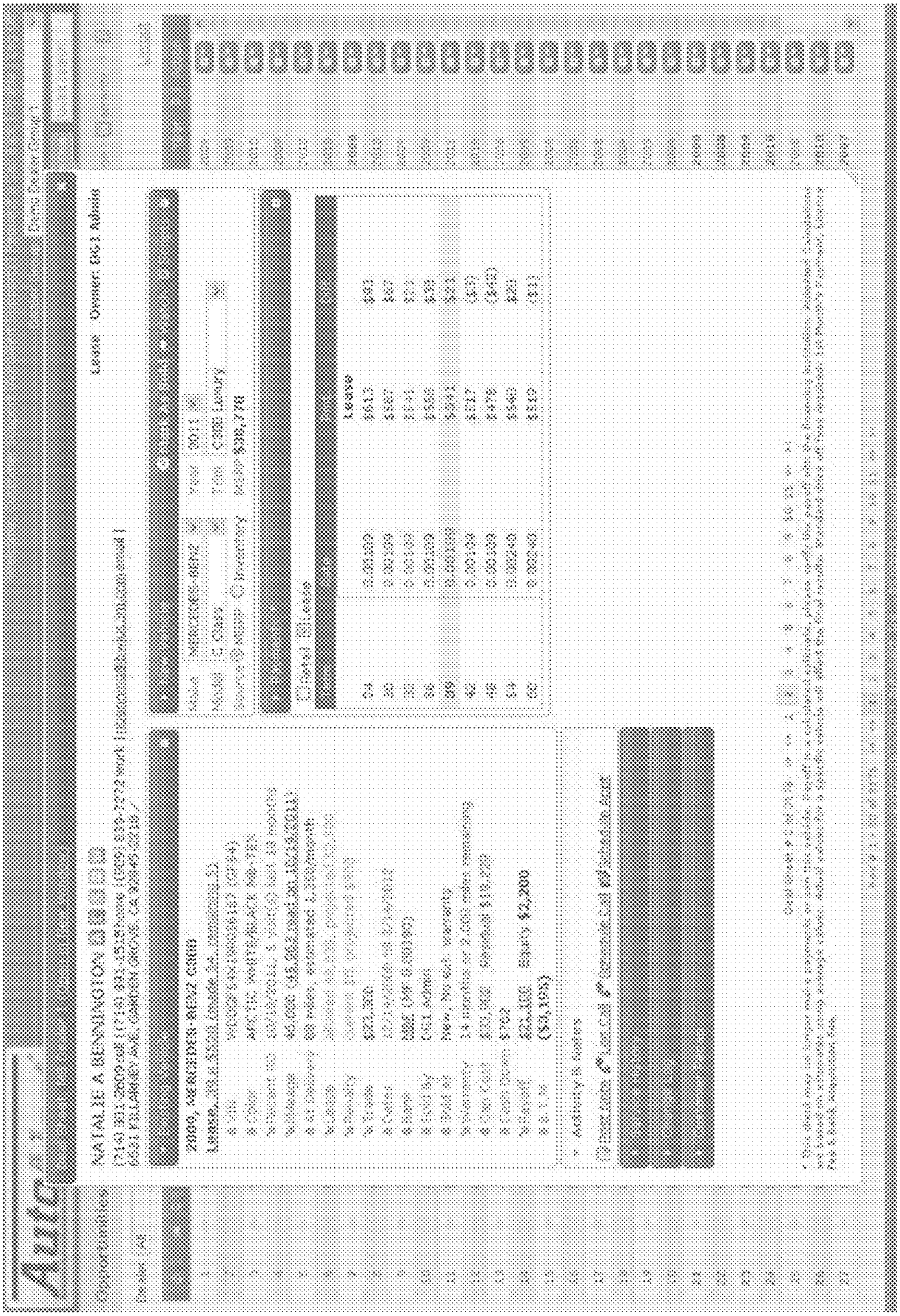
FIG. 69 shows an example of a deal sheet and deal sheet interface in one embodiment of a financial terms alert generation system.

As shown in FIG. 68, a home screen in accordance with various embodiments can include a pie chart as shown under the heading "Total Opportunities" in FIG. 68. The pie chart can provide a visual overview and breakdown of present alerts by category. For example, in FIG. 68, the pie chart indicates that there are 3336 alerts, 3348 contract end alerts, and 2434 mileage alerts. Selecting, for example by clicking on, one of the sections or labels of the pie chart can take the user to an alerts interface illustrated for example in FIG. 67, and the alerts interface can be configured, as discussed above, to show only those alerts falling at least into the selected category of alert. The numerical totals, as displayed on the pie chart of FIG. 68, for each alert category can be tallied by the alert generation process, described elsewhere herein, as that process identifies and processes alerts. As stated, it is important to keep in mind that, while the alert generation process described herein is described mainly in terms of general alerts (e.g., alerts based purely on availability of financially attractive replacement products), the process for calculating and generating alerts, including mileage, flex, service, contract end, and warranty alerts, can be accomplished in a similar manner to and perhaps at substantially the same time as the automated alert generation and notification discussed herein. Thus, during the general alert generation and notification process, customer mileages can be calculated and predicted, warranty and service information can be reviewed, and corresponding alerts can be generated. This process can take place on-demand, periodically, according to specified rules or monitored events, in the background, or as a foreground process.

A home screen as shown in FIG. 68 can also include an area to display a selection of the top alerts. Top alerts, for example, can include alerts that have been selected as having a high priority based on various criteria. In various embodiments, all available alerts can be ranked by the system according to various criteria and a selection of the top ranked alerts can be displayed. For example, a customer whose vehicle is scheduled for service, whose contract is nearing maturity, who is projected to exceed mileage allowance can be ranked higher, and for whom a more financially attractive deal on a replacement product has been found can be given a high priority and rank. In other embodiments, alerts falling in multiple categories can also be given higher priority. Thus a customer for whom mileage, contract end, and warranty alerts have been raised can be given higher priority than a customer for whom only a mileage alert has been raised. Alerts having similar category criteria can be ranked against each other using still additional criteria, such as difference between a customer's current payment and a potential payment under a new agreement. In various embodiments, alerts within a category are finally ranked according to difference in payment, reflecting that customers to whom a more attractive deal can be provided will often be more likely to upgrade. In this manner, customers who can save the most by entering a new contract can be given a higher priority.

Figure 12:
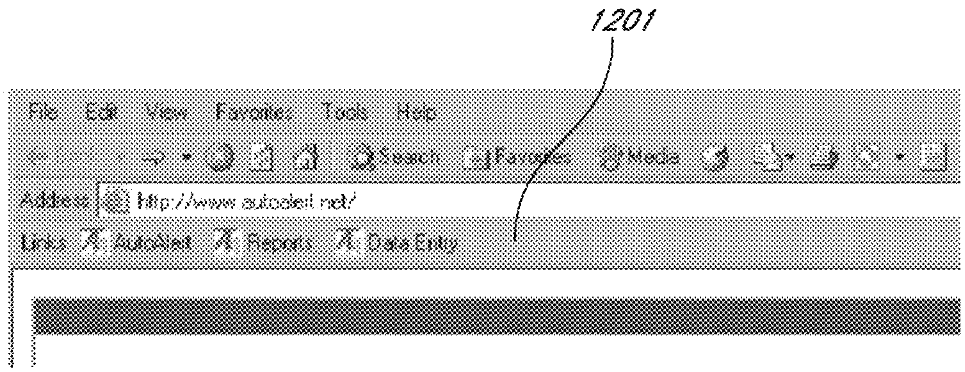
Figure 13:
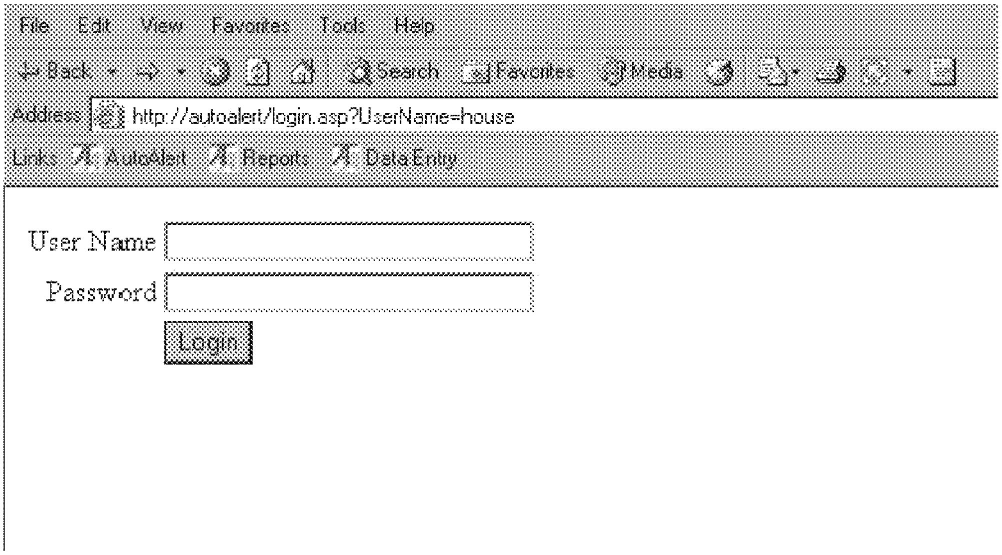
Figure 14:
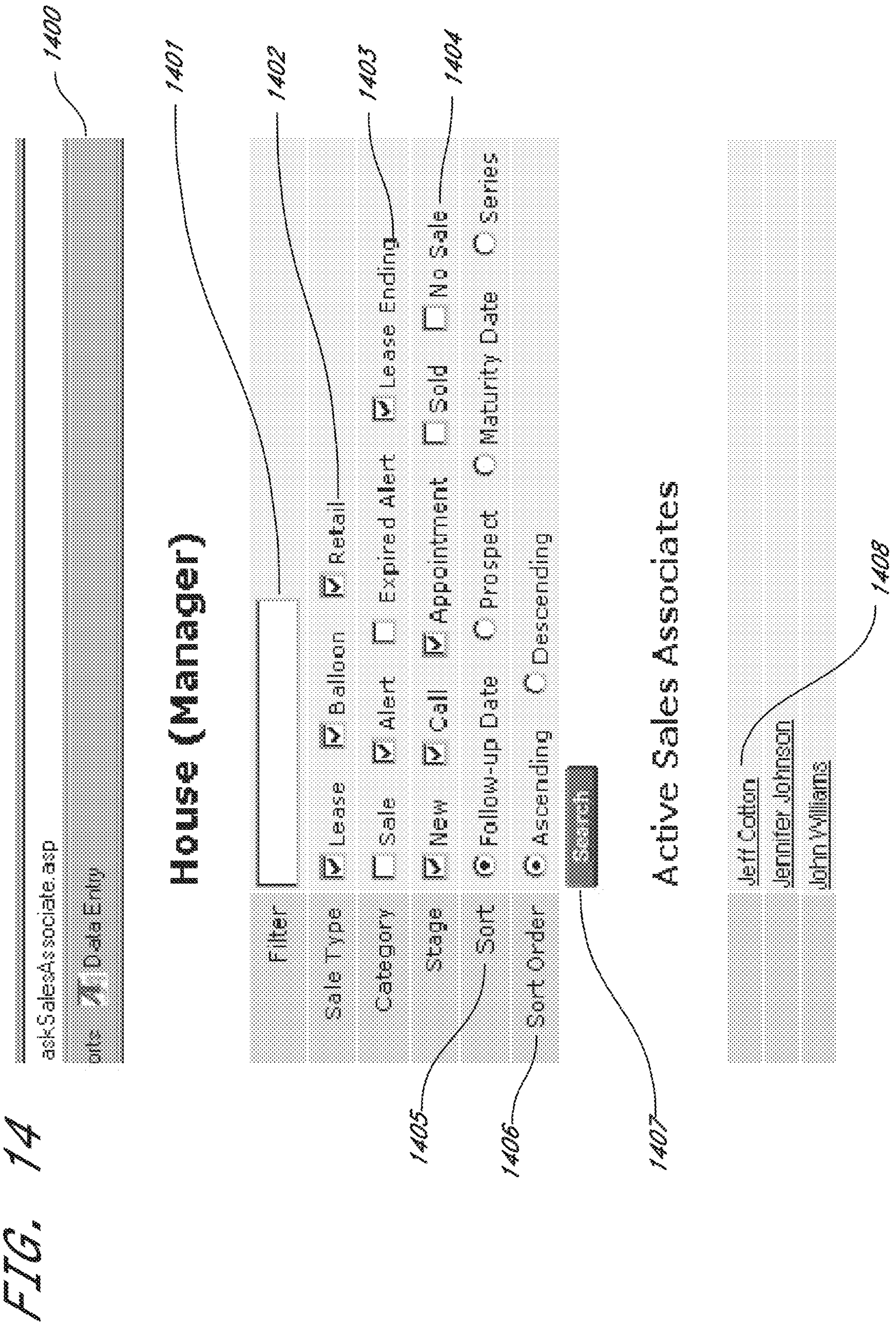

FIG. 12 illustrates an internet browser that has buttons 1201 advantageously used to access functions in various embodiments. FIG. 13 illustrates an initial log in screen in which a user enters a username and password into fields 1201 to gain authorized access to the system. When the user accesses the system, an initial view 1400 is advantageously displayed as illustrated in FIG. 14. The view 1400 advantageously displays the name of the person associated with the username and password. In the instance illustrated in FIG. 14, the person is a manager.

Figure 15A:
Figure 15B:
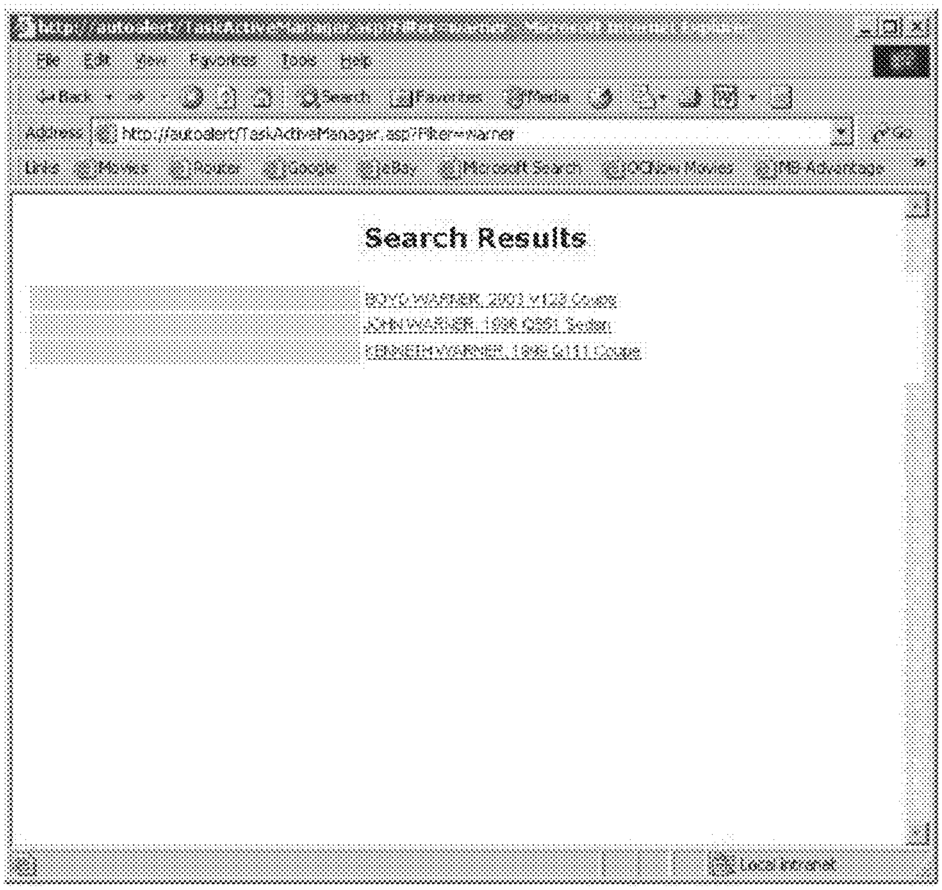

Using the view 1400, the manager may customize the data displayed in view by filtering data, sorting data, ordering data, ranking data, or any suitable combination thereof. Although particular parameters are illustrated in FIG. 14, any suitable parameter in the system may be used as a reference for customization. Entering one or more words into field 1401 may be used to limit the displayed data to those including those words. For example, if the user wanted to see only entries associated with a particular car name, model, make, or year, the user could enter some or all of those into field 1401. Similarly, to view entries associated with a client having a particular name, the user could enter the name into field 1401. Selecting one or more of checkboxes 1402 may be used to limit the displayed data to a particular combination of sale or transaction types associated with a client, such as a lease, a retail sale, a balloon, or the like. Selecting one or more of checkboxes 1403 may be used to limit the displayed contact management entries to a category of deal sheets associated with a client, such as a sale, an alert, an expired alert, a lease ending, or the like. Selecting one or more of checkboxes 1404 may be used to limit the displayed contact management entries to those at one or more particular stages in the contact management process, such as where the entry is new, where a telephone call has been made, where an appointment has been made, where a sale occurred, where no sale occurred, or any other stage suitable for managing contacts with persons. For example, the user can see all of the new deal sheets calculated, those that are scheduled to receive a call, appointments set, and so on. Selecting the sort radio buttons 1405 may be used to sort the data in a variety of ways such as follow up date, by prospect or client, by maturity date as in when the term of the purchase or lease will expire, and by series of vehicle. Selecting radio buttons 1406 may be used to view the data in ascending or descending order. After configuring the filtering, sorting, and ordering functions, the search button 1407 may be selected to see data associated with the selected the parameters. For example, FIG. 15A illustrates an example of search criteria, including a particular client name, and FIG. 15B illustrates the results of that search. In one embodiment, to view data associated with a particular salesperson, a hyperlink (e.g., hyperlink 1408) is selected. The hyperlink may advantageously display the name of the salesperson.

Figure 3:
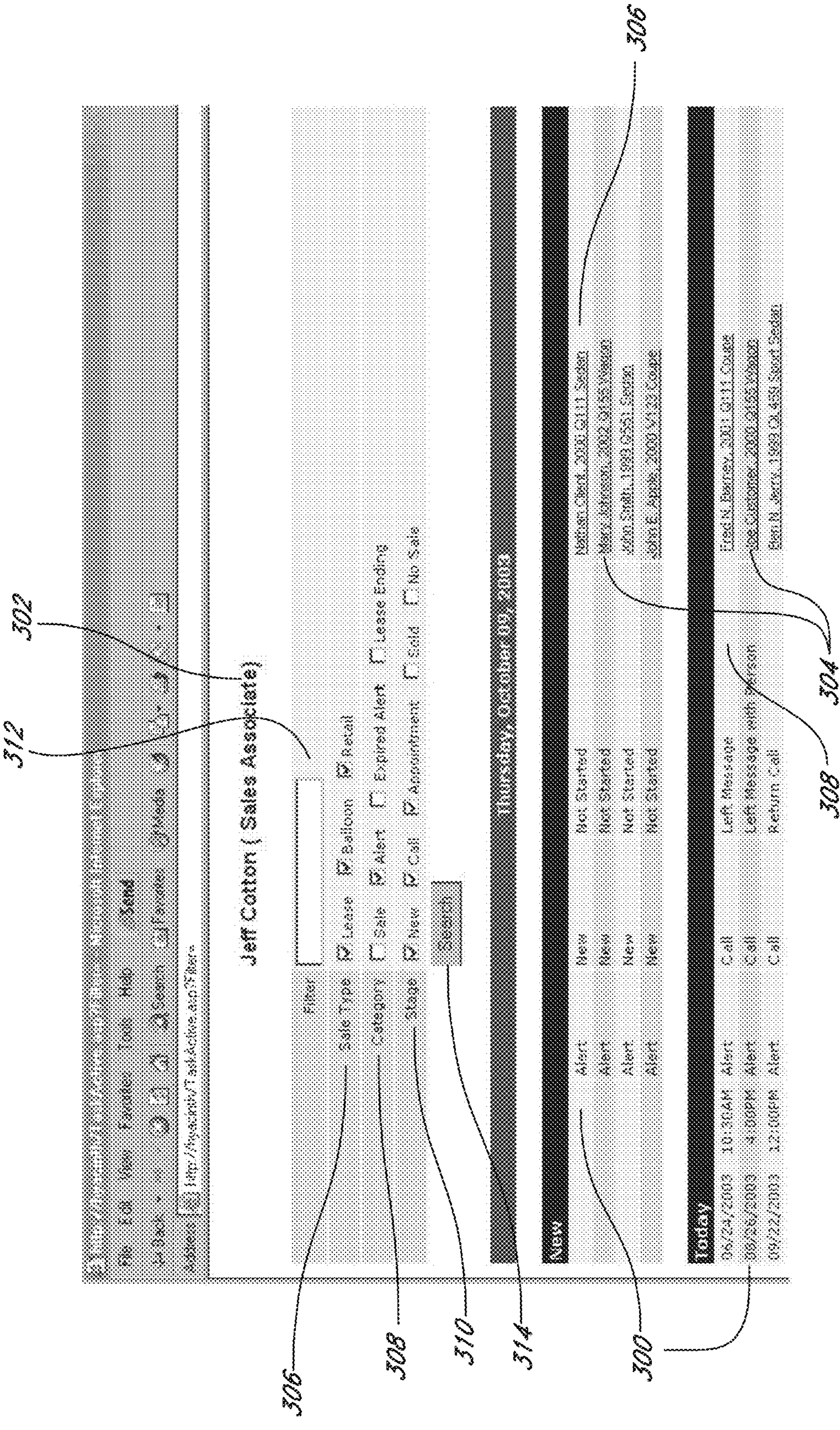

When the user accesses the system, an initial view screen is advantageously displayed as illustrated in FIG. 3. The screen advantageously displays the name 302 of the person associated with the username and password. In the instance illustrated in FIG. 3, the person is a salesperson. The system may advantageously associate the salesperson with clients. Any suitable association with clients may be used. For example, the clients may include but are not limited to persons to whom the salesperson may have sold an automobile, persons to whom the salesperson has been assigned by a supervisor, other persons, or any suitable combination thereof. Thus, by managing the salesperson-client associations, the system may advantageously be used to limit the client data that a salesperson may view to the associated clients.

FIG. 3 illustrates contact management entries 300, which advantageously may include client information, transaction information, or any other suitable information associated with clients. A client may have an entry associated with the client's current automobile transaction, as illustrated by hyperlinks 304 that display the client name and one or more associated automobile identifiers (e.g., make, model, year, or the like). In response to selecting one of the hyperlinks 304, a contact management view associated with the client is displayed, as described below. In one embodiment, contact management entries may advantageously be associated with a particular date. Contract management entries may advantageously be displayed and grouped according to one or more dates. In another embodiment, new contact management entries are displayed. The displayed entries may display any suitable parameter in the system, including but not limited to a stage in the contact management process, items associated with a particular date, tasks associated with a particular date, actions taken during the contact management process, or the like. In one embodiment, the contact management entries may be used to schedule and track tasks associated with contact management. The user may advantageously scroll down through this area and view tasks that have scheduled for future follow up. In one embodiment, a contact management entry is associated with a deal sheet. In one embodiment, when a new deal sheet is generated, an associated contact management entry is also created. The system may generate deal sheets or contact management entries at any suitable time. In one embodiment, the system generates a deal sheet and an associated contact management entry when the system receives an update of information used to calculate replacement agreements that are advantageously displayed in deal sheets. In one embodiment, deal sheets are generated periodically (e.g., weekly). In one embodiment, deal sheets are generated dynamically. In one embodiment, deal sheets are generated substantially continuously. In one embodiment, when a new deal sheet is calculated, the prior deal sheet is retained and accessible through the client's history accessible through a contact management entry or the like. In one embodiment, deal sheets are generated in response to a user request. In an embodiment wherein one or more deal sheet parameters are customizable (e.g., a rebate amount or the like), a person may alter the one or more parameters and review the number and types of deal sheets generated (e.g., how many alerts). Categories of deal sheets include, but are not limited to, an "alert," a "sale," an "expired alert," and a "lease ending."

As illustrated in FIG. 3, a user may choose to customize the display of the contact management entries by filtering entries, sorting entries, ordering entries, ranking entries, or any suitable combination thereof. Although particular parameters are illustrated in FIG. 3, any suitable parameter in the system may be used as a reference for customization. Selecting one or more of checkboxes 306 may be used to limit the displayed contact management entries to a particular combination of sale or transaction types associated with a client, such as a lease, a retail sale, a balloon, or the like. For example, a client may have an existing lease of an automobile or may have purchased an automobile and is currently making payments. Selecting one or more of checkboxes 308 may be used to limit the displayed contact management entries to a category of deal sheets associated with a client, such as a sale, an alert, an expired alert, a lease ending, or the like. In one embodiment, an alert comprises a deal sheet that fits into one or more parameters. For example, in one embodiment, an alert comprises a deal sheet in which a replacement agreement for an associated replacement product has an associated payment within 10% of a payment associated with the client's current agreement. Any suitable range may be used. For example, the range could be set from at any value from 1% to 200% or more than 200%. In one embodiment, a lease ending deal sheet comprises a deal sheet for a client whose current agreement is a lease and that lease will end within a specified time (e.g., near the end of the lease). In one embodiment, a lease ending deal sheet comprises a deal sheet for a client whose lease will end in 6 months, 180 days, or the like. Any suitable time prior to the end of the client's lease may be used to identify a lease ending deal sheet. Accordingly, the contact management entries may be queried for leases ending within a specific period. In one embodiment, the display of entries may be ordered to view contact management entries associated with lease ending deal sheets beginning with those furthest from maturity or beginning with the leases which will end soonest. In one embodiment, an "expired alert" deal sheet comprises a deal sheet that was previously within one or more parameters associated with an alert, but no longer is because one or more parameter values changed. The expired alert deal sheet advantageously provides a reference point as sales associates continue to communicate with their clients. In one embodiment, a "sale" deal sheet comprises a deal sheet that is a default category that is not an alert, a lease ending, or an expired alert. Selecting one or more of checkboxes 310 may be used to limit the displayed contact management entries to those at one or more particular stages in the contact management process, such as where the entry is new, where a telephone call has been made, where an appointment has been made, where a sale occurred, where no sale occurred, or any other stage suitable for managing contacts with persons. Entering one or more words into field 312 may be used to limit the displayed contact management entries to those including those words. For example, if the user wanted to see only entries associated with a particular model of car, the user could enter the particular model of car into field 312. Similarly, to view entries associated with a client having a particular name, the user could enter the name into field 312. In one embodiment, to view the customized display of contact management entries, button 314 is selected. In one embodiment, radio buttons or other suitable graphical user interface elements (not shown) associated with data fields in the system may be used to sort the contact management entries.

Viewing Alerts and Opportunities

FIG. 67 shows an example of an interface that allows a user to view and sort alerts and opportunities. A categories column can contain textual or graphical indications of the various categories in which an alert falls. Categories can include the following: "Alert, which can indicate a customer who can get into a new vehicle and continue paying about the same; "Flex," which can indicate a customer who is flexible to different contract terms (e.g., longer or shorter duration) and can get into a new vehicle and continue paying the same; "Contract End," which can indicate a customer whose contract (e.g., lease or financing contract) is nearing maturity; "Service," which can indicate a customer whose car is currently in or scheduled for service; "Mileage," which can indicate a customer who has exceeded or is about to exceed lease mileage allowance; and "Warranty," which can indicate a customer whose standard warranty is about to expire and who has not yet purchased an extended warranty. A user can sort the list of alerts based on any available criteria (e.g., the criteria listed in any column of FIG. 67). It is important to note that a single customer and associated product or agreement can fall under multiple alert categories.

Alerts can be ranked by the system according to various criteria and presented to the user. In some embodiments, alerts conforming to particular criteria that indicate a high priority can be ranked higher. For example, a customer whose vehicle is scheduled for service, whose contract is nearing maturity, and who is projected to exceed mileage allowance can be ranked higher. Alerts falling in multiple categories can also be given higher priority. Alerts having similar category criteria can be ranked against each other using still additional criteria, such as difference between a customer's current payment and a potential payment under a new agreement. Thus, customers who can save the most by entering a new contract can be given a higher priority.

Figure 72:
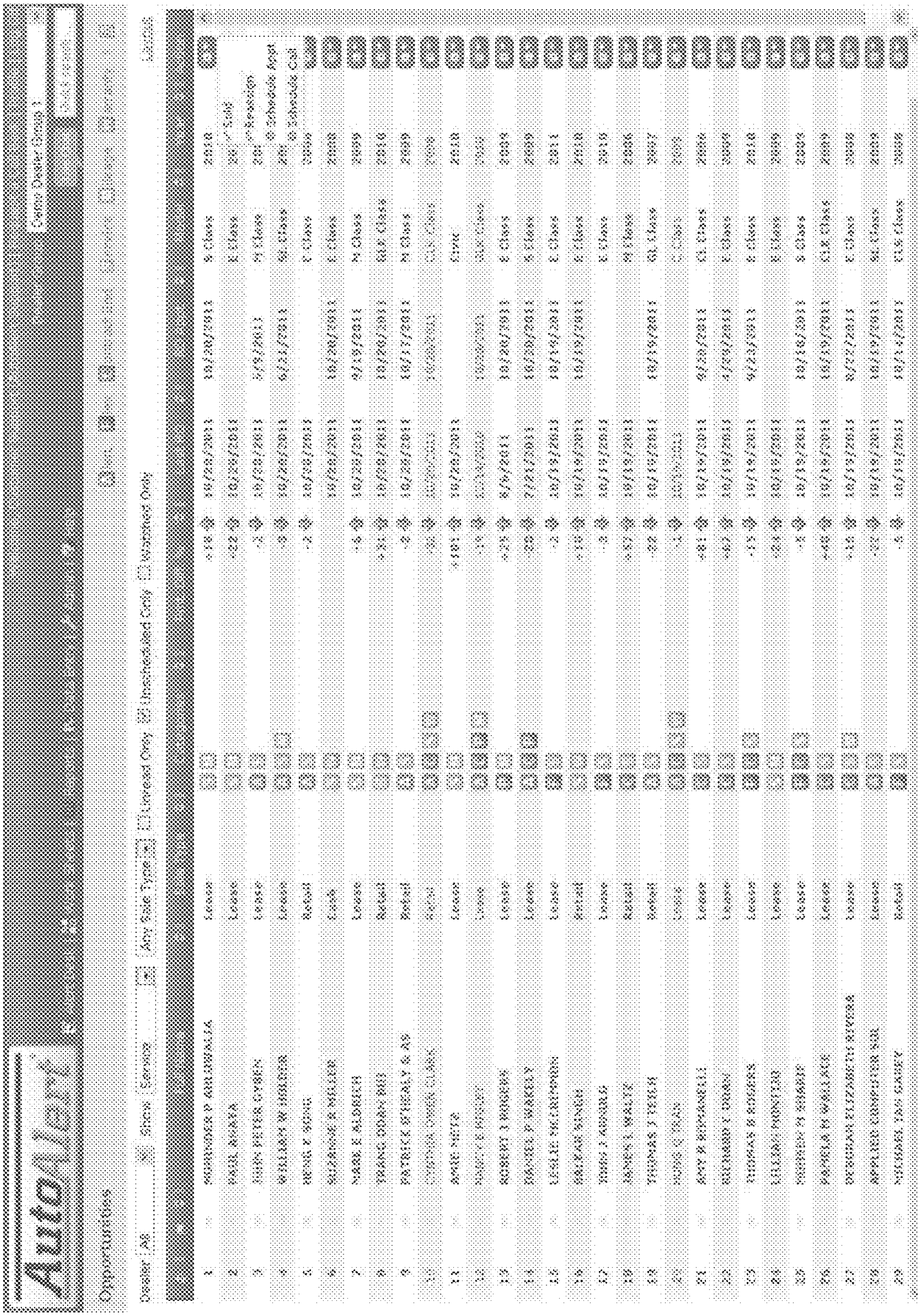
FIG. 72 illustrates an alerts interface in one embodiment of a financial terms alert generation system.

As shown in FIG. 67, alerts can be presented according to a ranking. Additionally, alerts can be by dealer, alert type, sale type, read status, scheduled status, or watched status. The watched function can allow the user to mark certain alerts for follow-up or later inspection. A user can indicate that an alert should be watched by selecting, for example, the flag icon in the table row corresponding to the alert. Icons corresponding to the different categories of alerts (e.g., alert, flex, contract end, service, mileage, and warranty) above the alerts table can be selected to display only alerts that fall into a certain category. For example, FIG. 72 shows an alert interface where the icon corresponding to service alerts has been selected. As shown in the table of FIG. 72, only alerts that correspond at least to the service category are shown.

Selecting an alert, for example by clicking the customer name in a column of the alert table shown in FIG. 67, can present the user with a deal sheet corresponding to the alert. For example, selecting an alert can bring the user to a deal sheet similar to that illustrated in FIG. 70 and discussed above.

Mileage Alerts

Figure 54:
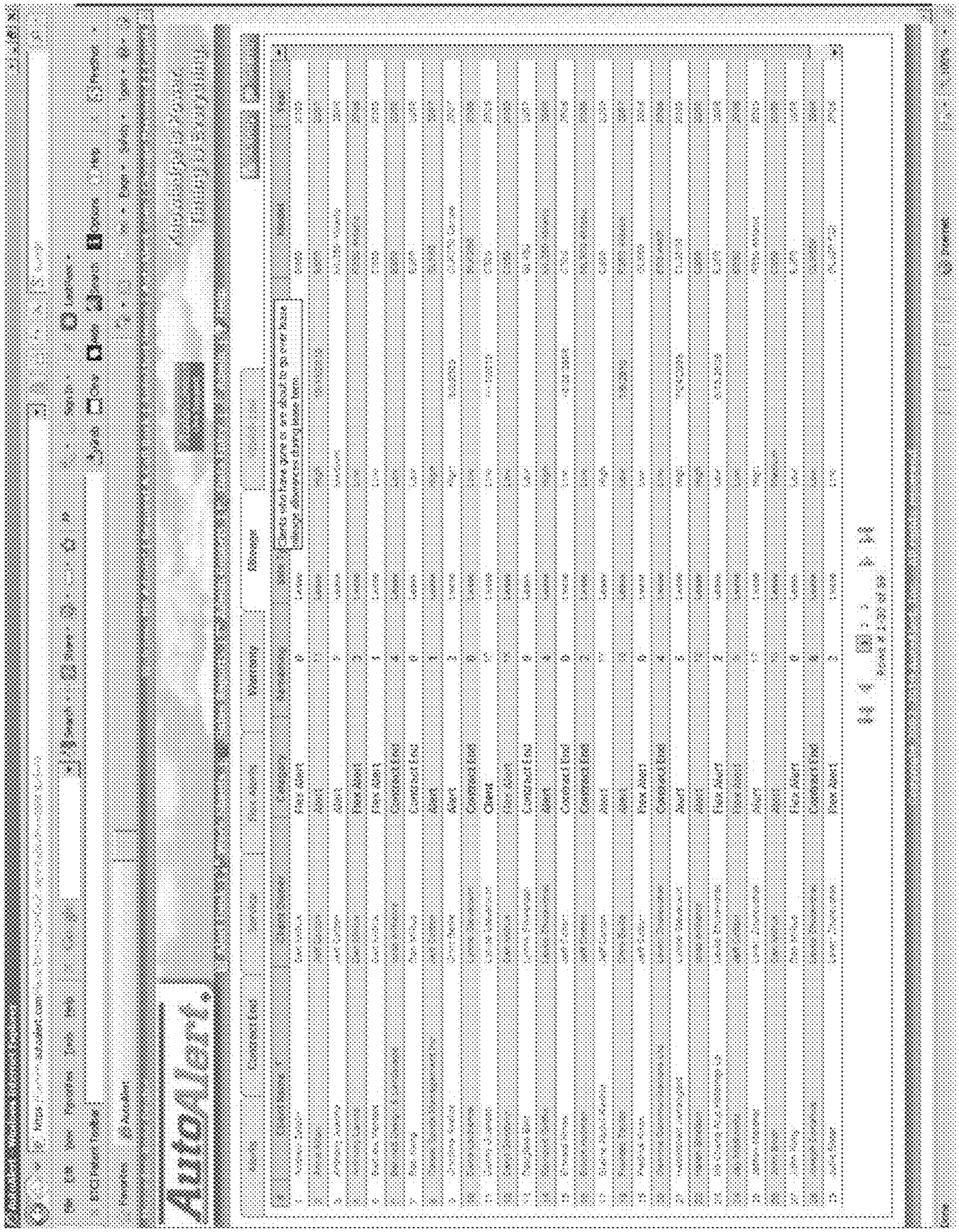
FIG. 54 is a screen shot that illustrates how one embodiment of a financial terms alert generation system displays a list of mileage alerts.

FIG. 54 illustrates how some embodiments may allow user to view use-based or mileage alerts. In this example, a "mileage" tab presents a list of customers who are exceeding or are about to exceed the allowed mileage of their current lease agreement. Traditionally, generating this type of list might require a dealer to pull existing contracts for her customers, identify the mileage allowed in each contract, and compare it to an actual mileage reading as reported by a service technician or as confirmed after contacting the customer. Then the dealer would run through a deal analysis. The entire process might take over an hour per customer, and a relatively low percentage of customers (approximately 10%) would actually be over their mileage or likely to exceed it. Using a system such as the one disclosed herein and illustrated in the examples, a dealer can receive real-time alerts or see instantly, when she logs onto an embodiment, that particular customers are prospects for new agreements because of their mileage. She can also, as disclosed herein, see deal sheets and scripts that will help close a new agreement.

Customers who have exceeded or are about to exceed the mileage limits under their lease agreements can be identified by extrapolating from their last verified mileages. For example, during the alert generation process, current and future mileage predictions can be established by determining a customer's average monthly mileage as of the customer's last verified mileage recordation. The determined mileage rate can be used to calculate an estimated mileage increase from the last verified mileage recordation. In this manner, a customer's current mileage can be predicted, as can the customer's predicted mileage for a future time such as a predetermined alert period. Thus, customers who have exceeded or are likely to exceed the mileage requirements under their leases can be identified in alerts for further action or review.

Mileage alerts can also be generated based on service milestones. For example, if a customer's vehicle should be brought in for service every 5,000 miles (perhaps as noted to the customer by the vehicle's on-board computer), the system can, using an extrapolation process similar to the one described above, identify customers who will soon be due for service. In this manner, customers who will likely be scheduling a service visit for the future can be preemptively contacted about financially attractive deals on replacement products. A customer can thus have some time to consider the attractiveness of a replacement product before bringing her vehicle in for service, at which time the customer can also view potential replacement products, discuss replacement products with sales representatives, and review the condition and value of her existing product. This can eliminate the need for a separate trip to the dealership, and perhaps allow the customer to consider the attractiveness of an upgrade before investing considerable time and money in a service visit.

It should be noted that the process for calculating and generating alerts, including mileage alerts, can be accomplished in a manner similar to the automated alert generation and notification discussed herein. Thus, during the general alert generation and notification process, customer mileages can be calculated and predicted, and corresponding alerts can be generated. This process can take place on-demand, periodically, according to specified rules or monitored events, in the background, or as a foreground process. Notably, as discussed elsewhere herein, the alert generation process can be executed separately from any alert presentation processes, such as those processes used to display and present alerts as shown in FIG. 67. A display process can then access previously stored or transmitted alerts for presentation on an alerts interface. As discussed above, mileage based alerts can be displayed along with other types of alerts, as illustrated for example in FIG. 67, and a single customer and associated product or agreement can fall under multiple alert categories.

Warranty Alerts

As mentioned above, warranties may include usage terms as well. If a warranty has usage terms but no calendar or date terms, then it is useful to provide a mechanism whereby the customer can be contacted or informed before that use term is exceeded. If a warranty has usage terms as well as calendar terms (e.g., 5 years or 50,000 miles), then it is potentially even more advantageous to contact a customer or otherwise be aware of the likelihood that the warranty's use term will be exceeded before the date term, because the customer or dealer may assume that the date term controls. It is also, of course, useful to alert when the date term may be exceeded even if usage is not approaching the limits of the use term.

Figure 47:
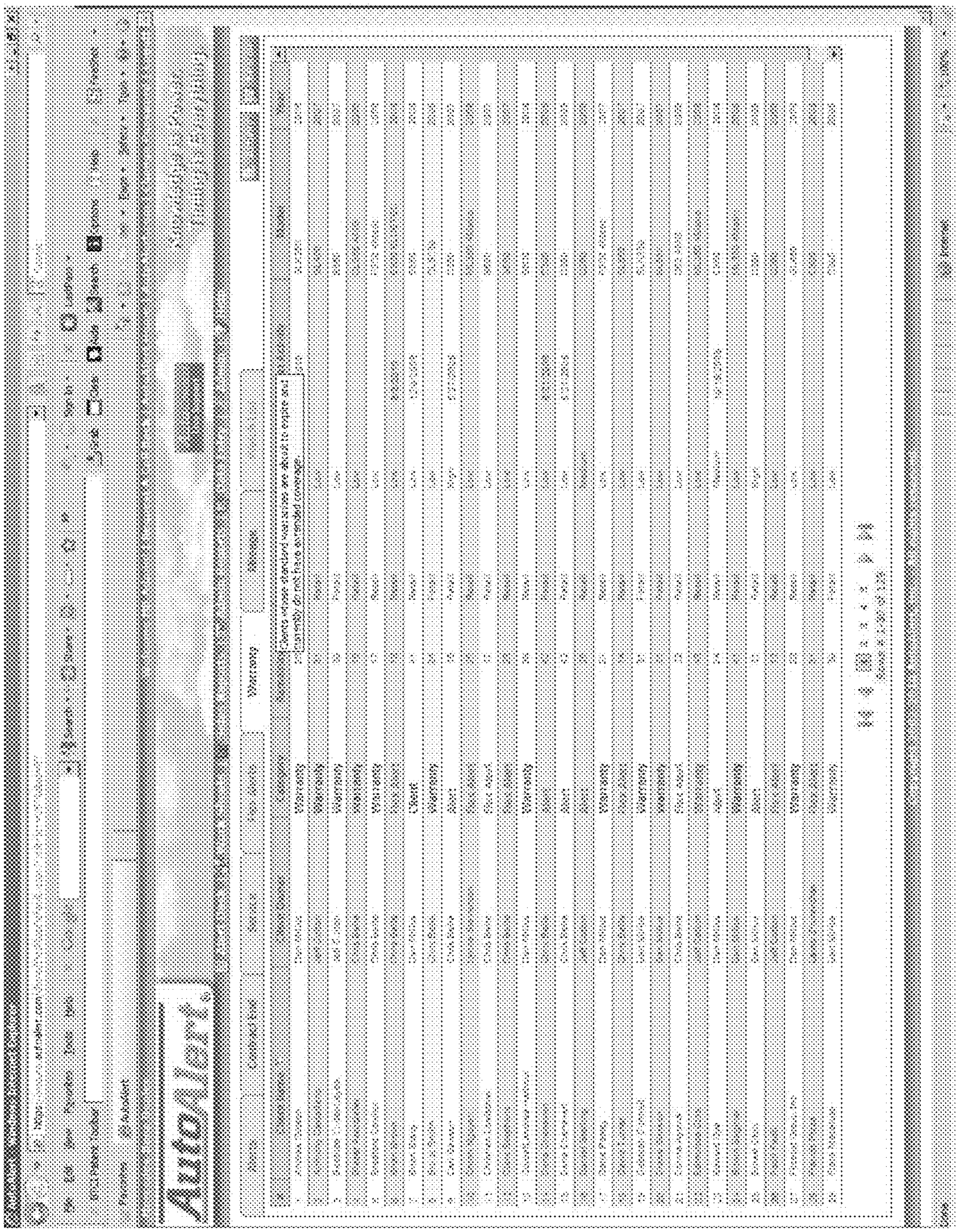
FIG. 47 is a screen shot that illustrates how one embodiment of a financial terms alert generation system displays a list of warranty alerts.

For example, FIG. 47 illustrates a screen such as one that might be part of the illustrative embodiments discussed herein. The screen is one of a tabbed screen by which a variety of opportunities are available: general Alerts, upcoming Contract Ends (agreements coming to a conclusion), Service Alerts (e.g., alerts indicating that a customer should be reminded to bring a product in for service according to a scheduled maintenance plan), Flex Alerts, Warranty Alerts, Mileage Alerts, and Watch Lists (alerts for specific customers or opportunities that a user has articulated a particular interest in).

Figure 48:
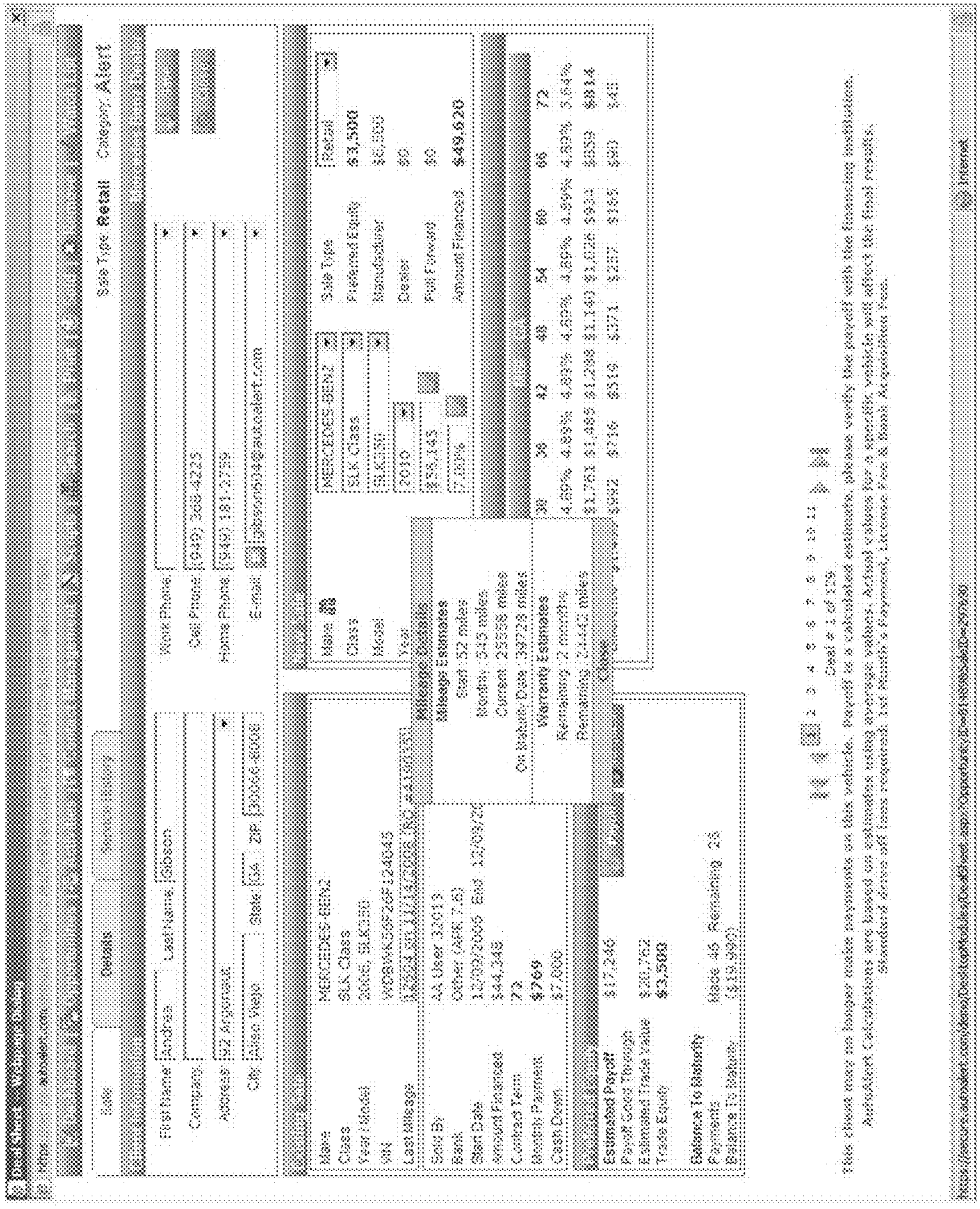
FIG. 48 is a screen shot that illustrates a display of mileage estimates as applied to warranty terms in one embodiment of a financial terms alert generation system.

Warranty Alerts, as illustrated in FIG. 47, by default show those customers whose warranties are about to expire and who have not purchased extended coverage-a secondary or supplemental warranty. The first warranty alert on the list is for customer Andre a Gibson. Selecting that alert bring up a screen such as that in FIG. 43, with deal sheet information and other details about the client. In some embodiments, selecting that alert might immediately bring up a screen with more detail about the specific alert listed, while in some embodiments, such as the one illustrated, an addition action by the user is needed. Here, selecting the "last mileage" field brings up a "mileage details" display as shown in FIG. 48. This mileage details display presents an example of the usage information that an embodiment might make available. For example, the 'start' mileage represents the usage of the product (in this case, the vehicle mileage) when the customer first obtained the product or when the relevant agreement began. If a warranty or lease is in effect for 10,000 miles of customer use, this value might represent the usage of the vehicle when it was provided to the customer.

If the term is applied to cumulative vehicle use, this value might be irrelevant—it could be absent, set to '0', or otherwise indicated as not relevant or ignored.

"Monthly" represents the extrapolated use rate of the product. In some embodiments, a different frequency, such as daily or annually, may be used. This value may also be directly reported instead of extrapolated. Examples of sources include customers who report their own typical (or actual) use rate and data sources which provide typical use rates for products and/or customers similar (e.g., demographically) to the customer in question.

"Current" represents the current usage of the product in question. This value may advantageously be annotated with a 'last verified' date, or a separate 'last verified' field could be included. The difference between 'current' and 'last verified' being that 'current' is an extrapolated value based on a typical use rate (such as 'monthly') applied to the 'last verified' mileage. Last verified, on the other hand, is an actual or trusted usage measure such as one reported by a customer, observed by a trusted source (such as a service technician), or reported by the product itself. An accurate use rate is preferably obtained from two or more verified usage measures. Any of a number of algorithms can be used to determine a use rate from two or more verified usage measures.

"On maturity date" is the expected usage level at a point in the future. This can be obtained by extrapolating from the use rate, such as monthly, and the current or last verified value to obtain the use measure expected when the warranty in question expires. In the context of leases or other agreements discussed above, the future date might be the date the current agreement expires, or the date on which a replacement agreement is effective (depending on the type of analysis performed and the data being presented to the customer or user). The future value may be based to a greater or lesser degree on verified data. If no verified data is used, one way this value may be obtained is to apply a generic or demographically appropriate use rate, as mentioned above, to an assumed initial value of 0 or other suitable chosen value. For example, if it is known that a car was brought in for an oil change on particular date and that an oil change is recommended or required at a particular mileage level, then that mileage may be used as a reference point for predicting the future value.

"Warranty Estimates" illustrate an example of how an embodiment may represent the terms of a warranty. In this example, there are two terms shown, a date based term and a use based term. The first is a date based term ("remaining" but also labeled as "months remaining", for example) which indicates that there are two months remaining in the warranty. As illustrated, this term is highlighted, because the amount of time remaining is below a threshold. In some embodiments, the threshold may be set as a percentage of the total (e.g., warn when the warranty is 90% consumed) or as an absolute value (as shown). The values of these terms may be set on a customer, user, dealer, application level, or other basis.

Figure 49:
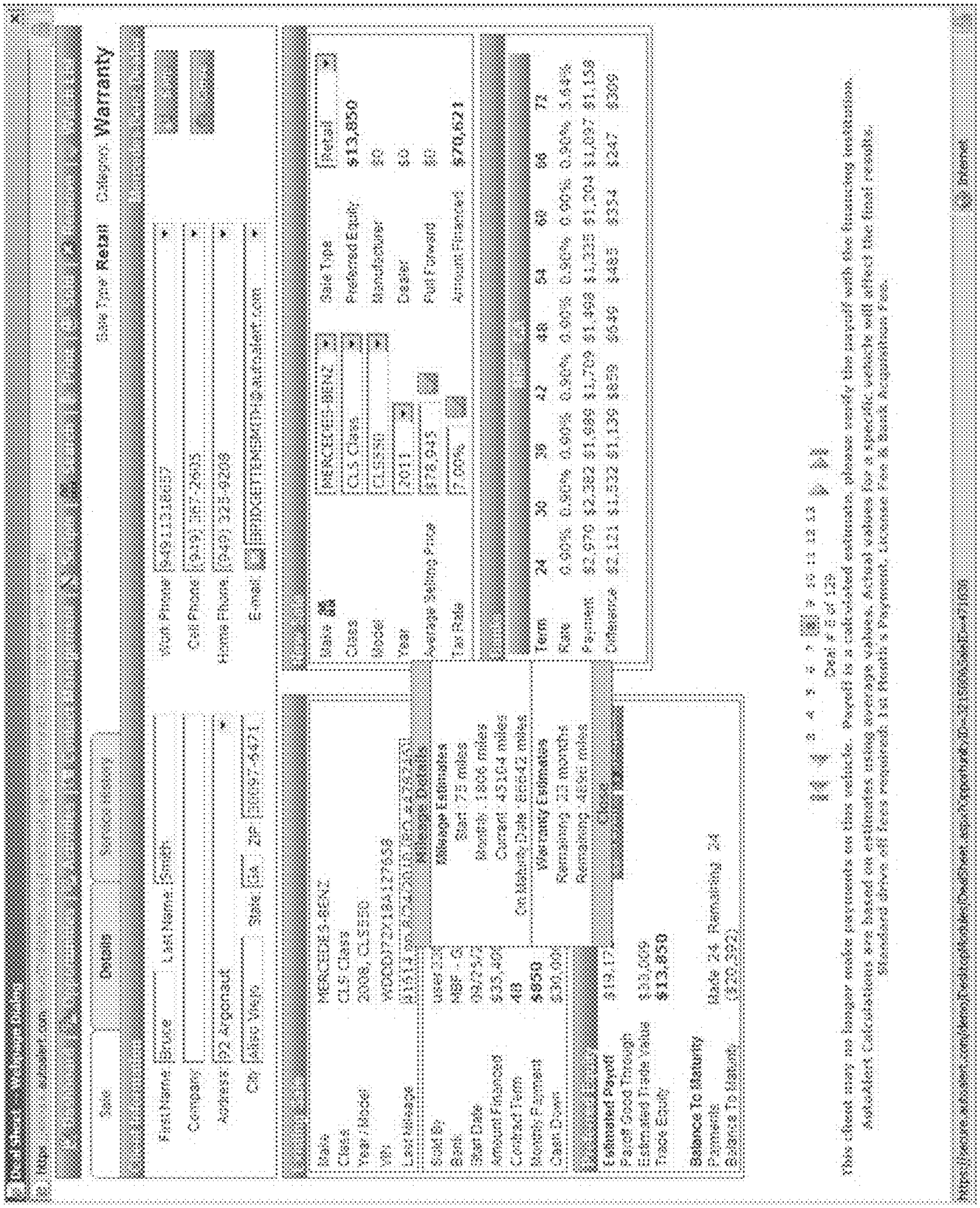
FIG. 49 is another screen shot that illustrates a display of mileage estimates as applied to warranty terms in one embodiment of a financial terms alert generation system.

The second remaining term shows the remaining usage, which is calculated based on the usage term of the warranty (obtained as described above) and the current usage (also obtained as described above). In this example in FIG. 48, the usage term is not highlighted, because it is not likely to be a reasonable basis on which the warranty will expire. FIG. 49 illustrates an example where the usage based term is the source of the warranty alert. The warranty has 23 months left to run, but is apparently for 50,000 miles: currently 45,104 of those miles have been used, and at a monthly use rate of 1,806 miles, the warranty miles will be consumed in less than 3 months. This is sufficiently soon to trigger an alert, per the settings in force.

Figure 52:
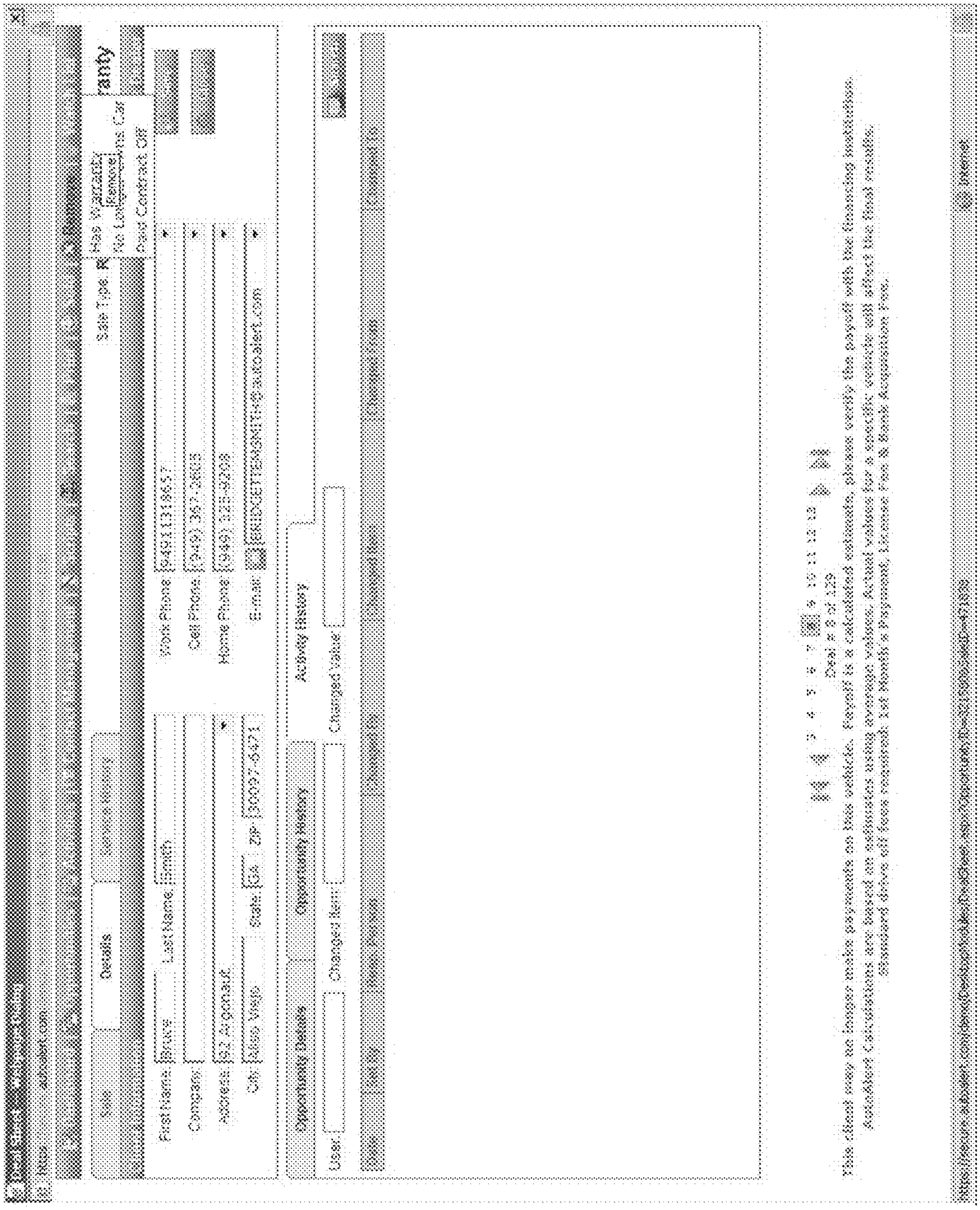
FIG. 52 is a screen shot that illustrates the ability to remove an alert in one embodiment of a financial terms alert generation system.

FIG. 52 illustrates an example of how opportunities may be closed out or removed. Customer Bruce Smith has two types of alerts or opportunities. One, previously discussed above and shown in FIG. 49, is based on his mileage rate implying that he will exceed the use term of his warranty relatively soon. The second, also visible in FIG. 49, indicates that the customer can replace his current agreement, which has 24 months to run, with a new agreement that will put him in a brand new car (a 2011 version of the car he currently has) for a monthly rate that might be attractive to him (as discussed above).

As shown in FIG. 52 one or both of these alerts can be removed. In the example embodiment illustrated, this may be done by indicating that he has a (new) warranty, that he has paid off his current contract (and thus has no current monthly payments), or that he no longer owns the car in question. Selecting any of these options will update the appropriate fields in the system and will modify the alerts accordingly.

Conquest™ and Service Opportunities

Figure 55:
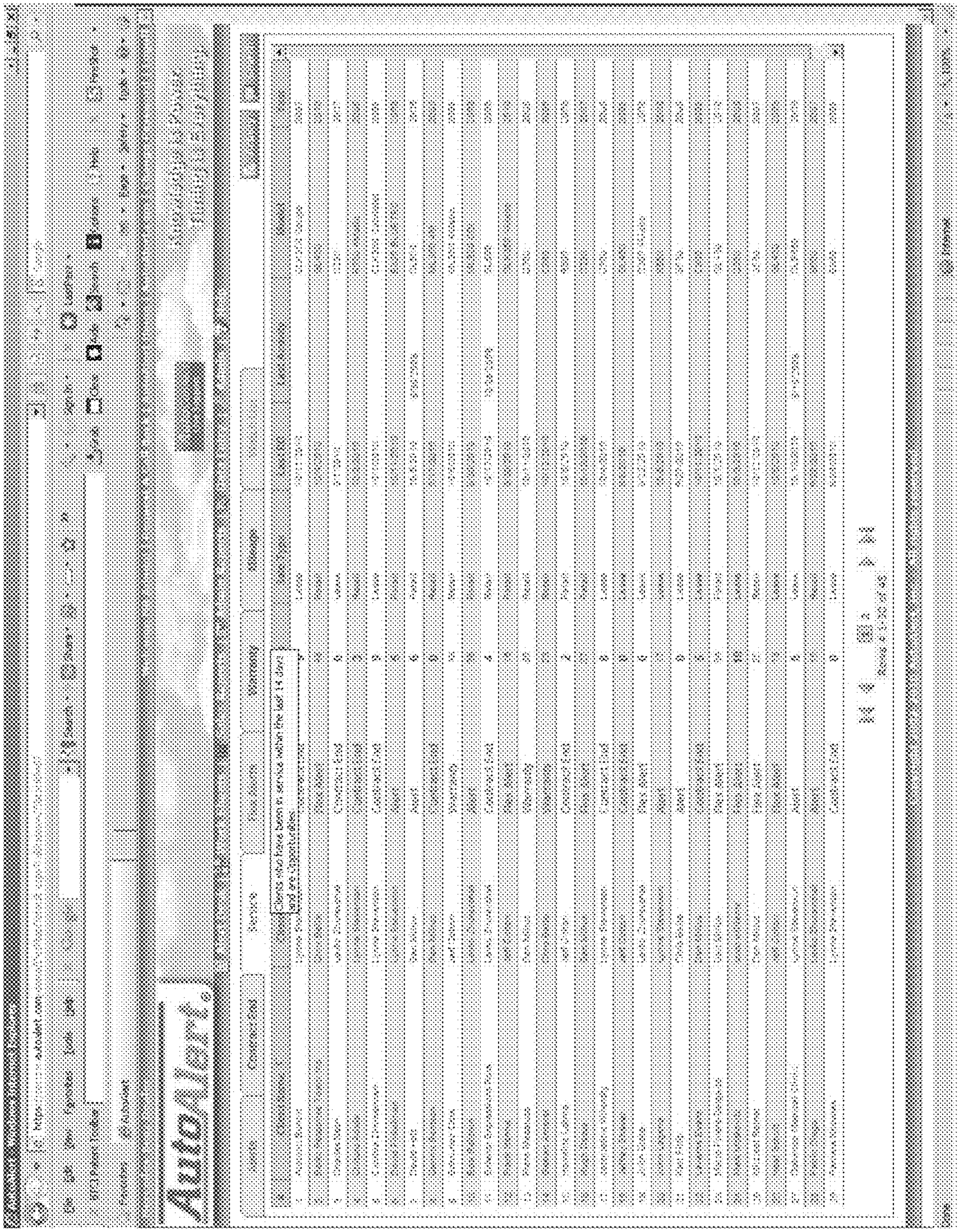
FIG. 55 is a screen shot that illustrates how one embodiment of a financial terms alert generation system displays a list of service alerts.

Dealers often have their own service departments or are affiliated with service providers. As mentioned above, service provision is an opportunity for new or updated information to be entered into the system and for current information to be confirmed or marked as obsolete or invalid. It also tends to bring the status of their product to the fore of a customer's thoughts, such that they might be likely to consider replacing or refinancing the product. Service Opportunities, illustrated in FIG. 55, are one way these opportunities can be presented by an embodiment.

The alerts presented are of a variety of types (e.g., warranties, contract ending, refinance alerts, etc). What they have in common is they all apply to customers who have recently brought their product in for services, currently have their product in for service, or who are about to bring a product in for service. In the illustrated example, 'recently' is defined as the last 14 days, but in some embodiments this value is different or is configurable.

Another use of service alerts, also mentioned elsewhere, is to remind customers to bring their product in for servicing. These reminders may be based on the passage of time or on usage (including usage indicated by a virtual usage meter mechanism such as that disclosed herein) and may be based on user defined levels, defaults (e.g., every year or 30,000 miles), or recommended values as obtained from a data source such as those mentioned elsewhere in this disclosure (e.g., a manufacturer).

A service script such as that in FIG. 56 may be generated by certain embodiments. The illustrated script mentions that the customer was recently in the service department and then segues into the relevant reason for the alert (e.g., a warranty is expiring; a new agreement opportunity is available; etc). The ability to reference the recent service history as well as the new opportunity in the same script is a valuable tool. If the detail is available in the system, the script could even include more detail about the service visit, or any other aspect of the customer's profile. A script tailored for upcoming service might include a reference to recently completed refinancing or may mention that 'when you bring your car in for service, you may want to leverage the value of your well maintained vehicle by . . . " or similar language.

These scripts, and the others mentioned herein, need not be in English and are, preferably, available in the language of the customer or the user.

Service is also an example of an opportunity for a "Conquest™" or new customer acquisition. In some instances, a service customer may well be an existing customer—one who obtained their product from the dealer who provides the service (or is associated with the service provider). However, in other instances a service customer may have obtained their product elsewhere and is therefore not in the standard records of the dealership. During service, the service provider will typically have access to identifying information about a product and customer. This may be a vehicle's VIN, or a license plate number, or a product serial number. The service provider may also have direct access to product, agreement, customer, and warranty information as discussed herein (for example, because the customer provides it during the course of arranging for or obtaining service or because it is available upon inspection by the service provider). Sometimes, a service provider may be able to obtain much of the relevant information from its own DMS or from external systems (such as those of affiliates, the manufacturer, or other such sources including those mentioned elsewhere in this disclosure).

In short, providing service is an opportunity to generate enough information for a basic follow-up contact, and is also an opportunity to populate some embodiments with enough information to generate alerts and opportunities of the type discussed herein.

Figure 57:
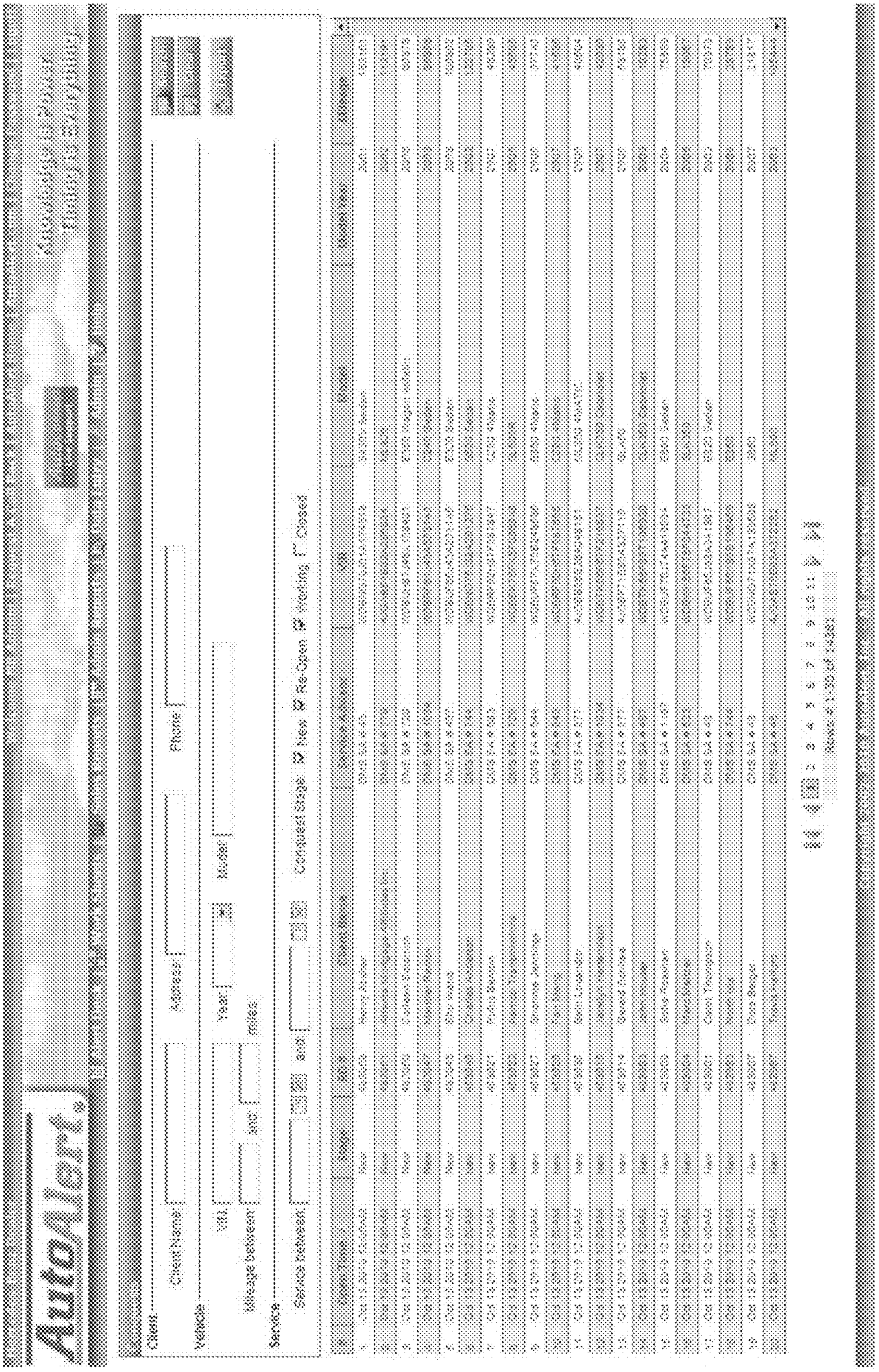
FIG. 57 is a screen shot illustrating one way one embodiment of a financial terms alert generation system displays Conquest™ or conversion opportunities and allows for such opportunities to be entered, searched, and exported, for example.

FIG. 41, which illustrates a launch or home screen for an embodiment of a system according to this disclosure, includes a shortcut to a 'Conquests™ ' page. Selecting this may bring up a screen such as that in FIG. 57, which displays a list of individuals who have recently been in for service but who are not otherwise customers of the dealer. The information displayed includes the prospect's name, their VIN, model and model year information, and the mileage as recorded during the servicing. Additional information may be available or displayed in some embodiments, and less information may be displayed or available in some embodiments.

Figure 58:
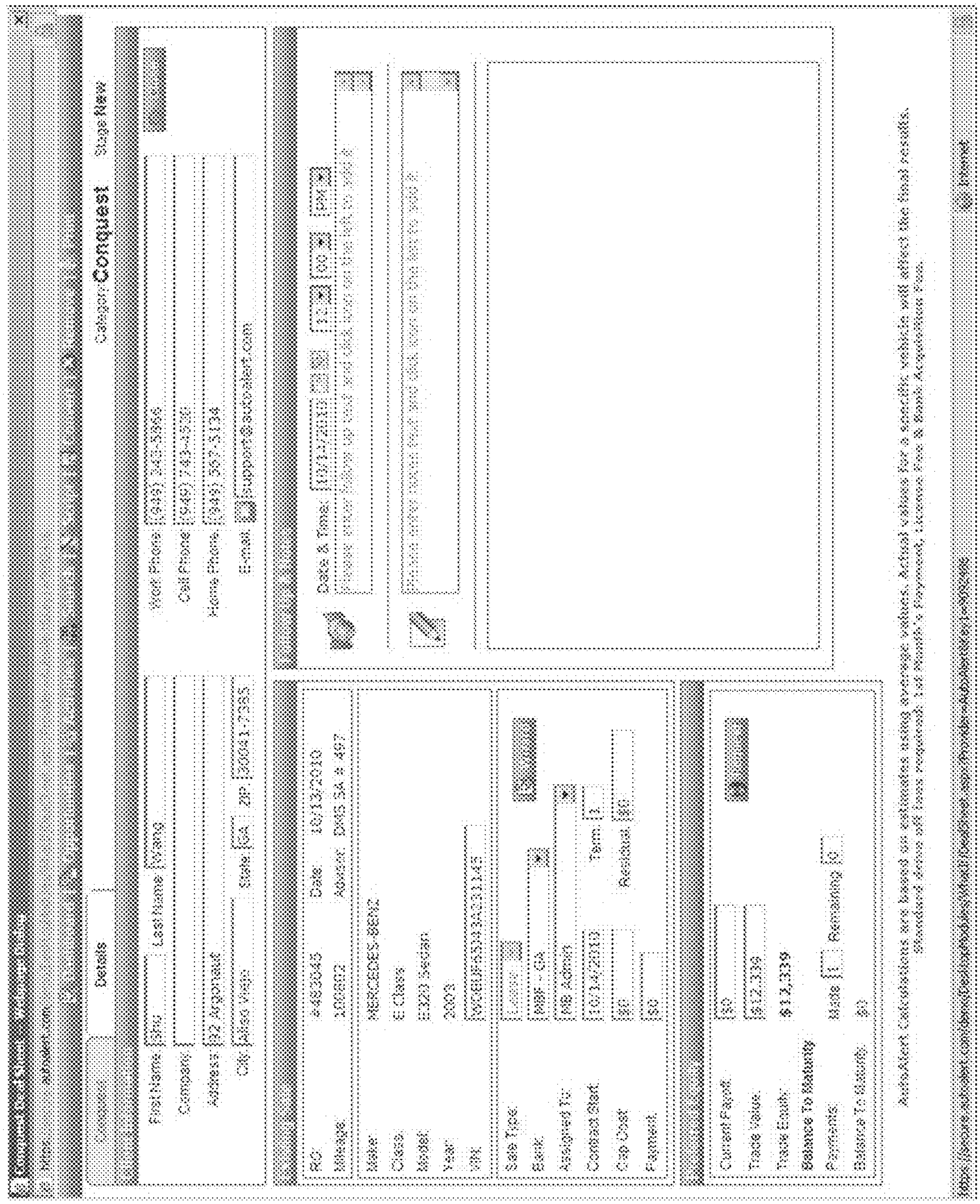
FIG. 58 is a screen shot illustrating one way one embodiment of a financial terms alert generation system displays details about a Conquest™ or conversion opportunity and allows for details to be edited.

Selecting a Conquest™ prospect such as the entry for Shu Wang brings up the screen such as that in FIG. 58. As shown, in some embodiments this may resemble the display used when viewing other alerts. Indeed, in some embodiments a Conquest™ prospect may be treated like another alert or opportunity and the display of Conquest™ prospects may be integrated in with the warranty, service, mileage, and other opportunities.

FIG. 58 shows more of the detailed information that was obtained during the serving or from other sources based on the information obtained during servicing. For example, current lease information was obtained, possibly from a financer, a dealer network, or a manufacturer. The trade value field is also populated, perhaps based on a widely accepted value for the make and model in question, perhaps based on a dealer's particular valuation for that make and model, and perhaps reflecting an assessment of the particular car and its condition and mileage.

Figure 59:
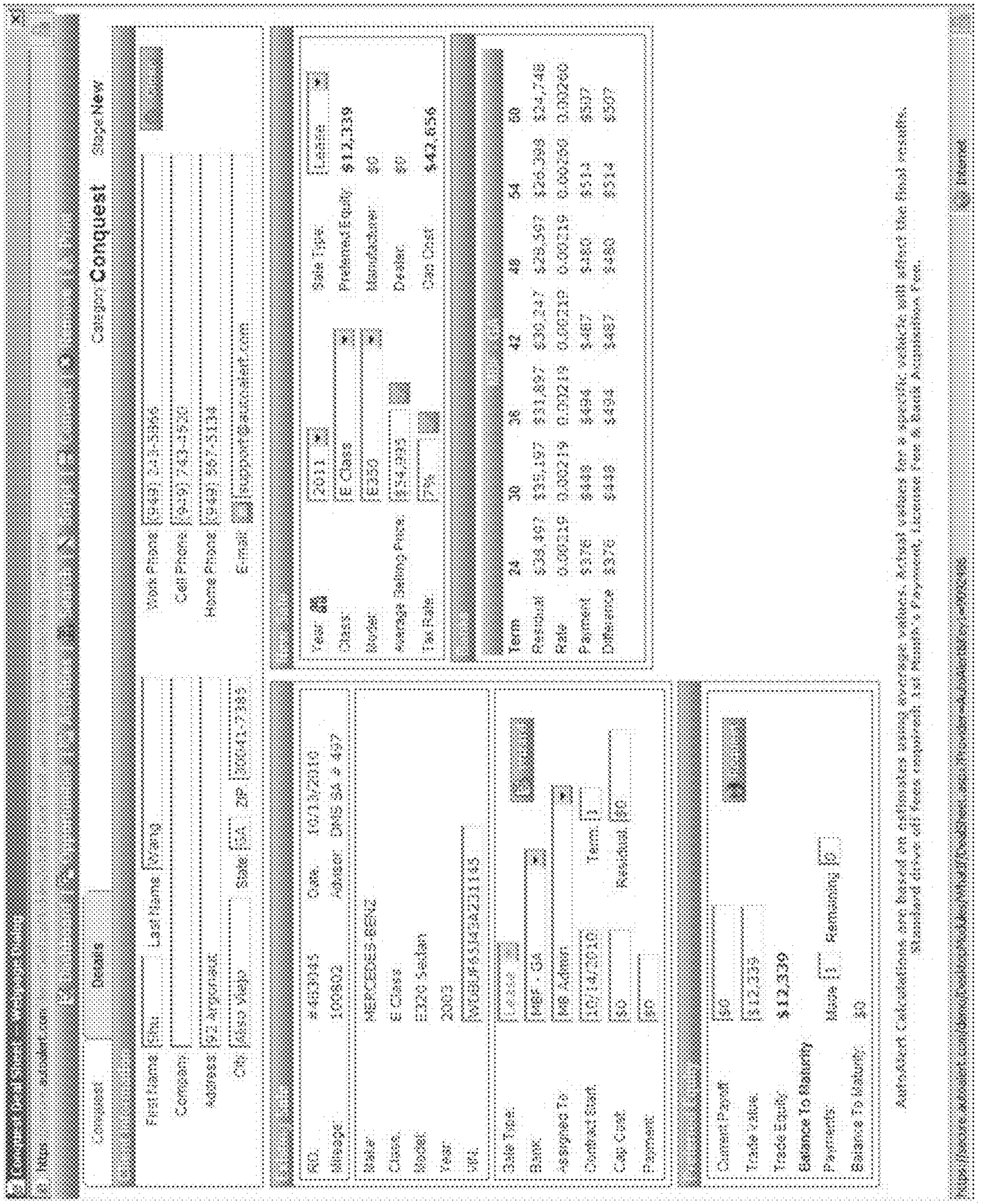
FIG. 59 is a screen shot illustrating one way one embodiment of a financial terms alert generation system displays comparison details about a Conquest™ or conversion opportunity and allows for details to be edited or comparisons to be run.

FIG. 59 shows that deal sheets can be generated based on this information, including as described herein. Because in this particular example there is limited information about the prospect's payment plans, there is a limited ability for the system to recommend a particular deal. However, given sufficient information, recommendations and opportunities can be identified as disclosed herein.

Figure 60:
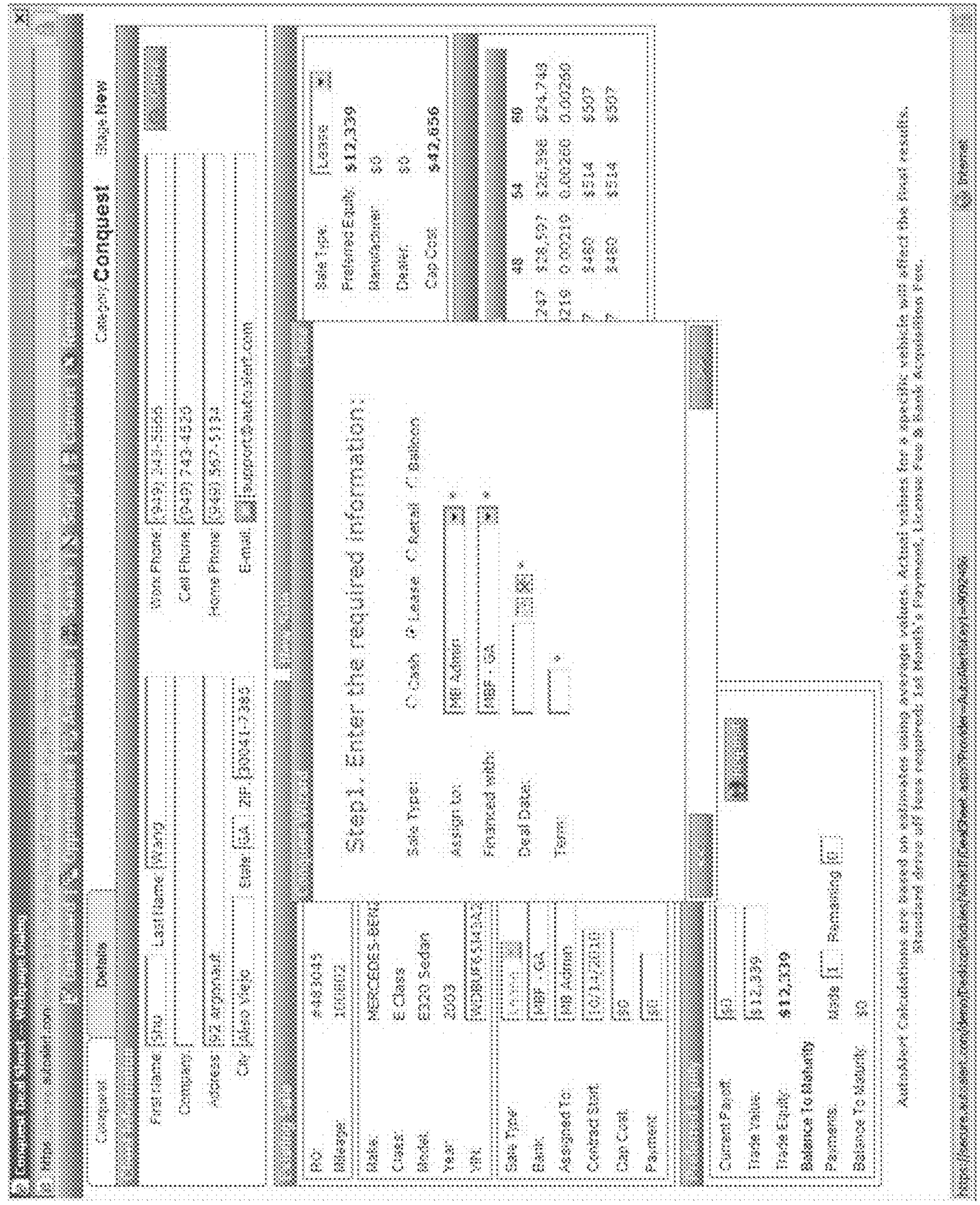
FIGS. 60-62 are screen shots illustrating an example of a wizard used by an embodiment to enter information about a conversion prospect or a customer.
Figure 61:
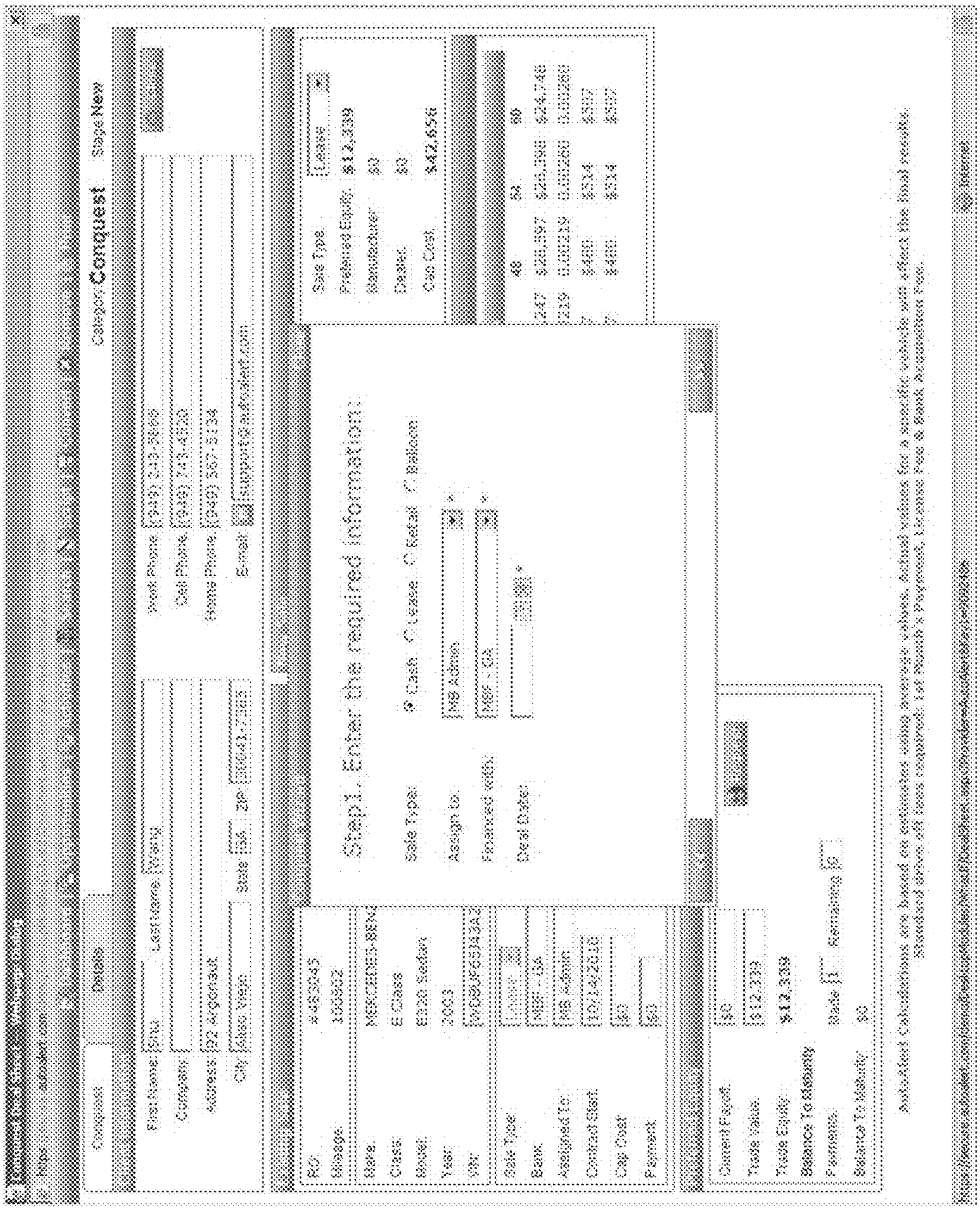
Figure 62:
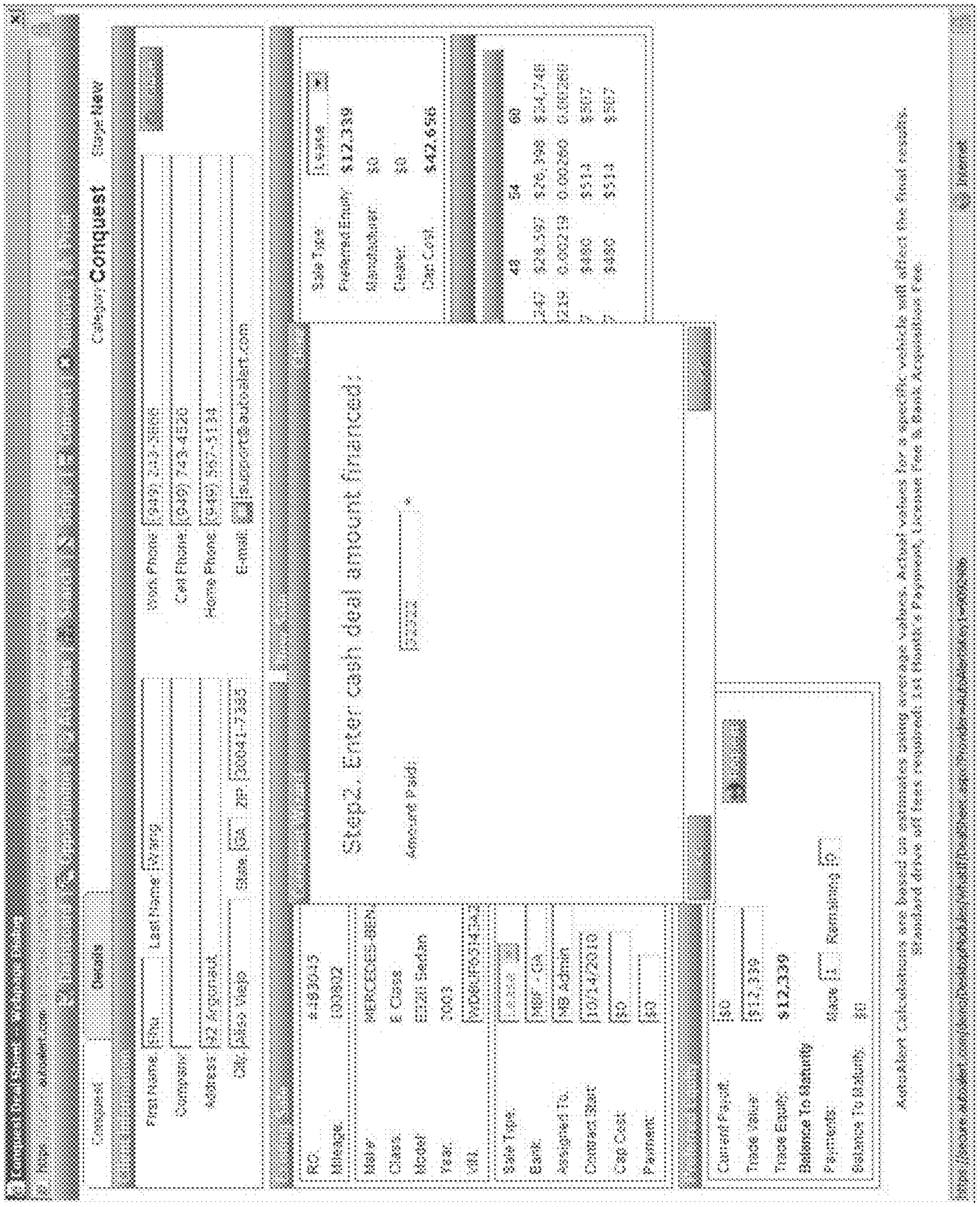

FIGS. 60 and 61 shows one way of entering information about the prospect's current agreement, such as may be obtained by contacting the prospect, a financial organization, or any other source of the information. As discussed elsewhere, embodiments support a wide variety of import mechanisms and formats. In this example, the 'wizard' button on FIG. 59 was selected, and the screen shown in FIG. 60 or 61 then prompts the user to enter basic information about the prospect's current agreement. FIG. 60 shows that this prospect is assigned to a specific user of the system, that their financing is with MBF-GA, and prompts the user to enter the date the agreement commenced and the term (assuming the agreement is a lease or a payment plan, for example). FIG. 61 prompts for similar information, but because it reflects an outright purchase, no term is required. The next step in the wizard prompts the user to enter more details about the agreement. In this example, FIG. 62 prompts the user to enter the amount paid. In other screens, the user might enter terms such as a down payment, a monthly fee, mileage limits, overage rates, balloon payments, and the like.

Figure 63:
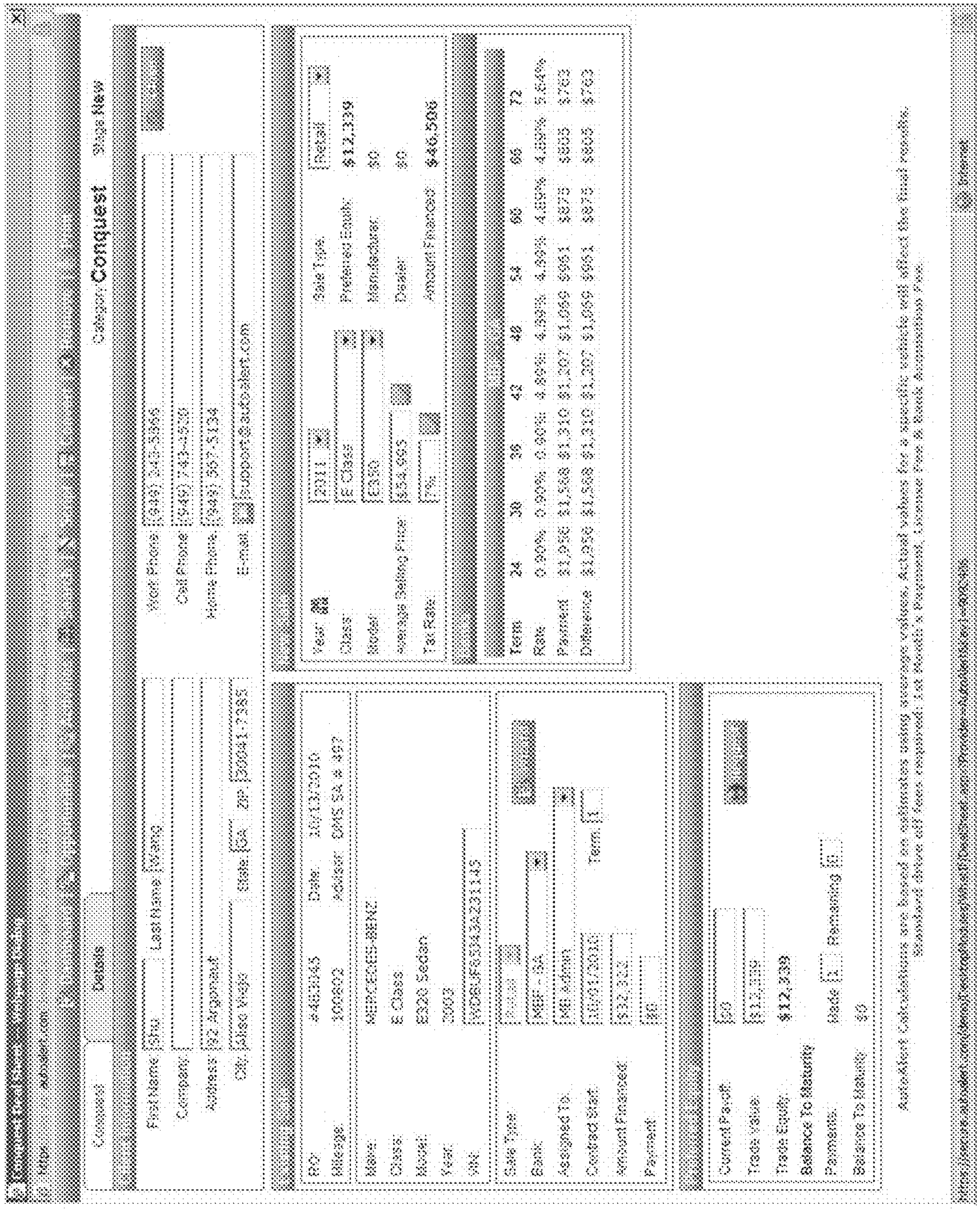
FIG. 63 is a screen shot that illustrates how one embodiment of a financial terms alert generation system updates its displays in response to new information being entered.
Figure 64:
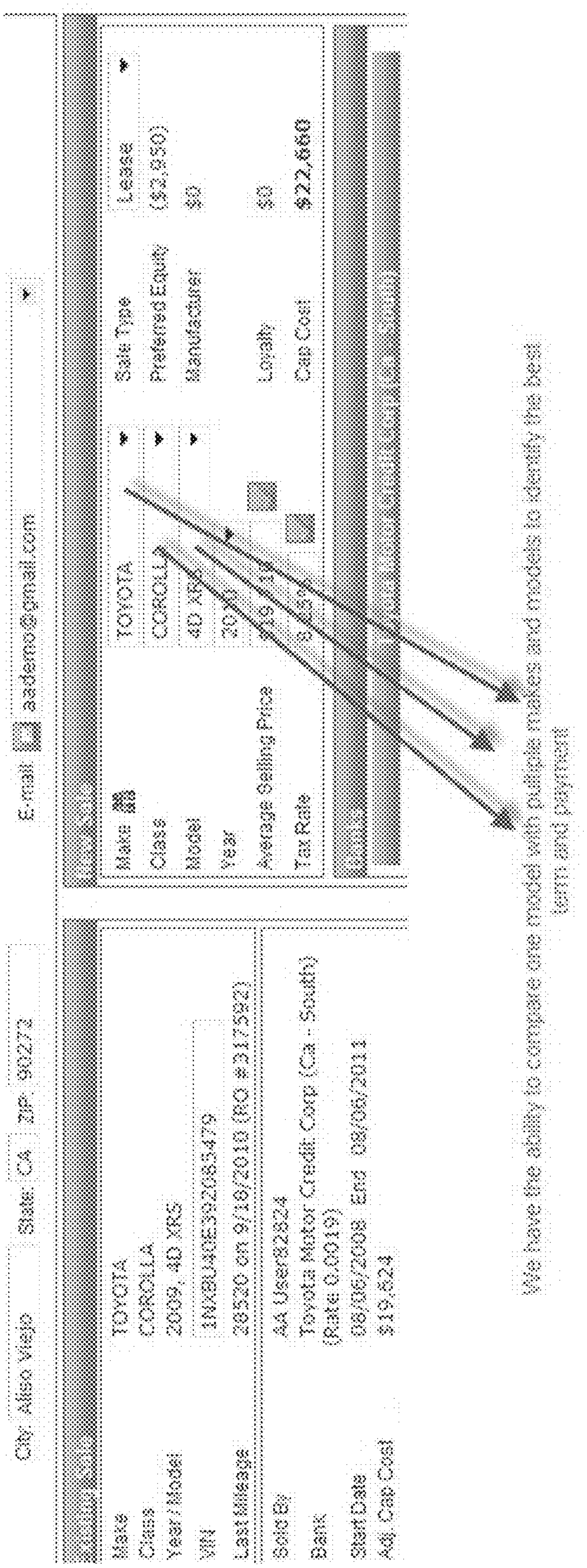
FIG. 64 is an example screen shot that illustrates an example embodiment's ability to compare an agreement for one product to multiple agreements for multiple comparable products.
Figure 65:
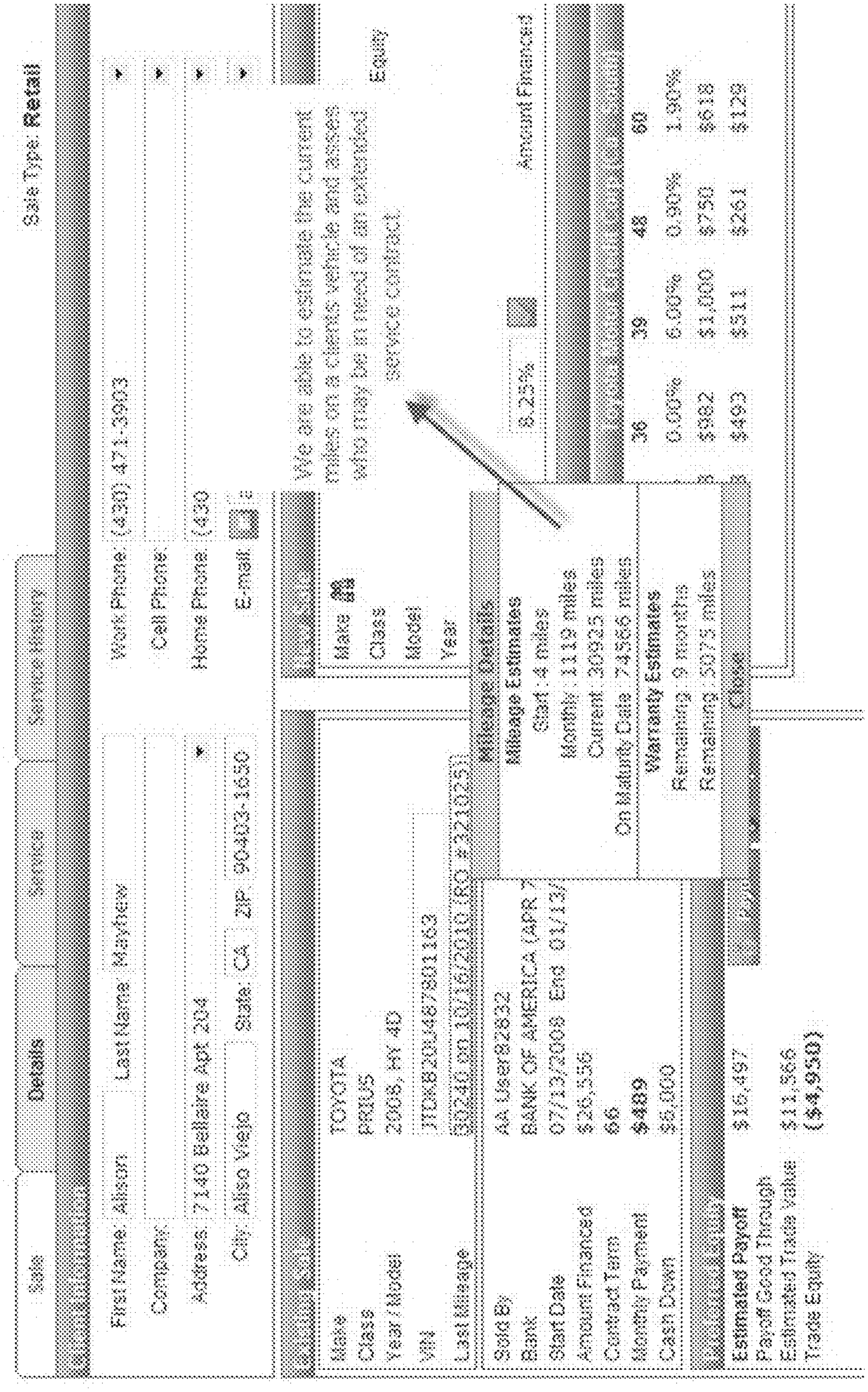
FIG. 65 is an example screen shot that illustrates an example embodiment's use and display of mileage details and warranty terms.

FIG. 63 illustrates the same screen as that of FIG. 59, only updated to reflect the newly entered agreement details. In the illustrated example, these new details did not cause this particular embodiment to identify any other types of opportunities. However, if mileage or sales opportunities were available, or (assuming warranty or service information had been entered or obtained) warranty or service opportunities were available, then this could be indicated by an appropriately configured embodiment.

Scripts

Certain embodiments advantageously provide scripts appropriate for users of the embodiment. Users may include dealers, manufacturers, service providers, banks or finance providers, customers, prospective customers, the like, and combinations thereof. Scripts are preferably tailored to the user and the scenario, and advantageously provide as much detail as possible or as shown to be effective. For example, an embodiment meant for use by members of the general public seeking an attractive package to present to a dealer may be pitched in terms of the value the customer brings and the profit the dealer will still make. In some embodiments, script language is customizable by the user, an administrator, or at another level of permissioning.

Figure 51:
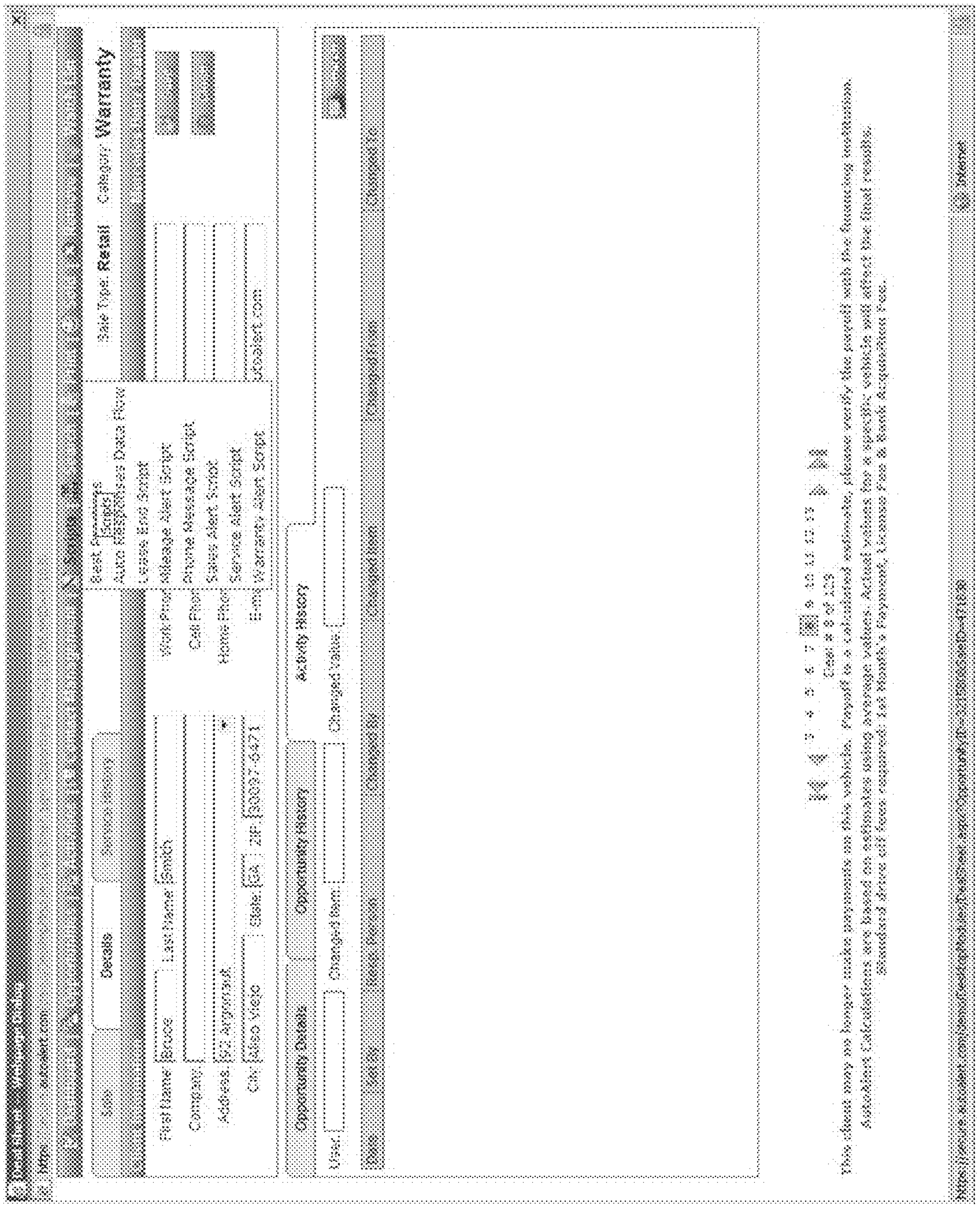
FIG. 51 is a screen shot that illustrates some of the scripts available in one embodiment of a financial terms alert generation system.

FIG. 51 illustrates an example of how scripts can be made available to a user. In addition to seven available scripts, this interface also provides a 'best practices' dialog, which gives the user information on efficient and proven ways to use the embodiment and to engage the customer.

Figure 50:
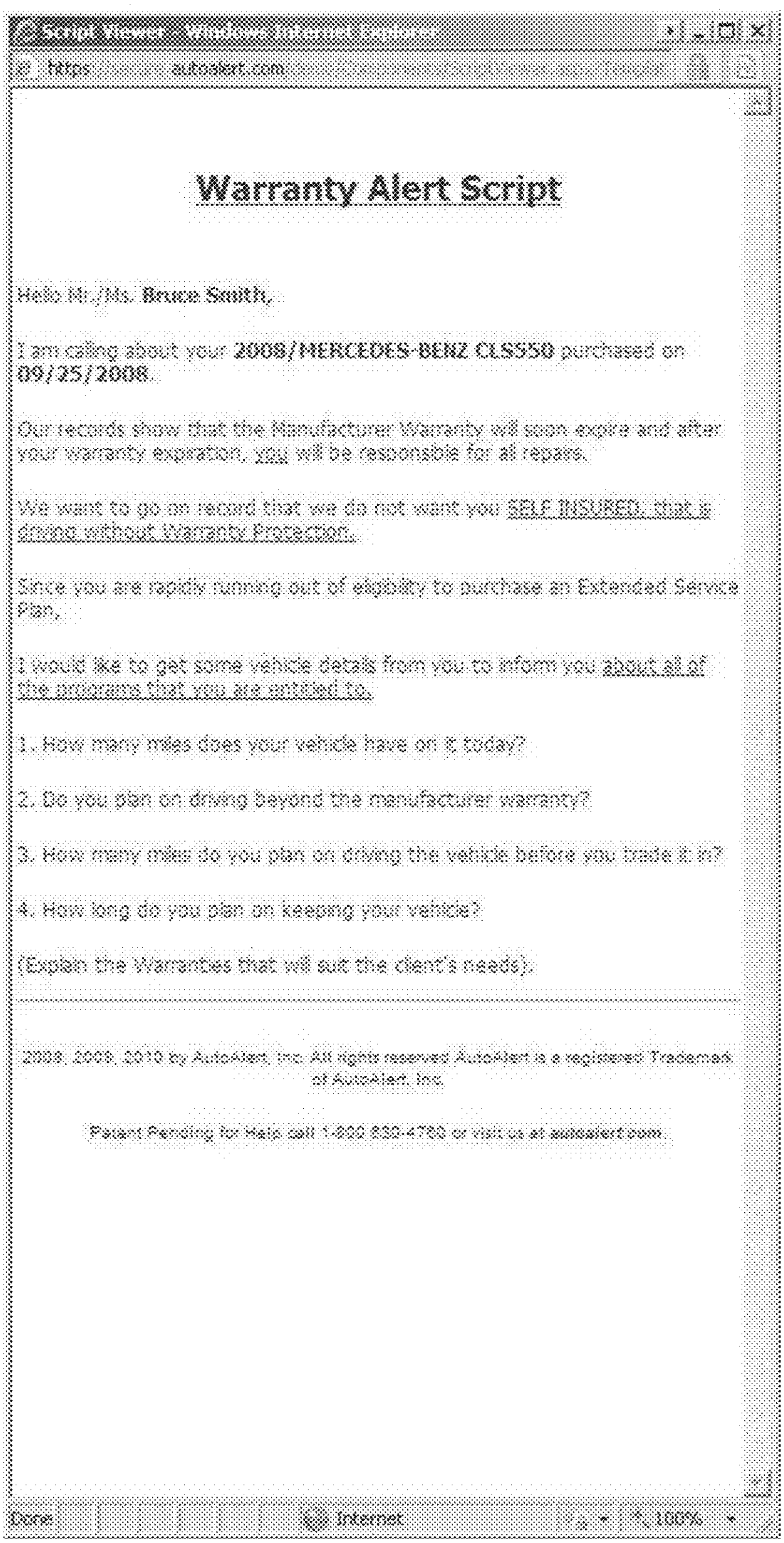
FIG. 50 is an example of a warranty alert script generated by one embodiment of a financial terms alert generation system.

FIG. 49 showed that an alert may be generated based on Bruce Smith being likely to exceed the use term of his current warranty. FIG. 50 shows a sample script that a dealer using this embodiment may see. The script integrates various pieces of information, such as the customer's name and the customer's current product. In some embodiments details of available secondary warranties may be included, as well as details about the current mileage or the products service history.

Figure 53:
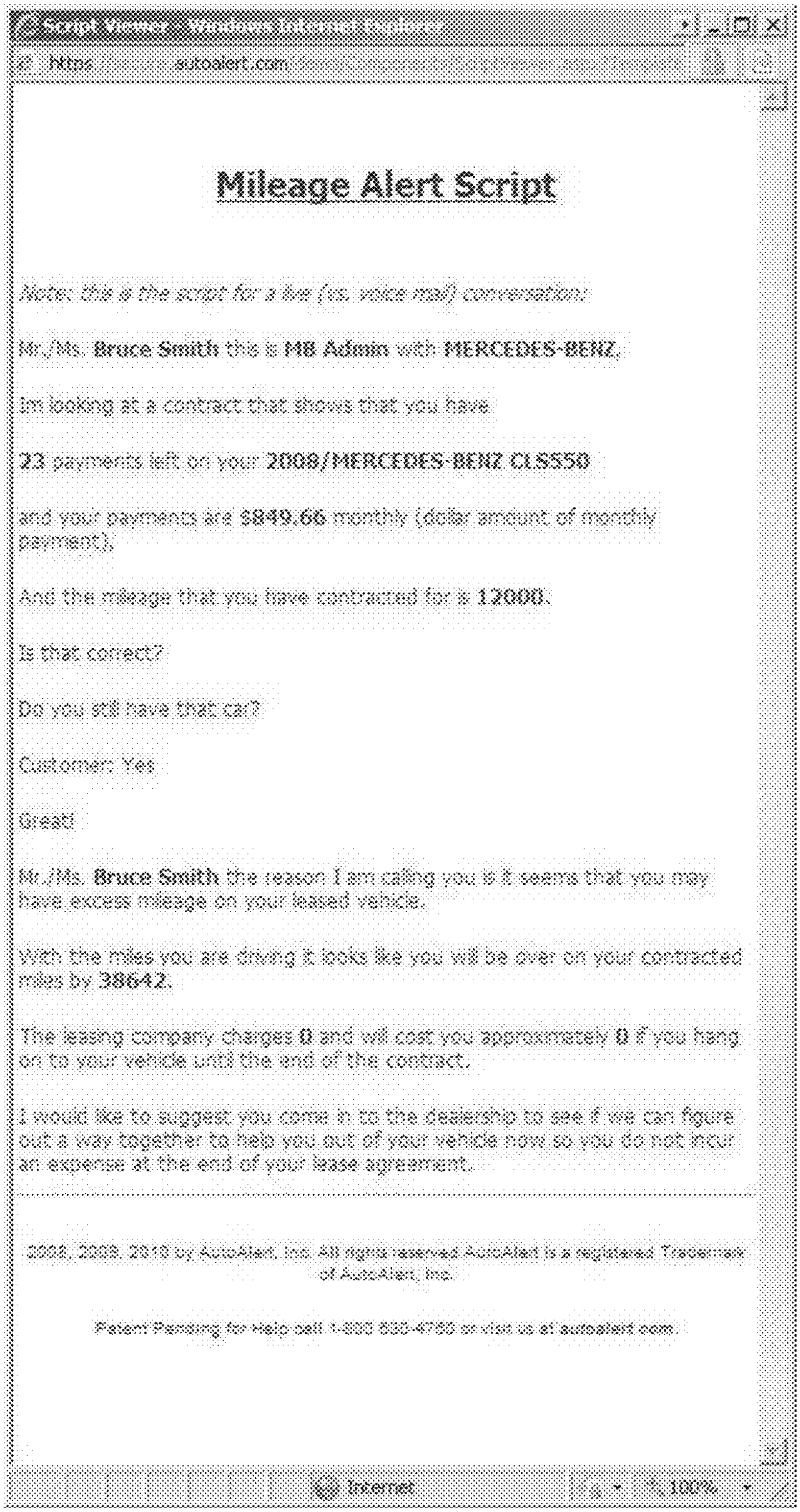
FIG. 53 is an example of a mileage alert script generated by one embodiment of a financial terms alert generation system.

Another script is shown in FIG. 53. This script also makes use of the virtual odometer feature, in this case comparing the estimated future mileage to the terms of Mr. Smith's current lease. The illustration shows that the current agreement is for 12,000 miles and the estimated mileage at completion will be 38,642 miles, which would typically result in an excess use fee on the order of 2,500-6,500 dollars. In this particular illustration, because the actual agreement used to generate the screen is Smith's retail agreement and not a lease agreement, there is no excess use fee in the system and the values in the script are set to 0. If, however, the fields were populated in the system then this embodiment would generate a script with the appropriate fee amounts included.

Other System Controls and Interfaces

Various embodiments of the disclosed system can provide interfaces for viewing and configuring aspects of the system. For example, the system can provide interfaces for managing customer information, setting alert parameters and schedules, generating reports, configuring data sources, and editing data used by the system.

Customer Management Interface

Figure 4:
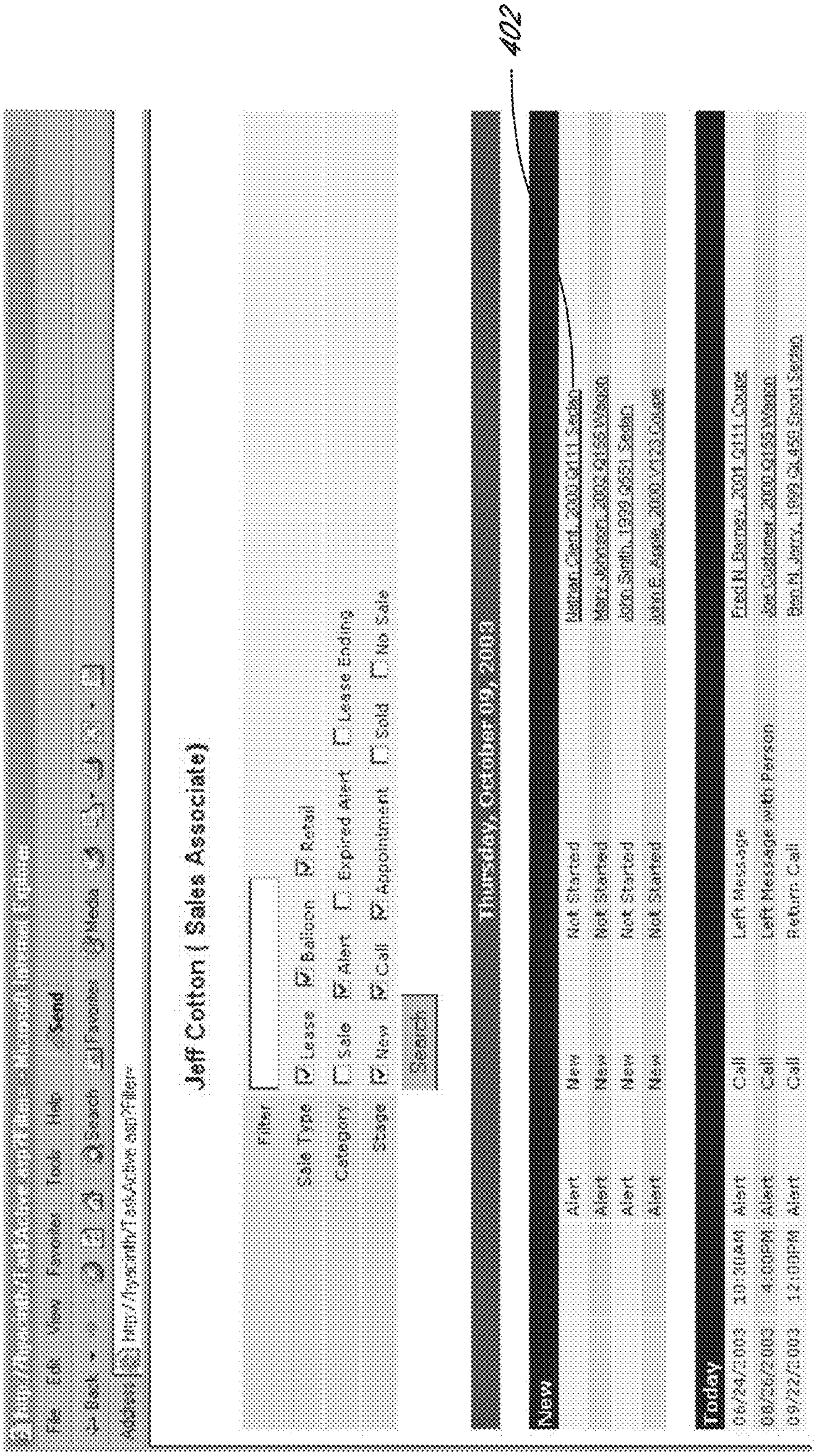
Figure 5:
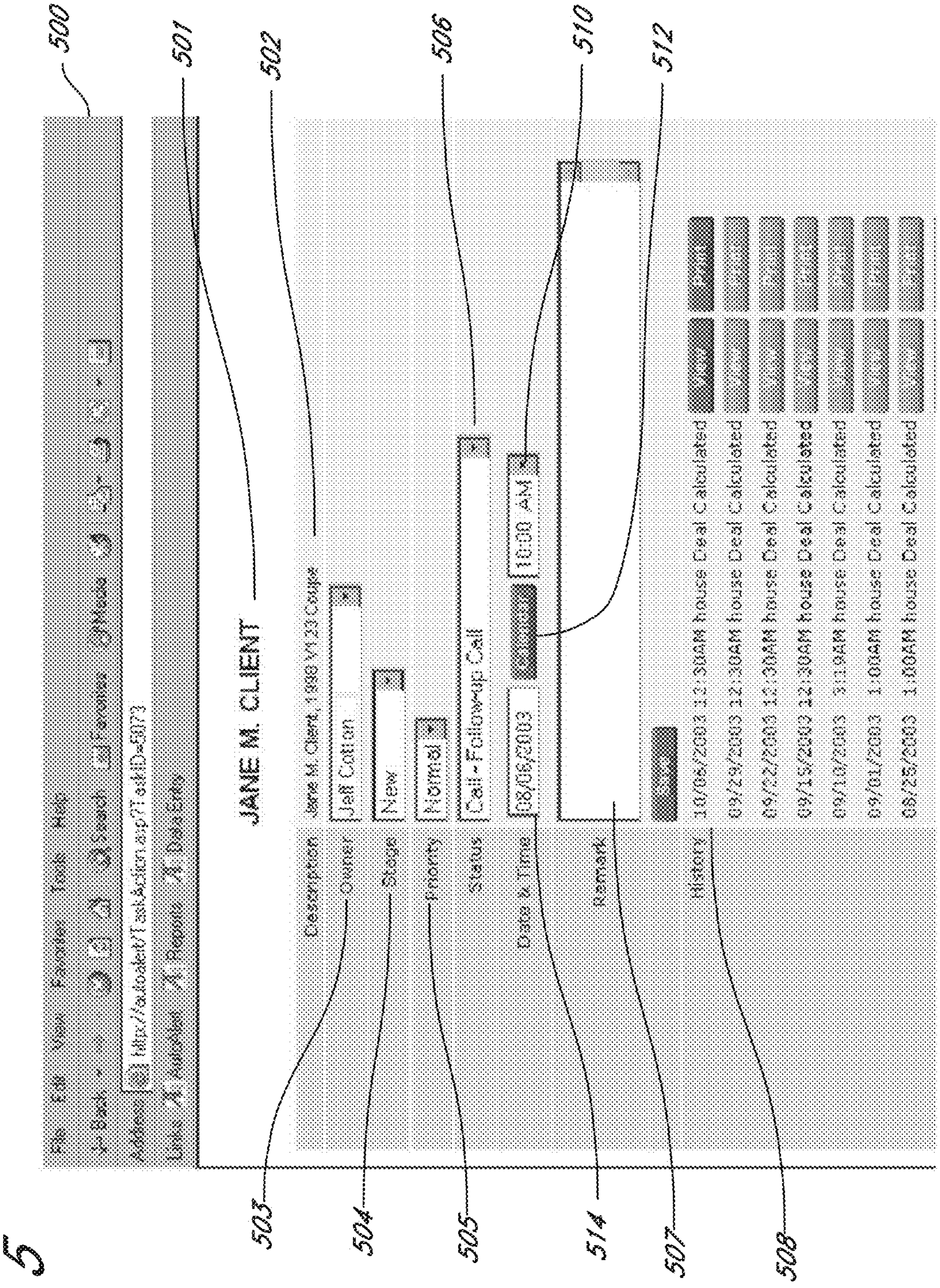
Figure 6:
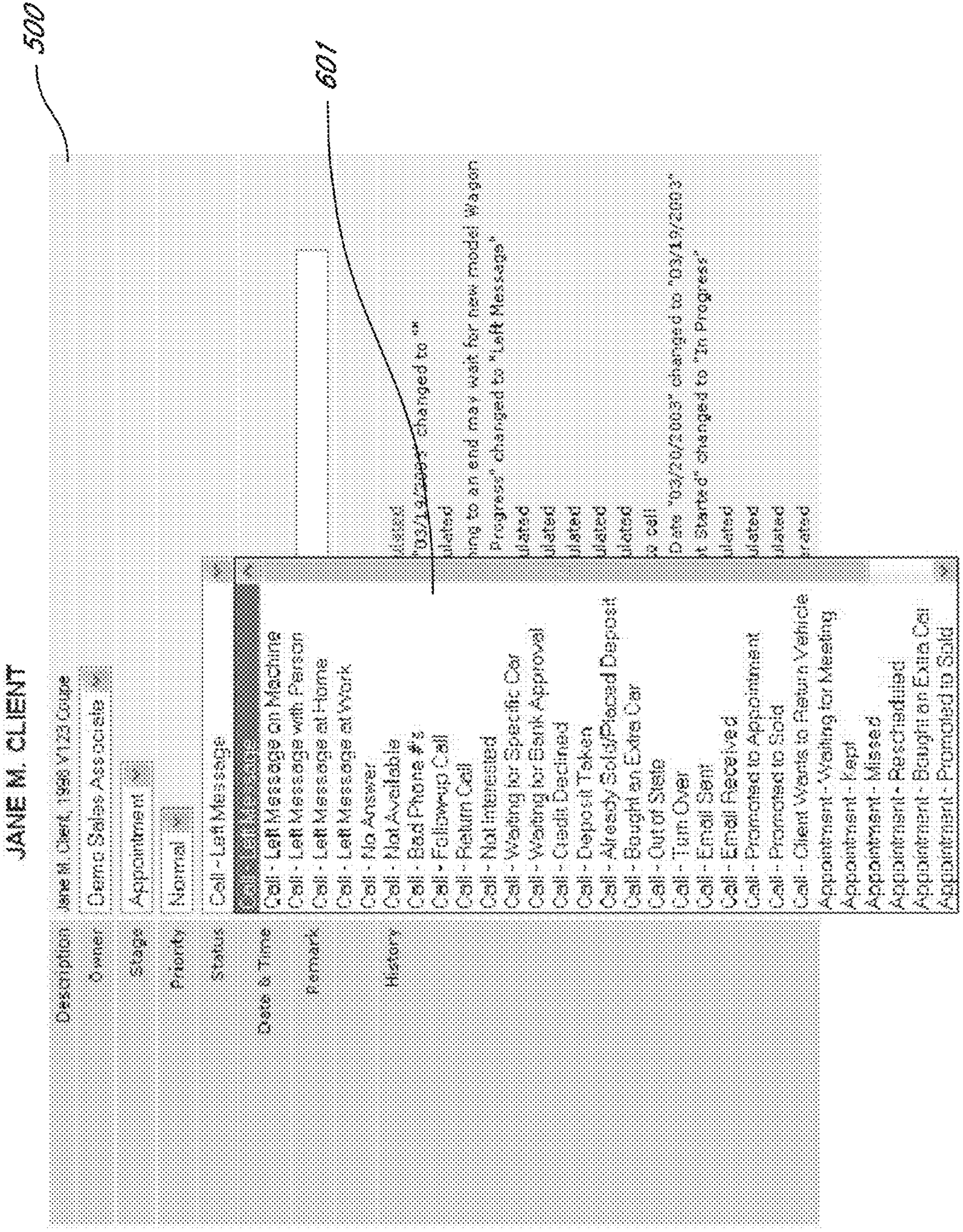
Figure 7A:
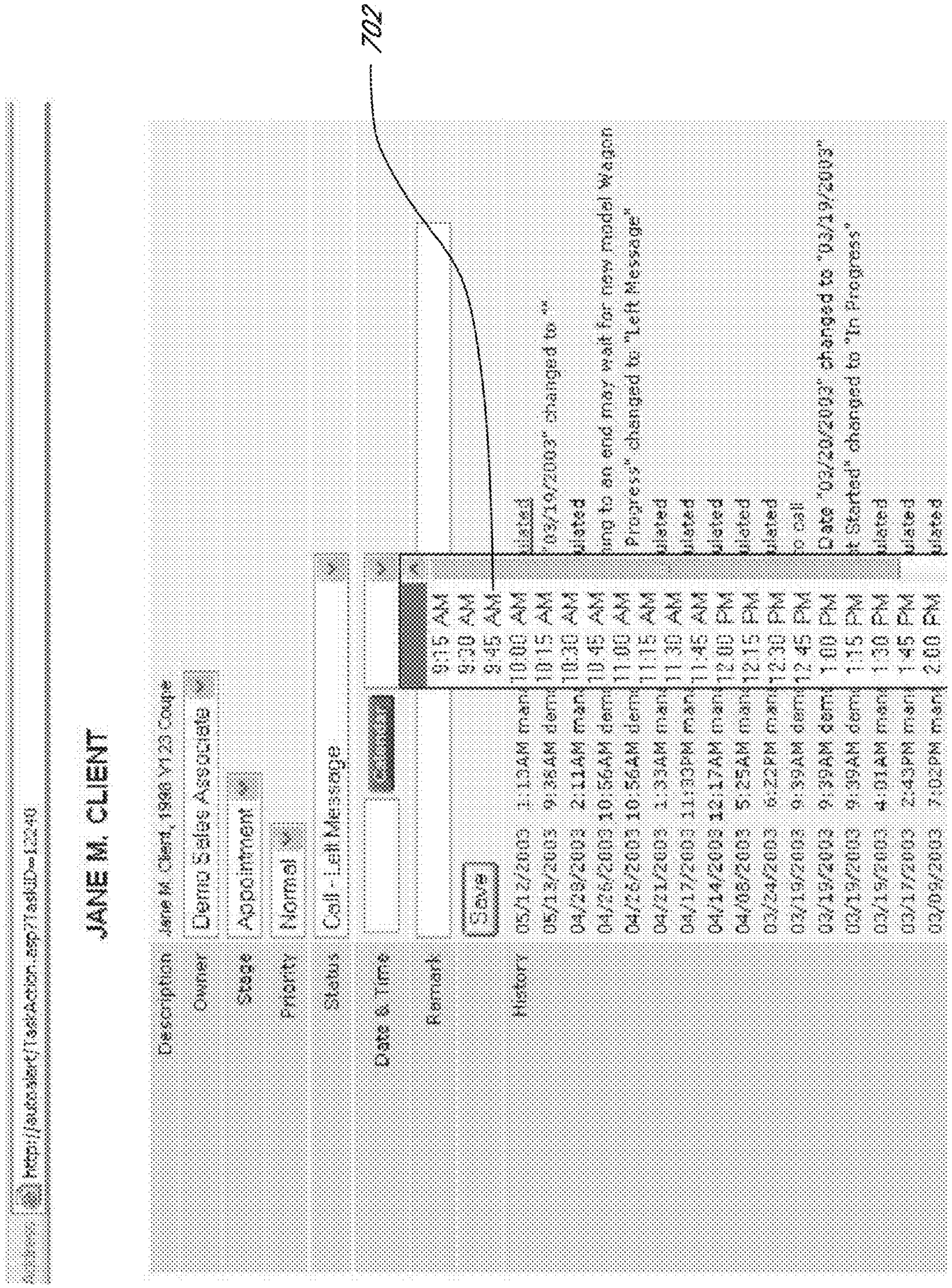
Figure 7B:
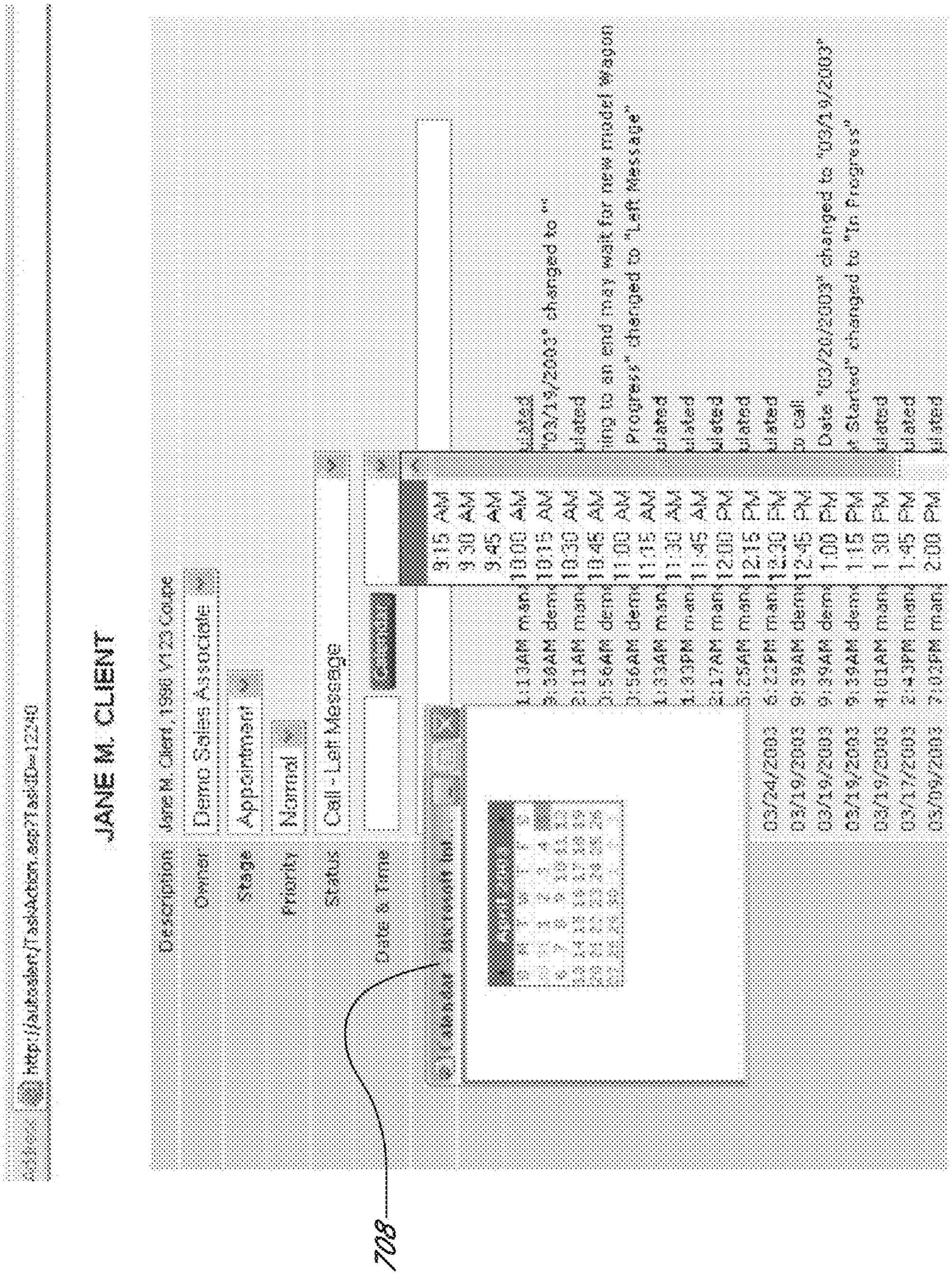

FIG. 4 illustrates an embodiment of the display shown in FIG. 3. In response to a selection of hyperlink 402, a contact management view 500 is displayed as illustrated in FIG. 5. Text 501 identifies the name of client associated with hyperlink 402. The client name and vehicle descriptor is also shown in text 502. Listbox 503 displays the owner of the entry (e.g., a salesperson assigned to the client). Listbox 504 indicates the current stage in the contact management process. In one embodiment, a user may select a stage and save the newly selected stage in the system. Listbox 505 indicates a priority associated with the contact management process. In one embodiment, a user may select a priority and save the newly selected priority in the system. Priorities may advantageously indicate whether specific contact must take place, should take place, or is not needed. In one embodiment, an icon, text, or the like (not shown) is advantageously displayed adjacent entries 304 (FIG. 3) to indicate an associated priority. Any suitable icon, color, or text may be used to indicate different priorities. In one embodiment, a different colored icon is associated with each priority. Listbox 506 indicates a status associated with the contact management process. For example, the user may record contact management-related actions taken for the client by selecting a particular status from the list box 506, which displays a list of selectable statuses 601 (FIG. 6). In one embodiment, a user may select a status and save the newly selected status in the system. A status may indicate, for example, that the salesperson called the client and left a message, called the client and set an appointment, or the like. Field 507 allows text to be entered and subsequently stored for display in history list 508. Selection of listbox 510 allows a user to select a time from list 702 (FIG. 7A). Selection button 512 allows a user to select a date displayed in a calendar view 708 (FIG. 7B), where selection of a date from the calendar view 708 causes the date to appear in field 514. The user may also enter a date directly into field 514. The dates and times may be advantageously used to schedule future activities such as a future call, or an appointment set. The history log may advantageously record a user's use of the contact management screen, list what deal sheet calculations and generations the system has performed, and show any saved remarks. In one embodiment, newly generated contact management entries are associated with a "new" stage indication. A salesperson may advantageously use view 500 to track contact with the client through various contact stages, to document appointments made, and schedule future contacts. In one embodiment, a status change will advantageously be recorded in history section 508. In one embodiment, when the save button is selected, the information from view 500 is logged into the history section as a separate line showing the date the entries were made along with the information entered.

Figure 8:
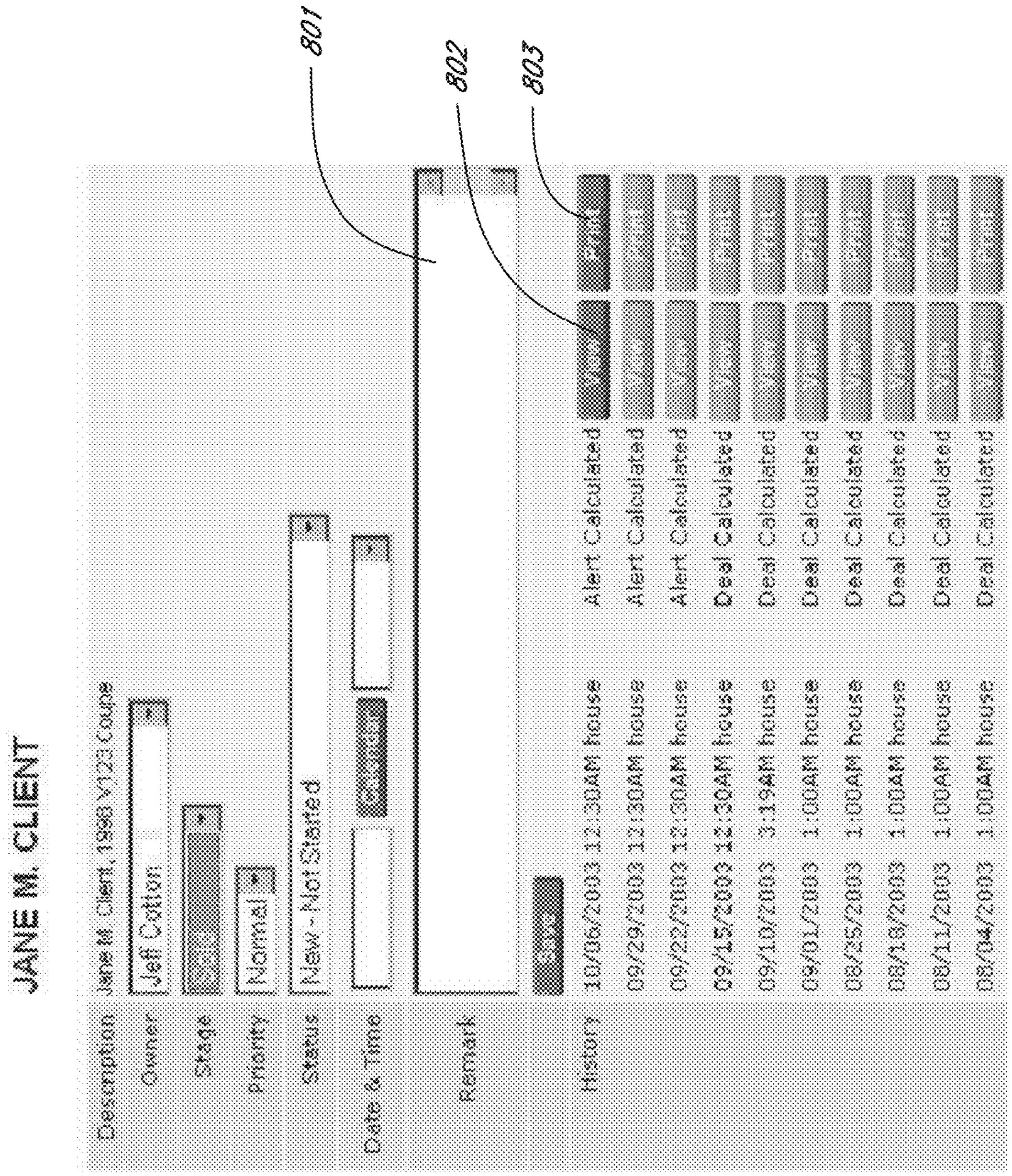

FIG. 8 illustrates an embodiment of the contact management view from FIG. 5 in which remarks are entered the field 507 and then stored in the history view. When a view button 802 is selected, a deal sheet view 902 (FIG. 9) is displayed. When a print button 803 is selected, a deal sheet formatted for printing is displayed.

Administration and Reports Interfaces

Figure 16:
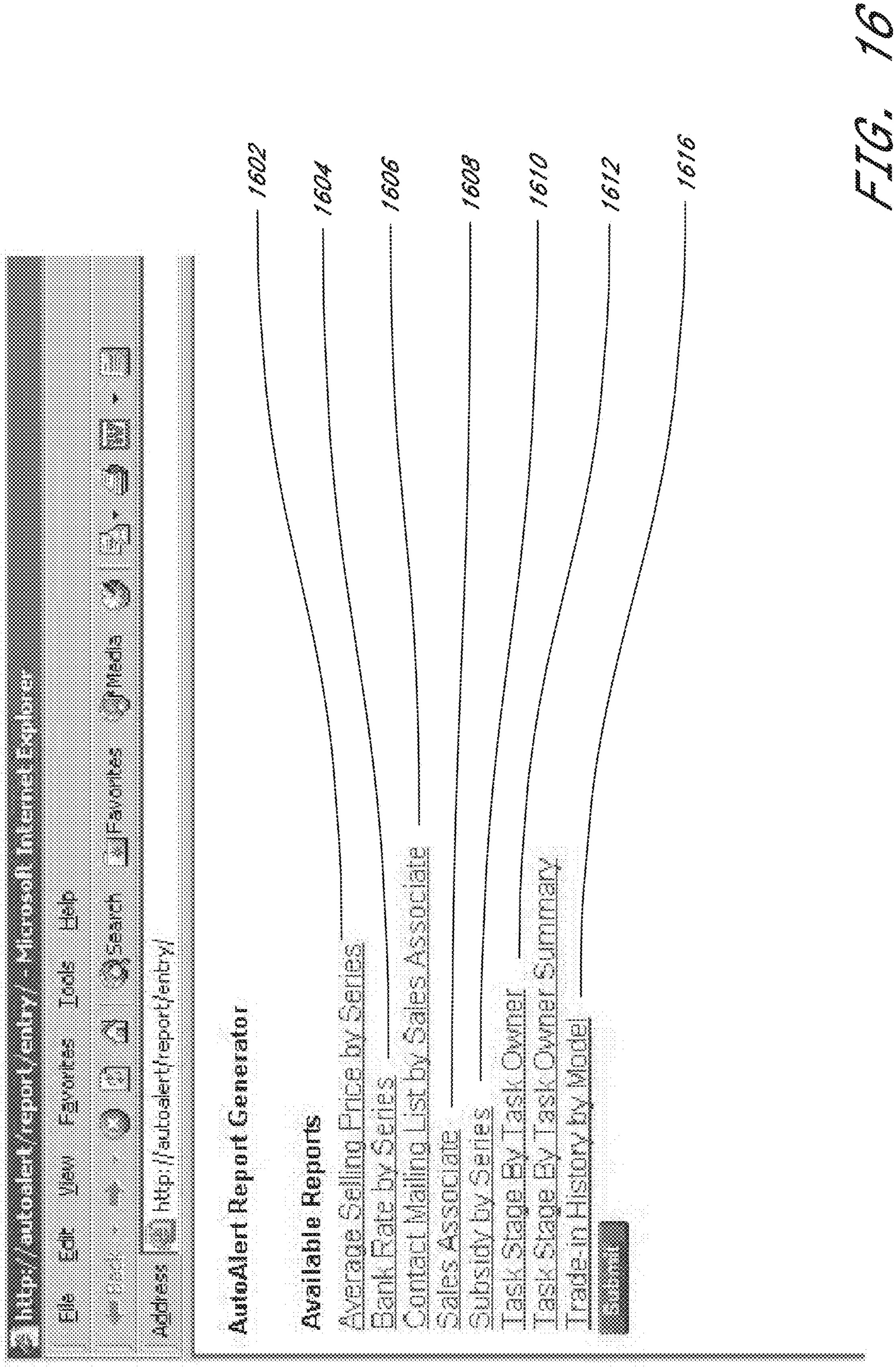
Figure 17:
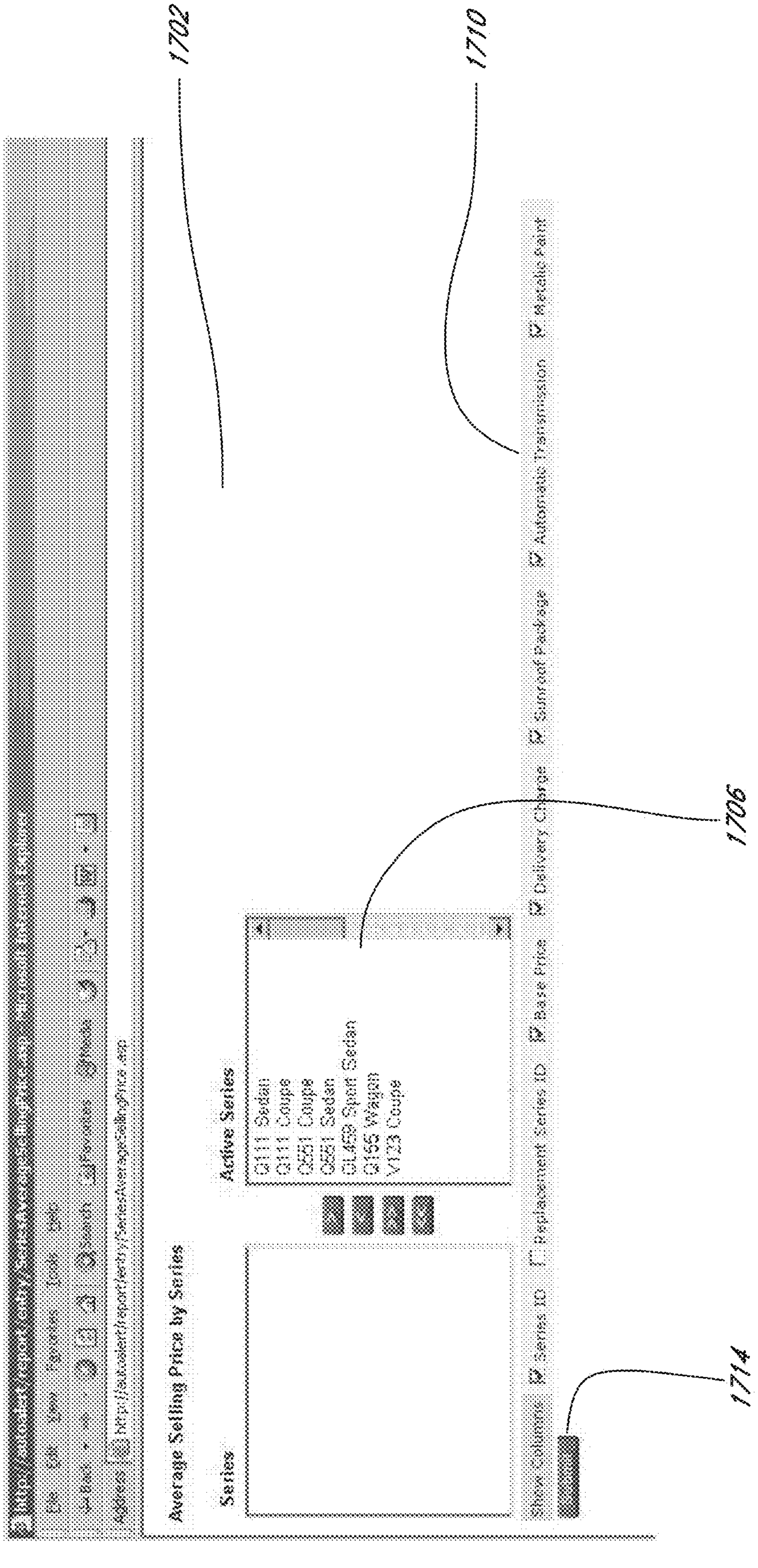

Any screens suitable for performing administrative functions may be used in connection with the system. These screens may be used to maintain and manage information used to perform the calculations within the system. For example, FIG. 16 illustrates a reports generator screen. Selecting hyperlink 1602 opens an average selling price screen 1701.

Using screen 1702, the user may view a display of costs associated with some or all of a set of car models. In one embodiment, the set comprises a set of available car models offered by a particular car dealership (e.g., list 1706). The "active series" designation indicates the series which may be displayed in the display of costs. To move one or more series from one series box to the other, the series may be selected and the appropriate single-arrow button pressed. The double-arrows buttons are for selecting and moving all items from one series box to the other. Checkboxes 1710 may be used to select the data to be displayed, including but not limited to a series or model identifier, a replacement series identifier, a base price, a delivery charge, a sunroof package, automatic transmission, metallic paint, other costs associated with the financing or price of automotive-related features, or any other suitable costs. A submit button 1714 is selected to display the data in a report 1802 (FIG. 18), which may advantageously be used to evaluate the average selling price information the system uses to calculate the deal sheets. In one embodiment, the average selling price information the system uses to calculate the deal sheets may be edited or entered manually. Accordingly, the report 1802 advantageously allows a person to review the average selling price information used by the system determine whether to edit that information.

Figure 19:
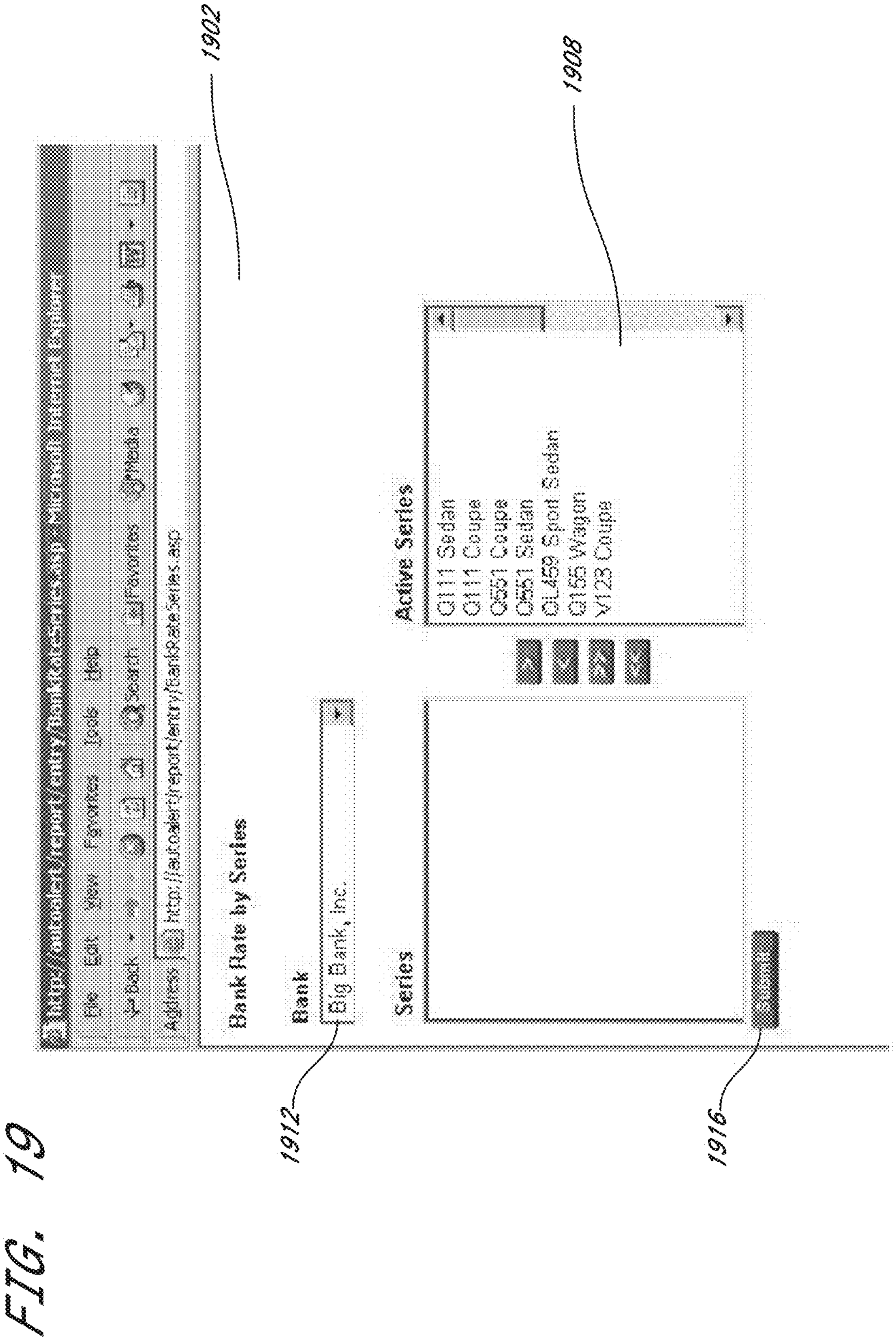

Referring to FIG. 16, selecting hyperlink 1604 opens a bank rate screen 1902 (FIG. 19). Using screen 1902, the user may view a display of financing rates associated with some or all of a set of car models. The "active series" designation indicate the series which may be displayed in the display of financing rates. To move one or more series from one series box to the other, the series may be selected and the appropriate single-arrow button pressed. The double-arrows buttons are for selecting and moving all items from one series box to the other. In one embodiment, the set comprises a set of available car models offered by a particular car dealership (e.g., list 1908). In one embodiment, the user may limit the financing rates displayed to those rates offered by one or more financial institutions. For example, listbox 1912 may be used to select a financial institution. In response to selecting button 1916 A submit button 1912 is selected to display the data in a report 2002 (FIG. 20), which may advantageously evaluate the financing rates used in the system. The report 2002 advantageously may include financing rate information, including a model identifier, the duration of the term, a money factor, a residual percentage, and MRM. A model identifier may be advantageously used to associate a rate residual with a particular model because rates and residuals may vary by model. The duration of the term is the length of the agreement. The money factor comprises a leasing interest rate or APR of the lease. The residual percentage comprises the portion of the original selling price that the financing company expects the product to be worth at the end of the lease or purchase. MRM is a maximum residual amount used that may be used for calculating payoffs.

Figure 21:
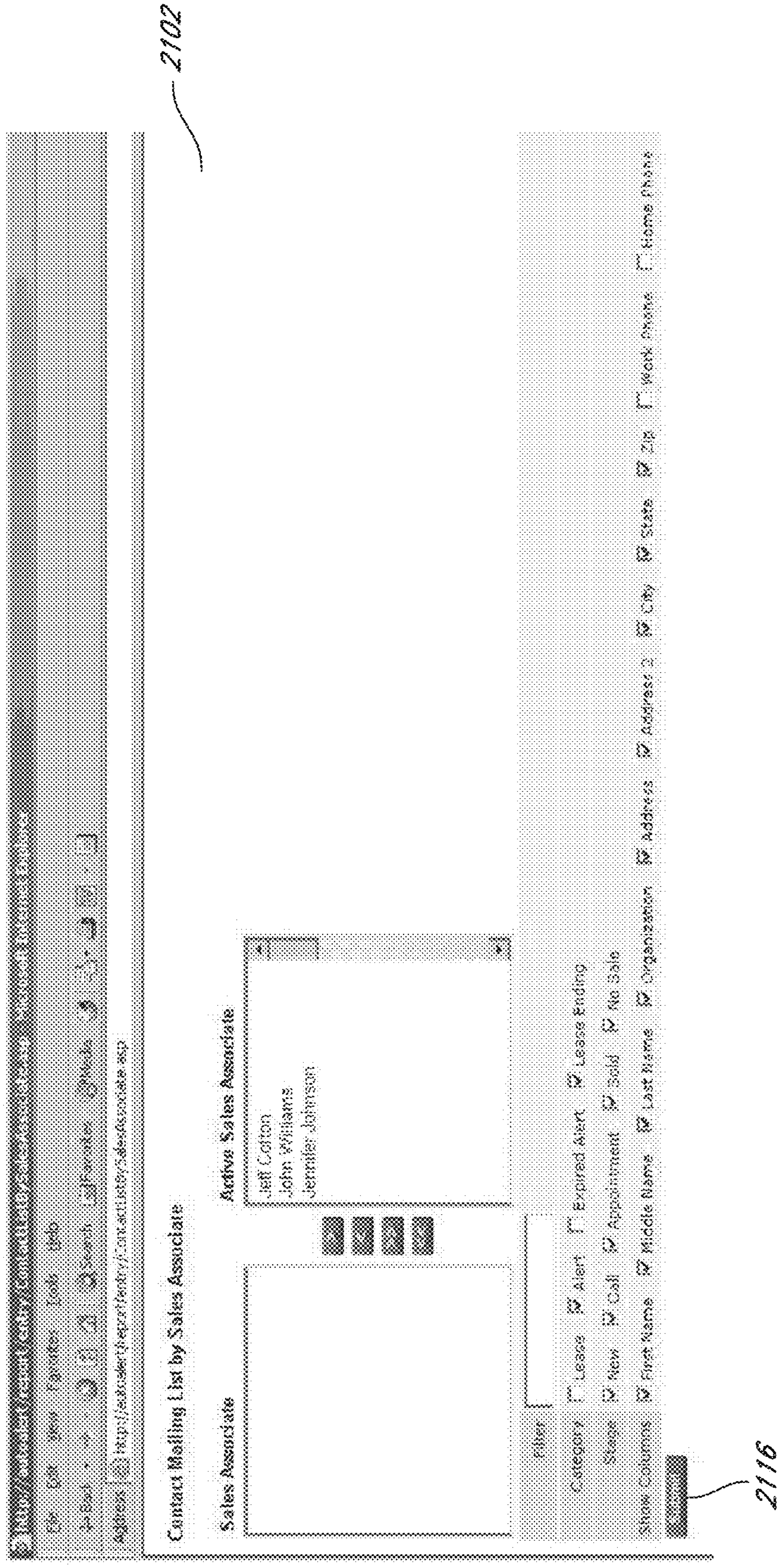
Figure 22:
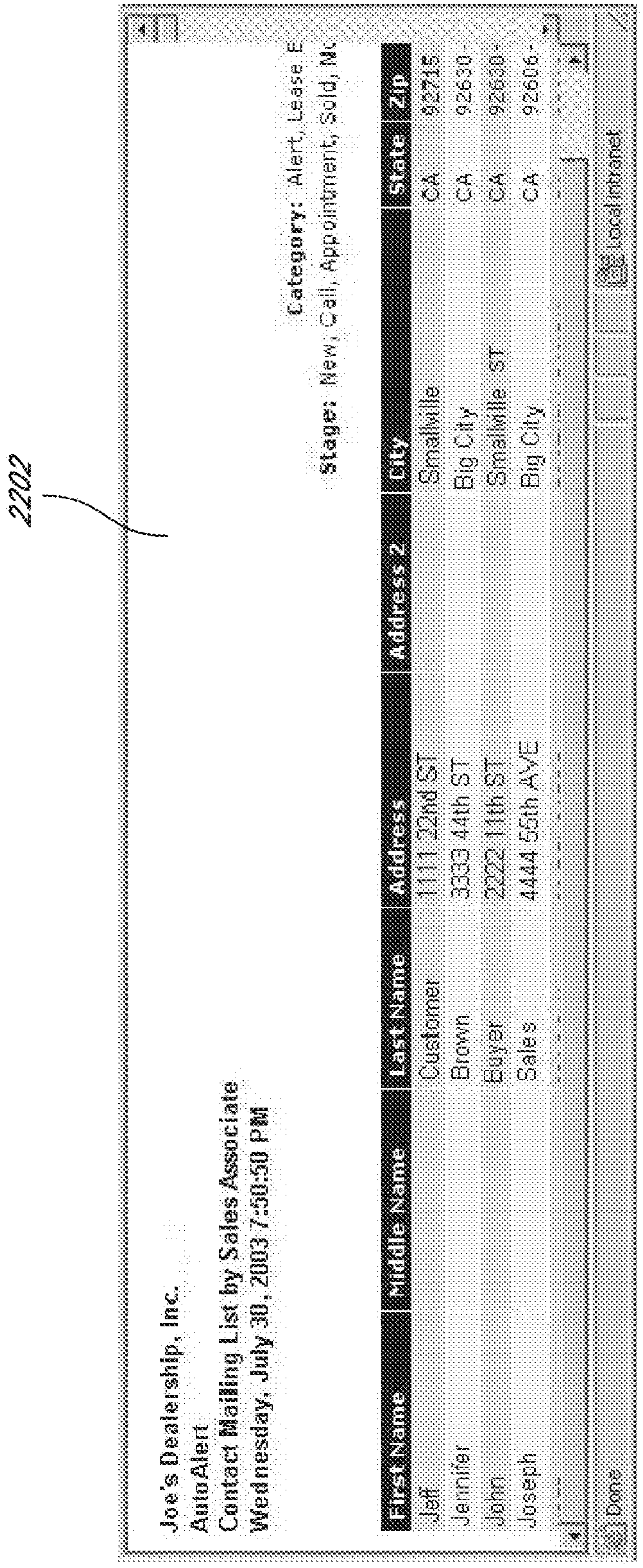

Referring to FIG. 16, selecting hyperlink 1606 opens a mailing list screen 2102 (FIG. 21). Using screen 2102, the user may view a display of client-related, contact information associated with some or all of a set of clients. In an embodiment where sets of clients are associated with one or more salespersons, the display of the client-related, contact information may be displayed for one or more selected salespersons. The "active sales associate" designation indicate the sales associates which may be displayed in the display of the client-related, contact information. To move one or more sales associates from one sales associates box to the other, the sales associates may be selected and the appropriate single-arrow button pressed. The double-arrows buttons are for selecting and moving all items from one sales associate's box to the other. Selecting one or more checkboxes may limit the column-displayed, client-related, contact information to particular parameters, including but not limited to names, organization name, addresses, city, state, zip, home telephone, work telephone, mobile telephone, or the like. Selecting one or more checkboxes may limit the displayed client-related contact information to a category of deal sheets associated with a client, such as a sale, an alert, an expired alert, a lease ending, or the like. Selecting one or more checkboxes may limit the displayed client-related contact information to those at one or more particular stages in the contact management process, such as where the entry is new, where a telephone call has been made, where an appointment has been made, where a sale occurred, where no sale occurred, or any other stage suitable for managing contacts with persons. A submit button 2116 is selected to display the data in a report 2202 (FIG. 22), which may advantageously to view list of the client-related, contact information.

Figure 23:
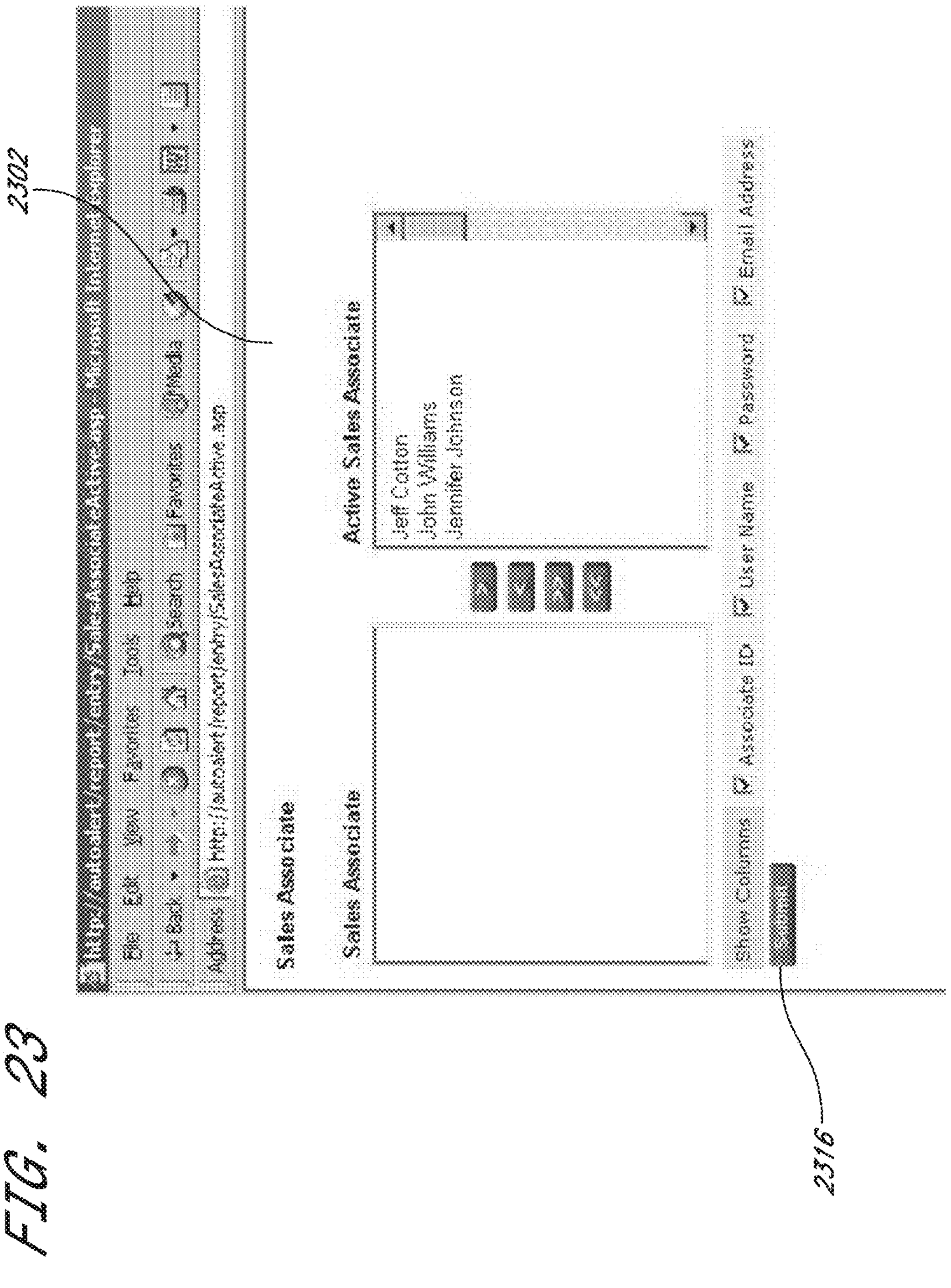

Referring to FIG. 16, selecting hyperlink 1608 opens a salesperson screen 2302 (FIG. 23). Using screen 2302, the user may view a display of information associated with some or all of a set of salespersons. Selecting one or more checkboxes may limit the column-displayed salesperson information, which may include but is not limited to a salesperson identifier, a username, a password, an email address, or the like. A submit button 2316 is selected to display the data in a report 2402 (FIG. 24), which may advantageously to review a display of the salesperson information.

Figure 25:
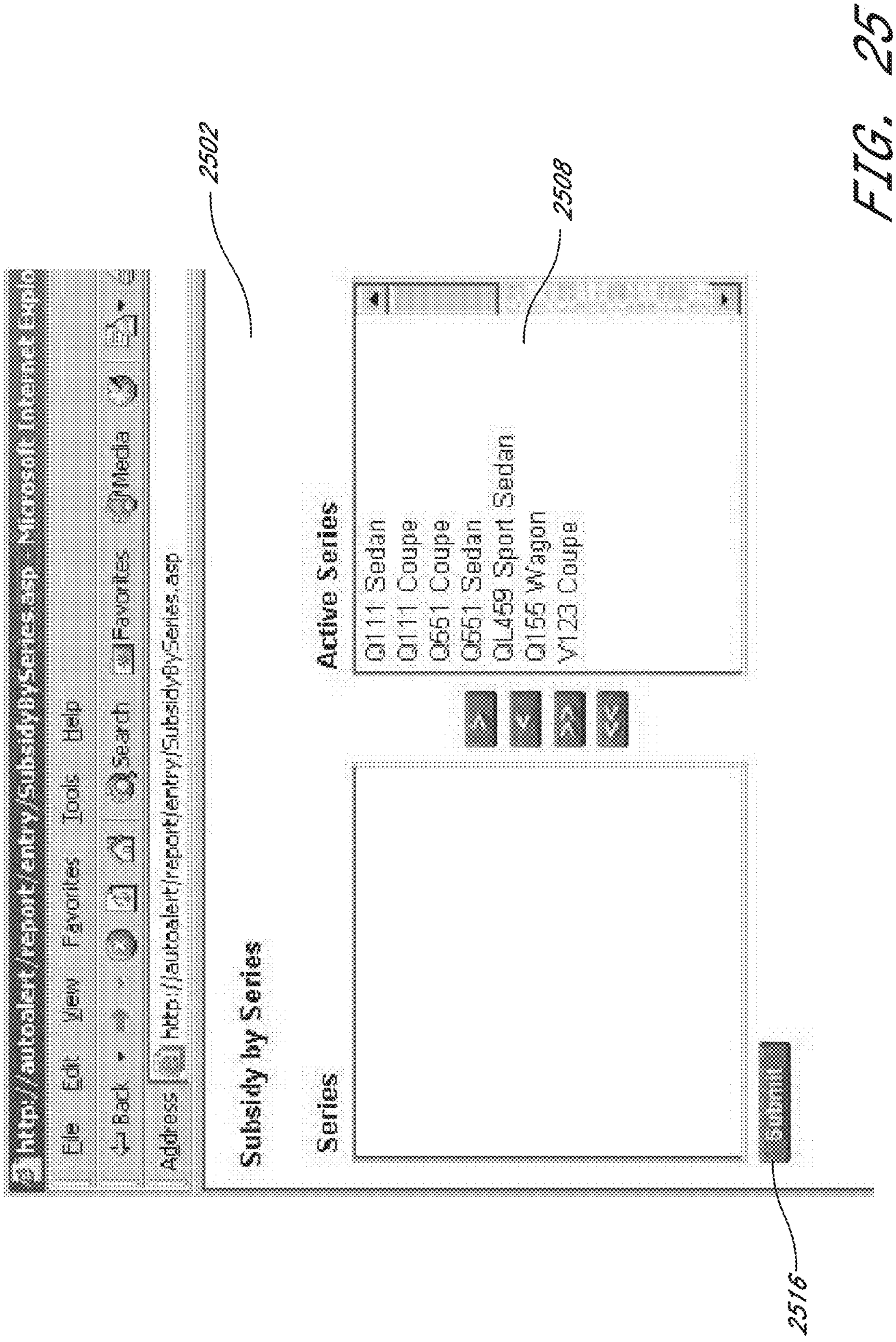

Referring to FIG. 16, selecting hyperlink 1610 opens a subsidy screen 2502 (FIG. 25). Using screen 2502, the user may view a display of information associated with subsidies (e.g., rebates, discounts, promotions, or the like) associated with some or all of a set of car models. The "active series" designation indicate the series which may be displayed in the display of financing rates. To move one or more series from one series box to the other, the series may be selected and the appropriate single-arrow button pressed. The double-arrows buttons are for selecting and moving all items from one series box to the other. In one embodiment, the set comprises a set of available car models offered by a particular car dealership (e.g., list 2508). A submit button 2516 is selected to display the data in a report 2602 (FIG. 26), which may advantageously to assess one or more models and any associated subsidies. In one embodiment, the system uses the subsidies to create deal sheets.

Figure 27:
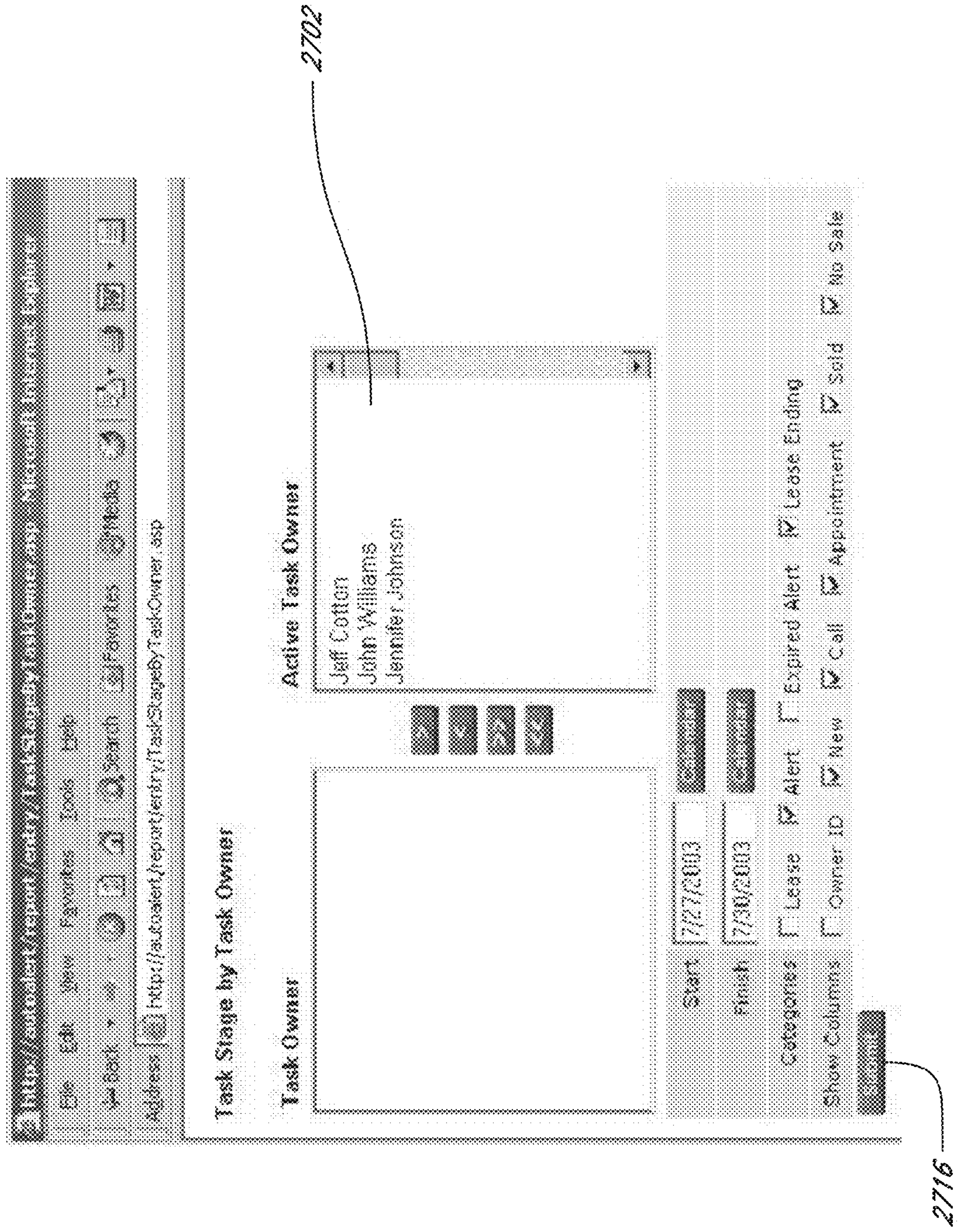
Figure 28:
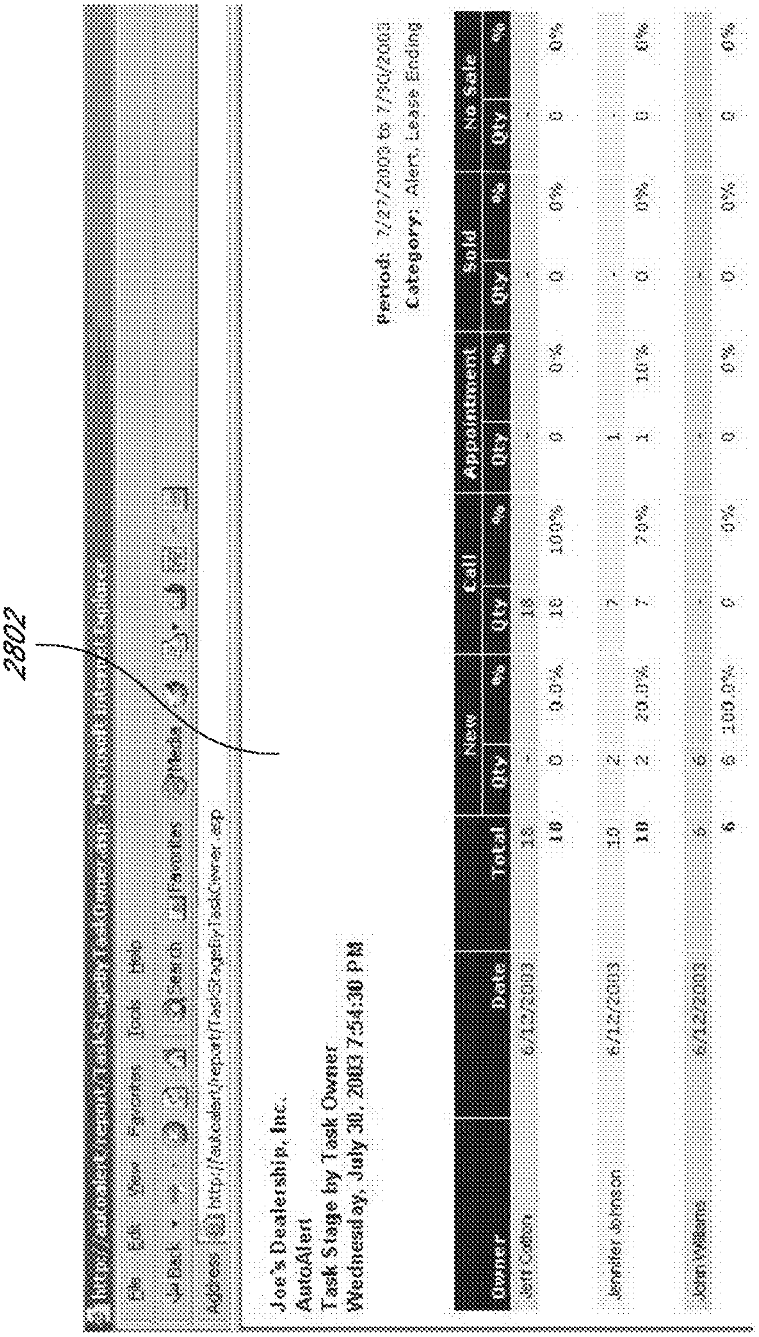

Referring to FIG. 16, selecting hyperlink 1612 opens a task stage by task owner screen 2702 (FIG. 27). Using screen 2702, the user may view a display of contact management task information associated with some or all of a set of task owners (e.g., a salesperson). In an embodiment where set tasks are associated with one or more salespersons, the display of the task information may be displayed for one or more selected salespersons. The "active sales associate" designation indicate the sales associates which may be displayed in the display of the client-related, contact information. To move one or more sales associates from one sales associate's box to the other, the sales associates may be selected and the appropriate single-arrow button pressed. The double-arrows buttons are for selecting and moving all items from one sales associate's box to the other. Selecting one or more checkboxes may limit the task information to a category of deal sheets, such as a sale, an alert, an expired alert, a lease ending, or the like. Selecting one or more checkboxes may limit the task information columns displayed to those at one or more particular stages in the contact management process, such as where the entry is new, where a telephone call has been made, where an appointment has been made, where a sale occurred, where no sale occurred, or any other stage suitable for managing contacts with persons. In an embodiment where the task information is associated with a particular date, a range of one or more dates may be entered into one or more of the start field and finish field using any suitable method, including but not limited to manual entry or using calendar buttons in a manner substantially similar to that described above with respect to calendar view 708 (FIG. 7B) and field 514 (FIG. 5). A submit button 2716 is selected to display the task information in a report 2802 (FIG. 28). As illustrated in FIG. 28, report 2802 advantageously displays each selected salesperson with a total number of tasks for the sales person, a subtotal of tasks at each particular stage for the sales person, and an associated percentage relative to the total number of tasks for the particular stage and sales person. In one embodiment, report 2802 may include totals by any suitable group, including by division, type of sales, organization, or the like.

Figure 29:
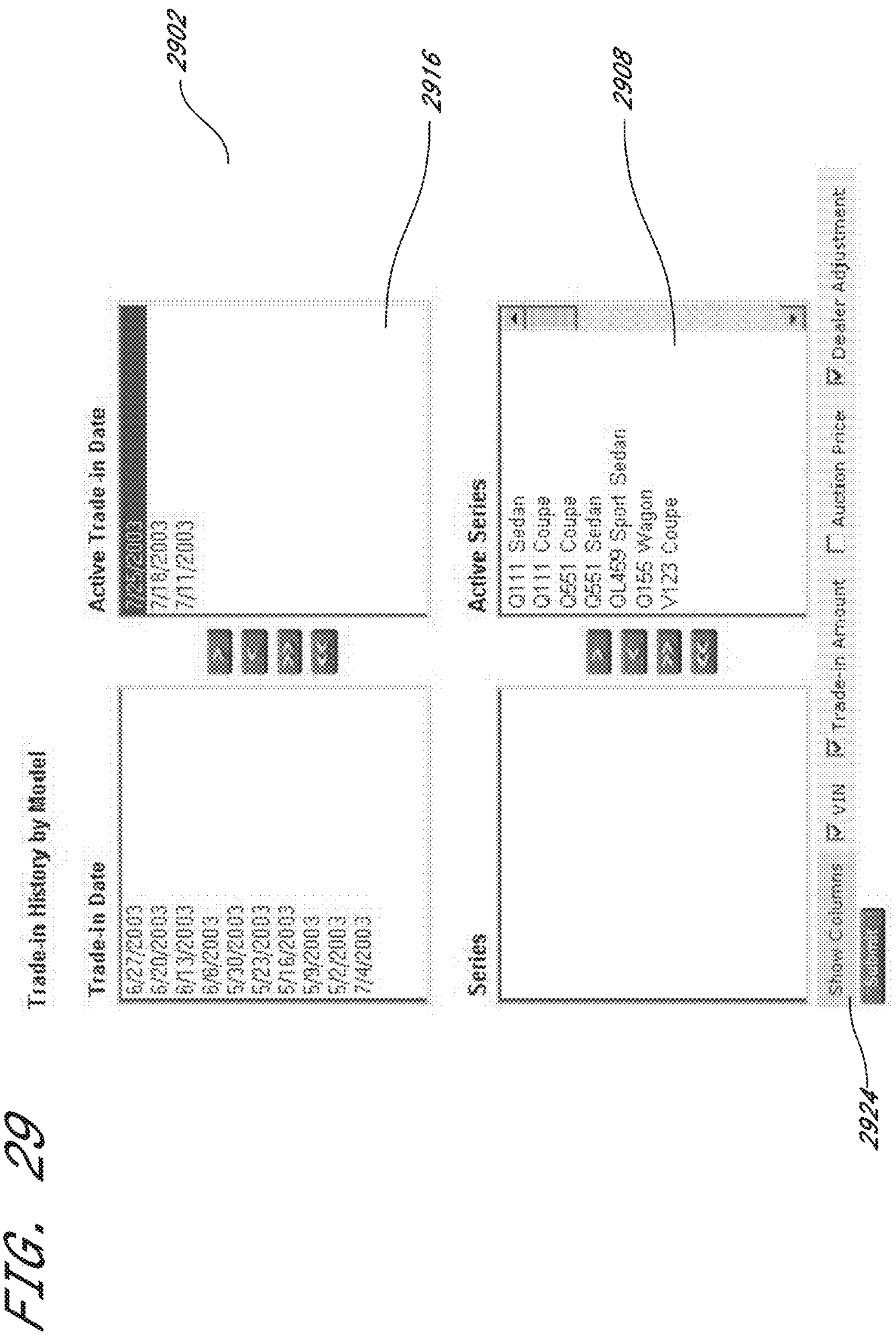

Referring to FIG. 16, selecting hyperlink 1616 opens a trade-in history screen 2902 (FIG. 29). Using screen 2902, the user may view a history of trade-in values associated with some or all of a set of car models. The "active series" designation indicate the series which may be displayed in the display of financing rates. To move one or more series from one series box to the other, the series may be selected and the appropriate single-arrow button pressed. The double-arrows buttons are for selecting and moving all items from one series box to the other. In one embodiment, the set of car models comprises a set of car models accepted as a trade-in by a particular car dealership (e.g., list 2908). The user may view a history of trade-in values associated with some or all of a set of dates. The "active trade-in date" designation indicate the trade-in dates which may be displayed in the display of financing rates. To move one or more trade-in dates from one trade-in date's box to the other, the trade-in dates may be selected and the appropriate single-arrow button pressed. The double-arrows buttons are for selecting and moving all items from one trade-in date's box to the other. In one embodiment, the set of dates comprises a set of dates on which a particular car dealership accepted particular models accepted as a trade-in (e.g., list 2916). Selecting one or more checkboxes may limit the column-displayed trade-in information, which may include but is not limited to a vehicle identification number, the trade-in amount, an auction price, and a dealer adjustment. The dealer adjustments are those FIGURES where the dealer can actually make changes to the average trade in value. These values are subsequently put into and become part of the calculations. A submit button 2924 is selected to display the +information in a report 3002 (FIG. 30), which may be used to evaluate the trade-in values used by the system. In one embodiment, a trade-in value, adjustment, or other parameter value associated with a particular current product may be manually altered (e.g., receive user input) to customize that parameter value. In one embodiment, any parameter value associated with a particular replacement product may be manually altered (e.g., receive user input) to customize that parameter value.

FIG. 31 illustrates an embodiment wherein money factor, residual percentage, or both may be altered for one or more replacement products and for one or more suitable replacement agreement terms (e.g., 36 months, 48 months, 60 months, or the like). Accordingly, a person may enter suitable values to update such values in the system. In one embodiment, these changes are advantageously reflected in view 2002 (FIG. 20).

Figure 26:
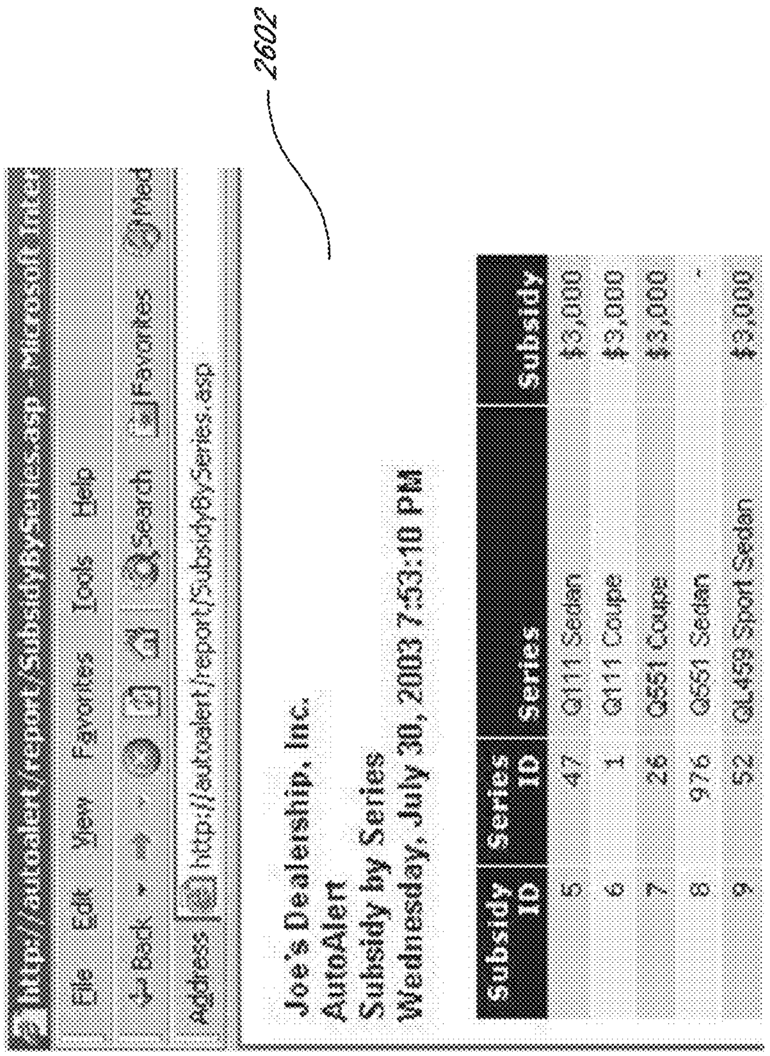
Figure 32:
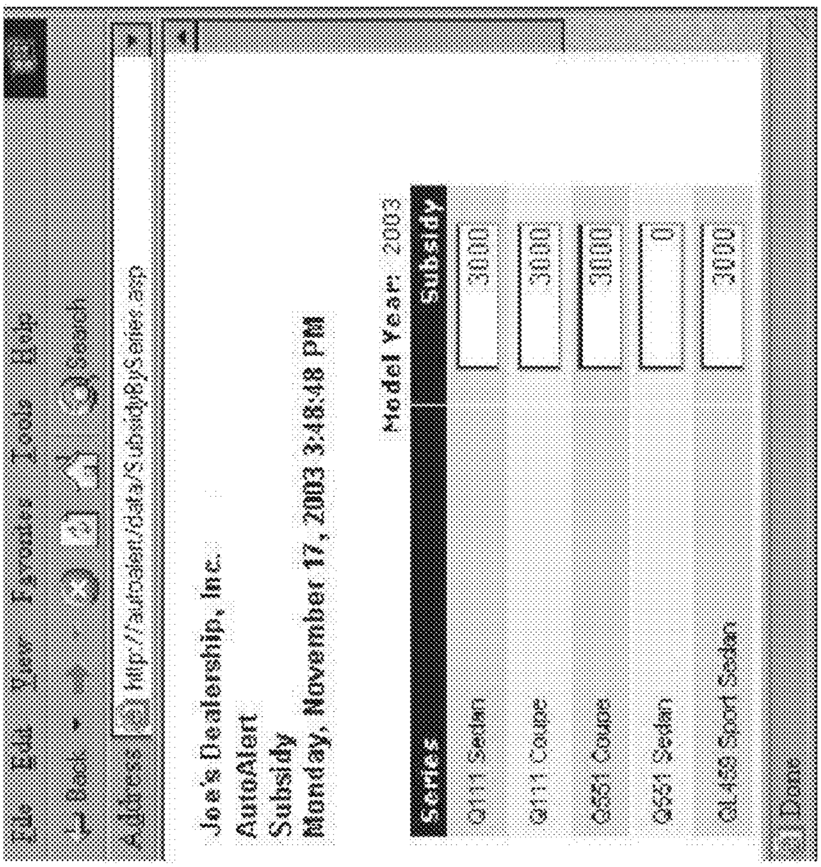

FIG. 32 illustrates an embodiment wherein money factor, residual percentage, both may be altered for one or more replacement products. Accordingly, a person may enter suitable values to update such values in the system. In one embodiment, these changes are advantageously reflected in view 2602 (FIG. 26).

FIG. 33 illustrates a display of contact management related activities for one or more accounts (e.g., a house account, a salesperson account, or the like), a group of one or more accounts, or both.

Back End System Design and Operation

General Architecture

A general architecture that implements various features of embodiments of some or all of the aspects disclosed herein will now be described with reference to drawings. The drawings and the associated descriptions are provided to illustrate embodiments of what is disclosed herein and not to limit its scope.

Certain figures illustrate various views of a system, which may be displayed to a user of the system and which the user may access, review, use, or any suitable combination thereof. Some or all of these views may be used with any other suitable views. In one embodiment, the system uses a hypertext interface, such as HTML, MICROSOFT™ Active Server Pages, or the like. In one embodiment, the system is accessed via a secure system, such as a local area network or the like. For example, the system may be hosted using an in-house server with one or more local computers. However, any network may be used, including wide area networks, the Internet, or the like. Further, the system may be implemented using one or more computers. A skilled artisan will understand that embodiments may have a user interface implemented via deployed software applications such as computer or smart phone applications, with any databases and other application logic running either on those same devices or remotely.

As described with respect to some embodiments herein, persons employed at an automobile dealership use the system; however, other suitable uses are contemplated outside of the automobile context. Further, although in some embodiments particular features are described with reference to a salesperson and a management person, any persons may use some or all aspects of the embodiments of the system.

Computing Systems

A computing system in accordance with various embodiments can be in communication with one or more clients, one or more data sources, one or more networks, or any combination thereof. The computing system may be used to implement one or more of the systems and methods described herein. While various disclosed embodiments may describe particular implementations of the computing system, it is recognized that the functionality provided for in the components and modules of the computing system may be combined into fewer components and modules or further separated into additional components and modules.

Modules

It will be apparent to a skilled artisan, in light of this disclosure, that the system and method described herein can advantageously be implemented using computer software, hardware, firmware, or any combination of software, hardware, and firmware. In one embodiment, the system is implemented as a number of software modules that comprise computer executable code for performing the functions described herein. In one embodiment, the computer-executable code is executed on one or more general purpose computers. However, a skilled artisan will appreciate, in light of this disclosure, that any module that can be implemented using software to be executed on a general purpose computer can also be implemented using a different combination of hardware, software, or firmware. For example, such a module can be implemented completely in hardware using a combination of integrated circuits. Alternatively or additionally, such a module can be implemented completely or partially using specialized computers designed to perform the particular functions described herein rather than by general purpose computers.

It will also be apparent to a skilled artisan, in light of this disclosure, that the modules described herein can be combined or divided. For example, a skilled artisan will appreciate, in light of this disclosure, that any two or more modules can be combined into one module. Thus, referring to FIG. 39, the information retrieval module 3930 and the financial terms comparison module 3935 can be combined into a single module that performs the functions of both modules. Conversely, any one module can be divided into multiple modules. For example, the information retrieval module 3930 can be divided into multiple modules such that each individual module performs part of the functions of the information retrieval module 3930 and all of the modules collectively perform all such functions.

In general, the word "module," as used herein, refers to logic embodied in hardware or firmware, or to a collection of software instructions, possibly having entry and exit points, written in a programming language, for example, COBOL, CICS, Java, Lua, C, or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules described herein are preferably implemented as software modules, but may be represented in hardware or firmware. Generally, the modules described herein refer to logical modules that may be combined with other modules or divided into sub-modules despite their physical organization or storage.

Databases

Similarly, a number of data sources, data nodes, databases, or database services are described herein. A skilled artisan will appreciate, in light of this disclosure, that any two or more databases can be combined into one database and that any one database can be divided into multiple databases.

A computing system in accordance with various embodiments can include one or more internal and/or external data sources. For example any data used by the system may be stored in whole or in part in the computing system or may be stored in whole or in part on another system. In some embodiments, one or more of the data repositories and the data sources may be implemented using a relational database, such as DB2, Sybase, Oracle, CodeBase and Microsoft® SQL Server as well as other types of databases such as, for example, a flat file database, an entity-relationship database, and object-oriented database, a record-based database and/or a key-value store.

Distributed Processing

A skilled artisan will also appreciate, in light of this disclosure, that multiple distributed computing devices can be substituted for any one computing device illustrated herein. In such distributed embodiments, the functions of the one computing device are distributed such that some functions are performed on each of the distributed computing devices. Distributed processing can take place over a network, such as a LAN, WAN, or the Internet, for example, via a wired, wireless, or combination of wired and wireless, communication link. The network can communicate with various computing devices and/or other electronic devices via wired or wireless communication links.

Access to a distributed computing system in accordance with various embodiments can be provided through a web-enabled user access point such as a client's or data source's personal computer, cellular phone, laptop, or other device capable of connecting to the Internet. Such a device may have a browser module implemented as a module that uses text, graphics, audio, video, and other media to present data and to allow interaction with data via the network. The browser module may be implemented as a combination of an all points addressable display such as a cathode-ray tube (CRT), a liquid crystal display (LCD), a plasma display, or other types and/or combinations of displays. In addition, the browser module may be implemented to communicate with input devices and may also include software with the appropriate interfaces which allow a user to access data through the use of stylized screen elements such as, for example, menus, windows, dialog boxes, toolbars, and controls (for example, radio buttons, check boxes, sliding scales, and so forth). Furthermore, the browser module may communicate with a set of input and output devices to receive signals from the user. The input device(s) may include a keyboard, roller ball, pen and stylus, mouse, trackball, voice recognition system, or pre-designated switches or buttons. The output device(s) may include a speaker, a display screen, a printer, or a voice synthesizer. In addition a touch screen may act as a hybrid input/output device. In another embodiment, a user may interact with the system more directly such as through a system terminal connected to other components of the system without communications over the Internet, a WAN, or LAN, or similar network.

In some embodiments, the system may include a physical or logical connection established between a remote microprocessor and a mainframe host computer or server computer for the express purpose of uploading, downloading, or viewing interactive data and databases on-line in real time. The remote microprocessor may be operated by an entity operating the computer system. The entity operating the computer system can host one or more systems for one or more client entities (e.g., for distributors or dealerships), and each client entity's data can be maintained, secured, and accessed separately. In this manner, the entity operating the computer system can provide distributed access to the computer system (e.g., as described above) on a software-as-a-service basis.

In some embodiments, terminal emulation software may be used on the microprocessor for participating in the micro-mainframe link. In other embodiments, clients who are internal to an entity operating the computer system may access the system internally as an application or process run by the CPU.

System Components and Distributed Processing

Figure 34:
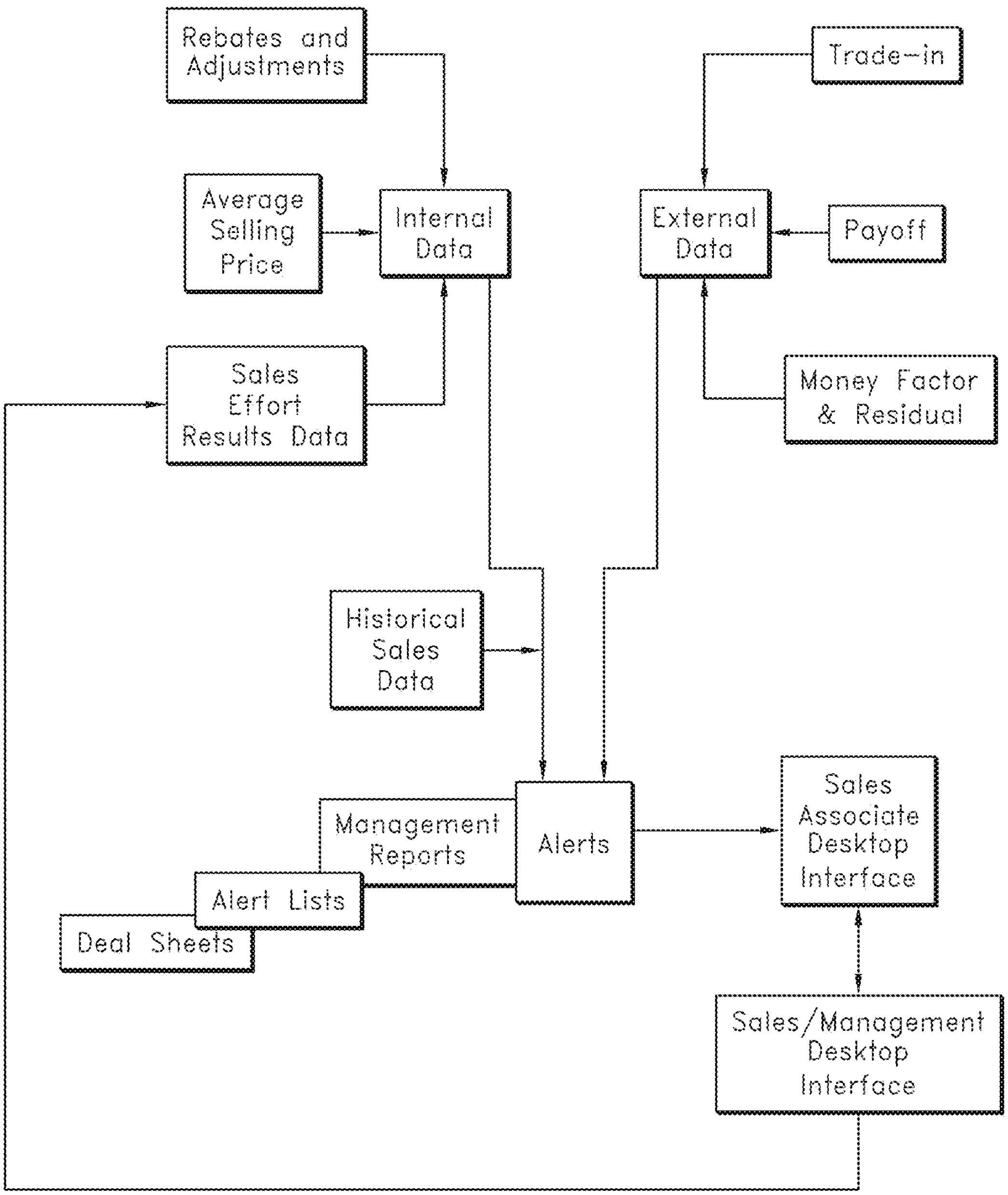
FIG. 34 is a block diagram illustrating how, in one embodiment of a financial alert generation system, internal data, external data, and historical data are used to generate one or more alerts.

FIG. 34 illustrates an embodiment in which internal data, external data, and historical data are used to generate one or more alerts. The external data comprises trade-in data, payoff amount data, money factor data, and residual data. The internal data comprises rebates and adjustments, average selling price data, and sales effort results data. Management reports, alert lists, and deal sheets are advantageously provided. Further, a sales associate may access the system via a sales associate interface and a manager may access the system from an interface.

Alerts in the system of FIG. 34 are generated at the Alerts block. Details of the alert generation aspect are described in more detail below. The Alert block uses internal data, external data, and historical sales data to process customer information and generate deal sheets, alerts, and reports. Internal data, shown as the Internal Data block, can include information about rebates and adjustments, average selling prices, sales effort results data, and the like. External data, shown as the External Data block, can include information about trade-ins, payoffs, money factors and residuals, and the like. It should be understood that internal and external data can also include many other kinds of information including, but not limited to, financial information, customer information, retail information, market information, trend information, insurance information, vehicle registration information, or any other relevant data.

The Alerts block of FIG. 34 can be implemented as a module, comprising any combination of hardware, software, or both. In various embodiments, the Alerts block is implemented as an executable process or script running on a server. The script can run, for example, as a single process, a multi-threaded process, multiple processes on a single machine, multiple processes on separate machines, or as a transparently provided distributed process with resources that are dynamically provisioned. In some embodiments, the script can be implemented as coordinated distributed processes that communicate, for example, using an implementation of inter-process communication, remote procedure calls, the Message Passing Interface (MPI) standard, or the like. The Alerts script can, as described herein, access dealer and customer information, as well as other internal and external data, to generate and process alerts.

In various embodiments similar to FIG. 34, the system can maintain data for a plurality of client entities, for example, dealerships or service centers. Data for the client entities can be stored together, separately, locally, or remotely. In such embodiments, an Alerts script can generate and process alerts continually, periodically, in response to specified events, in response to monitored parameters, or in response to updated information (e.g., from customers, banks, retailers, manufacturers, or any other relevant data source). The Alerts script can, for example, process alerts for client entities sequentially, according to a schedule, according to a prioritized list or queue, according to available resources, or all at once. For example, client entities can be ordered on a prioritized list, and processing for client entities with higher priorities can be completed before processing for client entities with lower priorities.

Figure 73:
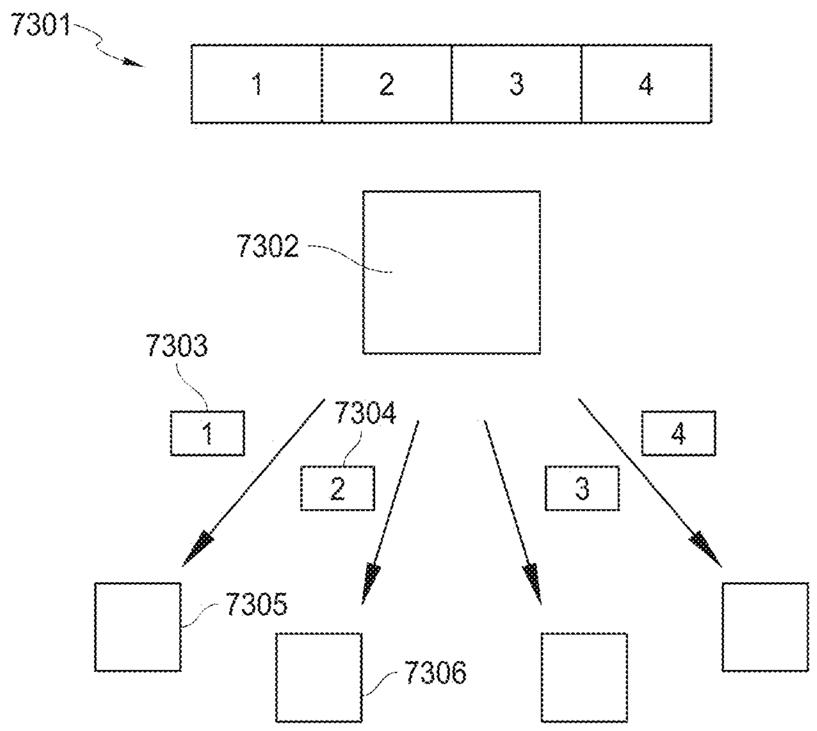
FIG. 73 illustrates an example of a distributed system for processing alerts and deal sheets in one embodiment of a financial terms alert generation system.

In various embodiments, the Alerts script can be implemented as a distributed system. FIG. 73 shows an example of an embodiment where a first processing node 7302 begins processing alerts for a client entity and distributes the processing among a number of processing nodes (e.g., processors, processes, scripts, machines, virtual machines, data centers, cloud computing services, the like, or combinations thereof). In FIG. 73, the first processing node 7303 begins processing alerts for customer information of four client entities (e.g., four distinct dealerships). The customer information is illustrated as a data set 7301 having four components corresponding to the four client entities. The first processing node 7302 can divide the customer information 7301 into four segments (e.g., data segments 7303 and 7304) corresponding to the four client entities. It is important to note, however, that the customer information need not be divided up by client entity. In various embodiments, for example, customer information 7301 can correspond to customer information for a single client entity and can be divided for processing into a plurality of segments. Each data segment can then be distributed to a processing node (e.g., one of processing nodes 7305 and 7306). Each processing node can then perform the requested processing tasks (e.g., alert or deal sheet generation) on its segment of the data. The results from each processing node, for example, can be returned to first processing node 7302, stored by the processing node in a database, or a combination of both.

Figure 74:
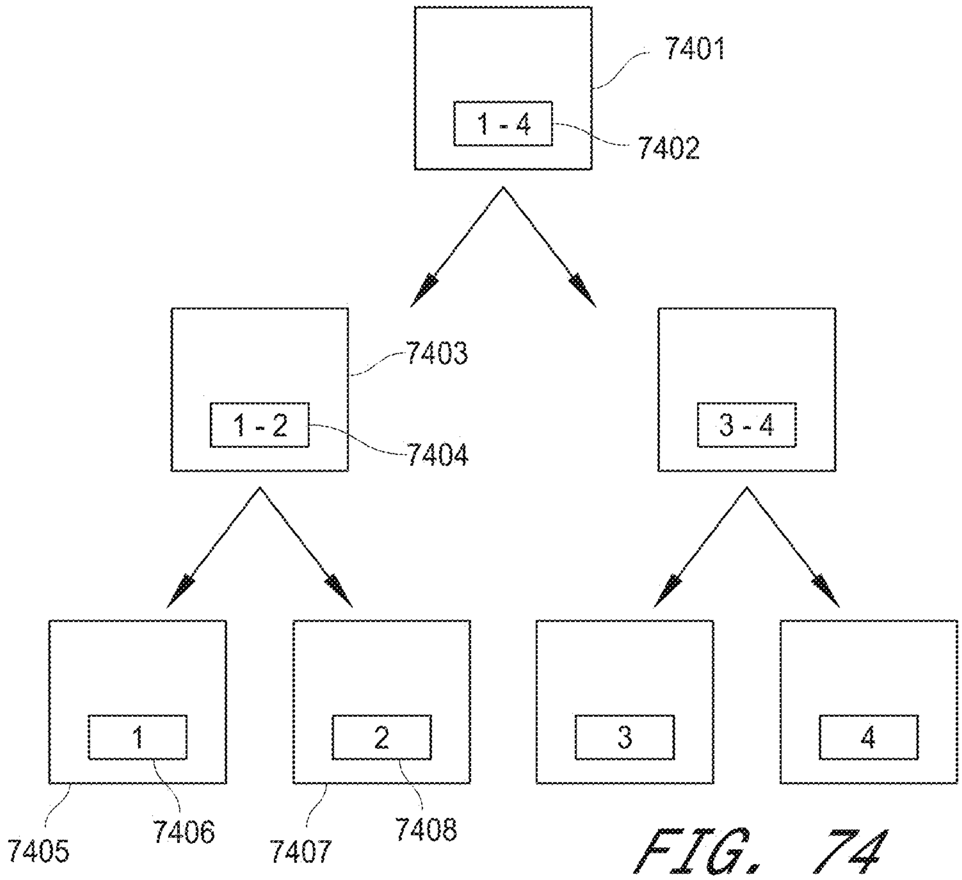
FIG. 74 illustrates an example of a distributed system for processing alerts and deal sheets in one embodiment of a financial terms alert generation system.

In various embodiments, including embodiments illustrated by FIG. 74, the processing nodes can begin processing customer deal sheets and alerts, can further divide and distribute processing tasks, or both. For example, in FIG. 74, a first processing node 7401 can divide customer information 7402 into multiple segments and distribute the segments to multiple processing nodes. Upon receiving an information segment 7404, a processing node 7403 can further divide the information segment (e.g., into information segments 7406 and 7408) and distribute the divisions to additional processing nodes (e.g., to processing nodes 7405 and 7407). A processing node can, for example, continue to distribute processing tasks when its resource utilization is above a specified threshold or when the portion of client entity processing or data allocated to it exceeds a determined amount. In various embodiments, Alert processing for a client entity can take place by dividing the processing task into a plurality of subtasks and distributing the subtasks to a plurality of processing nodes to be processed in parallel.

The Sales Associate Desktop Interface (SADI) block in FIG. 34 can provide a user with access to the system. Although the SADI block of FIG. 34 is illustrated as a dealer desktop interface, it should be understood that the interface can provided to any user, including for example dealers, customers, service shops, financiers, insurance brokers, or any other users. The functionality provided to the interface can depend on the category of user. Further, although the SADI is illustrated in the context of a desktop interface, it should be understood that the interface can be provided on any appropriate interface device such as a desktop computer, laptop computer, tablet computer, smartphone, e-reader, multimedia device, television, or any other electronic device with a user interface. Also for example, the interface can be provided via a script, form, application, web-page, smartphone or tablet app, or any other appropriate mechanism for providing an interactive user interface. A user can use the interface to interact with the system in any manner disclosed herein, for example, to view and manage alerts, deal sheets, customer information, product information, sales information, reports, the like and combinations thereof. In various embodiments, the interface can provide some or all of the functionality of the system as disclosed herein and as shown, for example, in FIGS. 67-72.

Figure 39:
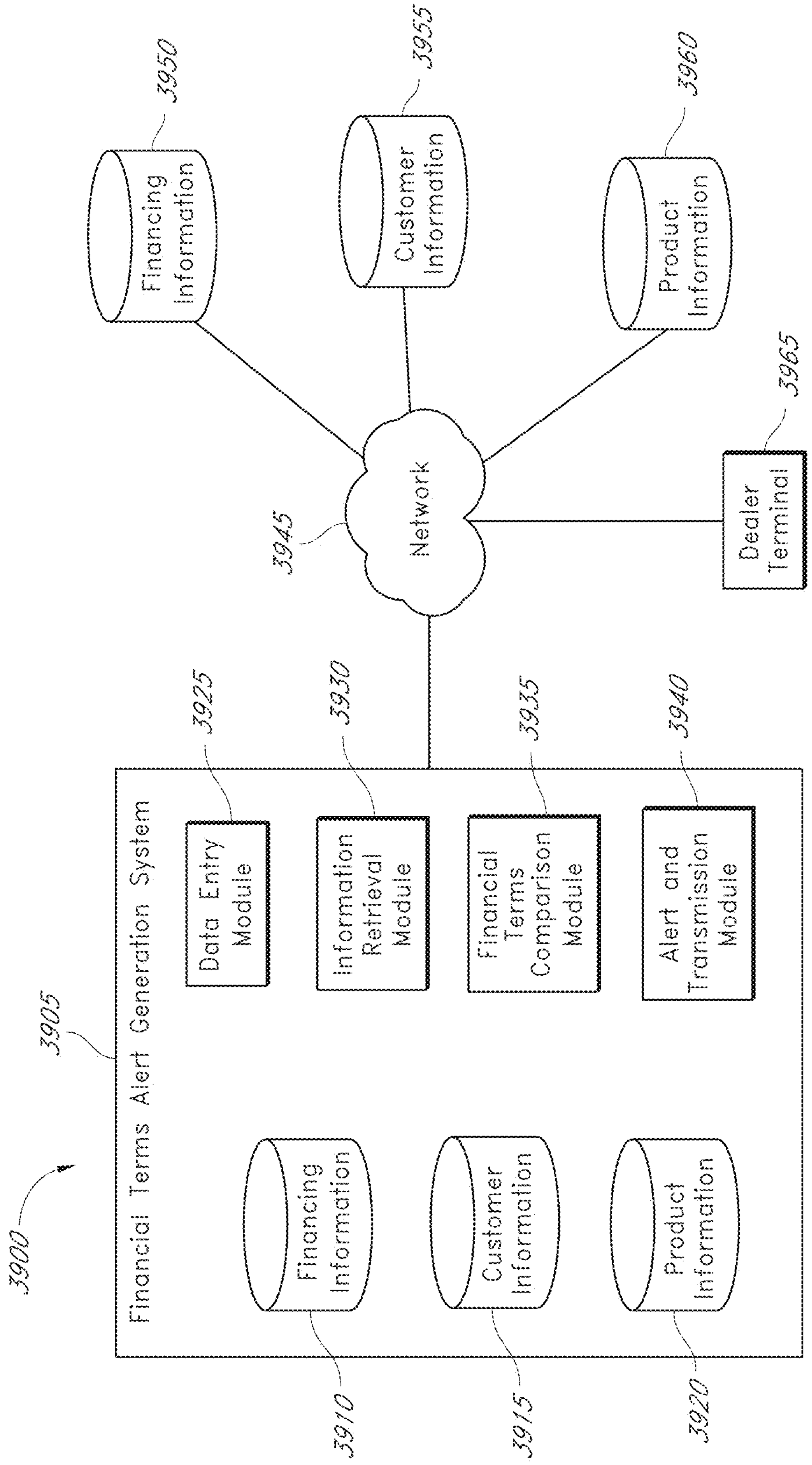
FIG. 39 is a block diagram that illustrates one embodiment of a financial terms alert generation system attached to a computer network.
Figure 40:
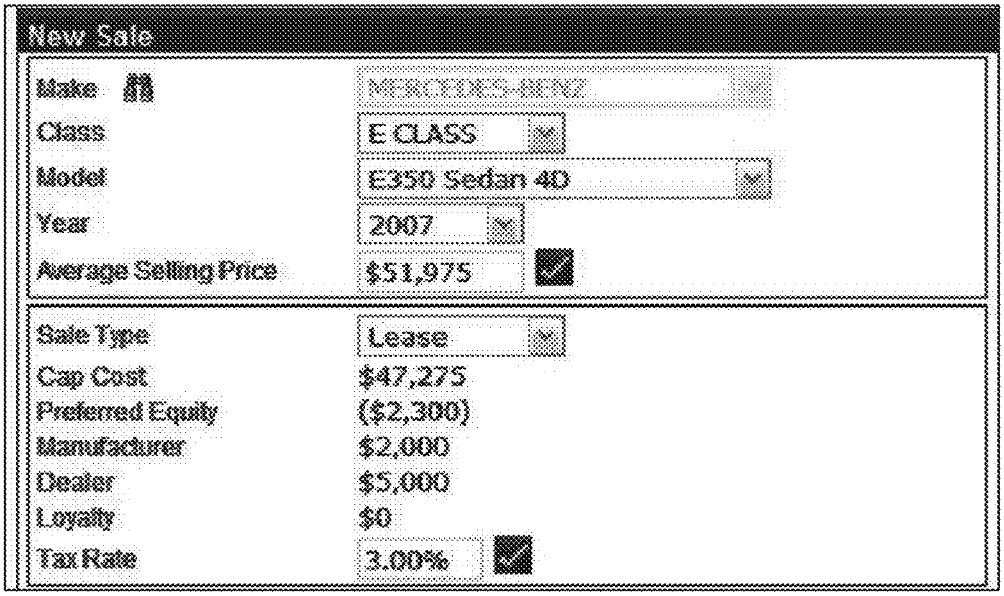
FIG. 40 is an example screen shot that illustrates a class selection feature of one embodiment of a financial terms alert generation system.

FIG. 39 illustrates a financial terms alert generation system attached to a computer network, according to one embodiment of the system described herein. A financial terms alert generation system 3905 comprises financing information 3910, customer information 3915, product information 3920, a data entry module 3925, an information retrieval module 3930, a financial terms comparison module 3935, and an alert transmission module 3940. The financial terms alert generation system 3905 is preferably connected, via a computer network 3945, to external financing information 3950, external customer information 3955, external product information 3960, and at least one dealer terminal 3965. In some embodiments, the financing information 3910, customer information 3915, and product information 3920 does not exist permanently within the financial terms alert generation system, but is retrieved from external sources 3950, 3955, and 3960, as needed. In other embodiments, at least portions of the financing information 3910, the customer information 3915, and product information 3920 is stored permanently within the financial terms alert generation system 3905 to provide local storage and caching of data. A skilled artisan will appreciate, in light of this disclosure, that the illustrated storage and modules can be distributed across multiple network hosts rather than being centralized in one location.

In one embodiment, the data entry module 3925 is configured to receive input from a user to enter or modify data stored in the financing information 3910, the customer information 3915, the product information 3920, the external financing information 3950, the external customer information 3955, or the external product information 3960. In general, the data entry module 3925 is not used for a large percentage of data entry, because the information retrieval module 3930 generally automatically retrieves information from sources available on the network 3945. However, advantageously the data entry module 3925 provides a manual tool for entering data for cases in which a user desires to fine tune the information stored in the databases. For example, in certain cases, a dealership may have special incentive programs that are not captured in sources available on the network 3945, and a dealer may want to manually enter data that takes such special incentive programs into account.

In one embodiment, the information retrieval module 3930 is configured to automatically retrieve information about products, customers, and financing from sources available on the network 3945, such as, for example, from the external financing information 3950, the external customer information 3955, and the external product information 3960. Upon retrieving such information from sources available on the network 3945, the information retrieval module 3930 makes the information available to the financial terms alert generation system 3905, such that the system 3905 can use the information in order to perform the calculations necessary to determine whether a customer can advantageously enter a new lease or purchase transaction. For example, in one embodiment, the information retrieval module 3930 stores the retrieved information in local storage accessible to the financial terms alert generation system

3905, such as by storing the information in the financing information 3910, the customer information 3915, and the product information 3920. Alternatively or additionally, the information retrieval module 3930 can store the information in memory rather than in local storage. A skilled artisan will appreciate, in light of this disclosure, a variety of techniques for retrieving information from sources available on the network 3945, including, for example, by scraping public websites. In light of these known techniques, a skilled artisan will readily understand, in light of this disclosure, how to implement the information retrieval module 3930.

Advantageously, by automatically retrieving a large amount of information relating to products, customers, and financing, the information retrieval module 3930 contributes to the ability of the financial terms alert generation system 3905 to generate a large amount of alerts regarding financing opportunities in a timely fashion such that dealers can be informed of such opportunities in time to convert many such opportunities into sales. Advantageously, the automation provided by the information retrieval module 3930 also allows for periodic alert generation based on up-to-date information. Accordingly, the financial terms alert generation system 3905 can generate alerts whenever new information is retrieved by the information retrieval module 3930 that affects whether customers are able to advantageously enter a new lease or purchase transaction.

In one embodiment, the financial terms comparison module 3935 performs comparisons and calculations necessary to generate deals and alerts. For example, it can be determined whether a customer is able to advantageously enter a new lease or purchase transaction, and a corresponding alert can be generated. In one mode of operation, the financial terms comparison module 3935 performs batch comparisons periodically. In another mode of operation, the financial terms comparison module 3935 performs batch comparisons whenever new information is added to any one or more of the financing information 3910, the customer information 3915, or the product information 3920. In another mode of operation, the financial terms comparison module 3935 performs a comparison for a particular identified customer and returns results of such a comparison in real time. When operating in this mode, the financial terms comparison module 3935 can advantageously lead to the generation of an alert in real time while, for example, a customer is in a dealership showroom. Advantageously, the financial terms comparison module 3935, in one embodiment, is configured to be able to perform comparisons and calculations in any one or more of the above-described modes of operation, such that the most advantageous mode of operation under the circumstances can be chosen.

In various embodiments, financial terms comparison module 3935 can begin processing alerts for one or more client entities and distribute the processing among a number of processing nodes (e.g., processors, processes, scripts, machines, virtual machines, data centers, cloud computing services, the like, or combinations thereof). The processing nodes can begin processing alerts for client entity customers, can further divide and distribute processing tasks, or both. For example, a processing node can continue to distribute processing tasks when its resource utilization is above a specified threshold or when the portion of client entity processing or data allocated to it exceeds a determined amount. In various embodiments, alert processing for a client entity can take place by dividing the processing task into a plurality of subtasks and distributing the subtasks to a plurality of processing nodes to be processed in parallel.

Preferably, the financial terms comparison module 3935 compares each customer's current financial arrangements with potential financial arrangements for similar or related products in order to determine whether a replacement arrangement can be entered into on more favorable or almost as favorable terms. To perform such calculations and comparisons, the financial terms comparison module 3935 employs the comparison method steps and calculation formulas as are described herein above. Upon performing the calculations and comparisons, the financial terms comparison module 3935 generates information for an alert to a customer whenever a favorable replacement financial arrangement can be had.

In various embodiments, the system uses internal data, external data, or both. In one embodiment, the internal data comprises rebates, adjustments, average selling prices, historical sales data. In one embodiment, the external data comprises trade-in values, payoff values, money factors, and residual. In one embodiment, alerts are provided to any suitable person, including but not limited to outbound marketers (e.g., telephone or the like), salespersons, managers, or the like.

Example System Layout

Figure 75:
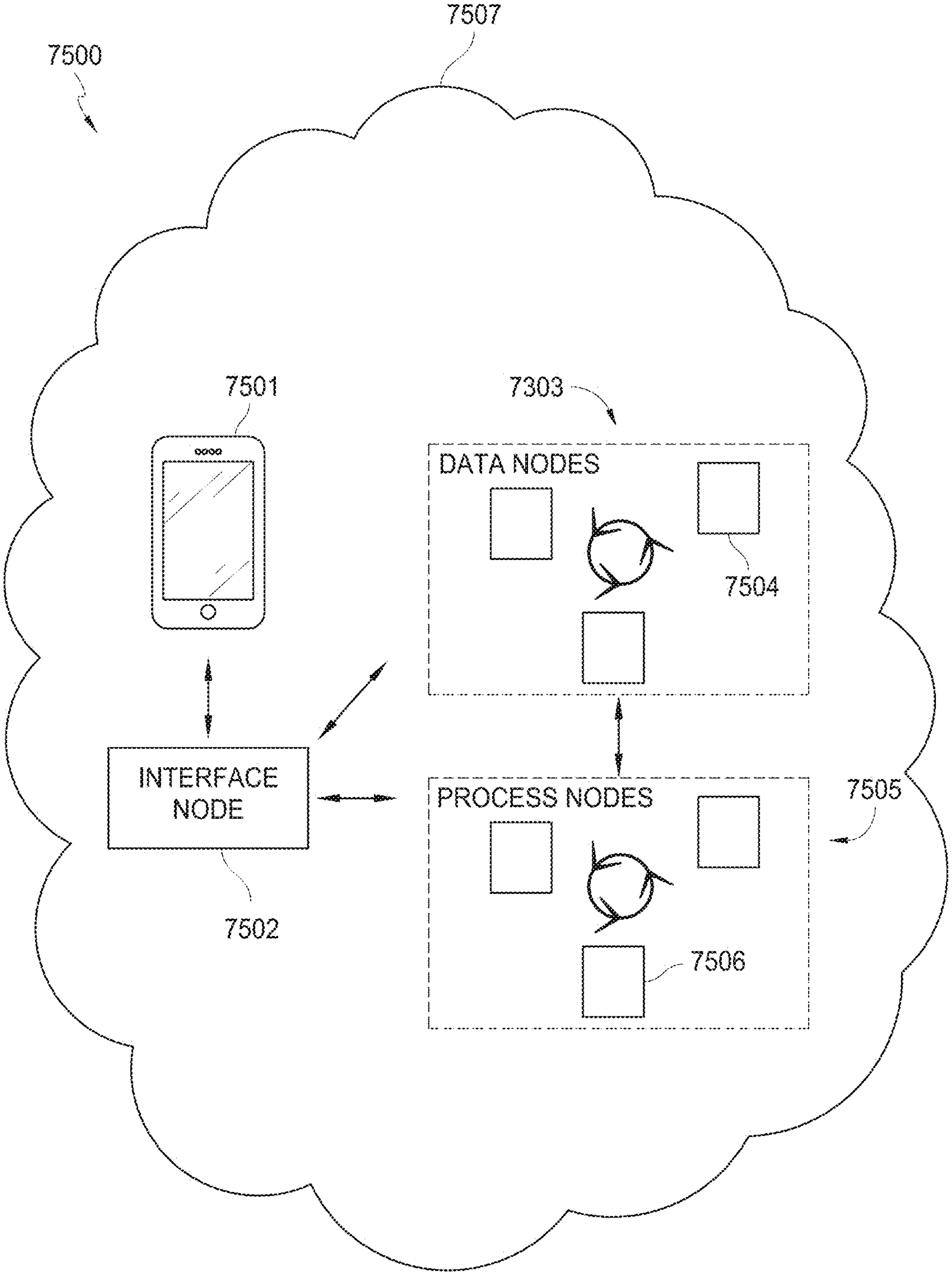
FIG. 75 illustrates an example layout of a financial terms alert generation system.

FIG. 75 shows an example layout for a system 7500 in accordance with various embodiments. It should be understood that the system illustrated in FIG. 75 is one perspective of an example system; it is not an exhaustive description of system components or functionality and is not mutually exclusive with respect to other features, embodiments, or illustrations in this disclosure.

The system 7500 is shown enclosed by a cloud interconnection 7507. The cloud interconnection 7507 is provided to indicate that the components of the illustrated system need not be local, remote, directly connected, or connected by a network. Rather, the components may be integrated, distributed, provided, or otherwise disposed in any appropriate manner which allows the components to provide the described functionality. Further, and as discussed elsewhere, the components need not represent distinct devices, applications, or processes and may be combined or divided in any manner that preserves the functionality of the system.

A user of the system may interact with a user device 7501 which provides a user interface. To provide the user interface, the user device 7501 can communicate with an interface node. The interface node 7502 can interact with other parts of the system, including data nodes 7503 and process nodes 7505, to provide requested functionality and data to the user. In various embodiments, the interface node 7502 communicates with data nodes 7503 to retrieve information on customer alerts and deal sheets. The interface node can organize, sort, filter, or otherwise prepare the alert, deal sheet, customer, and other information for presentation to the user. Via user device 7501, the user can view the presented data and issue further commands to the interface node. For example, the user can request additional data, filter or sort presented data, generate new deal sheets, enter customer information, or set alert or deal sheet parameters. In various embodiments, the interface node can be a web or application server configured to provide a user interface similar to that shown in FIGS. 67-72.

System data can be stored by one or more data nodes 7503. The data nodes 7503 can be located locally or remotely, and can be distributed across various platforms, networks, and devices. Collectively, the data nodes provide access to data used by the system. In various embodiments, the data nodes store customer, alert, deal sheet, financing, pricing, service, sales, and other information used by the system. In one example, the data nodes can store customer and alert information for a plurality of client entities, such as dealerships and service centers. Data for the various client entities can be maintained separately, for example in separate logical databases, or stored together, for example in a single database or table, and tagged with appropriate client entity information. Data for the various client entities can be provided or accessed together or separately, and such provisioning or access can depend on the requesting user or agent. In various embodiments, data nodes 7503 can be implemented using various database systems (e.g., as a mysql cluster or an Amazon Elastic Compute Cloud EC2 service) described elsewhere herein.

Process nodes 7505 can provide various services and functions. As with the data nodes 7503, the process nodes 7505 can be located locally or remotely, and can be distributed across various platforms, networks, and devices. Collectively, the process nodes provide various services. In various embodiments, the process nodes can provide alert and deal sheet generation functionality as, for example, described below. The process nodes 7505 can provide such functionality periodically, according to scheduled or received events, on-demand, based on stored rules, based on a prioritized list or schedule, or according to any other appropriate criteria. In various embodiments, the process nodes 7505 can provide periodic alert and deal sheet generation as a background service transparent to a user, as well as on-demand alert and deal sheet generation according to user requests. Process nodes 7505 also can, for example, receive and process updated alert and deal sheet generation criteria, such as alert thresholds, replacement product information, customer preference information, financial information, sale information, and the like. In various embodiments, process nodes 7503 can be implemented as an application, a service, multiple services, or as a distributed system such as an Amazon EC2 service or a computing cluster utilizing a high speed switched fabric interconnect. Alert and deal sheet generation, as can for example be provided by the process nodes 7505 is described in more detail below.

Alert and Deal Sheet Generation

As will be apparent to a skilled artisan in light of the foregoing disclosure, the system disclosed herein perform a number of useful processes for alerting a dealership when a customer is in a position to be offered a new and advantageous lease, warranty, purchase agreement, or other financial arrangement related to a new or current product. Advantageously, providing such information to a dealership in a timely fashion can drive a significant number of sales and leasing arrangements for a dealership. Accordingly, embodiments as described herein allow for the automated performance of a number of processes that can significantly increase dealership profits. Embodiments of such processes are described below with regard to FIGS. 36 through 38. Such processes can be performed, for example, using system architectures and components described above and elsewhere in this disclosure.

Various types of alerts, as previously discussed, can be generated. Thus alert generation can proceed in various ways. For example, alerts can be generated on a customer-by-customer basis, such that various categories of alerts are generated for a single customer before moving on to the next customer. In this manner, a customer's account can be checked for mileage alerts, service alerts, warranty alerts, contract end alerts, or any other type of alert at substantially the same time. It should be noted that, while some alerts will be produced as a result of generating a deal sheet and comparing it with a customer's current agreement, other alerts are generated by looking at the date, mileage, and other criteria of a customer's current product or agreement. For example, a customer's current mileage can be predicted and compared to mileage limitations of a lease agreement, warranty agreement, or service agreement. Also for example, the current date can be compared to a lease end date, a warranty expiration date, or a scheduled service date, and an alert can be generated when critical dates are approaching.

In various embodiments, when the system executes a process to generate an alert, a deal sheet is generated. The system can, for example, identify one or more replacement products associated with the current product and determine whether a payment associated with the replacement agreements is less than or equal to the sum of a payment associated with the current agreements and a certain threshold percentage value of the payment associated with the current agreement. For example, in one embodiment where the threshold percentage value is 10 percent, if a client leases a first automobile at $500 a month and a second associated automobile is available for lease at $550 a month, the system would generate an alert because the second automobile's payment is within 10%. Any suitable threshold percentage value may be used. In one embodiment, the threshold value is 5%. The threshold percentage value may be between and including 3% and 10%. Of course, the threshold percentage value may be at or about any suitable value. Further, this comparison of payments may be used to generate an alert alone, in combination with associations among products within the system, or in combination with any other suitable parameters. Further, alerts may be generated without reference to a comparison of payments. In another embodiment, the threshold is based not on a percentage but on a relative range, such as within $50 a month of the current agreement. In yet another embodiment, the threshold is based on an absolute range, such as payment of $400-$450 a month, without direct reference to the payment under the current agreement. Such ranges (percentage, relative, absolute, or other) may be one-sided (e.g., up to 10% higher but not any lower), unbounded (e.g., anything lower), and asymmetric (e.g., up to 10% higher or 20% lower, or $50 lower or $100 higher. Sill another embodiment allows thresholds to be specified in mixed modes (e.g., combining percentage and absolute values).

In some embodiments, additional fees (e.g., license fee, bank acquisition fee, or the like) may be required in addition to the replacement product payments. In some embodiments, the payments calculated for a replacement product includes fees (e.g., delivery charge, fuel-economy tax) related to the replacement agreement. The replacement product may have any suitable combination of features financed in its payment. In one embodiment, the replacement product includes a set of predetermined features. In one embodiment, a set of predetermined features includes automatic transmission, sunroof package, and metallic paint.

Figure 36:
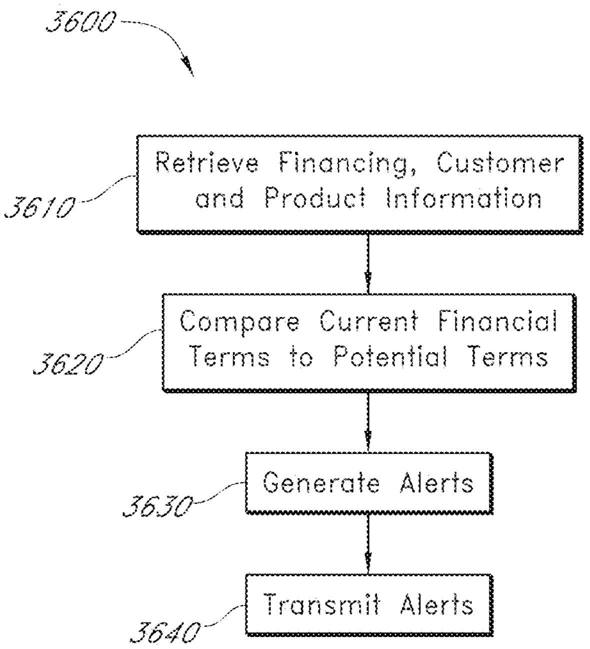
FIG. 36 is a flowchart that illustrates a process of alerting a dealership when a customer can be offered a new lease or other financial arrangement, as performed by one embodiment of a financial terms alert generation system.

FIG. 36 illustrates a process of alerting a dealership when a customer can be offered a new lease or other financial arrangement. Such a process 3600 commences with a block 3610. In the block 3610, the process 3600 retrieves customer information, financing information, and product information. Preferably, such customer information and financing information includes information about any leases or other financial arrangements that each customer is already involved in, along with information about financial arrangements currently available from financial institutions. Accordingly, such information provides a basis for allowing the process 3600 to compare current financial arrangements with potential financial arrangements to determine whether a customer can switch to an advantageous financial arrangement. In one embodiment, an automated information retrieval module, such as the information retrieval module 3930 of FIG. 39, automatically retrieves the customer and financial information from various electronic sources, such as, for example, public and private web pages, databases maintained by a dealership, external databases, and the like. A number of techniques for automatically retrieving such information are known to skilled artisans and can be employed to implement the information retrieval module 3930.

In a block 3620, the process 3600 compares each customer's current financial terms with potential financial terms being offered by financial institutions. Preferably, the comparison block 3620 takes into account all available financial variables that affect whether a customer can advantageously switch financial arrangements, including, for example, interest rates, payoff periods, amount due on the current financial arrangement, any dealer or manufacturer incentives currently available, and the like. The foregoing list of financial variables is exemplary and non-exhaustive; a skilled artisan will appreciate, in light of this disclosure, other financial variables that are relevant, under some circumstances, for determining whether a customer can advantageously switch financial arrangements. In one embodiment, a financial terms comparison module, such as the financial terms comparison module 3935 of FIG. 39, performs the processing of the block 3620.

In a block 3630, the process 3600 generates, based on the comparison of the block 3620, a number of alerts to inform a dealership that a customer can advantageously switch financial arrangements. It should be noted that alerts can be generated and provided based on a variety of different criteria including financial attractiveness of replacement agreements, lease dates and mileage allowances, warranty dates and mileage allowances, service dates and schedules, or any other parameters described herein. Such alerts can be generated, for example, at block 3630.

In one embodiment, the process 3600 generates an alert whenever the difference between the amount that a customer will pay for a new but comparable financial arrangement as compared to the customer's current financial arrangement is below a threshold value. For example, in one embodiment, the process 3600 generates an alert whenever the difference in payment amount is less 10%, such that, for example, an alert is generated when a new payment amount would be $540 and a current payment amount is $500. Alternatively, the process 3600 can be configured to generate an alert only when the difference between a new payment amount and a current payment amount is negative; that is, when the new payment amount is less than the current payment amount. A skilled artisan will appreciate, in light of this disclosure, that a wide variety of thresholds can be set depending on the particular types of sales opportunities that a dealer wants to know about. In one embodiment, the processing of the block 3630 is performed by the financial terms comparison module 3935. Alternatively, as will be apparent to a skilled artisan, the processing of the block 3630 can be performed by a separate module, such as, for example, an alert generation module.

In a block 3640, the process 3600 transmits the generated alerts to a dealership. Advantageously, the transmission of alerts informs the dealership of sales opportunities that may provide to the dealership a significant opportunity to boost profits. As will be apparent from the description of the system provided above, the alerts can be transmitted by email, pager, web page, database record, fax, or any other known method of transmitting electronic data. In one embodiment, the processing of the block 3640 is performed by an alert transmission module, such as, for example, the alert transmission module 3940 of FIG. 39.

Though additional blocks are not illustrated by FIG. 36, it will be apparent to a skilled artisan in light of this disclosure that the dealer can invoke additional processing of the alerts once the dealer has received the alerts. For example, the dealer can invoke the contact management and task management functions as have been described herein. Accordingly, in addition to alerting the dealer, embodiments of the system can perform a number of processes for managing alerts. Advantageously, such alert management provides dealers an effective way to follow up with each alert in a way that maximized the dealer's chances to convert an alert of a potential sale into an actual sale.

Figure 37:
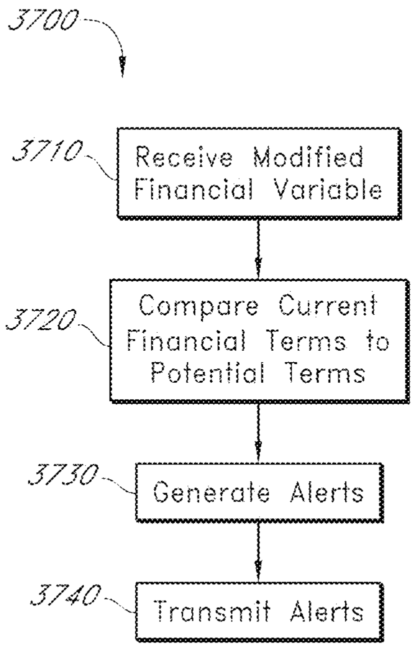
FIG. 37 is a flowchart that illustrates another embodiment of a process of alerting a dealership when a customer can be offered a new lease or other financial arrangement, as performed by one embodiment of a financial terms alert generation system.

FIG. 37 illustrates another embodiment of a process of alerting a dealership when a customer can be offered a new lease or other financial arrangement. In this embodiment, in a block 3710, the process 3700 receives at least one modified financial variable. For example, in one embodiment, the process 3700 may receive a financial variable that indicates that a dealer rebate has increased from $500 to $1,000.

Based on the new information, the process 3700 executes much of the same processing that was explained with regard to FIG. 36 in order to generate alerts that take into account the newly entered information. Advantageously, therefore, the process 3700 can be used by a dealer to answer questions such as "How many customers could be switched to a new financial arrangement if we increase the dealer incentive to $1,000?" In one embodiment, the modified financial variables received in the block 3710 are received by an automated process such as the information retrieval module 3930. In another embodiment, the modified variables are entered manually using a data entry module, such as, for example, the data entry module 3925 of FIG. 39. Advantageously, allowing for manual entry allows for great flexibility in allowing a dealership to change variables over which the dealership has control in order to determine whether new sales opportunities can be generated.

As indicated, the process 3700 performs much of the same processing that is performed by the process 3600. In a block 3720, the process 3700 compares current financial terms to potential financial terms, substantially as explained with respect to the block 3620. In a block 3730, the process 3700 generates alerts, substantially as explained with respect to the block 3630. In a block 3740, the process 3700 transmits the alerts, substantially as explained with respect to the block 3640.

Real-Time Generation

Figure 38:
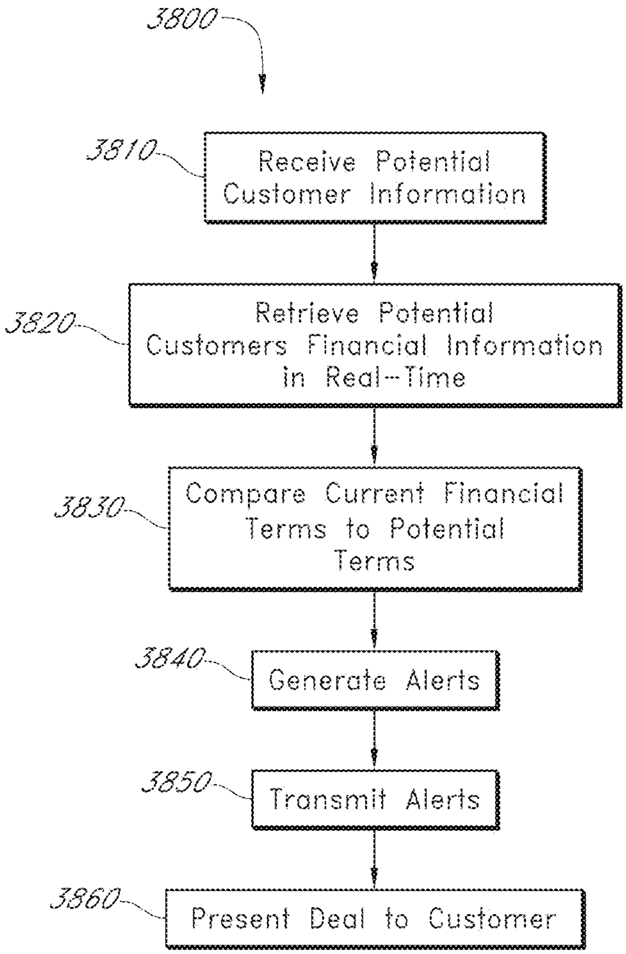
FIG. 38 is a flowchart that illustrates process for detecting and presenting a deal to a customer in real-time, as performed by one embodiment of a financial terms alert generation system.

Advantageously, one embodiment of the system can be used to determine, in real time, whether a deal can be presented to a customer, while the customer is, for example, in a dealership showroom. FIG. 38 illustrates such a process for detecting and presenting a deal to a customer in real-time. The process 3800 commences, in a block 3810, to receive a potential customer identification. In one embodiment, a potential customer identification, such as, for example, a customer number, can be entered manually into the system using the data entry module 3925. In a block 3820, the process 3800 retrieves the potential customer's financial information in real-time. In a block 3830, the process 3800 compares the current financial terms of the financial arrangements associated with the identified potential customer with potential financial terms for comparable financial arrangements, substantially as explained with regard to the block 3620. In a block 3840, the process 3800 generates alerts, substantially as explained with regard to the block 3630. In a block 3850, the process 3800 transmits the alerts, substantially as explained with regard to the block 3640. In a block 3860, the dealership uses the transmitted alert to present a deal to the potential customer. Advantageously, the entire process 3800 occurs while the potential customer is still in the presence of the dealer, giving the dealer a higher probability to derive increased sales based on the alerts.

Alert Parameters and Replacement Products

Much of this disclosure has addressed a scenario alerts or opportunities relates to informing a customer or potential customer (e.g., a Conquest™ or conversion) if there is an attractive opportunity to enter a new agreement for a product similar to the one for which the customer has a current agreement (e.g., the same make and model car, but a new year; the same make and a similar model; or a comparable make and model). Some embodiments allow a user (e.g., a customer or a dealer) to specify the properties of desirable new agreements (for example, monthly payments and agreement duration) and will create alerts or opportunities when agreements having those properties are available, regardless of the make and model that is the subject of those agreements. Any subset of the terms applicable to an agreement may be the basis for such a search, and ranges may be specified for one or more of the terms. Such ranges, as discussed above, may be quite flexible: e.g., as a percentage of a value, as an absolute range, or as a numerical range; and may be denominated as appropriate for the term in question (e.g., in years, months, dollars, miles, etc.). A variety of user interfaces may support creating such searches, including searches with ranges. Searching based on agreement terms may be combined with searching based on product terms, such that an agreement-based search (such as one described in this paragraph or the like) may also include elements limiting it to a particular make and/or model, a particular product year, or to products that are considered similar or comparable to a particular product, as described above. A search may also be run against particular one or more categories or subcategories of products (e.g., fuel efficient, hybrid, luxury). Thus, an embodiment is broadly capable of allowing alerts whenever a combination of attractive agreement terms and attractive product terms is available, where attractive can be defined in terms of any of the product or agreement properties maintained or accessed by the embodiment.

In various embodiments, a manager or sales representative can adjust the rebates and finance parameters to change when a deal sheet is considered an alert. Thus, a person may try various scenarios and view the results. For example, if an automobile dealership is considering a $1,000 rebate for a certain model of automobile, a manager could enter the $1,000 rebate into the system and then evaluate the number of new alerts generated by this rebate. Similarly, the manager could view the results from altering the interest rate, money factor, or any other suitable parameter associated with an alert.

In various embodiments, a current product is associated in the system with one or more replacement products. Accordingly, when the system executes a process to generate a deal sheet, the system determines the one or more replacement products associated with the current product and displays a deal sheet for those one or more replacement products. Associations may be made in any suitable manner, including but not limited to a database, a data file, or the like. In one embodiment, a particular make, model, and year of an automobile may be associated with one or more other combinations of make, model, and year. In this embodiment, when the system executes a process to generate a deal sheet, the system identifies the make, model, and year of the current product and display a deal sheet with associated combinations of make, model, and year. In one embodiment, these associations are entered manually into the system for general use (e.g., a manager determines that customers generally would accept particular types of replacement products for certain types of current products).

Any suitable way of determining what replacement products to display may be used. For example, where a client requests a particular make, model, and year, the system may advantageously receive that particular make, model, and year and display a corresponding deal sheet. Although automobiles may be categorized using make, model, series, class, year, or the like, any suitable category, classification, or grouping of automobile may be used to create associations for a client's current automobile and a replacement automobile. Further, for current products or replacement products, any category, classification, or grouping may be used to association current products with replacement products. In some embodiments, a replacement product may comprise one or more automobiles among the dealership's new or pre-owned inventory, a new car offered by a manufacturer, or an automobile from any other suitable provider.

Alert Notification and Presentation

In one embodiment, the alert transmission module 3940 receives alert information generated by the financial terms comparison module 3935 and transmits the alerts to a dealer. In one embodiment, the alert transmission module 3940 transmits the alerts to a dealer terminal 3965 via email. Alternatively or additionally, the alert transmission module 3940 can be configured to transmit alerts via pager, telephone, fax transmission, a webpage accessible to the dealer terminal 3965, or any other known mechanism for communicating information using electronic devices. In one embodiment, the alert transmission module 3965 is configured to transmit, store, or present an alert to the dealer terminal 3965 in real time, such that the dealer receives the alert, for example, while a customer is still in a dealership showroom. Such real time alert generation and transmission can be advantageously employed to generate an alert for each customer that comes into a dealership's service department. That is, whenever, the customer brings a product to be serviced, the dealership can quickly run a comparison and generate any alerts, as applicable, to determine whether the customer can advantageously enter into a new lease or purchase transaction. If the customer can enter into such a transaction under favorable terms, the dealer can use the information from the alert to make an offer to the customer while the customer is in the service department. Advantageously, this usage of the financial terms alert generation system 3905 can lead to a substantial increase in sales, as it has been found that at any given time, approximately eight percent of customers can enter new loans or leases on favorable terms. Advantageously, the financial terms alert generation system 3905 identifies a large percentage of those customers that can enter new loans or leases on favorable terms.

In one embodiment, when a client with a current agreement visits a dealership, information sufficient to identify the client is provided to the system. For example, in one embodiment, the current product's vehicle identification number is entered into the system. In response, a deal sheet or an alert sheet associated with the client's current agreement may advantageously be created. In one embodiment, a notification is automatically sent to one or more persons at the dealership. Thus, persons at a dealership may proactively offer the client with potential replacement agreements. For example, in one embodiment, when a client visits a dealership for car maintenance, a car maintenance system may automatically communicate with the system to generate a notification to a salesperson.

In some instances, the lease or contract-ending customers may advantageously be directed to a contract-ending specialist who can adjust the parameters on the remaining months left.

In one embodiment, the alerts will be integrated into an enterprise software system that tracks client-customer contact, facilitates outreach, facilitates follow through, or the like. For example, in one embodiment, the alerts are integrated into a Customer Relationship Manager (CRM) system that will function with one or more aspects of the daily working of an automotive dealership to include sales representatives, business development centers, call centers, lease termination departments, managers, finance departments and service departments. Thus, interaction with various aspects of these systems may advantageously trigger a notification of a potential replacement contract. For example, when a call center receives a call from the client, the call center's system would preferably access the alert aspects of the system and, if an alert was associated with the client, the call center's system would be automatically notified. In one embodiment, a person may be notified of new alerts, lease endings, or the like via a pop-up screen, an email, or the like. In one embodiment, a person may be notified of new alerts, lease endings, or the like via a wireless transmitter (e.g., PDA, cellular phone), a wired transmission (e.g., telephone), or any suitable method. Any suitable person may receive such notifications.

In one embodiment, a local distributor tracks the identity of a person that sold the client the current product, and the system uses that information to route one or more alerts related to that client's current product to the person. In one embodiment, any suitable person may receive an alert.

Customer Interface

Much of this disclosure has been described in terms of how a dealer or salesperson might use embodiments of aspects of these systems and methods to be able to convert potential customers to actual customers, to provide current customers additional value, to identify new sales opportunities, to identify high-probability sales opportunities, and the like. These embodiments and other embodiments may also be used by other categories or types of users.

For example, an embodiment accessible to current customers may allow them to configure their preferences and search terms as described above and allow them to review agreements from one or more sources, including sources other than their current dealer. Thus, a customer with a particular make and model might use such a system to identify opportunities to obtain a different product but with a similar payment. Or a customer may use such a system to identify opportunities to enter a new, more favorable agreement, for their current product. Some such embodiments will have access to a full range of agreement, warranty, and product information as discussed above. Other such embodiments may have access to agreement information only from specific lenders or to product information only about products in a particular dealer's inventory or from a particular manufacturer. These limitations may be in place because the embodiment is offered by a particular manufacturer or lender, for example, or because the embodiment is a limited or non-premium version. In some embodiments a user can pay an additional fee or otherwise obtain access to more information.

In addition to different underlying information, embodiments accessed by the general public (as opposed to dealers or, for example, loan counselors or bankers) may differ from the embodiments discussed above in that members of the general public will typically not be able to see opportunities, alerts, or details about other individuals. They may be able to create a variety of different types of alerts and opportunities relevant to themselves (e.g., establish multiple alerts for different payment levels).

Web Interface

In various embodiments, a customer interface can be provided via a website, web service, or other resource over a network such as the Internet. Current customers can be permitted to log in or otherwise verify their identities so that their existing personal, account, asset, or other information can be retrieved and used by the system. Such information can include contact information, purchase and lease information, service history, sales leads, the like, and combinations thereof. In some embodiments, for example, a customer's information can include information about prior sales inquiries by the customer, prior deals offered to the customer, products or services in which the customer has expressed interest, and the like. New customers can be allowed to use the service without filling out any personal information. In other embodiments, the customer can fill out a brief questionnaire about herself, including information about her current products and financial agreements. In still other embodiments, the customer can provide account, login, or security information to the service, and the service can retrieve the customer's profile and other information from the appropriate resource, for example, a remote server associated with the customer's home dealership, service center, or financier.

Customers who choose not to provide any information can be presented with deals based on statistics, rules, or other calculations associated with any available information about the customer. For example, the user's IP address can be used to determine an approximate location, and mean or median information for other customers in that area can be used to determine attribute values which can be used in initial offers or deal calculations. Also for example, information about the device and software from which the user is accessing the system, provided for example in a user agent string, can be used to determine base attribute values for the customer based on statistical correlations in existing customer data. The customer can be notified that the relevance and desirability of any deals or offers presented may be increased by providing additional information.

Customers can also be prompted to enter, instead of or in addition to personal information, information about desired offers or deals. This information can include parameters such as desired makes, models, prices, years, styles, sizes, the like, or combinations thereof. In some embodiments, information provided by a customer can be supplemented using the statistical or rule based techniques discussed above.

Based on the information retrieved about the customer, including any existing or retrieved customer information and any data inputted by the customer, the system can use the techniques disclosed in this application to determine one or more deals or offers. The deals or offers can be presented to the customer, and the customer can view details about the deals and compare them to each other or to other deals. The customer can also be provided with sorting and filtering controls, which can enable the user to find deals of interest. The customer can also have the option of refining the results by changing parameters or entering new search criteria. The deals can be provided in list form or displayed graphically with, for example, pictures of the products. The customer can also be provided with information about the dealer, location, or time associated with the deal. Optionally, the customer can save, send, post, share, or otherwise distribute one or more of the deals.

In some embodiments, the user can select an option to cause her device automatically to dial, video chat, email, message, or otherwise initiate contact with the dealer. In still other embodiments, the user can select an option to indicate that she would like the dealer to contact her regarding the deal. Upon selecting such an option, the system can alert the dealer or the dealer's computer system of the customer's inquiry. The system can include in the alert any information known about the customer, the deals offered to the customers, the deals selected by the customer. If the dealer has implemented a system as described in this disclosure, the dealer's system can automatically schedule a call or other contact with the customer, assign the task to a representative, calculate additional deal information, and attempt to retrieve any information locally or remotely available about the customer. The customer's request can, for example, be given a high priority and immediately dispatched to one or more available representatives.

In various embodiments, additional deals or offers can be provided directly to the customer via the web interface or via email. For example, based on the customer's profile, location, entered search criteria, viewed deals, or the like, the customer can be provided with relevant deals or offers. For example, the customer can be provided with limited time offers or sales related to deals in which the customer has expressed interest, or notified of offers or sales in her geographic area. The offers can be purely informational, or they can be interactive. In some embodiments, the offers can provide an option for the customer to accept the deal, express interest in the deal, request a dealer contact about the deal, or view contact information for the dealer.

The web-based interface can also allow a customer to check remotely on her account. For example, the customer can view her contact information, personal information, purchase and lease information, deal information, or any other information related to the customer and available to the dealer. Optionally, the dealer can restrict or choose the information available to the customer. In some embodiments, the customer can check on the status of service or repair orders, parts orders, or submit new service requests. For example, the customer can get updated information regarding when the customer's vehicle is available for pickup.

Smartphone or Portable Device Interface

In some embodiments, the system can at least in part be implemented by an application, script, or other interactive interface on a laptop, smartphone, tablet, e-reader, television, or other interactive electronic device. Such embodiments can have features and functions similar or identical to the web-based embodiments described above. For example, the customer can logon or enter search criteria; view, sort, and share deals or offers; contact dealers; receive sale or offer alerts, manage account information, view service alerts or updates, or the like. Data can be exchanged with a dealer or other remote server via one or more network connections available to the device. A smartphone, for example, can communicate with a dealer using Wi-Fi or a cellular radio. The smartphone can provide the dealer or remote server with any available information on the customer or device including location information and device details.

In some embodiments, an application running on a portable device can provide alerts or notifications to the customer even when the application is closed, not active, or running in the background. For example, limited-time offers or service update notifications can be provided to the customer via a notification interface on the device (e.g., a notification interface provided by Android, IOS, Windows Phone, Symbian OS, or BlackBerry OS). The user can enter the application to obtain additional details, perform further searching, or access any other functionality provided by the application. In some embodiments, a smartphone application can notify a customer when her vehicle is available for pickup and also provide deals and offers updated or generated in real-time. The application can be programmed to provide any or all of the functions of the web-based interface, the dealer system, or any other disclosed embodiment.

In still other embodiments, a dealer interface can be provided on a portable device. The dealer interface can allow a dealer to view customer information, updated deals or offers, current alerts, scheduled events or calls, or any other information via a portable device. For example, the application can provide the dealer with contact information for potential customers and facilitate immediate interaction between the dealer and the potential customer via phone, email, message, or the like. The application can also provide tools for customer account management and providing real-time deals based on updated information. For example, a dealer could use her smartphone to enter updated mileage, financial, or warranty information for a customer and to see immediately deals or offers that might be of interest to the customer.

Broadly Applicable

Although this disclosure is made with reference to preferred and example embodiments, the systems and methods disclosed are not limited to the preferred embodiments only. Rather, a skilled artisan will recognize from the disclosure herein a wide number of alternatives. Unless indicated otherwise, it may be assumed that the process steps described herein are implemented within one or more modules, including logic embodied in hardware or firmware, or a collection of software instructions, possibly having entry and exit points, written in a programming language, such as, for example C++. A software module may be compiled and linked into an executable program, installed in a dynamic link library, or may be written in an interpretive language such as BASIC. It will be appreciated that software modules may be callable from other modules or from themselves, and/or may be invoked in response to detected events or interrupts. Software instructions may be embedded in firmware, such as an EPROM or EEPROM. It will be further appreciated that hardware modules may be comprised of connected logic units, such as gates and flip-flops, and/or may be comprised of programmable units, such as programmable gate arrays or processors. The modules described herein are preferably implemented as software modules, but may be represented in hardware or firmware. The software modules may be executed by one or more general purpose computers. The software modules may be stored on or within any suitable computer-readable medium. The data described herein may be stored in one or more suitable mediums, including but not limited to a computer-readable medium. The data described herein may be stored in one or more suitable formats, including but not limited to a data file, a database, an expert system, or the like.

Although the foregoing systems and methods have been described in terms of certain preferred embodiments, other embodiments will be apparent to those of ordinary skill in the art from the disclosure herein. For example, although described in the context of automobiles, any good or service associated with a series of one or more payments may be used with embodiments of these aspects. Thus, any good or service, whether related to automobiles or unrelated to automobiles, is contemplated. Accordingly, the concepts represented herein may apply to any consumer or commercial good that is financed or leased over time, such as aircraft, heavy equipment, high tech equipment, or the like. Further, although particular make, models, and other automobile-specific information is described, any make, model, or other information may be used. Also, any use related to vehicles or unrelated to vehicles may be used. Additionally, other combinations, omissions, substitutions and modifications will be apparent to the skilled artisan in view of the disclosure herein. Accordingly, the present disclosure is not limited to the preferred embodiments. Rather, the claims that follow define the systems and methods.

What is claimed is:

1. A system comprising:

a computer readable storage medium comprising program instructions; and one or more processors configured to execute the program instructions to cause the system to:

receive, via a first computing device from a car maintenance system associated with a service location, an automated alert comprising a vehicle identifier associated with a first individual and a first vehicle, wherein the automated alert indicates that the first vehicle is or was at the service location;

in response to receiving the automated alert, determine, in real-time, from vehicle-related data from a vehicle-related database, that that the first individual is a qualifying individual;

generate first data for rendering, on a second computing device, a first graphical user interface associated with vehicles;

receive, via the first graphical user interface on the second computing device, an input parameter associated with at least one of a vehicle transaction or the first vehicle;

generate second data for rendering, on the second computing device, a second graphical user interface comprising an alert indicating that the first individual is the qualifying individual and that the first vehicle is or was at the service location;

receive, via the second graphical user interface, a user selection; and in response to receiving the user selection, generate third data for rendering, on the second computing device, a third graphical user interface comprising existing summary transaction data associated with the first individual, summary existing vehicle data for the first vehicle, summary replacement transaction data associated with the first individual, and summary replacement vehicle data associated with the summary replacement transaction data.

2. The system of claim 1, wherein the one or more processors are further configured to execute further program instructions to cause the system to:

determine a mileage value associated with the first vehicle; and determine a priority indicator associated with the first individual, wherein determining the priority indicator comprises determining that the mileage value satisfies a threshold, and wherein the second graphical user interface comprises the priority indicator associated with the alert.

3. The system of claim 1, wherein the one or more processors are further configured to execute further program instructions to cause the system to:

determine a date associated with a first vehicle transaction and the first individual; and determine a priority indicator associated with the first individual, wherein determining the priority indicator comprises determining that the date satisfies a threshold, and wherein the second graphical user interface comprises the priority indicator associated with the alert.

4. The system of claim 1, wherein the one or more processors are further configured to execute further program instructions to cause the system to:

determine a first payment value associated with a first vehicle transaction and the first individual;

determine a second payment value associated with a replacement transaction, a replacement vehicle, and the first individual; and determine a priority indicator associated with the first individual, wherein determining the priority indicator comprises determining that a difference between the first payment value and the second payment value satisfied a threshold, and wherein the second graphical user interface comprises the priority indicator associated with the alert.

5. The system of claim 1, wherein the one or more processors are further configured to execute further program instructions to cause the system to:

determine a priority indicator associated with the first individual based at least in part on (i) a mileage value associated with the first vehicle and (ii) a date associated with a first vehicle transaction and the first individual, wherein the second graphical user interface comprises the priority indicator associated with the alert.

6. The system of claim 1, wherein the one or more processors are further configured to execute further program instructions to cause the system to:

transmit, to a computing device associated with the first individual, an electronic communication associated with a potential new transaction for the first individual.

7. A method comprising:

by one or more processors executing program instructions:

receiving, via a first computing device associated with a service location, an automated alert comprising a vehicle identifier associated with a first individual and a first vehicle, wherein the automated alert indicates that the first vehicle is or was at the service location;

in response to receiving the automated alert, determining, in real-time, from vehicle-related data from a vehicle-related database, that that the first individual is a qualifying individual;

generating first data for rendering, on a second computing device, a first graphical user interface associated with vehicles;

receiving, via the first graphical user interface on the second computing device, an input parameter associated with at least one of a vehicle transaction or the first vehicle;

generating second data for rendering, on the second computing device, a second graphical user interface comprising a first alert indicating that the first individual is the qualifying individual and that the first vehicle is or was at the service location;

receiving, via the second graphical user interface, a user selection; and in response to receiving the user selection, generating third data for rendering, on the second computing device, a third graphical user interface comprising existing summary transaction data associated with the first individual, summary existing vehicle data for the first vehicle, summary replacement transaction data associated with the first individual, and summary replacement vehicle data associated with the summary replacement transaction data.

8. The method of claim 7, further comprising:

determining a mileage value associated with the first vehicle; and determining a priority indicator associated with the first individual, wherein determining the priority indicator comprises determining that the mileage value satisfies a threshold, and wherein the second graphical user interface comprises the priority indicator associated with the first alert.

9. The method of claim 7, further comprising:

determining a date associated with a first vehicle transaction and the first individual; and determining a priority indicator associated with the first individual, wherein determining the priority indicator comprises determining that the date satisfies a threshold, and wherein the second graphical user interface comprises the priority indicator associated with the first alert.

10. The method of claim 7, further comprising:

determining a first payment value associated with a first vehicle transaction and the first individual;

determining a second payment value associated with a replacement transaction, a replacement vehicle, and the first individual; and determining a priority indicator associated with the first individual, wherein determining the priority indicator comprises determining that a difference between the first payment value and the second payment value satisfied a threshold, and wherein the second graphical user interface comprises the priority indicator associated with the first alert.

11. The method of claim 7, further comprising:

determining a priority indicator associated with the first individual based at least in part on (i) one or more service dates, (ii) a mileage value associated with the first vehicle, and (iii) a date associated with a first vehicle transaction and the first individual, wherein the second graphical user interface comprises the priority indicator associated with the first alert.

12. The method of claim 7, further comprising:

determining a set of priority categories associated with the first individual and at least one of (i) one or more service dates, (ii) a mileage value associated with the first vehicle, (iii) a date associated with a first vehicle transaction and the first individual, or (iv) an expected payment difference between a first vehicle transaction and a replacement transaction;

determining, from the set of priority categories, that the first individual is associated with multiple priority categories;

increasing a priority indicator associated with the first individual to a higher priority indicator, wherein the second graphical user interface comprises the higher priority indicator associated with the first alert.

13. The method of claim 7, further comprising:

transmit, to a computing device associated with a dealer representative, an electronic communication associated with the first individual.

14. A system comprising:

a computer readable storage medium comprising program instructions; and one or more processors configured to execute the program instructions to cause the system to:

receive, via a first computing device associated with a service location, an automated alert comprising a vehicle identifier associated with a first individual and a first vehicle, wherein the automated alert indicates that the first vehicle is or was at the service location;

in response to receiving the automated alert, determine, in real-time, from vehicle-related data from a vehicle-related database, that that the first individual is a qualifying individual;

generate first data for rendering, on a second computing device, a first graphical user interface associated with vehicles;

receive, via the first graphical user interface on the second computing device, an input parameter associated with at least one of a vehicle transaction or the first vehicle;

generate second data for rendering, on the second computing device, a second graphical user interface comprising a first alert indicating that the first individual is the qualifying individual and that the first vehicle is or was at the service location;

receive, via the second graphical user interface, a user selection; and in response to receiving the user selection, generate third data for rendering, on the second computing device, a third graphical user interface comprising summary existing transaction data associated with the first individual, summary existing vehicle data for the first vehicle, summary replacement transaction data associated with the first individual, and summary replacement vehicle data associated with the summary replacement transaction data.

15. The system of claim 14, wherein the one or more processors are further configured to execute further program instructions to cause the system to:

determine a mileage value associated with the first vehicle; and determine a priority indicator associated with the first individual, wherein determining the priority indicator comprises determining that the mileage value satisfies a threshold, and wherein the second graphical user interface comprises the priority indicator associated with the first alert.

16. The system of claim 14, wherein the one or more processors are further configured to execute further program instructions to cause the system to:

determine a date associated with a first vehicle transaction and the first individual; and determine a priority indicator associated with the first individual, wherein determining the priority indicator comprises determining that the date satisfies a threshold, and wherein the second graphical user interface comprises the priority indicator associated with the first alert.

17. The system of claim 14, wherein the one or more processors are further configured to execute further program instructions to cause the system to:

determining a first payment value associated with a first vehicle transaction and the first individual;

determining a second payment value associated with a replacement transaction, a replacement vehicle, and the first individual; and determining a priority indicator associated with the first individual, wherein determining the priority indicator comprises determining that a difference between the first payment value and the second payment value satisfied a threshold, and wherein the second graphical user interface comprises the priority indicator associated with the first alert.

18. The system of claim 14, wherein the one or more processors are further configured to execute further program instructions to cause the system to:

determine a priority indicator associated with the first individual based at least in part on (i) one or more service dates, (ii) a mileage value associated with the first vehicle, and (iii) a date associated with a first vehicle transaction and the first individual, wherein the second graphical user interface comprises the priority indicator associated with the first alert.

19. The system of claim 14, wherein the one or more processors are further configured to execute further program instructions to cause the system to:

determine a set of priority categories associated with the first individual and at least one of (i) one or more service dates, (ii) a mileage value associated with the first vehicle, (iii) a date associated with a first vehicle transaction and the first individual, or (iv) an expected payment difference between a first vehicle transaction and a replacement transaction;

determine, from the set of priority categories, that the first individual is associated with multiple priority categories;

increase a priority indicator associated with the first individual to a higher priority indicator, wherein the second graphical user interface comprises the higher priority indicator associated with the first alert.

20. The system of claim 14, wherein the one or more processors are further configured to execute further program instructions to cause the system to:

transmit, to a computing device associated with the first individual, an electronic communication associated with a potential new transaction for the first individual.

* * * * *